United States Patent
Ikeda et al.

(10) Patent No.: US 8,189,033 B2
(45) Date of Patent: May 29, 2012

(54) RECORDING MEDIUM, PLAYBACK DEVICE, AND INTEGRATED CIRCUIT

(75) Inventors: Wataru Ikeda, Osaka (JP); Taiji Sasaki, Osaka (JP); Tomoki Ogawa, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 206 days.

(21) Appl. No.: 12/706,120

(22) Filed: Feb. 16, 2010

(65) Prior Publication Data

US 2010/0215343 A1  Aug. 26, 2010

Related U.S. Application Data

(60) Provisional application No. 61/153,994, filed on Feb. 20, 2009.

(51) Int. Cl.
*H04N 13/00* (2006.01)

(52) U.S. Cl. ......................................................... 348/42

(58) Field of Classification Search .............. 348/42–49; 386/124; *H04N 7/12*
See application file for complete search history.

(56) References Cited

U.S. PATENT DOCUMENTS

| | | | |
|---|---|---|---|
| 5,923,869 A | 7/1999 | Kashiwagi et al. |
| 6,393,574 B1 | 5/2002 | Kashiwagi et al. |
| 6,470,460 B1 | 10/2002 | Kashiwagi et al. |
| 6,573,819 B1 | 6/2003 | Oshima |
| 6,574,423 B1 | 6/2003 | Oshima et al. |
| 6,925,250 B1 | 8/2005 | Oshima et al. |
| 7,802,178 B2 | 9/2010 | Ikeda et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |

(Continued)

FOREIGN PATENT DOCUMENTS

JP  2004-328566  11/2004

(Continued)

OTHER PUBLICATIONS

International Search Report issued May 11, 2010 in International (PCT) Application No. PCT/JP2010/000664.

(Continued)

*Primary Examiner* — Tung Vo
(74) *Attorney, Agent, or Firm* — Wenderoth, Lind & Ponack, L.L.P.

(57) ABSTRACT

The recording medium 100 stores playlist information and a plurality of elementary streams. The playlist information includes a basic stream selection table and an extension stream selection table. The basic stream selection table shows elementary streams that are permitted to be played back in a monoscopic playback mode. The extension stream selection table shows elementary streams that are permitted to be played back only in a stereoscopic playback mode. The stream entry in the extension stream selection table indicates a packet identifier that is to be used by the playback device to perform demultiplexing when the playback device is in the stereoscopic playback mode and the corresponding stream number is set in the stream number register provided in the playback device.

7 Claims, 105 Drawing Sheets

U.S. PATENT DOCUMENTS

| | | |
|---|---|---|
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2007/0002041 A1* | 1/2007 | Kim et al. ............. 345/419 |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0103833 A1 | 4/2009 | Mitsuhashi et al. |
| 2009/0142041 A1* | 6/2009 | Nagasawa et al. ........ 386/124 |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0098389 A1 | 4/2010 | Shimada |

FOREIGN PATENT DOCUMENTS

| | | |
|---|---|---|
| JP | 2006-230001 | 8/2006 |
| JP | 3935507 | 3/2007 |
| JP | 2007-129368 | 5/2007 |
| JP | 2007-166651 | 6/2007 |
| JP | 2008-5203 | 1/2008 |
| WO | 2008/114595 | 9/2008 |

OTHER PUBLICATIONS

English translation of International Preliminary Report on Patentability issued Oct. 4, 2010 in International (PCT) Application No. PCT/JP2010/000664.

JPO International Search Report issued May 11, 2010 in corresponding International (PCT) Application No. PCT/JP2010/000668.

* cited by examiner

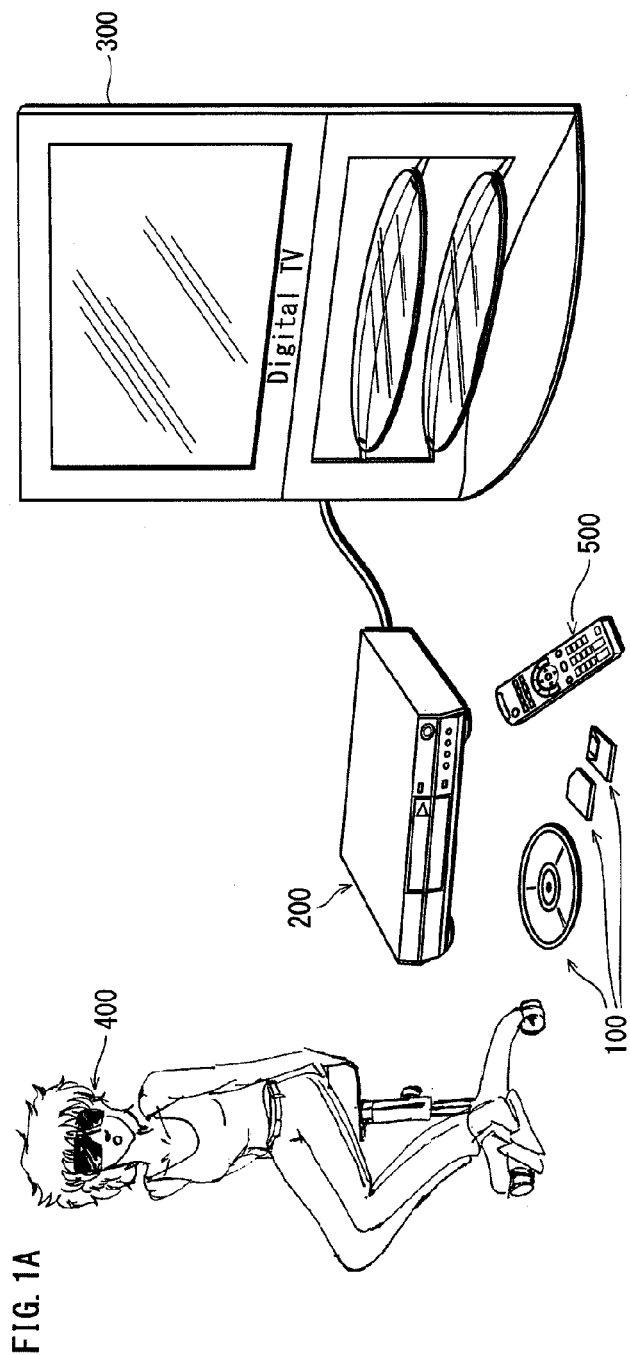
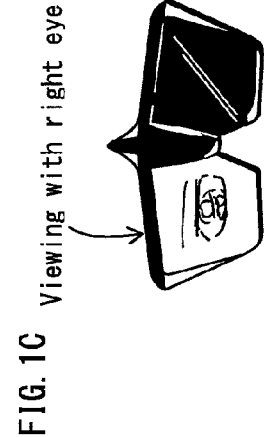
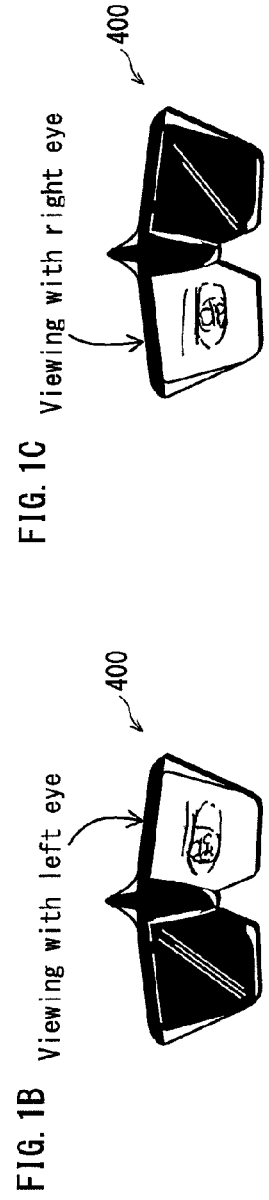

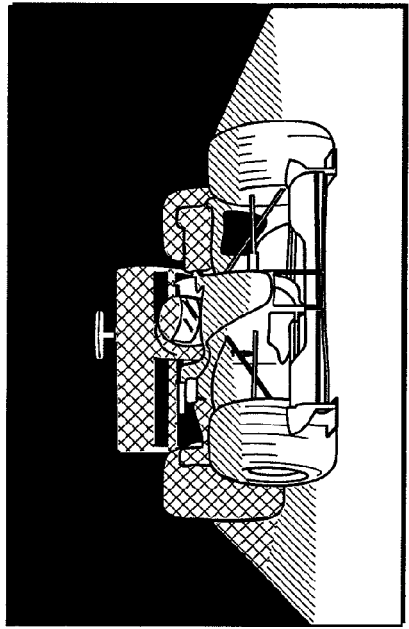
FIG. 6B Grayscale representing depth
Relationship between image and brightness
▩ Deeper
▨
□ Shallower
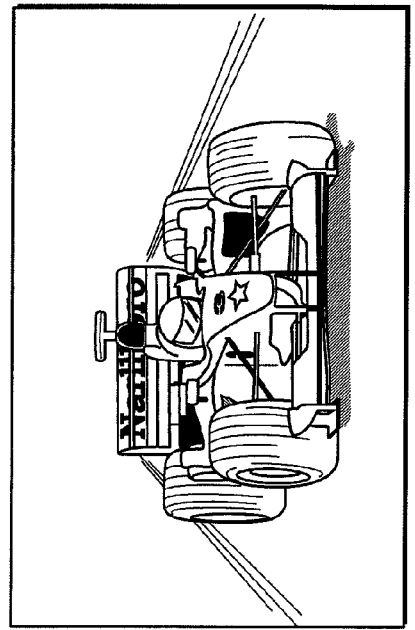
FIG. 6D
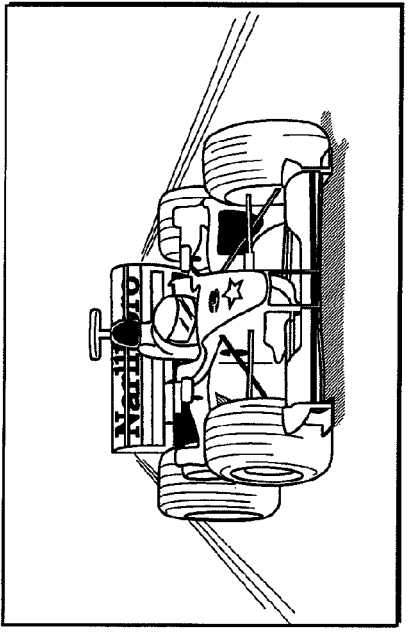
FIG. 6A
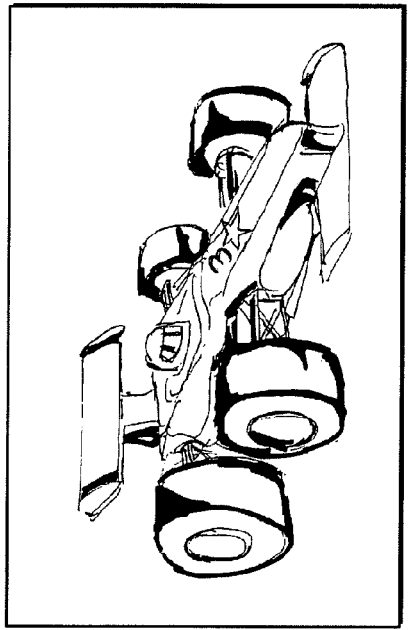
FIG. 6C Recording medium

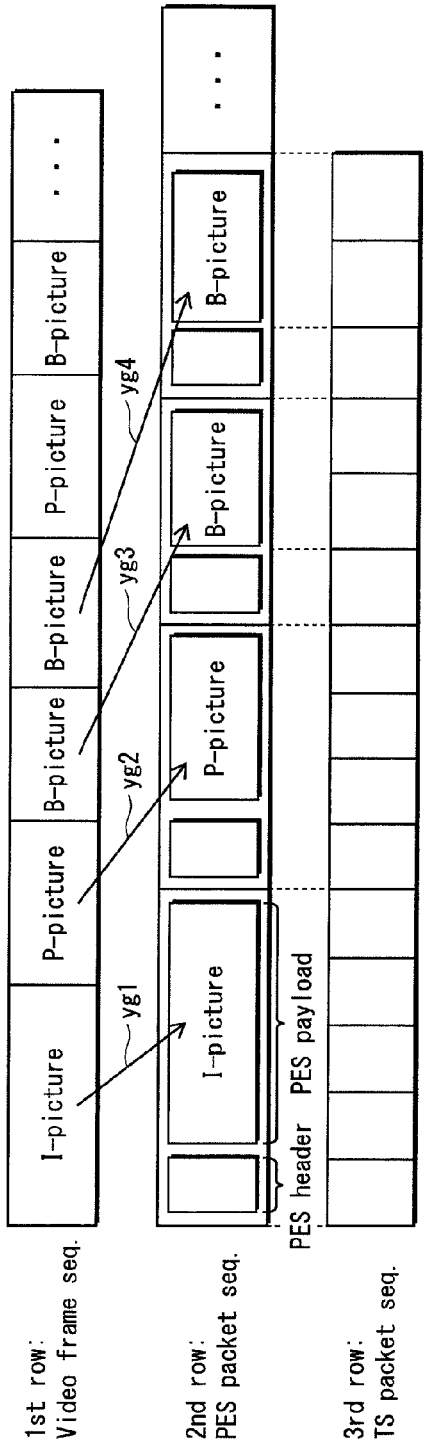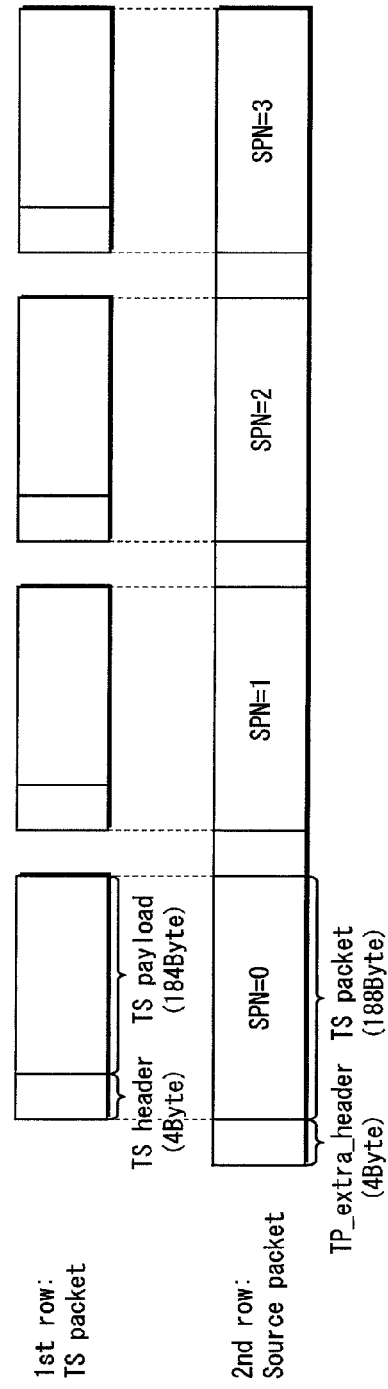
FIG. 9A
FIG. 9B

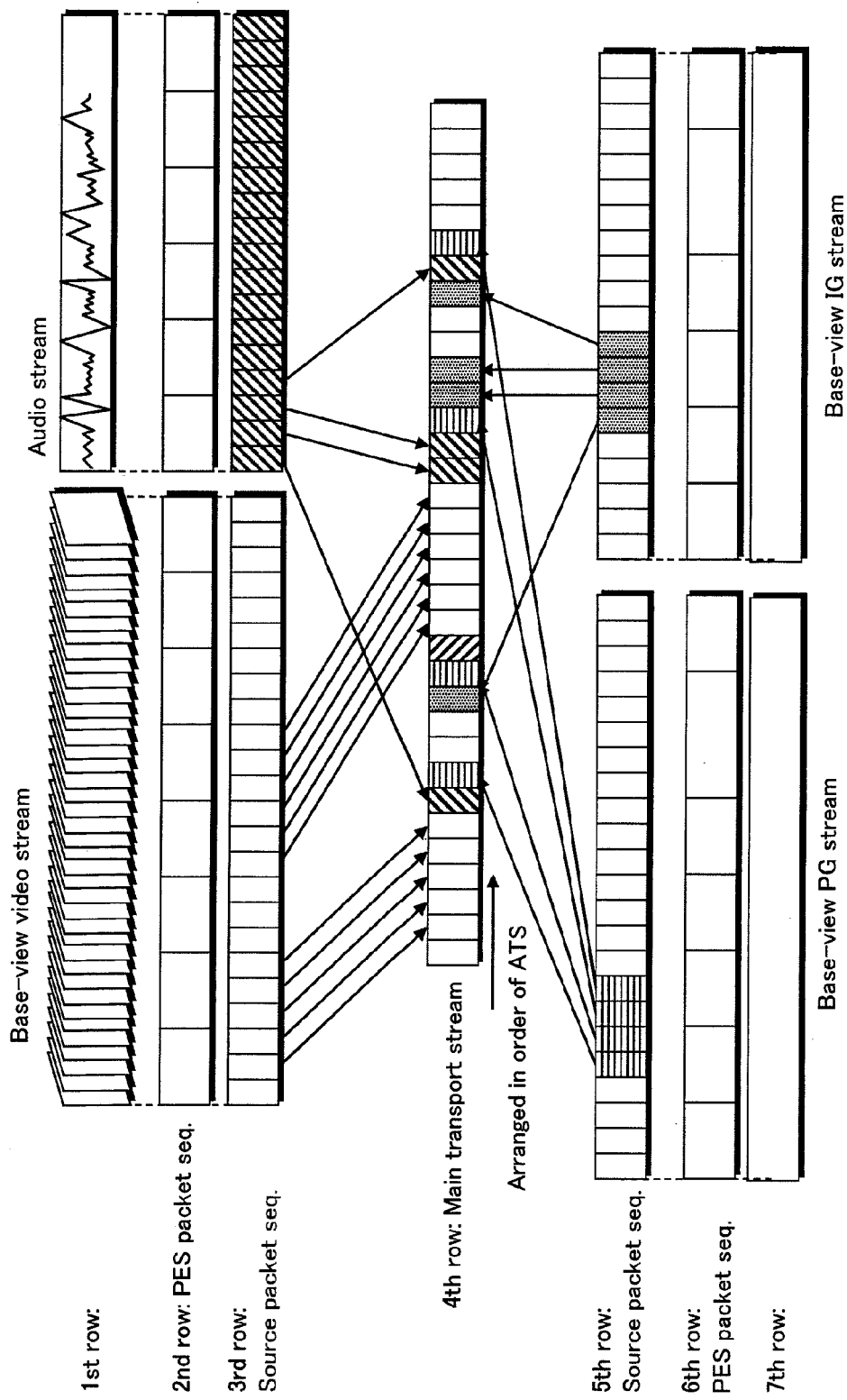

FIG. 14

Extension data

| Extension stream selection table (STN_table_SS) |
|---|
| Length |
| Fixed_offset_during_Popup |
| Dependent-view video stream registration seq. corresponding to playitem #1 } Registration seq. corresponding to playitem #1 |
| PG stream registration seq. corresponding to playitem #1 |
| IG stream registration seq. corresponding to playitem #1 |
| Dependent-view video stream registration seq. corresponding to playitem #2 } Registration seq. corresponding to playitem #2 |
| PG stream registration seq. corresponding to playitem #2 |
| IG stream registration seq. corresponding to playitem #2 |
| ... |
| Dependent-view video stream registration seq. corresponding to playitem #N } Registration seq. corresponding to playitem #N |
| PG stream registration seq. corresponding to playitem #N |
| IG stream registration seq. corresponding to playitem #N |

N represents the number of playitems in main path

FIG. 15A

Dependent-view video stream registration seq.

| SS_dependent_view_block #1 |
| SS_dependent_view_block #2 |
| ... |
| SS_dependent_view_block #V(x) |

| Stream No. =1 | Stream_entry |
| | Stream_attribute |
| | number_of_offset_sequence |

FIG. 15B

PG stream registration seq.

| PG stream registration info #1 |
| PG stream registration info #2 |
| ... |
| PG stream registration info #P(x) |

| Stream No. =1 | PG_text_ST_offset_sequence_id_ref |
| | is_SS_PG |
| | Stream_entry_for_Base_View |
| | Stream_entry_for_Dependent_View |
| | Stream_attribute |
| | SS_PG_text_ST_offset_sequence_id_ref |

FIG. 15C

IG stream registration seq.

| IG stream registration info #1 |
| IG stream registration info #2 |
| ... |
| IG stream registration info #I(x) |

| Stream No. =1 | IG_offset_sequence_id_ref |
| | IG_Plane_offset_direction_during_BB_video |
| | IG_Plane_offset_value_BB_video |
| | is_SS_IG |
| | Stream_entry_for_base_view |
| | Stream_entry_for_dependent_view |
| | Stream_attributes |
| | SS_IG_offset_sequence_id_ref |

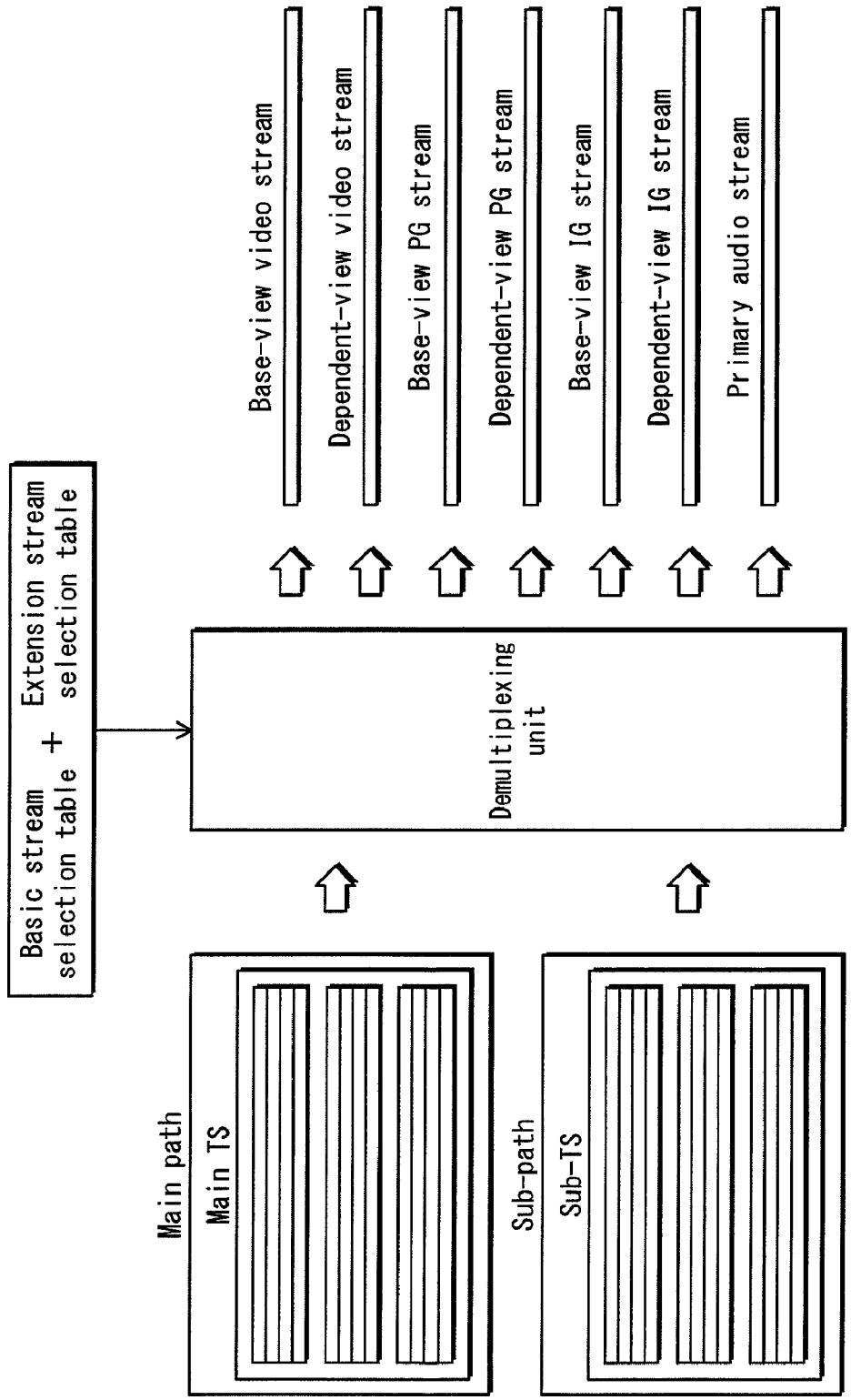

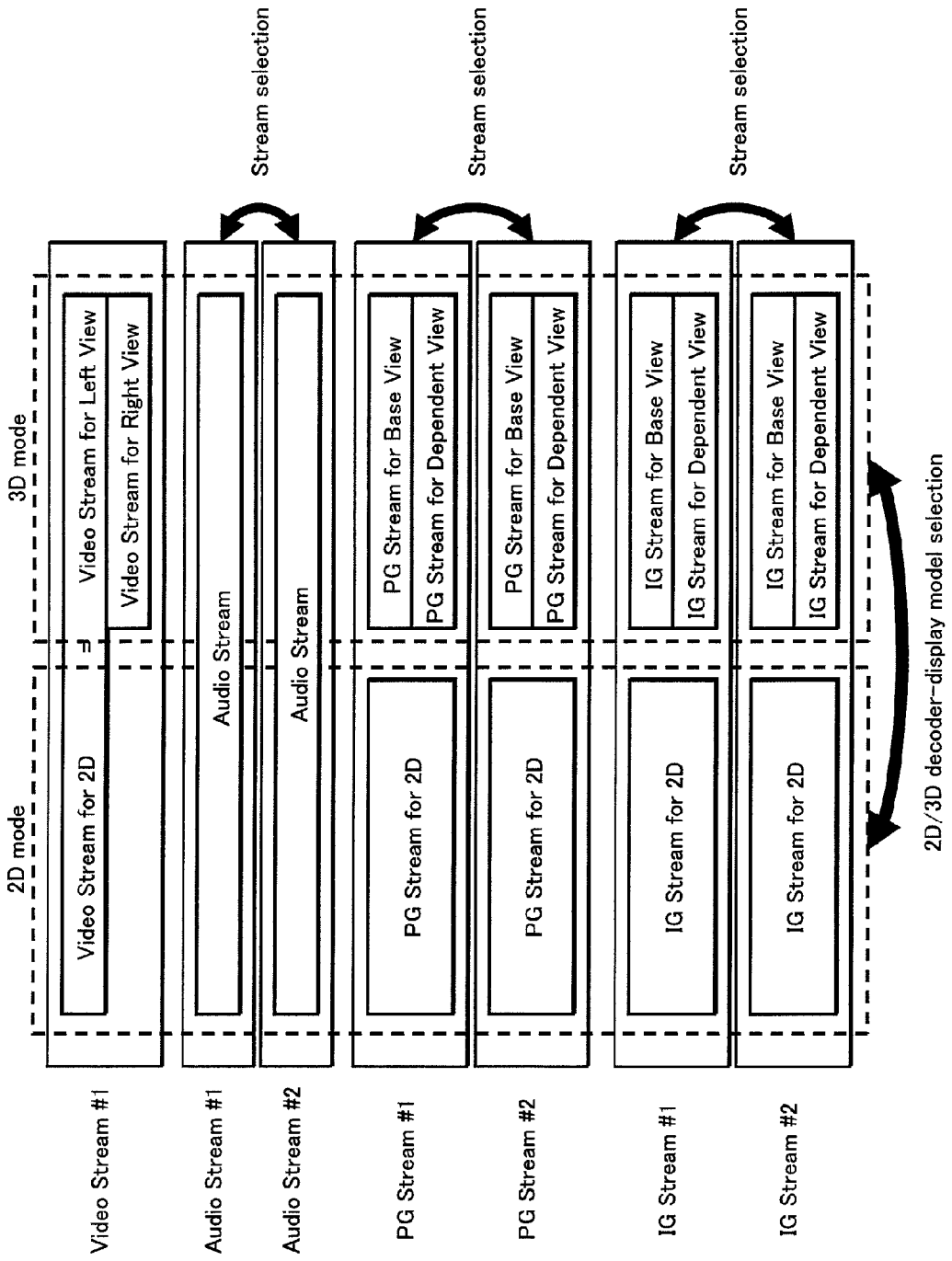

FIG. 19

```
STN_table_SS() {
for(PlayItem_id=0;PlayItem_id<number_of_PlayItems;PlayItem_id++) {
    length
    Fixed_offset_during_PopUp
        for(primary_video_stream_id=0;
            primary_video_stream_id
            <number_of_primary_video_stream_entries;
            primary_video_stream_id ++) {
            SS_dependent_view_block() {
                stream_entry()
                stream_attributes()
                number_of_offset_sequence
            }
        }
        for(PG_textST_stream_id=0;
            PG_textST_stream_id
            <number_of_PG_textST_stream_entries;
            PG_textST_stream_id ++) {
            PG_textST_offset_sequence_id_ref
            is_SS_PG
            if(is_SS_PG==1b) {
                stream_entry_for_base_view()
                stream_entry_for_dependent_view()
                stream_attributes()
                SS_PG_textST_offset_sequence_id_ref
            }
        }
        for(IG_stream_id=0;
            IG_stream_id<number_of_IG_stream_entries;
            IG_stream_id ++) {
            IG_offset_sequence_id_ref
            IG_Plane_offset_direction_during_BB_video
            IG_Plane_offset_value_during_BB_video
            is_SS_IG
            if(is_SS_IG==1b) {
                stream_entry_for_base_view()
                stream_entry_for_dependent_view()
                stream_attributes()
                if(Fixed_offset_during_PopUp==1) {
                }else{
                    SS_IG_offset_sequence_id_ref
                }
            }
        }
    }
}
```

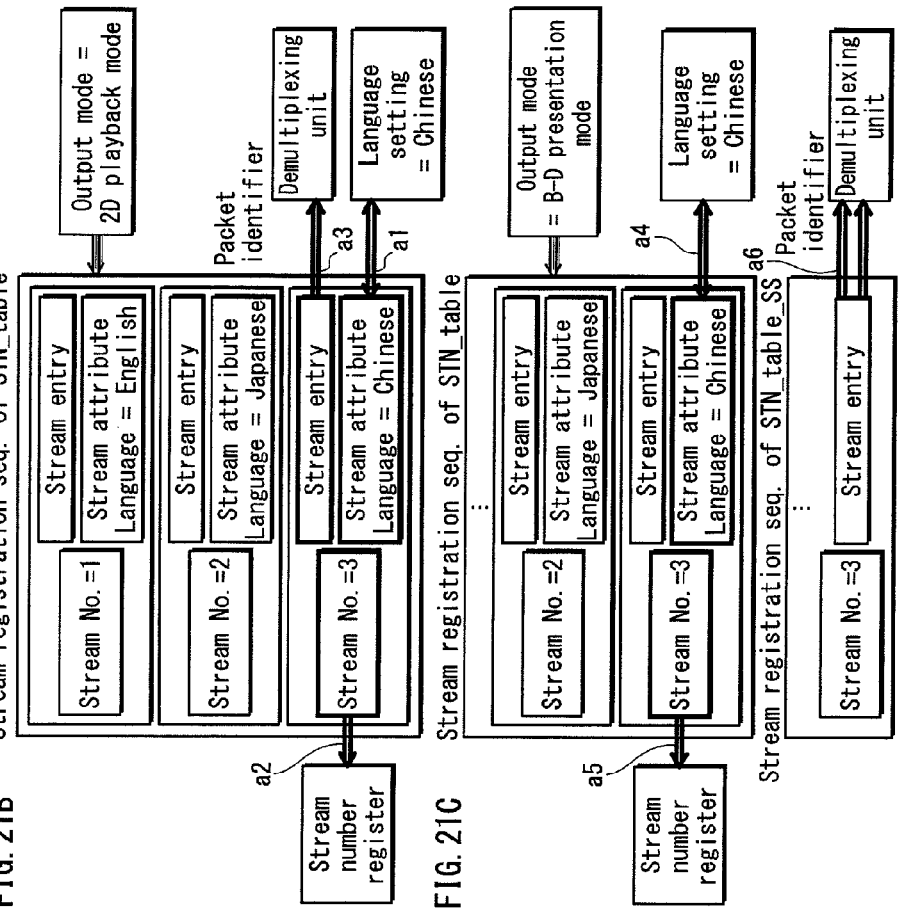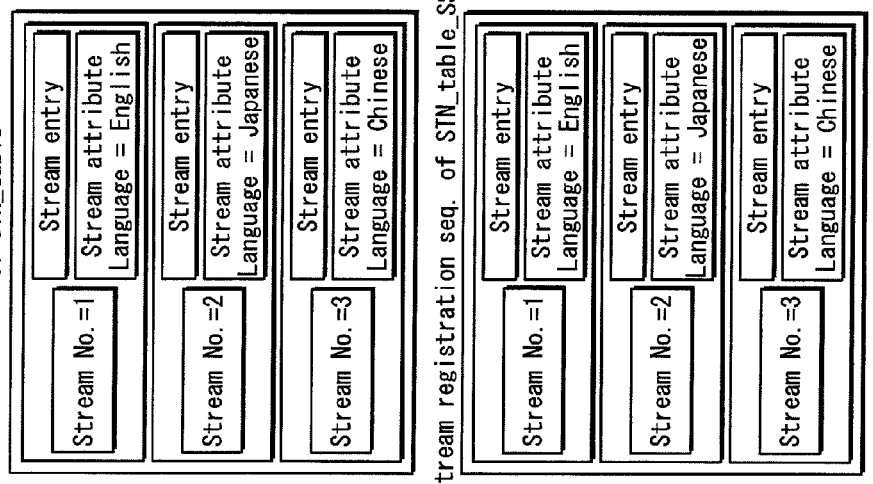

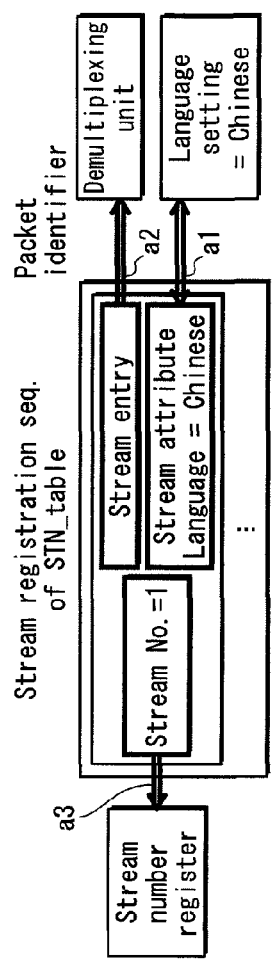
FIG. 22A
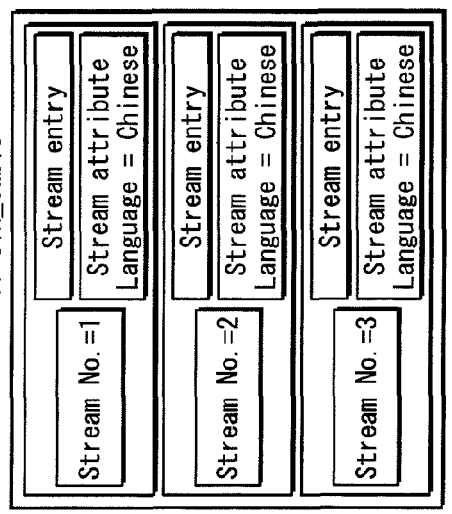
FIG. 22B
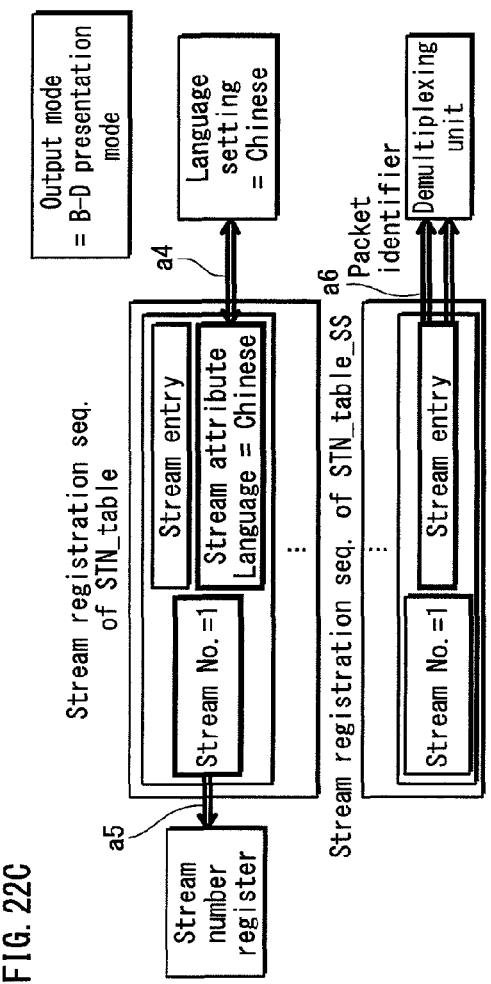
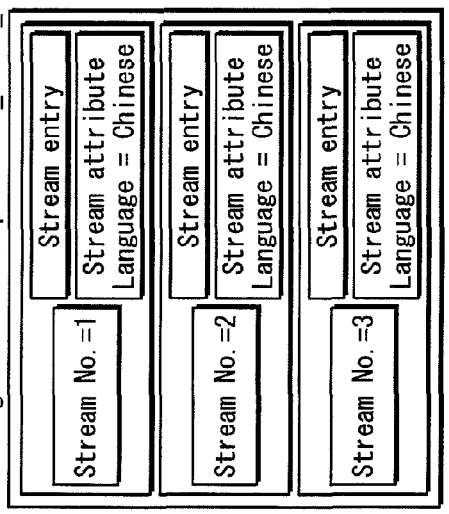
FIG. 22C

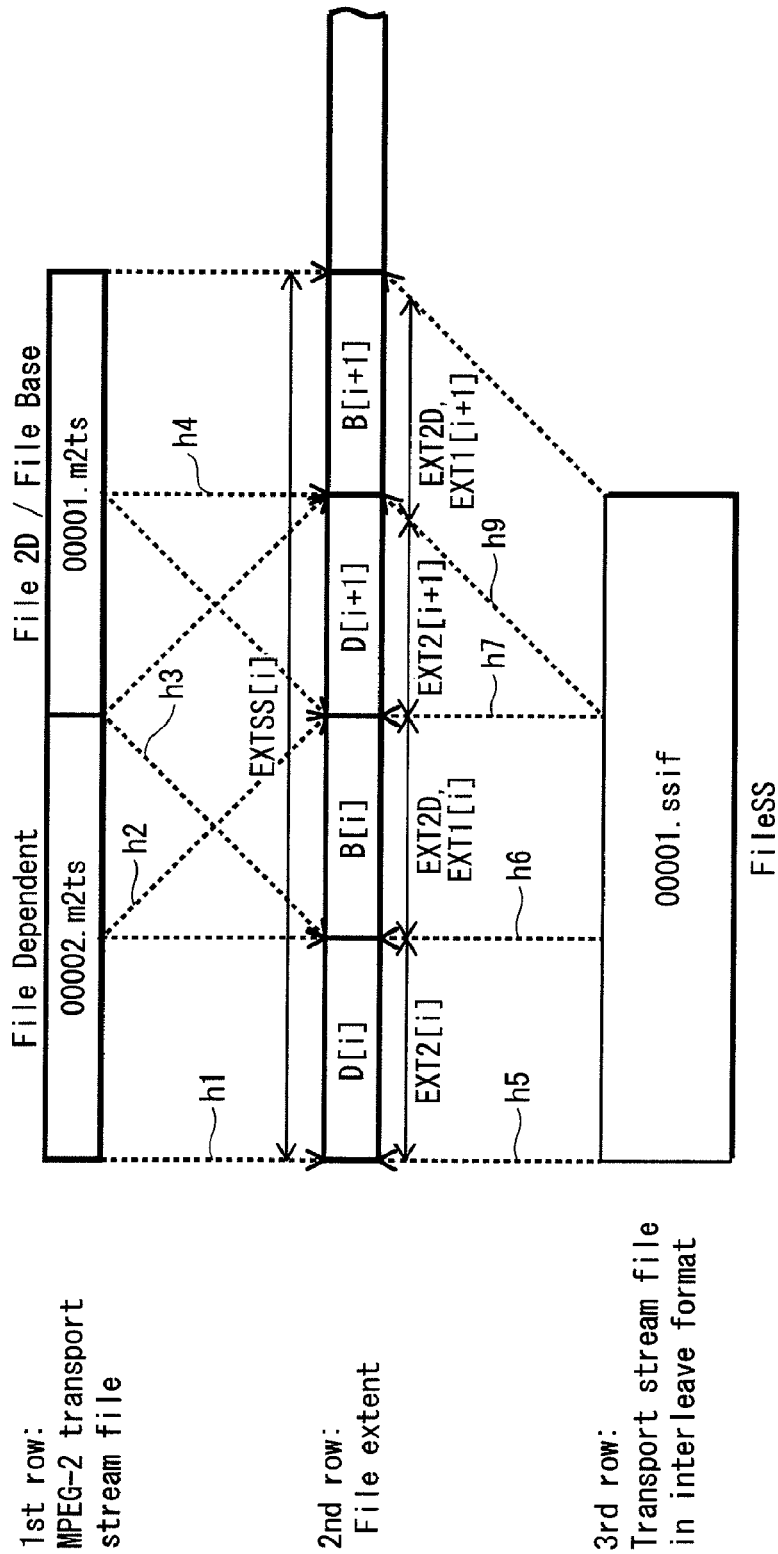

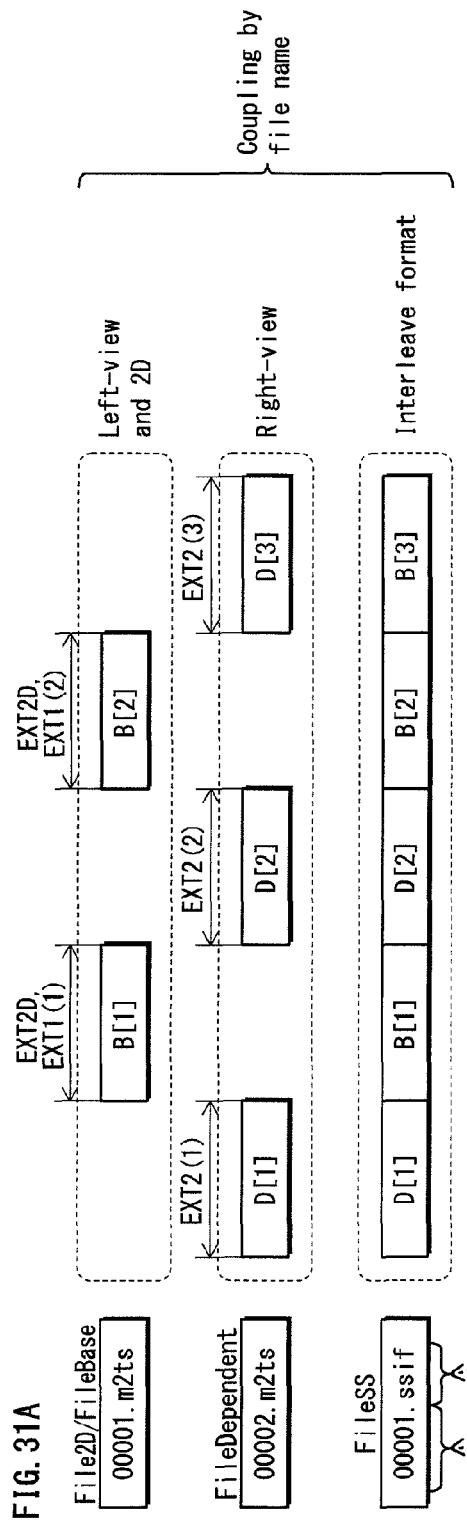
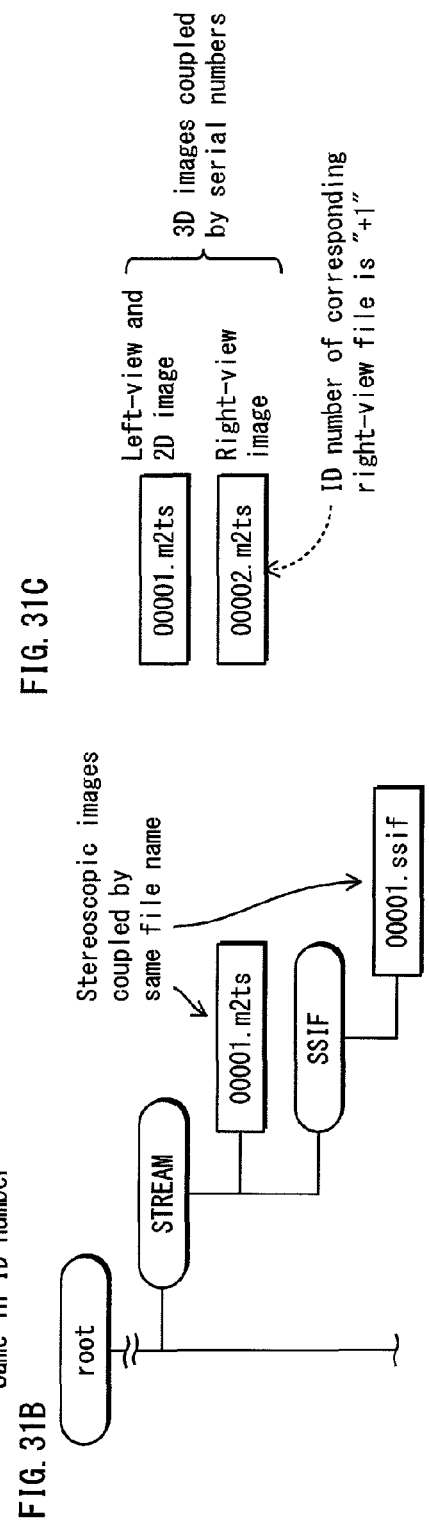

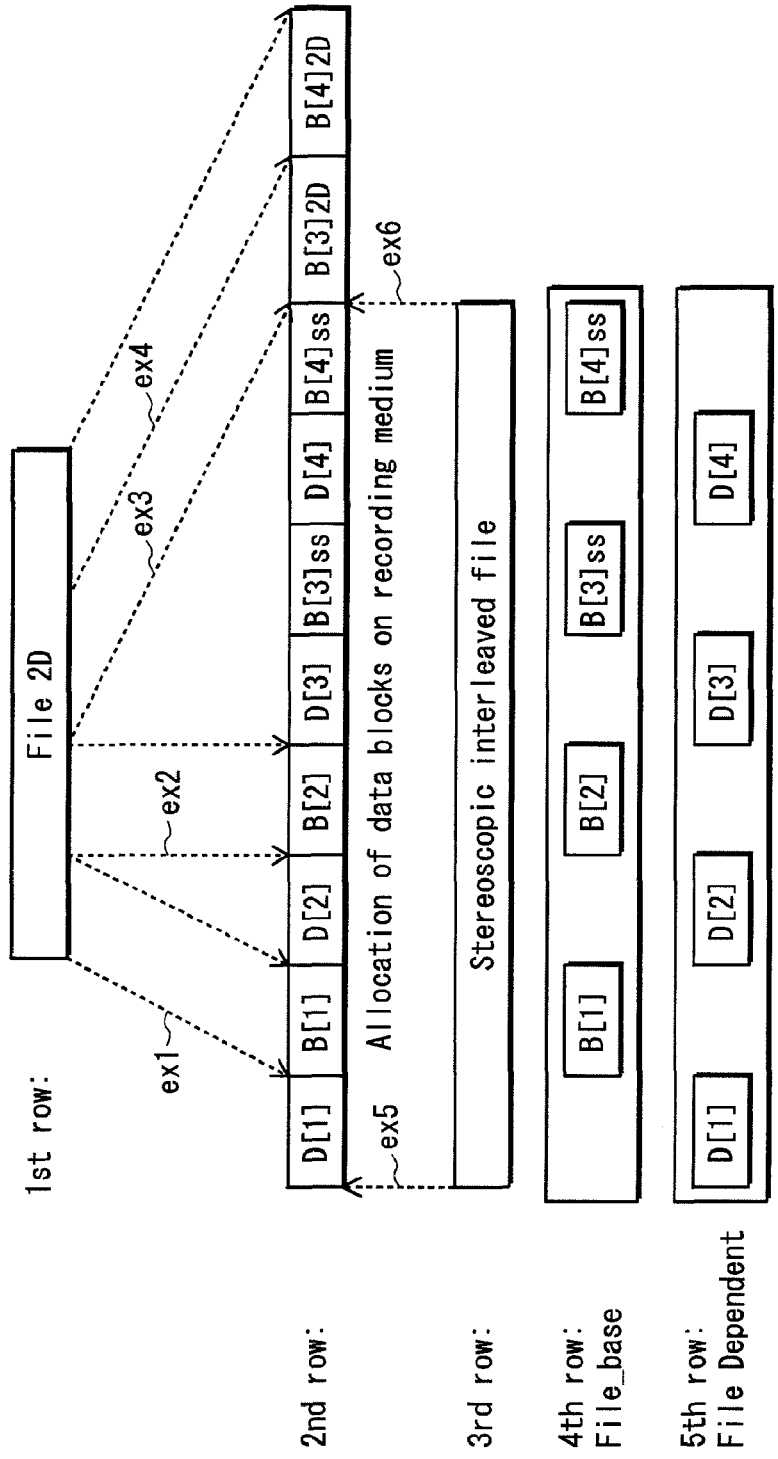

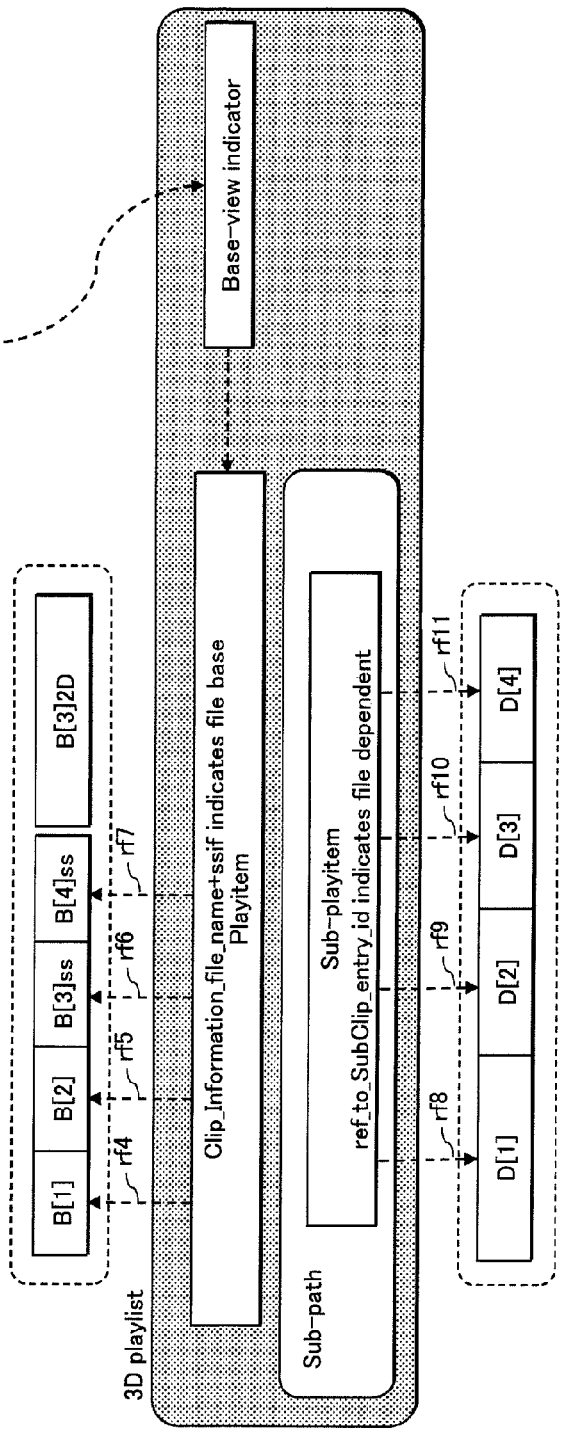
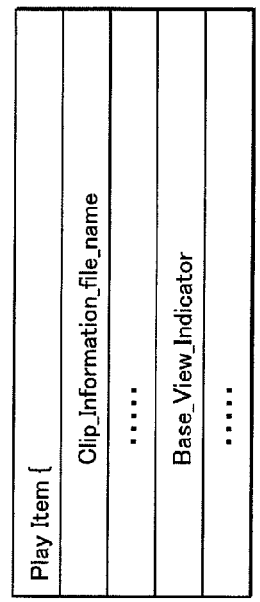
FIG.35A
FIG.35B

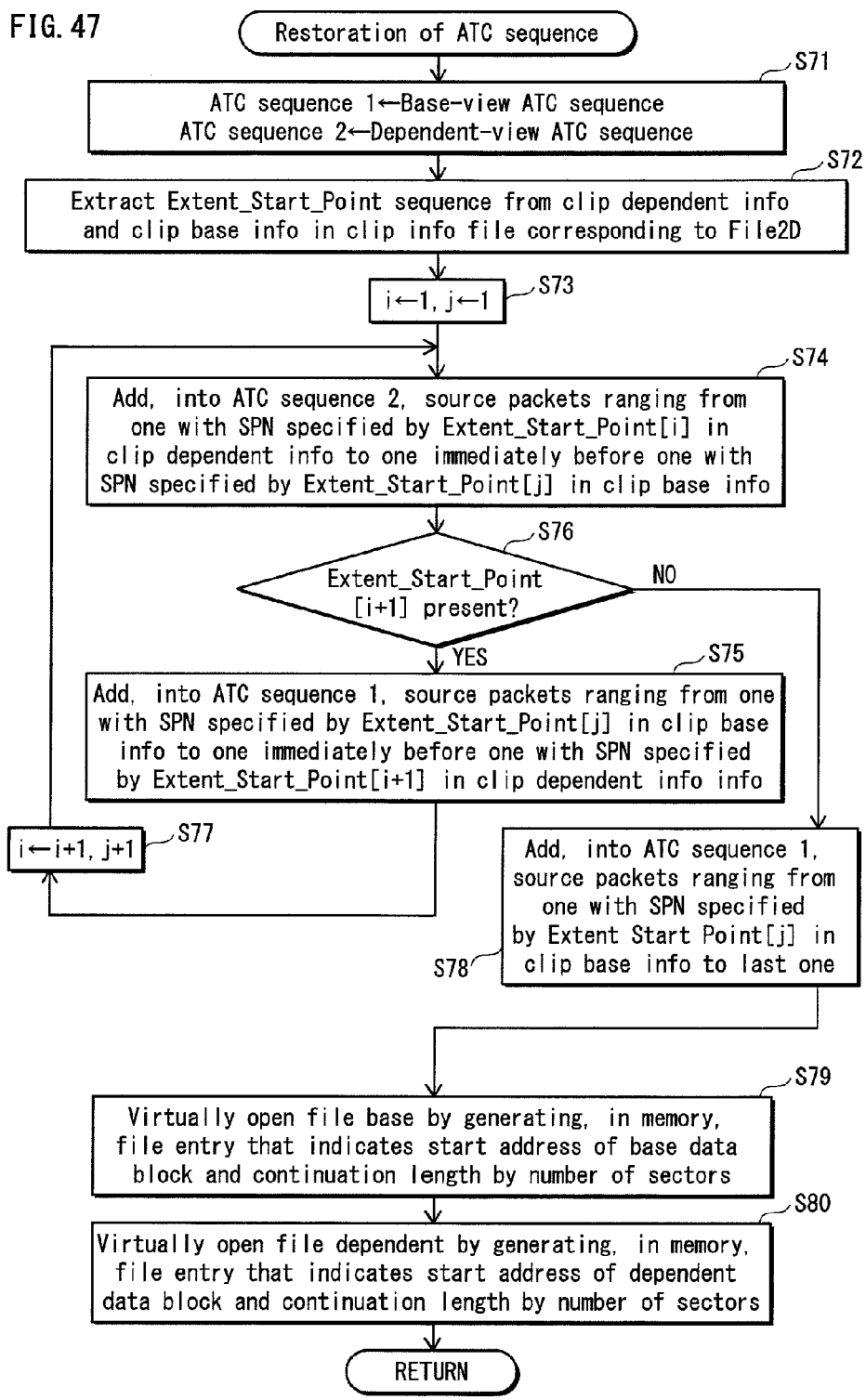

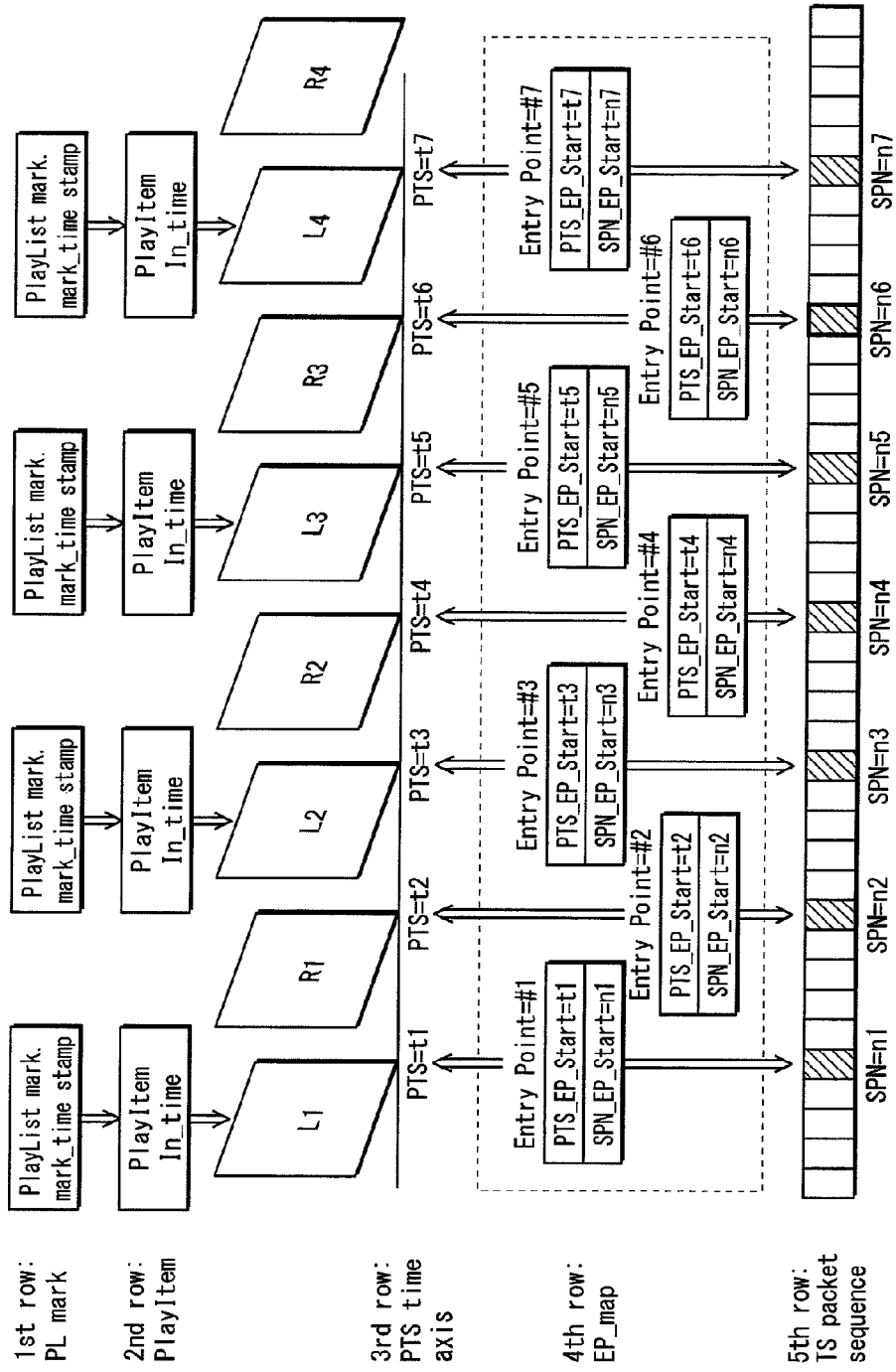

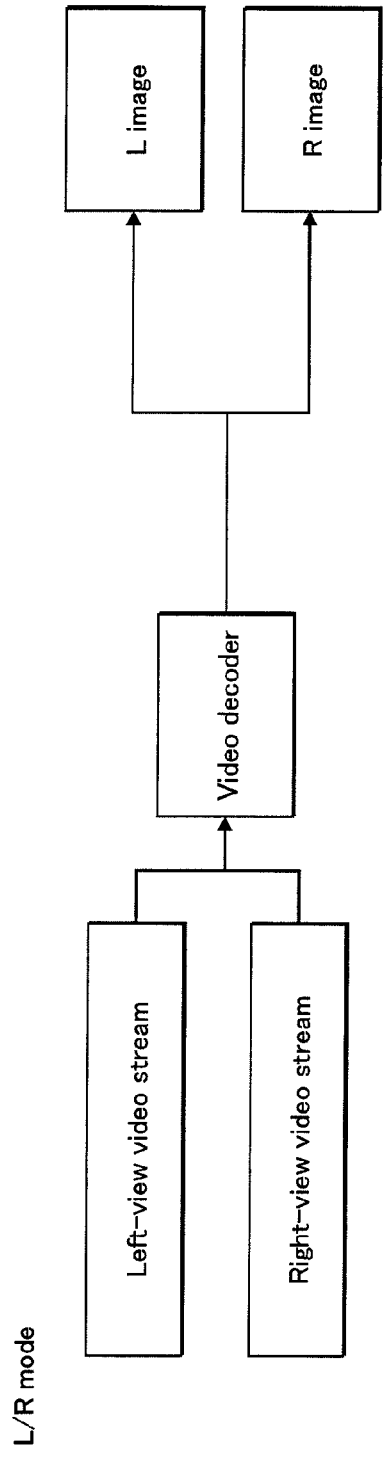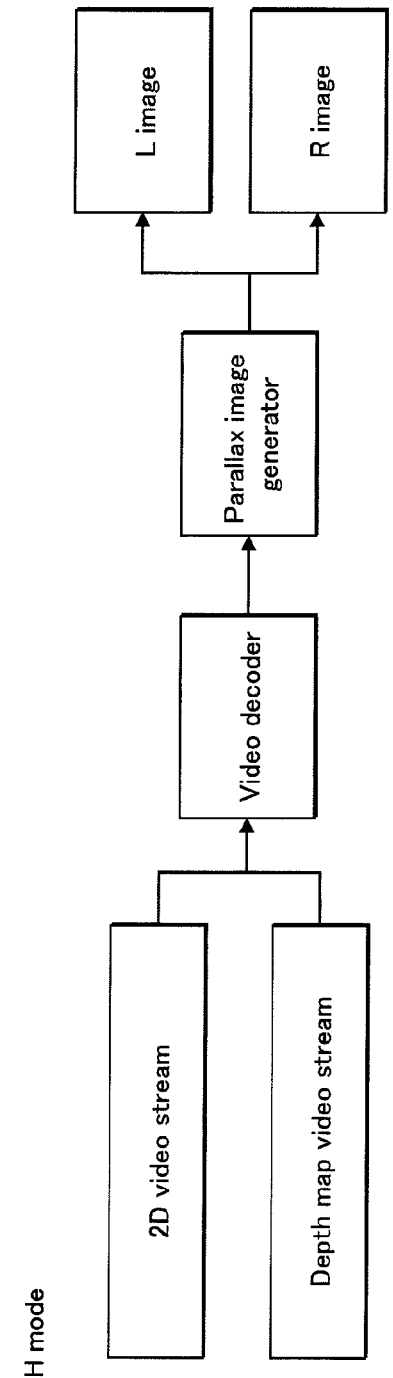
FIG.52A L/R mode
FIG.52B DEPTH mode

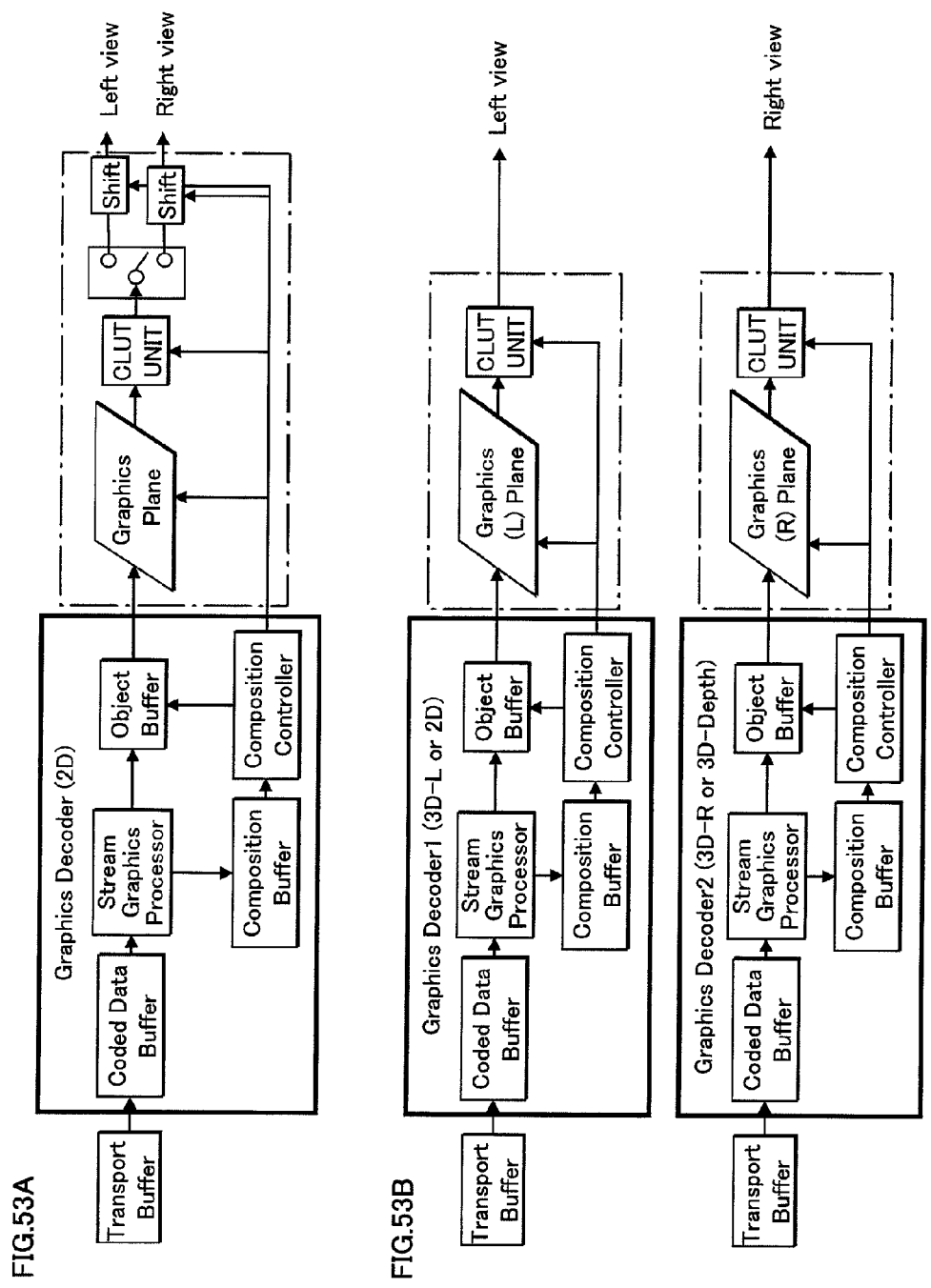

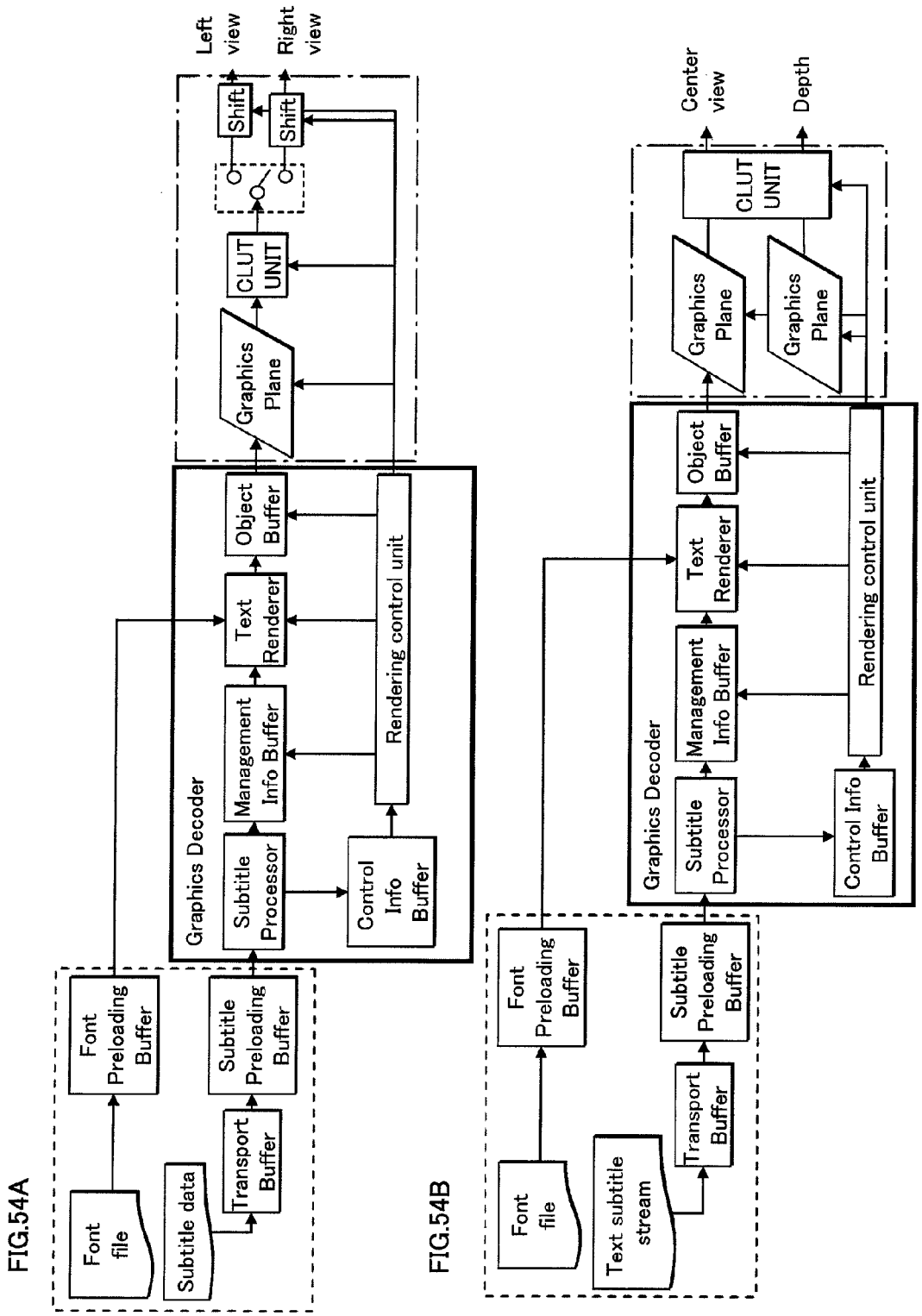

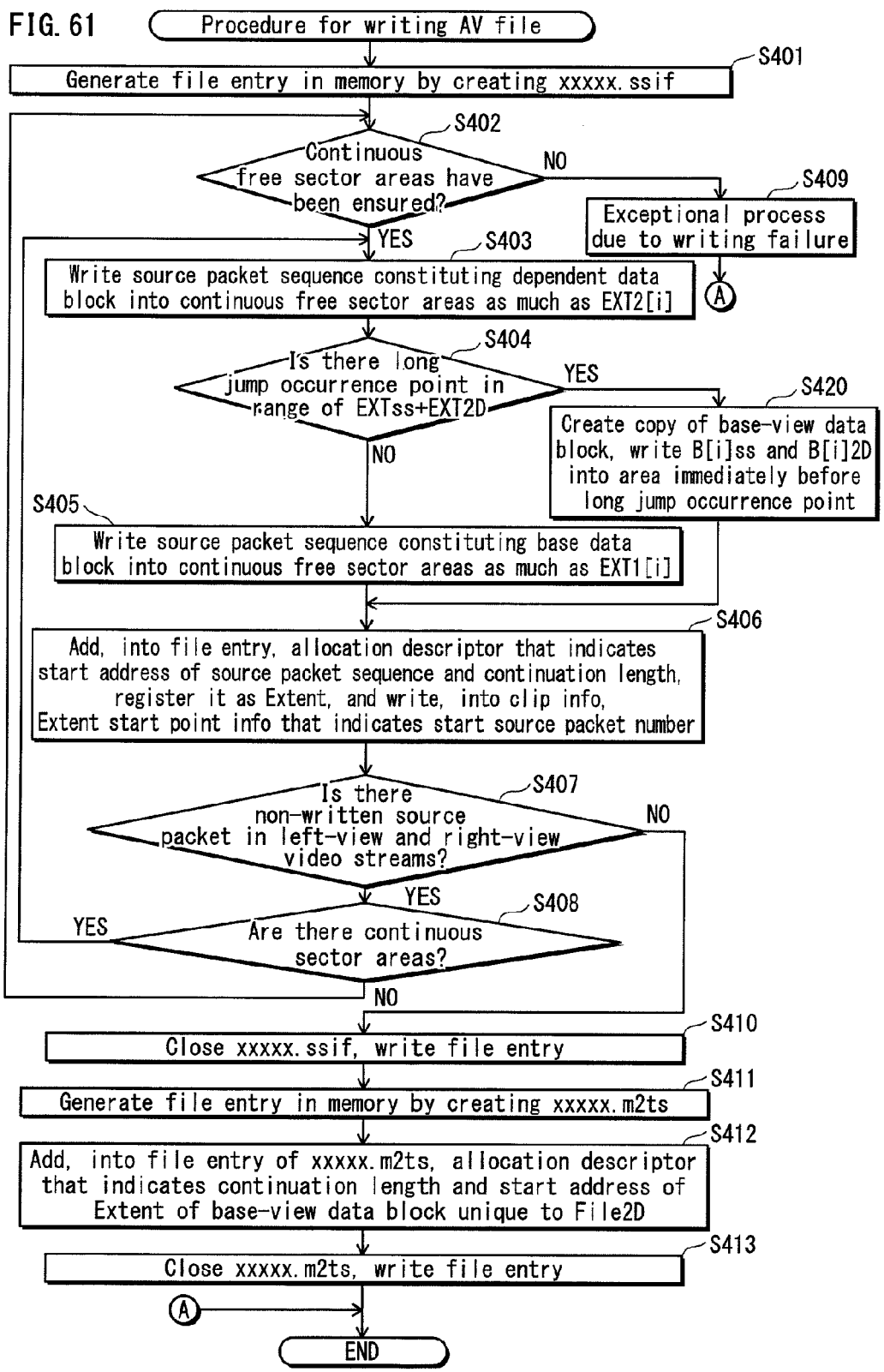

FIG. 70A  PSR21: Output Mode Preference

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Output Mode Preference |

Output Mode Preference ... 0b: 2D Output Mode / 1b: Stereoscopic Output Mode

FIG. 70B  PSR22: Stereoscopic status

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Output Mode |

Output Mode ... 0b: 2D Output Mode / 1b: Stereoscopic Output Mode

FIG. 70C  PSR23: Display Capability

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Stereoscopic Display Capability |

Stereoscopic Display Capability ... Connected TV system is / 0b: Stereoscopic presentation incapable / 1b: Stereoscopic presentation capable FIG. 70D  PSR24: 3D Capability

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | Stereoscopic Capability |

Stereoscopic Capability ... 0b: Stereoscopic presentation incapable / 1b: Stereoscopic presentation capable

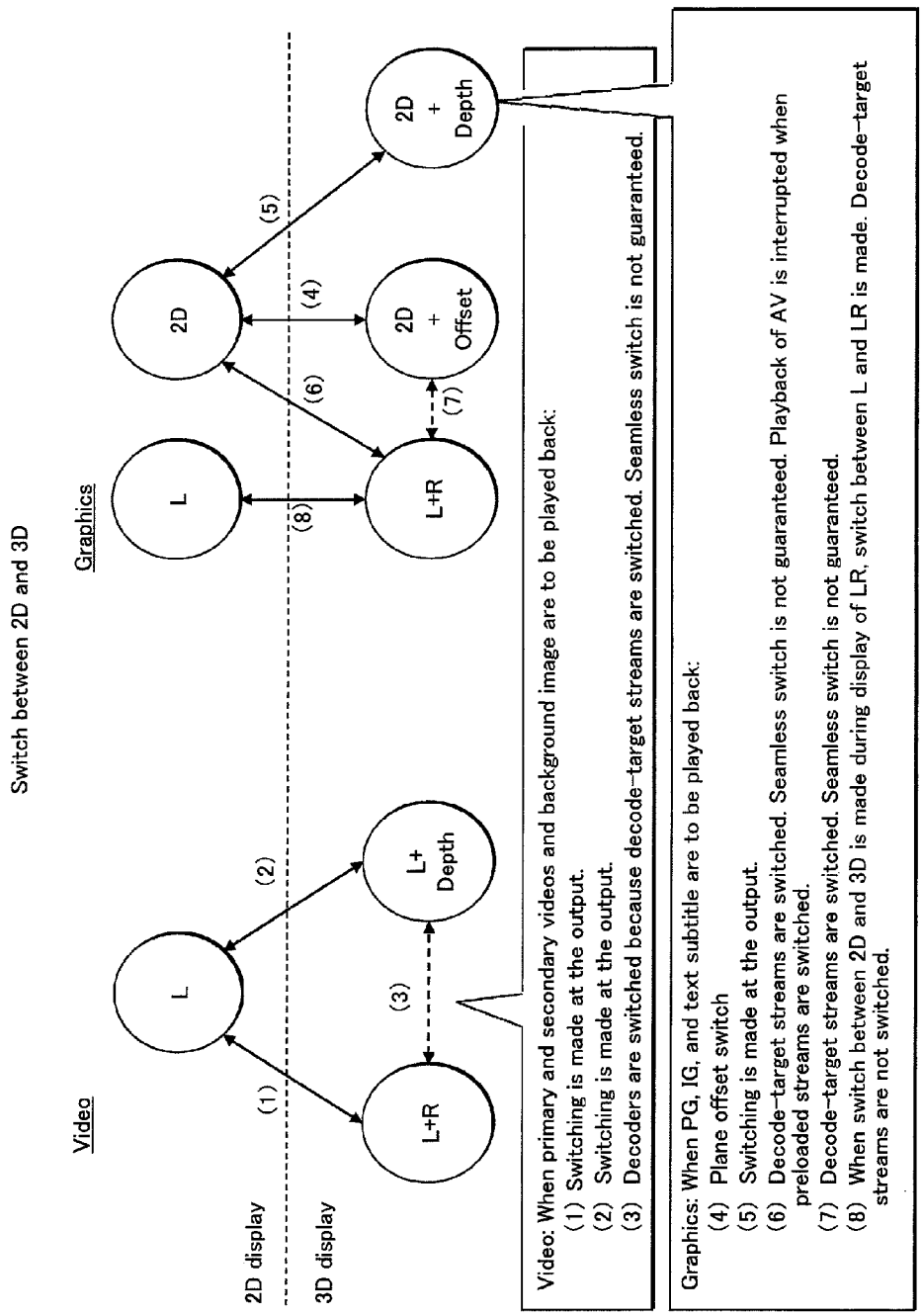

FIG.74

System parameter (player variable)
Player Capability for Video

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| reserved | | | | | | | |

| b7 | b6 | b5 | b4 | b3 | b2 | b1 | b0 |
|---|---|---|---|---|---|---|---|
| reserved | | | | | | Dependent View Capability | Depth Capability |

FIG.75

System parameter (player variable)
3D Capability

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | 1 Plane + Offset Capability | | | | | | |
| | Background image | Secondary video | reserved | Text subtitle | PG | IG | Java Graphics |

| b15 | b14 | b13 | b12 | b11 | b10 | b9 | b8 |
|---|---|---|---|---|---|---|---|
| reservd | 3D-Depth Capability | | | | | | |
| | Background image | Secondary video | Primary video | Text subtitle | PG | IG | Java Graphics |

| b7 | b6 | b5 | b4 | b3 | b2 | b1 | b0 |
|---|---|---|---|---|---|---|---|
| reserved | 3D-LR Capability | | | | | | |
| | Background image | Secondary video | Primary video | Text subtitle | PG | IG | Java Graphics |

Switch between 1 plane and 2 planes is available for each type of plane.

FIG.76

System parameter (player variable)
Corresponding database identification information

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| Corresponding database identification information | | | | | | | |
| b7 | b6 | b5 | b4 | b3 | b2 | b1 | b0 |
| Corresponding database identification information | | | | | | | |

Corresponding database identification information
Identification information for 3D data structure is different from that for 2D.

FIG.78

System parameter (player variable)
3D Presentation Type

| b31 | b30 | b29 | b28 | b27 | b26 | b25 | b24 |
|---|---|---|---|---|---|---|---|
| reserved | | Background image | | Primary video | | Secondary video | |
| b23 | b22 | b21 | b20 | b19 | b18 | b17 | b16 |
| Text subtitle | | PG | | IG | | Java Graphics | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | 3D Presentation Type | |

3D Presentation Type ···
 00b : 2D presentation mode
 01b : 3D-LR presentation mode
 10b : 3D-Depth presentation mode It can represent 3D playback method for each stream or plane (b31–b16).

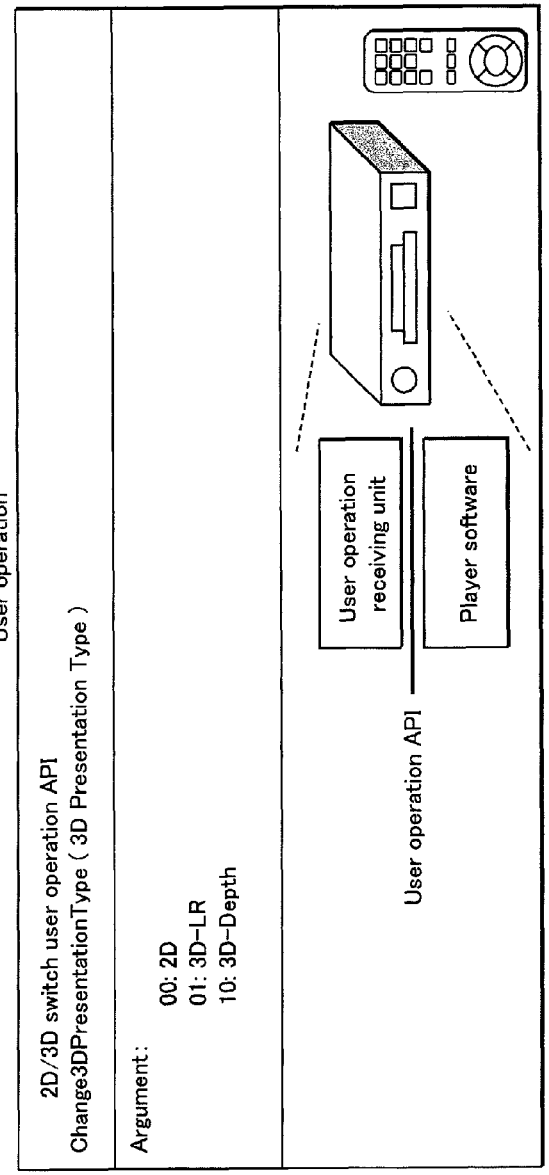
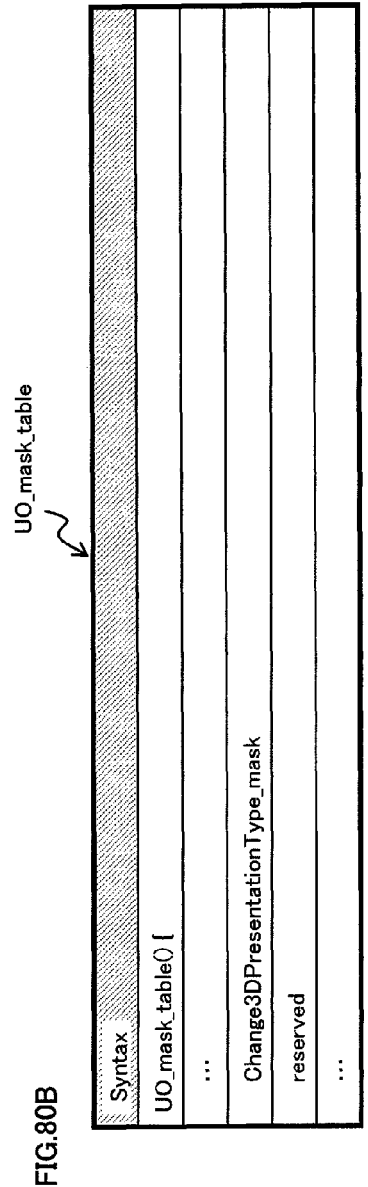
FIG.80A
FIG.80B

FIG.85

| PID_value | meaning |
|---|---|
| 0x1012 | Dependent View |
| 0x1013 | Dependent View, Depth |
| 0x1220 | PG for Left of 3D-LR |
| 0x1240 | PG for Right of 3D-LR |
| 0x1260 | PG for Depth of 3D-Depth |

| PID_value | meaning |
|---|---|
| 0x1420 | IG for Left of 3D-LR |
| 0x1440 | IG for Right of 3D-LR |
| 0x1460 | IG for Depth of 3D-Depth |
| 0x1801 | 3D Text Subtitle |
| 0x1B20 | Secondary Video Dependent View |
| 0x1B40 | Secondary Video Dependent View, Depth |

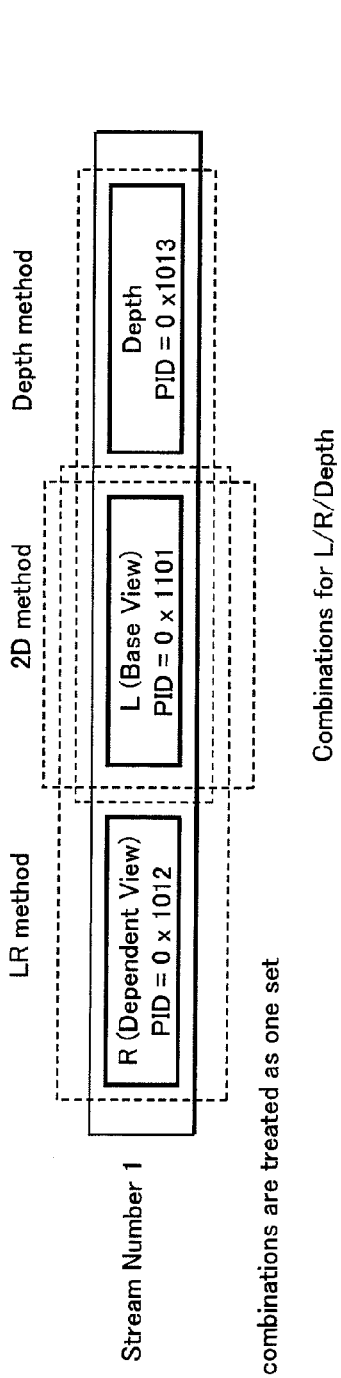
FIG.86A
FIG.86B
| Base View | Dependent View, Depth | Restriction |
|---|---|---|
| MPEG-4 AVC Base View | MPEG-4 AVC Dependent View | Cannot co-exist with secondary video |
| MPEG-2 Video | MPEG-2 Video | Cannot co-exist with secondary video |
| MPEG-4 AVC | MPEG-4 AVC | Cannot co-exist with secondary video |
| VC-1 | VC-1 | |
Combinations for L/R/Depth
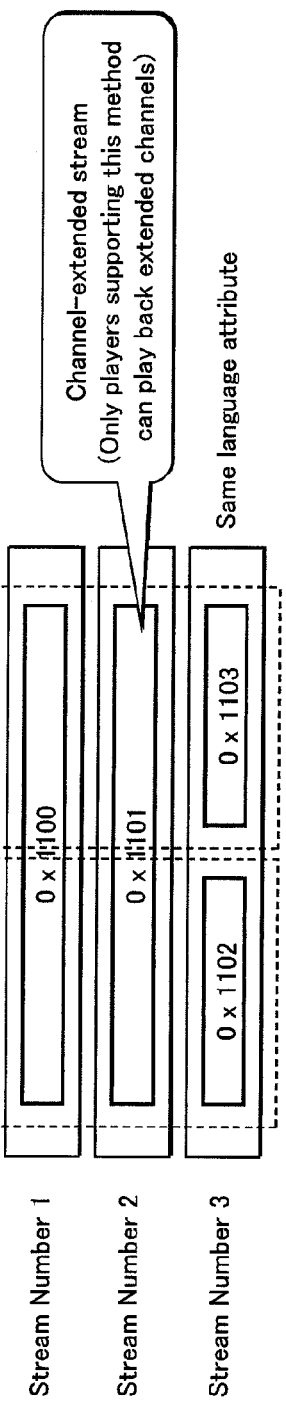
FIG.86C

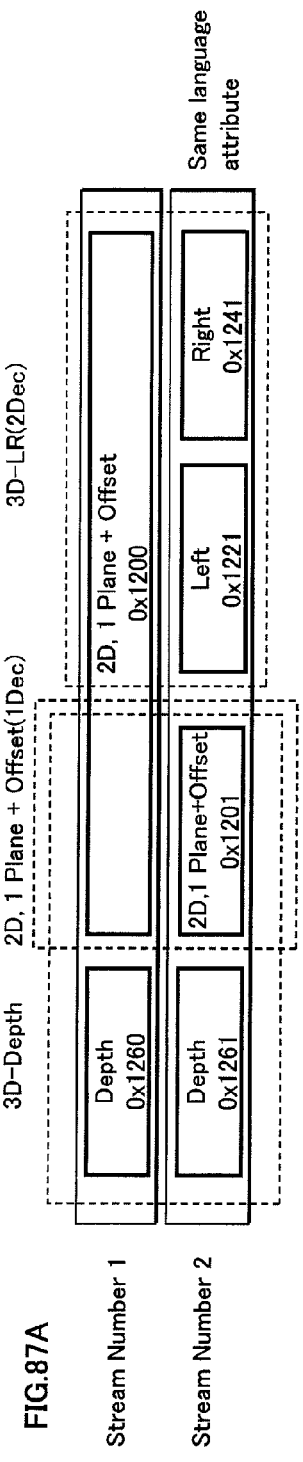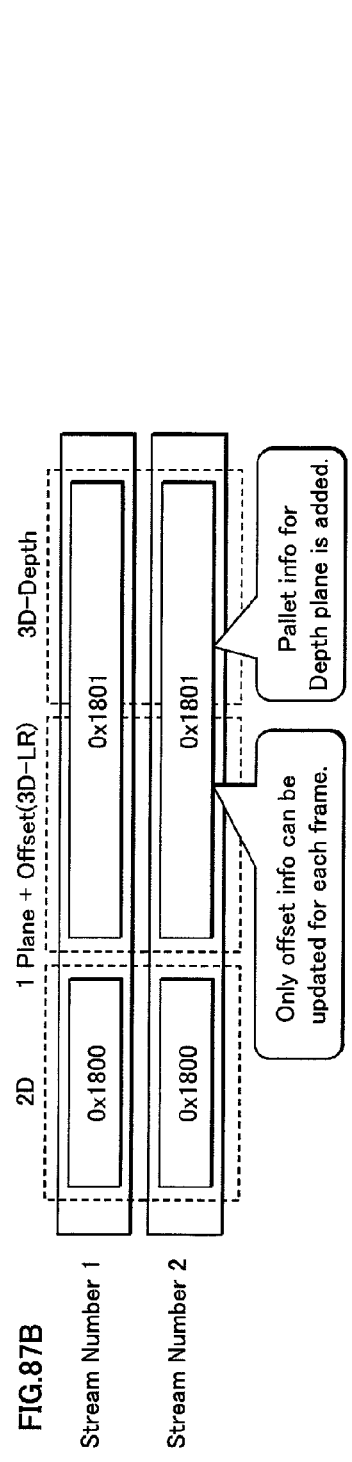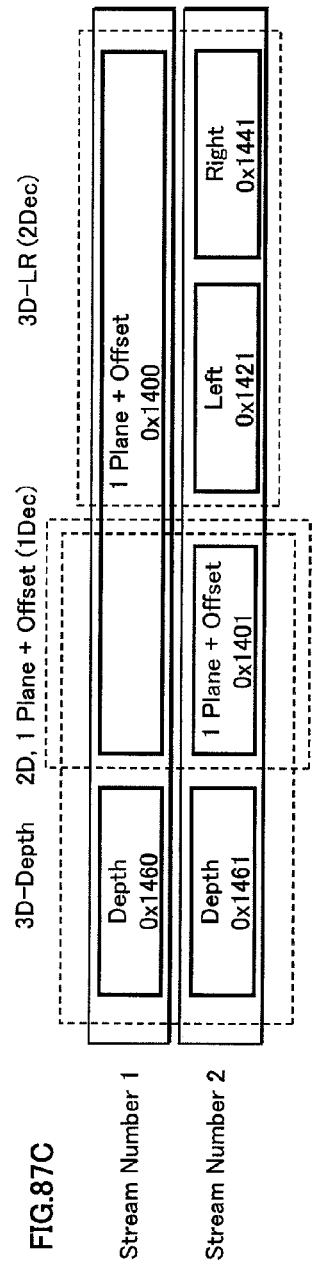

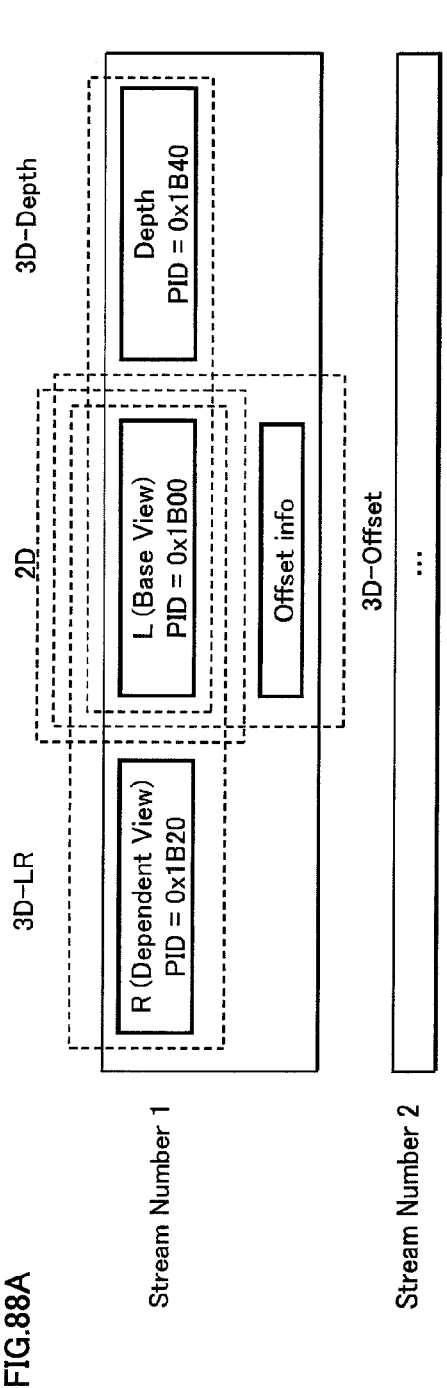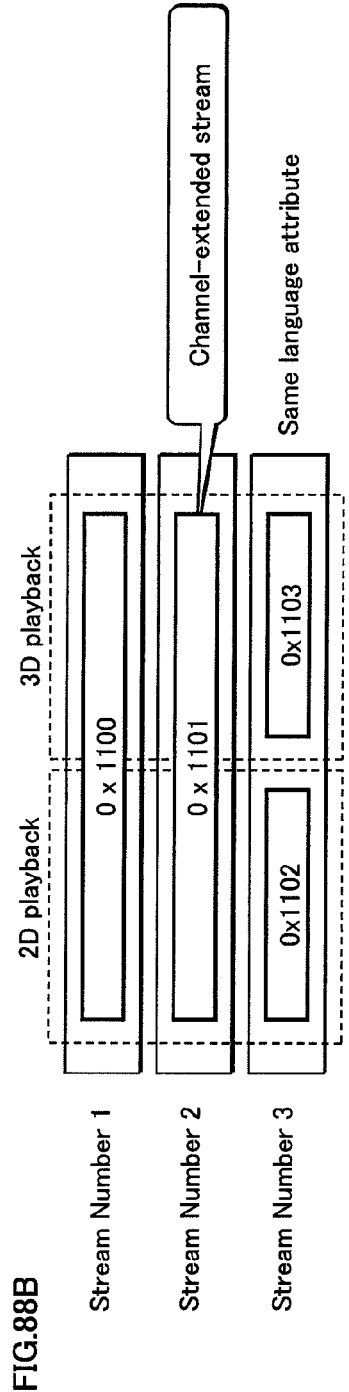
FIG.88A
FIG.88B

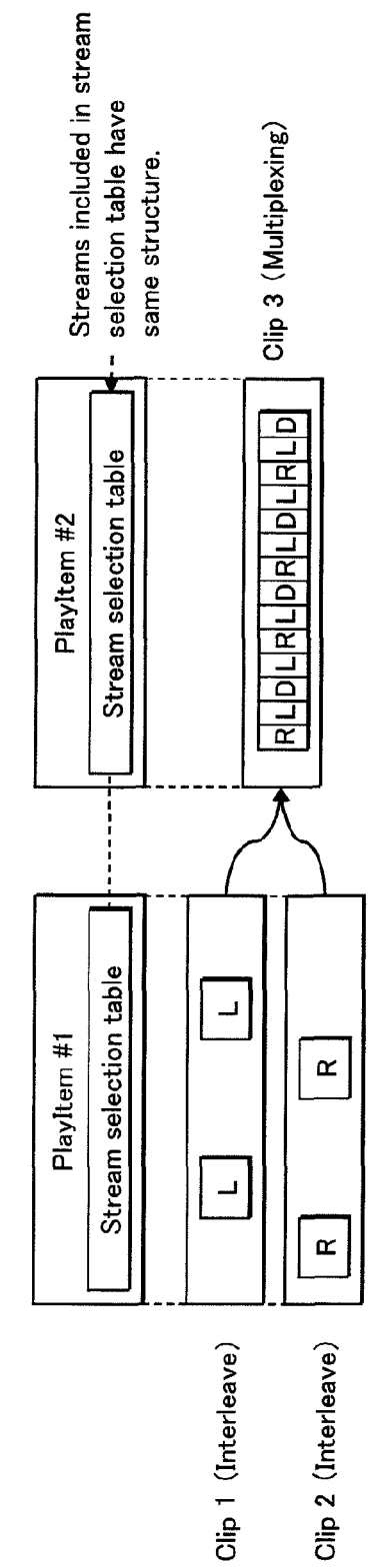
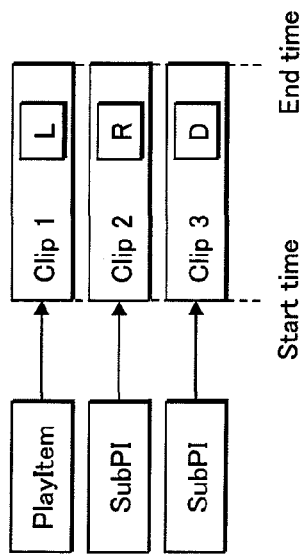
FIG.89A
FIG.89B

FIG.90A
| SubPath Type | Meaning |
|---|---|
| ... | |
| 8 | Dependent View for LR |
| 9 | Dependent View for Depth |
| 10 | 3D file to be referenced in layer-boundary jump instead of 2D file |
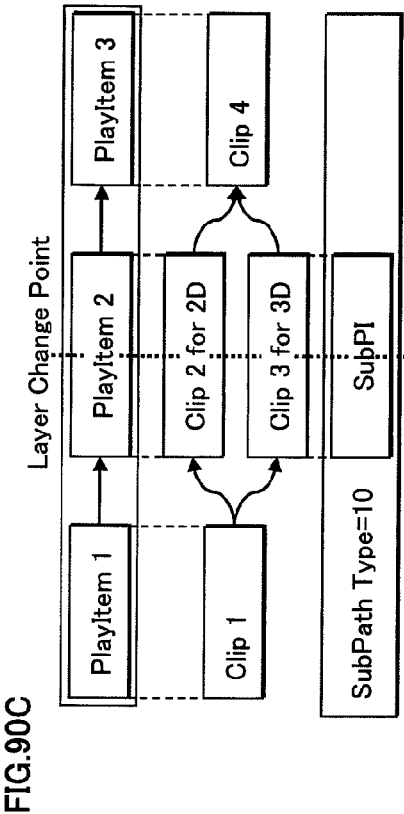
FIG.90C
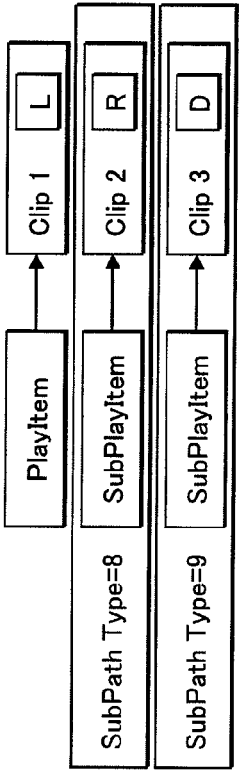
FIG.90B

FIG.91

| Syntax |
|---|
| STN_table_extention()[ |
| length |
| for (Loop for repeating as many as primary video streams) { |
| dependent_view_is_available |
| depth_is_available |
| reserved |
| if (dependent_view_is_available) { |
| stream_entry() |
| stream_attribute() |
| } |
| if (depth_is_available) { |
| stream_entry() |
| stream_attribute() |
| } |
| } |
| for (Loop for repeating as many as primary audio streams) { |
| replace_3D_audio_stream |
| reserved |
| stream_entry() |
| stream_attribute() |
| } |
| ... |

FIG.92

| Syntax |
| --- |
| ... |
| for (Loop for repeating as many as PG streams) { |
| offset_is_available |
| LR_streams_are_available |
| Depth_stream_is_available |
| reseved |
| if (offset_is_available) { |
| stream_entry() |
| stream_attribute() |
| } |
| if (LR_streams_are_available) { |
| stream_entry()for left |
| stream_entry()for right |
| stream_attribute() |
| } |
| if (Depth_stream_is_available) { |
| stream_entry() |
| stream_attribute() |
| } |
| } |
| ... |

FIG.93

| Syntax |
|---|
| ... |
| for (Loop for repeating as many as IG streams) { |
| offset_is_available |
| LR_streams_are_available |
| Depth_stream_is_available |
| reseved |
| if (offset_is_available) { |
| stream_entry() |
| stream_attribute() |
| } |
| if (LR_streams_are_available) { |
| stream_entry()for left |
| stream_entry()for right |
| stream_attribute() |
| } |
| if (Depth_stream_is_available) { |
| stream_entry() |
| stream_attribute() |
| } |
| } |
| ... |

FIG.94

| Syntax |
|---|
| for (Loop for repeating as many as secondary audio streams) { |
|   replace_3D_audio_stream |
|   reserved |
|   stream_entry() |
|   stream_attribute() |
| } |
| for (Loop for repeating as many as secondary video streams) { |
|   dependent_view_is_available |
|   Depth_is_available |
|   reserved |
|   if (dependent_view_is_available) { |
|     stream_entry() |
|     stream_attribute() |
|   } |
|   if (Depth_is_available) { |
|     stream_entry() |
|     stream_attribute() |
|   } |
| } |

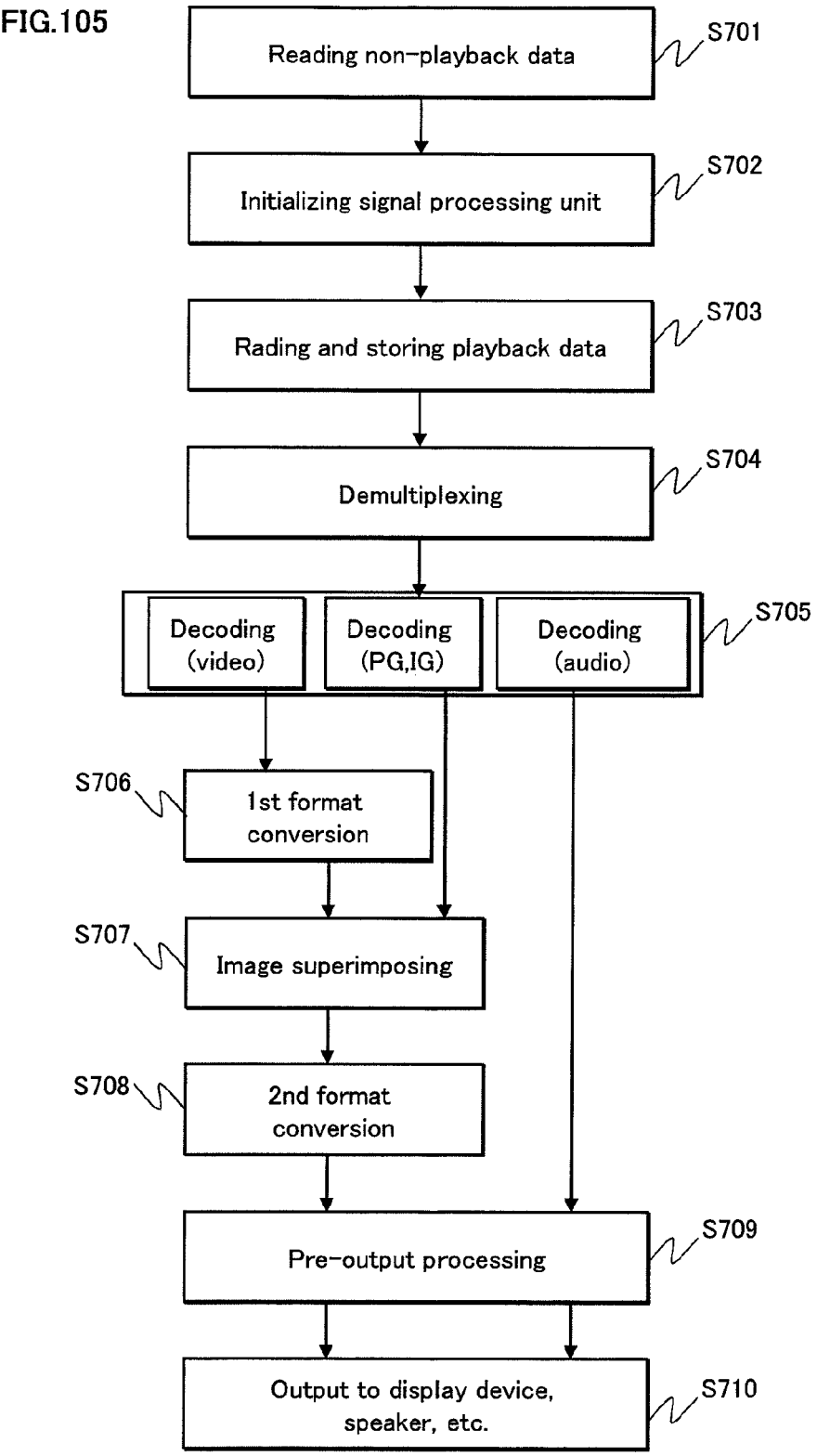

RECORDING MEDIUM, PLAYBACK DEVICE, AND INTEGRATED CIRCUIT

This application claims benefit to the provisional U.S. application 61/153,994, filed Feb. 20, 2009.

BACKGROUND OF THE INVENTION (1) Field of the Invention

The present invention relates to a technology of recording 3D and 2D images.

(2) Description of the Related Art

The 2D images, also called monoscopic images, are represented by pixels on an X-Y plane that is applied to the display screen of the display device.

In contrast, the 3D images have a depth in the Z-axis direction in addition to the pixels on the X-Y plane applied to the screen of the display device. The 3D images are presented to the viewers (users) by simultaneously playing back the left-view and right-view images to be viewed respectively by the left and right eyes so that a stereoscopic effect can be produced. The users would see, among the pixels constituting the 3D image, pixels having positive Z-axis coordinates in front of the display screen, and pixels having negative Z-axis coordinates behind the display screen.

It is preferable that an optical disc storing a 3D image has compatibility with a playback device that can play back only 2D images (hereinafter, such a playback device is referred to as "2D playback device"). This is because, otherwise, two types of discs for 3D and 2D images need to be produced so that the 2D playback device can play back the same content as that stored in a disc for 3D image. Such an arrangement will take a higher cost. It is accordingly necessary to provide an optical disc storing a 3D image that is played back as a 2D image by the 2D play back device, and as a 2D or 3D image by a play back device supporting both the 3D and 2D images (hereinafter, such a playback device is referred to as "2D/3D playback device").

Patent Document 1 identified below is one example of prior art documents describing technologies for ensuring the compatibility in playback between 2D and 3D images, with respect to optical discs storing 3D images.

PRIOR ART DOCUMENTS

Patent Literature 1

Japanese Patent No. 3935507

SUMMARY OF THE INVENTION

The Problems the Invention is Going to Solve

Meanwhile, when an attempt is made to introduce the 3D playback mode into the playback device while maintaining the compatibility with conventional 2D playback devices, what is a problem is how the stream selection procedure should treat the event of switching the playback mode from the 2D playback mode to the 3D playback mode.

The stream selection procedure is a processing procedure for determining, from among the elementary streams registered in a stream selection table recorded on a recording medium, the elementary streams to be demultiplexed by identifying them by the stream numbers. The stream selection table shows registered elementary streams that are permitted to be played back, among a plurality of elementary streams that are physically recorded on the recording medium.

The stream numbers determined by the stream selection procedure are stored in a stream number register in the playback device. The stream selection procedure is executed when a state change occurs in the playback device, for example, when switching between playback sections occurs, or when a disc is loaded. Here, by extension of the way of thinking of conventional 2D playback devices, the change in the playback mode would be interpreted as a change in the state of the device, and the stream selection procedure would be executed to set the stream numbers again.

However, when the stream selection procedure is executed due to a change of the playback mode and the new stream numbers are stored in the stream number register, there is no guarantee that the language attribute of the stream after the mode change is the same as the language attribute before the mode change. This is because the language attributes of the streams are managed by the stream numbers presented in the stream selection table, and the stream attributes change as the stream numbers change. When such a structure is adopted, the stream need to be set again after a mode change. Such a double work poses an inconvenience to the user.

It is therefore an object of the present invention to provide a recording medium which can keep the language attribute unchanged before and after switching of the playback mode.

Means to Solve the Problems

The above-described object is fulfilled by a recording medium on which playlist information and a plurality of elementary streams are recorded, wherein the playlist information includes a basic stream selection table and an extension stream selection table, the basic stream selection table shows a list of elementary streams that are to be played back in a monoscopic playback mode, and includes stream numbers of the elementary streams to be played back in the monoscopic playback mode, the extension stream selection table shows a list of elementary streams that are to be played back in a stereoscopic playback mode, and the elementary streams shown in the extension stream selection table are associated with the stream numbers included in the basic stream selection table.

Effects of the Invention

In the recording medium provided with the above-described problem solving means, when the playback mode switches from the monoscopic playback mode to the stereoscopic playback mode, the basis on which the stream selection is performed switches from the basic stream selection table to the extension stream selection table.

With the above-described structure, when the playback mode is switched from the monoscopic playback mode to the stereoscopic playback mode, it is possible to switch the stream to be supplied to the decoder while maintaining the stream numbers indicated in the stream selection table as they are, and keeping the language attributes of the streams unchanged before and after the mode change.

This makes it possible to change the playback mode from the monoscopic playback mode to the stereoscopic playback mode, and from the stereoscopic playback mode to the monoscopic playback mode, while maintaining the language attributes.

Also, the stream selection procedure in the stereoscopic playback mode is performed based merely on the basic stream selection table. As a result, the contents of the stream selection procedure in the stereoscopic playback mode can be the same as the contents of the stream selection procedure in the playback device dedicated to the monoscopic playback. In this way, the complete compatibility can be guaranteed with regard to the stream selection procedure. This facilitates ensuring the operation when a recording medium supporting the stereoscopic playback is loaded into a conventional playback device dedicated to the monoscopic playback. Since normal operations are guaranteed when a recording medium supporting the stereoscopic playback is loaded into a conventional playback device dedicated to the monoscopic playback, the producer of the playback device can be rest assured that the recording medium supporting the stereoscopic playback is brought into the marketplace without getting involved in a user trouble attributed to loading of a recording medium supporting the stereoscopic playback into a conventional playback device dedicated to the monoscopic playback.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 1A through 1C show an embodiment of the usage act of the recording medium, playback device, display device, and glasses;

FIGS. 6A through 6D show one example of the 3D-depth method;

FIGS. 9A and 9B illustrate how the video stream is stored in the PES packet sequences;

FIG. 10 schematically shows how the main TS is multiplexed.

FIGS. 11A and 113 show the internal structures of the main TS and sub-TS;

FIG. 14 shows the internal structure of the extension stream selection table;

FIGS. 15A-15C shows the stream registration sequences in the extension stream selection table;

FIG. 16 shows what elementary streams are demultiplexed from the main TS and the sub-TSs;

FIG. 18 shows the change of assignment of the stream numbers;

FIG. 19 shows a syntax for writing the extension stream selection table in an object-oriented compiler language;

FIGS. 21A through 21C show what packet identifiers are output to the demultiplexing unit by the combined stream registration sequence;

FIGS. 22A through 22C show what packet identifiers are output to the demultiplexing unit by the combined stream registration sequence;

FIG. 30 shows the correspondence between the file 2D/file base and the file dependent;

FIGS. 31A through 31C show the correspondence between the interleaved stream file and file 2D/file base;

FIG. 32 shows correspondence among the stereoscopic interleaved stream file, file 2D, file base, and file dependent.

FIGS. 35A and 35B show a 3D playlist generated by adding a base-view indicator to the 3D playlist;

FIG. 47 shows the procedure for restoring the ATC sequence;

FIG. 49 shows the internal structure of the entry map that is set for the slide show;

FIGS. 52A and 52B show the device structures including one decoder and two planes in the 3D-LR method and the 3D-Depth method;

FIGS. 53A and 53B show the internal structure of the graphics decoder for the PG stream;

FIGS. 54A and 54B show the internal structure of the text subtitle decoder;

FIG. 61 is a flowchart showing the procedure for writing the AV file;

FIG. 65 shows the internal structure of the system target decoder 4 and the plane memory set 5a;

FIGS. 70A through 70D show the bit assignment in the player setting register for realizing the 3D playback mode;

FIG. 73 is a state transition diagram showing the switch between 2D and 3D;

FIG. 74 shows the dependent-view capability and the 3D-depth capability;

FIG. 75 shows the system parameters extended to identify the 3D playback capabilities in more detail;

FIG. 76 shows the database identification information for identifying whether or not the playback device supports the data structure that has been extended for the 3D;

FIG. 78 shows a system parameter indicating the display format of the current playback;

FIGS. 80A and 80B show the user operation API for switching between the 2D and 3D display methods;

FIG. 85 shows the assignment of PIDs to the transport stream (TS) packets;

FIGS. 86A through 86C show the primary video stream and the primary audio stream;

FIGS. 87A through 87C show PG streams to which stream numbers 1 and 2 are assigned;

FIGS. 88A and 88B show the TS packets constituting the secondary video stream and the secondary audio stream;

FIGS. 89A and 89B show the forms for seamlessly connecting two playitems;

FIGS. 90A through 90C show the sub-path types for switching between files at the layer boundary;

FIG. 91 shows one example of how to describe the stream registration sequences for the primary video stream and the primary audio stream;

FIG. 92 shows one example of how to describe the stream registration sequences for the PG text subtitle stream;

FIG. 93 shows one example of how to describe the stream registration sequences for the IG stream;

FIG. 94 shows one example of how to describe the stream registration sequences for the secondary audio stream and the secondary video stream;

FIG. 105 is a detailed flowchart showing an operation procedure in the playback device.

DESCRIPTION OF THE PREFERRED EMBODIMENTS

Figure 2:
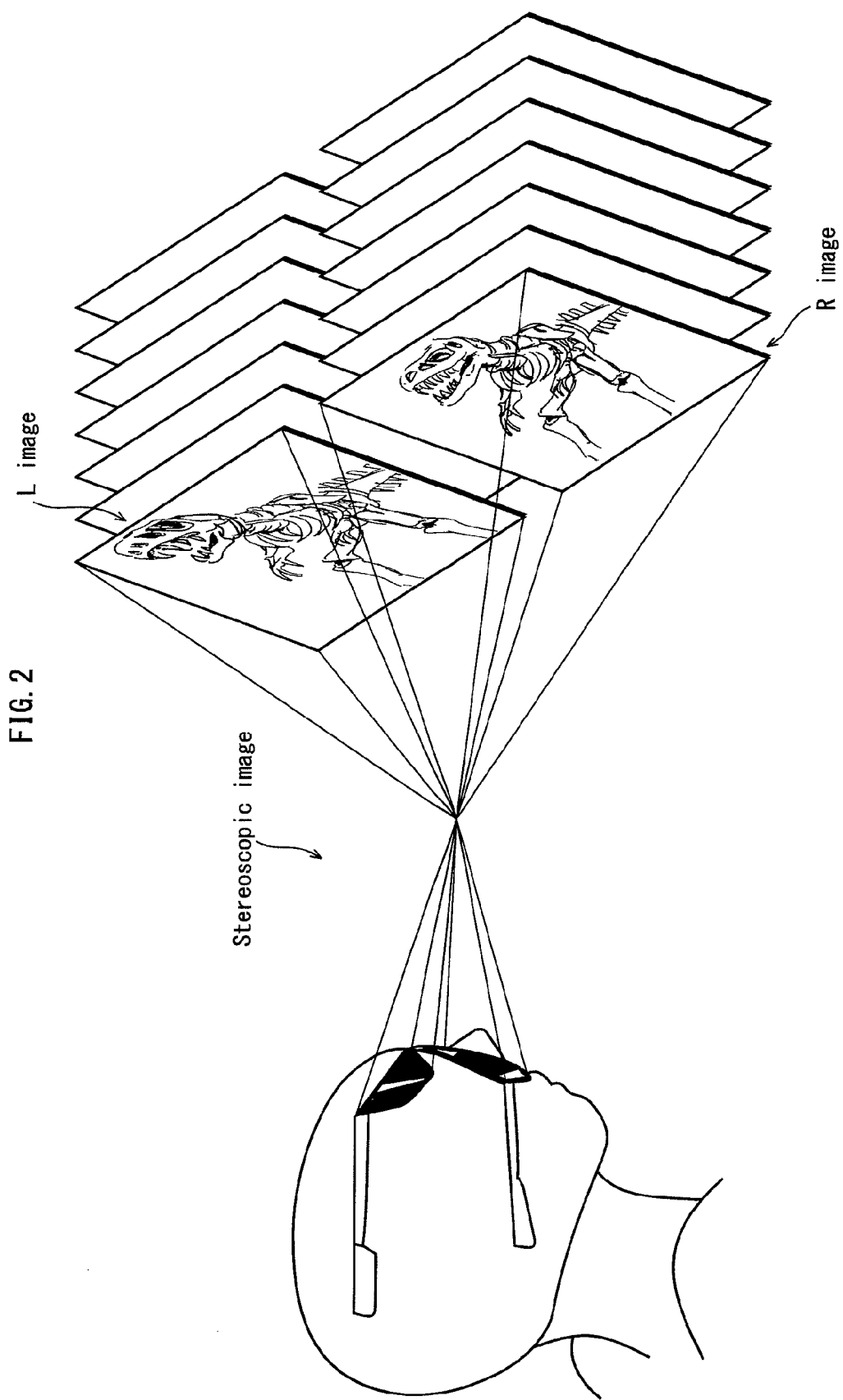
FIG. 2 shows the user's head on the left-hand side of the drawing and the images of a dinosaur skeleton seen respectively by the left eye and the right eye of the user on the right-hand side of the drawing.

The following describes an embodiment of a recording medium and a playback device provided with means for solving the above-described problems, with reference to the attached drawings. First, a brief description is give of the principle of the stereoscopic view.

In general, due to the difference in position between the right eye and the left eye, there is a little difference between an image seen by the right eye and an image seen by the left eye. It is this difference that enables the human beings to recognize the image they see in three dimensions. The stereoscopic display is realized by using the parallax of human beings, so that a monoscopic image looks as is it is three-dimensional.

More specifically, there is a difference between the image seen by the right eye and the image seen by the left eye, the difference corresponding to parallax of human beings. The stereoscopic display is realized by displaying the two types of images alternately at regular short time intervals.

The "short time interval" may be a time period that is short enough to provide human beings, by the alternate displays, an illusion that they are seeing a three-dimensional object. The methods for realizing the stereoscopic viewing include one using a holography technology and one using a parallax image.

The former method, the holography technology, is characterized in that it can reproduce an object three-dimensionally in the same manner as a human being recognizes the object normally, and that, in regards with video generation, although it has established a technological theory, it requires (i) a computer that can perform an enormous amount of calculations to generate the video for holography in real time, and (ii) a display device having a resolution in which several thousands of lines can be drawn in a length of 1 mm. It is extremely difficult for the current technology to realize such a product, and thus products for commercial use have hardly been developed.

On the other hand, the latter method using a parallax image has a merit that a stereoscopic viewing can be realized only by preparing images for viewing with the right eye and the left eye. Some technologies including the sequential segregation method have been developed for practical use from the viewpoint of how to cause each of the right eye and the left eye to view only the images associated therewith.

The sequential segregation method is a method in which images for the left eye and right eye are alternately displayed in a time axis direction such that left and right scenes are overlaid in the brain by the effect of residual images of eyes, and the overlaid image is recognized as a stereoscopic image.

The playback device described in the present application is a 2D/3D playback device (player) which, provided with the 2D playback mode and the 3D playback mode, can switch between these playback modes.

FIGS. 1A through 1C show the embodiment of the usage act of the recording medium, playback device, display device, and glasses. As shown in FIG. 1A, a recording medium 100 and a playback device 200, together with a television 300, 3D glasses 400, and a remote control 500, constitute a home theater system which is subject to the use by the user.

The recording medium 100 provides the home theater system with, for example, a movie work.

The playback device 200 is connected with the television 300 and plays back the recording medium 100.

The television 300 provides the user with an interactive operation environment by displaying a menu and the like as well as the movie work. The user needs to wear the 3D glasses 400 for the television 300 of the present embodiment to realize the stereoscopic viewing. Here, the 3D glasses 400 are not necessary when the television 300 displays images by the lenticular method. The television 300 for the lenticular method aligns pictures for the left and right eyes vertically in a screen at the same time. And a lenticular lens is provided on the surface of the display screen such that pixels constituting the picture for the left eye form an image only in the left eye and pixels constituting the picture for the right eye form an image only in the right eye. This enables the left and right eyes to see respectively pictures that have a parallax, thereby realizing a stereoscopic viewing.

The 3D glasses 400 are equipped with liquid-crystal shutters that enable the user to view a parallax image by the sequential segregation method or the polarization glasses method. Here, the parallax image is an image which is composed of a pair of (i) an image that enters only into the right eye and (ii) an image that enters only into the left eye, such that pictures respectively associated with the right and left eyes respectively enter the eyes of the user, thereby realizing the stereoscopic viewing. FIG. 1B shows the state of the 3D glasses 400 when the left-view image is displayed. At the instant when the left-view image is displayed on the screen, the liquid-crystal shutter for the left eye is in the light transmission state, and the liquid-crystal shutter for the right eye is in the light block state. FIG. 1C shows the state of the 3D glasses 400 when the right-view image is displayed. At the instant when the right-view image is displayed on the screen, the liquid-crystal shutter for the right eye is in the light transmission state, and the liquid-crystal shutter for the left eye is in the light block state.

The remote control 500 is a machine for receiving from the user operations for playing back AV. The remote control 500 is also a machine for receiving from the user operations onto the layered GUI. To receive the operations, the remote control 500 is equipped with a menu key, arrow keys, an enter key, a return key, and numeral keys, where the menu key is used to call a menu constituting the GUI, the arrow keys are used to move a focus among GUI components constituting the menu, the enter key is used to perform ENTER (determination) operation onto a GUI component constituting the menu, the return key is used to return to a higher layer in the layered menu.

In the home theater system shown in FIGS. 1A through 1C, an output mode of the playback device for causing the display device 300 to display images in the 3D playback mode is called "3D output mode", and an output mode of the playback device for causing the display device 300 to display images in the 2D playback mode is called "2D output mode".

This completes the description of the usage act of the recording medium and the playback device.

The present embodiment adopts a method in which parallax images to be used for the stereoscopic viewing are stored in an information recording medium.

The parallax image method is a method for realizing the stereoscopic viewing by preparing separately an image for the right eye and an image for the left eye, and causing the image for the right eye to enter only into the right eye and the image for the left eye enter only into the left eye. FIG. 2 shows the user's head on the left-hand side of the drawing and the images of a dinosaur skeleton seen respectively by the left eye and the right eye of the user on the right-hand side of the drawing. When the light transmission and block are repeated alternately for the right and left eyes, the left and right scenes are overlaid in the brain of the user by the effect of residual images of eyes, and the overlaid image is recognized as a stereoscopic image appearing in front of the user.

Among the parallax images, the image entering the left eye is called a left-eye image (L image), and the image entering the right eye is called a right-eye image (R image). A video composed of only L images is called a left-view video, and a video composed of only R images is called a right-view video. Also, the video streams which are obtained by digitizing and compress-encoding the left-view video and right-view video are called left-view video stream and right-view video stream, respectively.

These left-view and right-view video streams are compressed by the inter-picture prediction encoding using the correlated property between view points, as well as by the inter-picture prediction encoding using the correlated property in a time axis. The pictures constituting the right-view video stream are compressed by referring to the pictures constituting the left-view video stream having the same display times. One of the video compression methods using such a correlated property between view points is a corrected standard of MPEG-4 AVC/H.264 which is called Multi-view Video Coding (MVC). The Joint Video Team (JVT), which is a joint project of the ISO/IEC MPEG and the ITU-T VCEG, completed in July 2008 the formulation of the corrected standard of MPEG-4 AVC/H.264 called the Multi-view Video Coding (MVC). The MVC is a standard for encoding, in bulk, images for a plurality of view points. Due to the use, in the prediction encoding, of the similarity of images between view points as well as the similarity of images in a time axis, the MVC has improved the compression efficiency compared with methods for encoding independent images for a plurality of view points.

A video stream, among the left-view video stream and the right-view video stream having been compress-encoded by the MVC, that can be decoded independently is called "base-view video stream". A base-view indicator, which will be described later, indicates which of the left-view video stream and the right-view video stream is specified as the base-view video stream. Also, a video stream, among the left-view video stream and the right-view video stream, that has been compress-encoded based on the inter-frame correlated property with each picture data constituting the base-view video stream, and that can be decoded only after the base-view video stream is decoded, is called "dependent-view stream".

A video stream, among the left-view video stream and the right-view video stream having been compress-encoded with use of the correlated property between view points, that can be decoded independently is called "base-view video stream". A base-view indicator in the playitem information indicates which of the left-view video stream and the right-view video stream is specified as the base-view video stream.

The video stream in the MPEG4-AVC format, which forms the basis of the MVC video stream, is described in the following.

The MVC video stream has the GOP structure, and is composed of closed GOPs and open GOPs. The closed GOP is composed of an IDR picture, and B-pictures and P-pictures that follow the IDR picture. The open GOP is composed of a non-IDR I-picture, and B-pictures and P-pictures that follow the non-IDR I-picture. The non-IDR I-pictures, B-pictures, and P-pictures are compress-encoded based on the frame correlation with other pictures. The B-picture is a picture composed of slice data in the bidirectionally predictive (B) format, and the P-picture is a picture composed of slice data in the predictive (P) format. The B-picture is classified into reference B (Br) picture and non-reference B (B) picture.

In the closed GOP, the IDR picture is disposed at the top. In the display order, the IDR picture is not the top, but pictures (B-pictures and P-pictures) other than the IDR picture cannot have dependency relationship with pictures existing in a GOP that precedes the closed GOP. As understood from this, the closed GOP has a role to complete the dependency relationship.

Next, the internal structure of the GOP is described. Each piece of picture data in the open and closed GOPs has the video access unit structure of the H.264 encoding method. Each video access unit includes a video access unit delimiter, a sequence parameter set, a picture parameter set, and a view component.

The view component is picture data that has been compress-encoded based on the correlation between view points, while it has the access unit structure. The video access unit delimiter is converted into a network abstraction unit, and then stored in the source packet. Reading from the source packet enables a random access inside the video stream.

The relationship between the video access unit and the picture is "1 video access unit=1 picture". In the BD-ROM, the relationship is restricted to "1 PES packet=1 frame". Therefore, when the video has the frame structure, "1 PES packet=1 picture", and when the video has the field structure, "1 PES packet=2 pictures". Taken these into account, the PES packet stores the picture in a one-to-one ratio.

Figure 3:
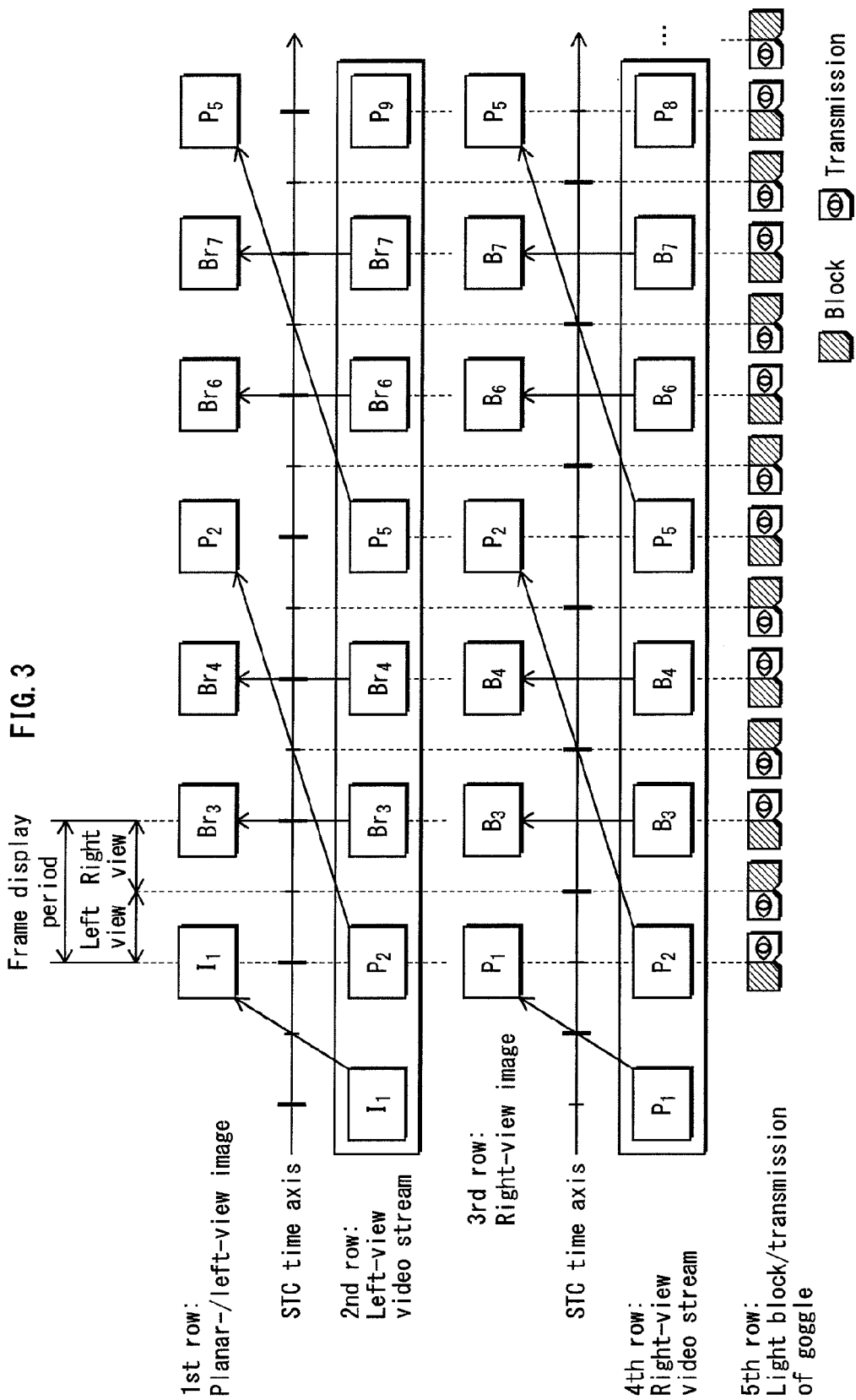
FIG. 3 shows one example of the internal structures of the left-view and right-view video streams for the stereoscopic viewing.

FIG. 3 shows one example of the internal structures of the left-view and right-view video streams for the stereoscopic viewing.

In the second row of FIG. 3, the internal structures of the left-view video stream is shown. This stream includes picture data I1, P2, Br3, Br4, P5, Br6, Br7, and P9. These picture data are decoded according to the Decode Time Stamps (DTS). The first row shows the left-eye image. The left-eye image is played back by playing back the decoded picture data I1, P2, Br3, Br4, P5, Br6, Br7, and P9 according to the PTS, in the order of I1, Br3, Br4, P2, Br6, Br7, and P5.

In the fourth row of FIG. 3, the internal structures of the right-view video stream is shown. This stream includes picture data P1, P2, B3, B4, P5, B6, B7, and P8. These picture data are decoded according to the DTS. The third row shows the right-eye image. The right-eye image is played back by playing back the decoded picture data P1, P2, B3, B4, P5, B6, B7, and P8 according to the PTS, in the order of P1, B3, B4, P2, B6, B7, and P5.

The fifth row shows how the state of the 3D glasses 400 is changed. As shown in the fifth row, when the left-eye image is viewed, the shutter for the right eye is closed, and when the right-eye image is viewed, the shutter for the left eye is closed.

In FIG. 3, for example, the starting P-picture of the right-view video stream refers to the I-picture of the left-view video stream; the B-picture of the right-view video stream refers to the Br-picture of the left-view video stream; and the second P-picture of the right-view video stream refers to the P-picture of the left-view video stream. Here, a mode, in which video frames of the base-view video stream (B) and video frames of the dependent-view video stream (D) are alternately output at a display cycle of 1/48 seconds like "B"-"D"-"B"-"D", is called a "B-D presentation mode".

Also, a mode, in which a same type of video frame is repeatedly output twice or more while the 3D mode is maintained as the playback mode, is called a "B-B presentation mode". In the "B-B presentation mode", video frames of an independently playable base-view video stream are repeatedly output like "B"-"B"-"B"-"B".

The B-D presentation mode and the B-B presentation mode described above are basic presentation modes in the playback device. Other than these, a playback mode called "1 plane+offset" mode is available in the playback device.

The "1 plane+offset" mode (also referred to as "3D-offset mode") is a playback mode in which the stereoscopic viewing is realized by incorporating a shift unit in the latter half of the plane memory and functioning the shift unit. In each of the left-view period and the right-view period, the plane offset unit shifts the coordinates of the pixels in the plane memory in units of lines leftward or rightward to displace the image formation point of the right-eye and left-eye view lines frontward or backward so that the viewer can feel a change in the sense of depth. More specifically, when the pixels coordinates are shifted leftward in the left-view period, and rightward in the right-view period, the image formation point is displaced frontward; and when the pixels coordinates are shifted rightward in the left-view period, and leftward in the right-view period, the image formation point is displaced backward.

In such a plane shift, the plane memory for the stereoscopic viewing only needs to have one plane. It is thus the best method for generating the stereoscopic images with ease. However, the plane shift merely produces stereoscopic images in which monoscopic images come frontward or go backward. Therefore, it is suited for generating a stereoscopic effect for the menu or subtitle, but leaves something to be desired in realizing a stereoscopic effect for the characters or physical objects. This is because it cannot reproduce dimples or unevenness of the faces of characters.

To support the "1 plane+offset" mode, the playback device is structured as follows. For the playback of graphics, the playback device includes a plane memory, a CLUT unit, and a synthesizing unit. The plane shift unit is incorporated between the CLUT unit and the synthesizing unit. The plane shift unit realizes the above-described change of pixel coordinates by using the offset in the offset sequence incorporated in the access unit structure of the dependent-view video stream. With this arrangement, the level of jump-out of pixels in the "1 plane+offset" mode changes in synchronization with the MVC video stream. The "1 plane+offset" mode includes "1 plane+zero offset mode". The "1 plane+zero offset mode" is a display mode which, when the pop-up menu is ON, gives the stereoscopic effect only to the pop-up menu by making the offset value zero.

Figure 4:
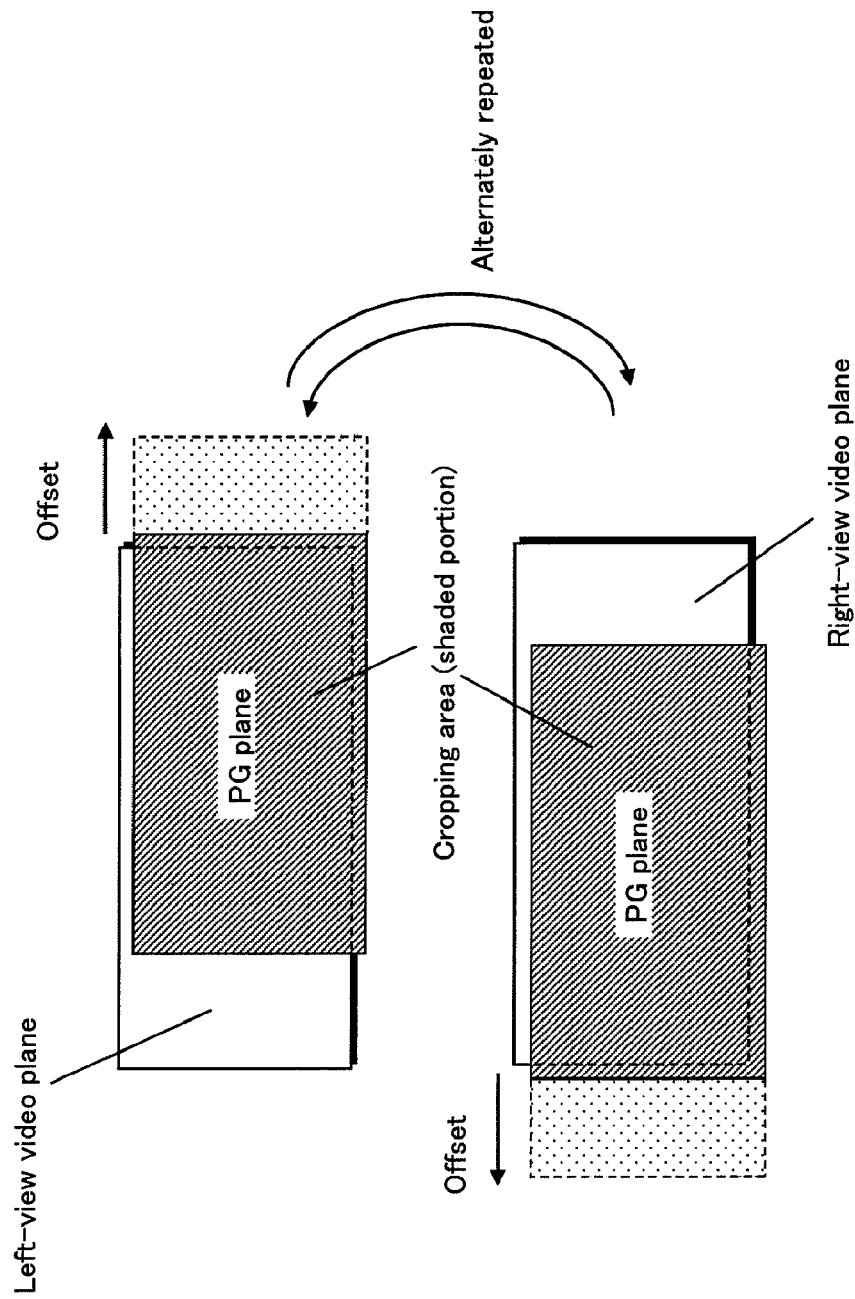
FIG. 4 shows how to realize the stereoscopic viewing in the "1 plane+offset" mode.

FIG. 4 shows how to realize the stereoscopic viewing in the "1 plane+offset" mode.

When the left-view video is to be output in the "1 plane+offset" mode, the coordinates of the image data stored in the plane memory called PG plane are shifted towards the positive direction of the X axis by the offset value. The plane memory is then cropped to prevent it from overlapping with the left-view video plane, and is provided to be synthesized with the other planes (see the upper portion of FIG. 4).

When the right-view video is to be output, the coordinates of the image data stored in the plane memory are shifted towards the negative direction of the X axis by the offset value. The plane memory is then cropped to prevent it from overlapping with the left-view video plane, and is provided to be synthesized with the other planes (see the lower portion of FIG. 4).

Figure 5:
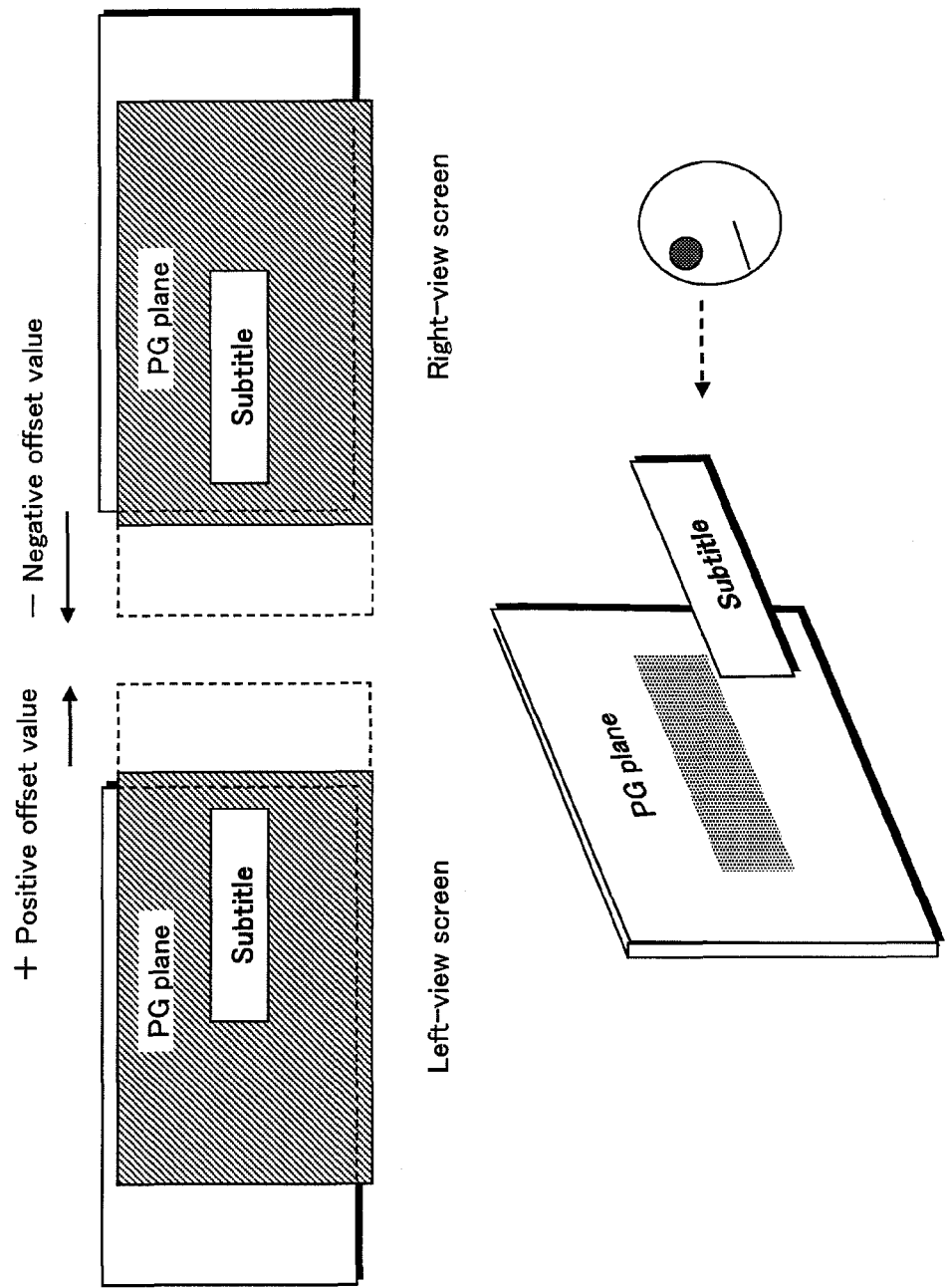
FIG. 5 schematically shows how an image is displayed to the user after the cropping with use of offset value and superimposing are performed.

FIG. 5 shows how the image planes are displayed to the user, after being cropped and superposed with use of the offset values. By shifting and cropping the image planes with use of the offset values, it is possible to create parallax images for the left and right eyes. This makes it possible to give depth to a monoscopic image. When the image has such a depth, the user will see the monoscopic image pop up from the screen of the display device.

The B-D presentation mode further includes the 3D-depth method for realizing the stereoscopic effect by using 2D images and the depth information, as well as the 3D-LR method for realizing the stereoscopic effect by using the L images and R images.

The 3D-depth method is realized by incorporating a parallax image generator in the latter half of the video decoder, and in the 3D-depth method, the left-view picture data and the right-view picture data are generated from (i) each piece of picture data in the video stream and (ii) the depth information of each pixel that constitutes the picture data.

The depth information may be made of grayscale picture data (also referred to as depth information picture data) that represents the depth of pixels by a grayscale.

Figure 7:
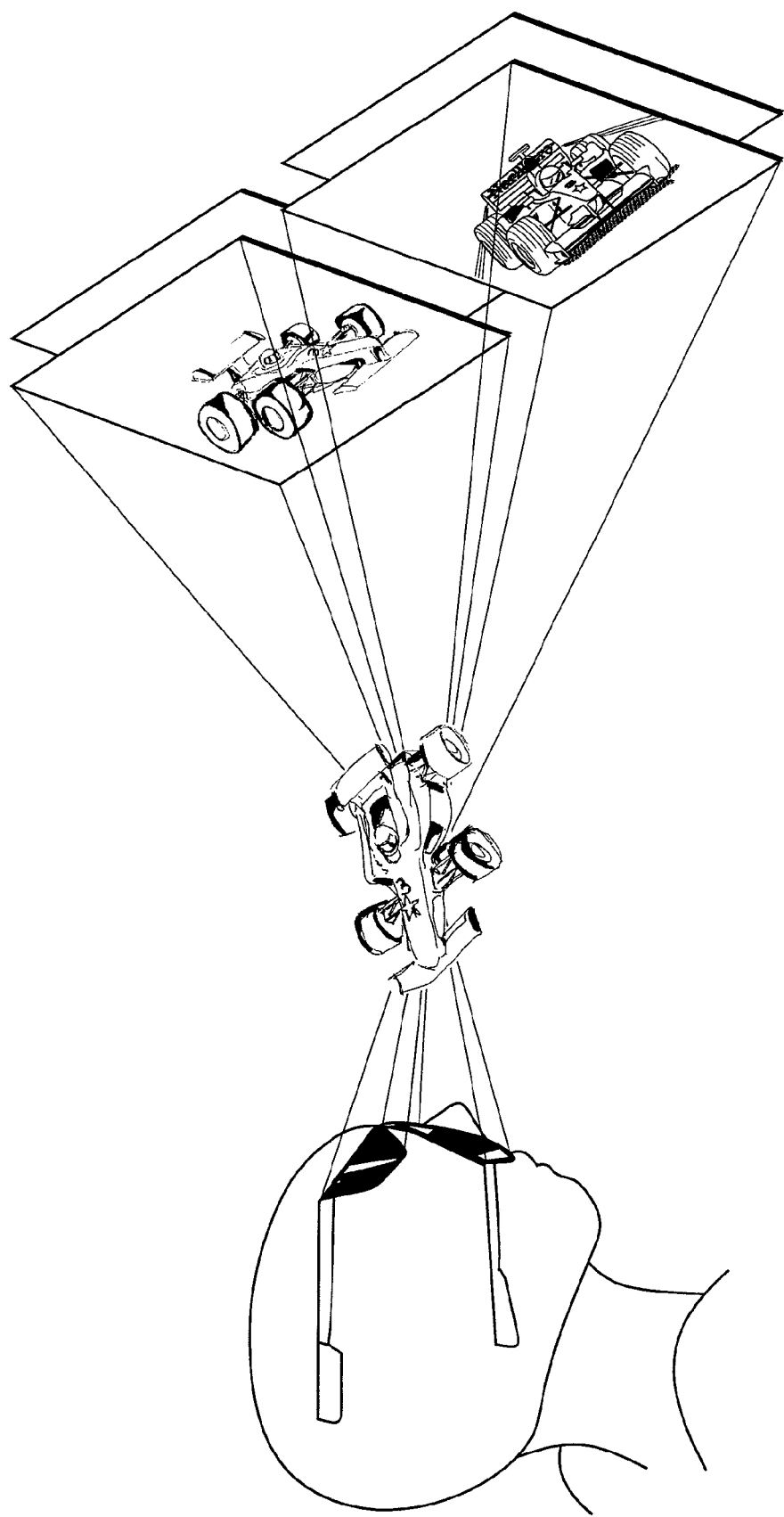
FIG. 7 shows a stereoscopic image generated in the 3D-depth mode.

FIGS. 6A through 6D show one example of the 3D-depth method. FIG. 6A shows a 2D image, and FIG. 6B shows a grayscale generated for the 2D image shown in FIG. 6A. The grayscale is represented by pixels that are composed of only the brightness element. The brighter (whiter) the grayscale pixels are, the shallower they are; and the darker the grayscale pixels are, the deeper they are. FIGS. 6C and 6D show the left-eye image and the right-eye image that are generated with use of the grayscale, respectively. FIG. 7 shows a stereoscopic image generated in the 3D-depth mode. As shown in FIG. 7, by generating the left-eye image and the right-eye image for each frame of 2D images, the user can enjoy the stereoscopic viewing by seeing the left-eye image and the right-eye image through the goggle.

In the 3D-depth method, a video stream that can be played back as a 2D image becomes the base-view video stream; and a video stream that is composed of grayscale picture data becomes the dependent-view video stream.

The base-view video stream can be shared by the 3D-depth mode and the 3D-LR mode. It is therefore possible to generate images for the 3D-depth mode and images for the 3D-LR mode by combining the base-view video stream and a video stream for the 3D-depth mode or a video stream for the 3D-LR mode. The data management structure is structured to support these combinations so that the display method is switched in accordance with the properties of the player and the television connected thereto. To achieve the 3D-depth mode, the playback device needs to be provided with dedicated hardware. As a result, it is supposed in the present application, except where otherwise mentioned, that the recording medium and the playback device do not support the 3D-depth mode.

Embodiment 1

Embodiment 1 of the present application relates to an improvement with regard to selection of one from among a plurality of types of elementary streams (ESs).

Figure 8A:
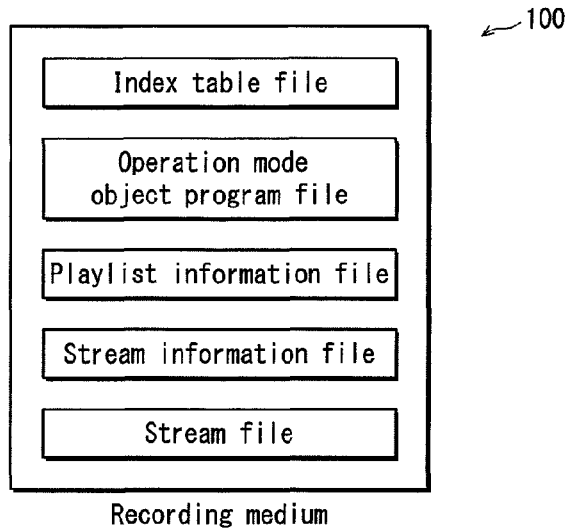
FIGS. 8A through 8C show the internal structure of the recording medium in Embodiment 1.
Figure 8B:
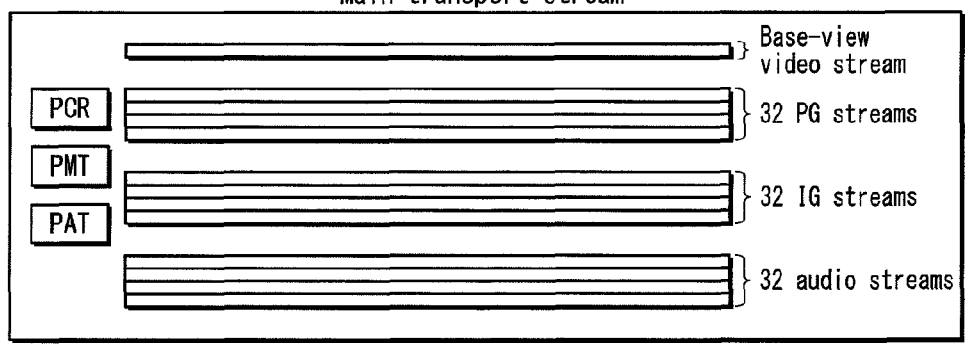
Figure 8C:
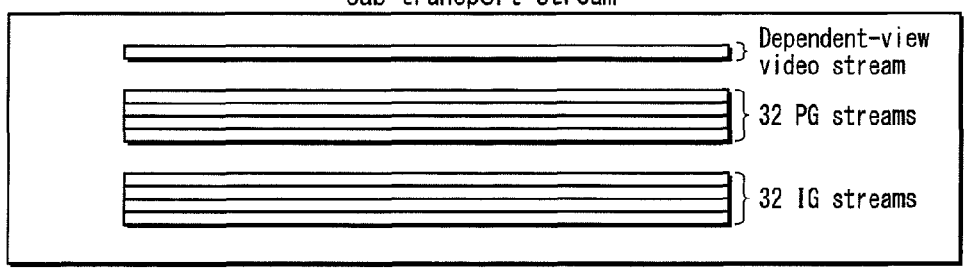

FIGS. 8A through 8C show the internal structure of the recording medium in Embodiment 1. As shown in FIG. 8A, the recording medium in Embodiment 1 stores an index table file, an operation mode object program file, a playlist information file, a stream information file, and a stream file.

<Index Table File>

The index table file is management information of the entire recording medium. The index table file is the first file to be read by a playback device after the recording medium is loaded into the playback device, so that the playback device is enabled to uniquely identify the disc. The index table file shows correspondence between each title constituting a title structure of an optical disc and an operation mode object that specifies the operation mode. Here, the title structure achieves the following: upon loading of an optical disc, playing back a title (FirstPlay title) for displaying a warning to the viewer, a logo of the content provider and so on; after the playback of the FirstPlay title, playing back a general title (which is identified by a serial number such as "1", "2", or "3") that constitutes a main story of the movie; and after the playback of the main-story title, playing back a title (menu title) and waiting for specification of a general title selected by the user. Here, one movie corresponds to a plurality of titles that are a plurality of versions of the movie. Accordingly, when a movie has only one version, the relationship is represented as "the movie=title". When a movie has a plurality of versions such as a theatrical version, a director's cut version, and a TV version, each of these versions is provided as one title. The playback device is provided with a title number register storing the title number of the current title. The title being played back currently is one of the plurality of titles whose title number is currently stored in the title number register. In optical discs, the above-mentioned FirstPlay title, general titles, and menu title are assigned with operation mode objects that define the operation modes of the respective titles, to define an operation mode in which each title operates. In this structure, the index table does not directly show the correspondence between the titles and the video streams, but show the correspondence between the titles and the operation mode objects so that the video streams are played back via the operation mode objects. This is because it is aimed to define titles that operate the operation mode objects, without playing back of AV.

<Operation-Mode-Object Program File>

The operation-mode-object program file stores operation mode objects which are programs that defined the operation modes of the playback device. The operation mode object is classified into: one that is written as a command; and one that is written in an object-oriented compiler language. The former type of operation mode object supplies a plurality of navigation commands as a batch job to the playback device in the command-based operation mode to operate the playback device based on the navigation commands. The command-based operation mode is called "HDMV mode".

The latter type of operation mode object supplies instances of class structure to the playback device in the operation mode based on the object-oriented compiler language, in order to operate the playback device based on the instances. Java™ applications can be used as the instances of class structure. The operation mode based on the object-oriented compiler language is called "BD-J mode".

<Playlist Information File>

The playlist information file is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which TSs among a plurality of TSs should be played back. The playlist 1information defines "patterns" of the playlists. The playback path defined by the playlist information is what is called "multi-path". The multi-path is composed of a "main path" and one or more "sub-paths". The main path is defined for the main TS. The sub-paths are defined for subjectional streams. A plurality of sub-paths can be defined while one main path is defined. The plurality of sub-paths are identified by identifiers called sub-path IDs. Chapter positions are defined in the playback time axis of the multi-path. It is possible to realize a random access by the playback device to an arbitrary time point in the time axis of the multi-path by causing the playback device to refer to one of the chapter positions. In the BD-J mode, it is possible to start an AV playback by the multi-path by instructing a Java™ virtual machine to generate a JMF (Java Media Frame work) player instance for playing back the playlist information. The JMF player instance is data that is actually generated in the heap memory of the virtual machine based on a JMF player class. In the HDMV mode, it is possible to start an AV playback by the multi-path by causing the playback device to execute a navigation command instructing to perform a playback according to the playlist. The playback device is provided with a playlist number register storing the number of the current playlist information. The playlist information being played back currently is one of a plurality of pieces of playlist information whose number is currently stored in the playlist number register.

<Stream Information File>

The stream information files are clip information files that are provided in a one-to-one correspondence with the stream files. The stream information file indicates: what ATC sequence is constituted form a sequence of source packets that exist in the stream file; what STC sequence is incorporated in the ATC sequence; and what TS is the ATC sequence.

The stream information file indicates the contents of the stream file. Therefore, when a TS in the stream file is to be played back, it is necessary to preliminarily read out, into the memory, a stream information file that corresponds to the stream file. That is to say, in the playback of a stream file, the "prestoring principle", in which the stream information file is preliminarily read out into the memory, is adopted. The reason that the prestoring principle is adopted is as follows. The data structure of the TS stored in the stream file has a compatibility with the European digital broadcast standard. So, the stream contains information such as PCR, PMT, and PAT that enable the stream to be treated as a broadcast program. However, it is unwise to extract such information each time a playback is performed. This is because it is necessary, each time a playback is performed, to access a low-speed recording medium to read out packets constituting the TS, and analyze the payloads of the TS packets. Therefore, the stream information files are provided in a one-to-one correspondence with the stream files storing TSs, and the stream information files are read out into the memory before the stream is played back, so that the information of the TSs can be grasped without analyzing the payloads of the TSs.

<Stream File>

The stream file stores one or more sequences of source packets. The source packet is a TS packet that is attached with a 4-byte TP_Extra_Header. The TP_Extra_Header is composed of a 2-bit copy permission indicator and a 30-bit ATS (Arrival Time Stamp). The ATS included in the TP_Extra_Header indicates an arrival time in a real-time transfer in which the isochronicity is ensured.

Among such sequences of source packets, a sequence of source packets whose time stamps are continuous in the Arrival Time Clock (ATC) time axis is called an "ATC sequence". The ATC sequence is a sequence of source packets, where Arrival_Time_Clocks referred to by the Arrival_Time_Stamps included in the ATC sequence do not include "arrival time-base discontinuity". In other words, the ATC sequence is a sequence of source packets, where Arrival_Time_Clocks referred to by the Arrival_Time_Stamps included in the ATC sequence are continuous. This is why each source packet constituting the ATC sequence is subjected to continuous source packet depacketizing processes and continuous packet filtering processes while the clock counter is counting the arrival time clocks of the playback device.

While the ATC sequence is a sequence of source packets, a sequence of TS packets whose time stamps are continuous in the STC time axis is called an "STC sequence". The STC sequence is a sequence of TS packets which do not include "system time-base discontinuity", which is based on the STC (System Time Clock) that is a system standard time for TSs. The presence of the system time-base discontinuity is indicated by a "discontinuity_cator" being ON, where the discontinuity_indicator is contained in a PCR packet carrying a PCR (Program Clock Reference) that is referred to by the decoder to obtain an STC. The STC sequence is a sequence of TS packets whose time stamps are continuous in the STC time axis. Therefore, each TS packet constituting the STC sequence is subjected to continuous decoding processes performed by the decoder provided in the playback device, while the clock counter is counting the system time clocks of the playback device.

Each of the main TS and the sub-TSs in the stream file is managed as a "piece of AV stream", namely an "AV clip", by the clip information in the stream information file corresponding to the stream file.

Also, the packet sequence stored in the stream file contains packet management information (PCR, PMT, PAT) defined in the European digital broadcast standard, as information for managing and controlling a plurality of types of PES streams.

The PCR (Program Clock Reference) stores STC time information corresponding to an ATS that indicates the time when the PCR packet is transferred to a decoder, in order to achieve synchronization between an ATC (Arrival Time Clock) that is a time axis of ATSs, and an STC (System Time Clock) that is a time axis of PTSs and DTSs.

The PMT (Program Map Table) stores PIDs in the streams of video, audio, graphics and the like contained in the transport stream file, and attribute information of the streams corresponding to the PIDs. The PMT also has various descriptors relating to the TS. The descriptors have information such as copy control information showing whether copying of the AV clip is permitted or not.

The PAT (Program Association Table) shows a PID of a PMT used in the TS, and is registered by the PID arrangement of the PAT itself.

These PCR, PMT, and PAT, in the European digital broadcast standard, have a role of defining partial transport streams constituting one broadcast program (one program). This enables the playback device to cause the decoder to decode TSs as if it deals with the partial TSs constituting one broadcast program, conforming to the European digital broadcast standard. This structure is aimed to support compatibility between the recording medium playback devices and the terminal devices conforming to the European digital broadcast standard. Among the TSs, a TS that is the base axis of the multi-path is called "main TS"; and a TS that is the base axis of the sub-path is called "sub-TS".

FIG. 8B shows the internal structure of the main TS. FIG. 8C shows the internal structure of the sub-TS. As shown in FIG. 8B, the main TS includes one base-view video stream, 32 base-view PG streams, 32 base-view IG streams, and 32 audio streams. As shown in FIG. 8C, the sub-TS includes one dependent-view video stream, 32 dependent-view PG streams, and 32 dependent-view IG streams.

Next, the internal structure of TS will be described.

FIGS. 9A and 9B illustrate in more detail how the video stream is stored in the PES packet sequences. The first row in FIG. 9A shows a video frame sequence of the video stream. The second row shows a PES packet sequence. The third row shows a TS packet sequence obtained by converting the PES packet sequence. As shown by arrows yg1, yg2, yg3 and yg4, the video stream is composed of a plurality of video presentation units (I picture, B picture, P picture). The video stream is divided up into the individual pictures, and each picture is stored in the payload of a PES packet. Each PES packet has a PES header storing a PTS (Presentation Time-Stamp) that is a display time of the picture stored in the payload of the PES packet, and a DTS (Decoding Time-Stamp) that is a decoding time of the picture stored in the payload of the PES packet.

<TS Packet Sequence>

FIG. 9B shows the format of the TS packets constituting the TS. The first row shows a TS packet sequence. The second row shows a source packet sequence.

As shown in the first row of FIG. 9B, each TS packet is a fixed-length packet consisting of a 4-byte "TS header" carrying information such as a PID identifying the stream, and a 184-byte "TS payload" storing data. The PES packets are divided and stored in the TS payloads.

As shown in the second row, each TS packet is attached with a 4-byte TP_Extra_Header to be converted into a 192-byte source packet. Such 192-byte source packets constitute the TS. The TP_Extra_Header stores information such as an ATS (Arrival_Time_Stamp). The ATS shows a transfer start time at which the TS packet is to be transferred to a PID filter. The source packets are arranged in the TS as shown in the third row. The numbers incrementing from the head of the TS are called SPNs (source packet numbers).

<Multiplexing of AV Clips>

FIG. 10 schematically shows how the main TS is multiplexed. First, the base-view video stream and an audio stream (First row) are respectively converted into PES packet sequences (Second row), and further converted into source packets sequences, respectively (Third row). Similarly, the base-view presentation graphics stream and the base-view interactive graphics stream (Seventh row) are converted into PES packet sequences, respectively (Sixth row), and further converted into source packet sequences, respectively (Fifth row). The video, audio, and graphics source packets obtained in this way are arranged in the order indicated by their ATSs. This is because the source packets should be read out into the read buffer according to their ATSs. The main TS (Fourth row) is composed of these source packets having been arranged in this way.

Elementary Streams to be Multiplexed in TS

The elementary streams (ES) to be multiplexed in these TSs include the video stream, audio stream, presentation graphics stream, and interactive graphics stream.

Video Stream

The video stream specified as the base-view stream constitutes a primary video stream in a picture-in-picture application. The picture-in-picture application is composed of the primary video stream and a secondary video stream. The primary video stream is a video stream composed of picture data of the picture-in-picture application that represents a parent picture in the screen; and the secondary video stream is a video stream composed of picture data of the picture-in-picture application that represents a child picture that is fit in the parent picture.

The picture data constituting the primary video stream and the picture data constituting the secondary video stream are stored in different plane memories after being decoded. The plane memory that stores the picture data constituting the secondary video stream has, in the first half thereof, a structural element (Scaling & Positioning) that performs changing scaling of the picture data constituting the secondary video stream, and positioning display coordinates of the picture data constituting the secondary video stream.

Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

Presentation Graphics (PG) Stream

The PG stream is a graphics stream that can be synchronized closely with the video, with the adoption of the pipeline in the decoder, and is suited for representing subtitles. The PG stream falls into two types: a 2D PG stream; and a stereoscopic PG stream. The stereoscopic PG stream further falls into two types: a left-view PG stream; and a right-view PG stream. One of the left-view PG stream and the right-view PG stream that is specified by the base-view indicator becomes the base-view PG stream, and the other that is not specified by the base-view indicator becomes the dependent-view PG stream.

The reason that the stereoscopic PG stream is provided as well as the 2D PG stream is as follows. For example, when the PG stream represents subtitle characters, the subtitle characters from an anterior view to be displayed in the 2D mode, and the subtitle characters for the left eye and the right eye to be displayed in the 3D-LR mode should be different from each other. For this reason, one graphics stream of an image from an anterior view is displayed in the 2D mode, and two graphics streams (left-view PG stream and right-view PG stream) are displayed in the 3D-LR mode. Similarly, in the 3D-depth mode, an image from an anterior view and a grayscale stream indicating the depth information are played back. The 2D+offset (2D compatible) stream and the 3D-LR stream should not be provided in mixture.

It is possible to define up to 32 2D PG streams, up to 32 base-view PG streams, and up to 32 dependent-view PG streams. These PG streams are attached with different packet identifiers. Thus, it is possible to cause a desired PG stream among these PG streams to be subjected to the playback, by specifying a packet identifier of the one to be played back to the demultiplexing unit.

The left-view PG stream and the right-view PG stream should have the same language attribute so that even if the user switches a display method, a subtitle having the same contents is displayed. It is thus presumed that the 2D subtitles and the 3D subtitles correspond to each other on a one-to-one basis, and that a 2D subtitle not having a corresponding 3D subtitle or a 3D subtitle not having a corresponding 2D subtitle should not be provided. This is to prevent the user from being confused when the display method is switched. With this structure, streams that respectively correspond to the 2D and 3D display modes are selected when one stream number is specified. In such a case, the one stream number should correspond to the same language attribute so that the contents of the subtitles for the 2D and LR are the same.

A close synchronization with video is achieved due to the decoding with the pipeline adopted therein. Thus the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The PG stream is a stream that is not multiplexed into the transport stream but represents a subtitle. The text subtitle stream (also referred to as textST stream) is a stream of this kind, as well. The textST stream is a stream that represents the contents of subtitle by the character codes.

The PG stream and the text subtitle stream are registered as the same stream type in the same stream registration sequence, without distinction between them in type. And then during execution of a procedure for selecting a stream, a PG stream or a text subtitle stream to be played back is determined according to the order of streams registered in the stream registration sequence. In this way, the PG streams and text subtitle streams are subjected to the stream selection procedure without distinction between them in type. Therefore, they are treated as belonging to a same stream type called "PG_text subtitle stream".

The PG_text subtitle stream for 2D is played back in the "1 plane+offset" mode. Hereinafter, the 2D PG_text subtitle stream is referred to as a "1 plane+offset" PG_text subtitle stream.

Interactive Graphics (IG) Stream

The IG stream is a graphics stream which, having information for interactive operation, can display menus with the progress of playback of the video stream and display pop-up menus in accordance with user operations.

As is the case with the PG stream, the IG stream is classified into a 2D IG stream and a stereoscopic IG stream. The stereoscopic IG stream is classified into a left-view IG stream and a right-view IG stream. One of the left-view IG stream and the right-view IG stream that is specified by the base-view indicator becomes the base-view IG stream, and the other that is not specified by the base-view indicator becomes the dependent-view IG stream. It is possible to define up to 32 2D IG streams, up to 32 base-view IG streams, and up to 32 dependent-view IG streams. These IG streams are attached with different packet identifiers. Thus, it is possible to cause a desired IG stream among these IG streams to be subjected to the playback, by specifying a packet identifier of the one to be played back to the demultiplexing unit.

The IG stream control information (called "interactive control segment") includes information (user_interface_model) that defines the user interface model. The person in charge of authoring can specify either "always on" or "pop-up menu on" by setting the user interface model information, where with the "always on", menus are displayed with the progress of playback of the video stream, and with the "pop-up menu on", the pop-up menus are displayed in accordance with user operations.

The interactive operation information in the IG stream has the following meaning. When the Java virtual machine instructs the playback control engine, which is proactive in the playback control, to start playing back a playlist in accordance with a request from an application, the Java virtual machine, after instructing the playback control engine to start the playback, returns a response to the application to notify that the playback of the playlist has started. That is to say, while the playback of the playlist by the playback control engine continues, the Java virtual machine does not enter the state waiting for end of execution. This is because the Java virtual machine is what is called an "event-driven-type" performer, and can perform operation while the playback control engine is playing back the playlist.

On the other hand, when, in the HDMV mode, the command interpreter instructs the playback control engine to play back a playlist, it enters the wait state until the execution of playback of the playlist ends. Accordingly, the command execution unit cannot execute an interactive process while the playback of the playlist by the playback control engine continues. The graphics decoder performs an interactive operation in place of the command interpreter. Thus, to cause the graphics decoder to perform the interactive operation, the IG stream is embedded with control information defining interactive operations for which buttons are used.

Display Modes Allowed for Each Stream Type

Different 3D display modes are allowed for each stream type. In the primary video stream 3D display mode, two playback modes, namely the B-D presentation mode and the B-B presentation mode are allowed. The B-B presentation mode is allowed for the primary video stream only when the pop-up menu is on. The type of primary video stream when the playback is performed in the B-D presentation mode is called "stereoscopic B-D playback type". The type of primary video stream when the playback is performed in the B-B presentation mode is called "stereoscopic B-B playback type".

In the PG stream 3D display mode, three playback modes, namely the B-D presentation mode, "1 plane+offset" mode, and "1 plane+zero offset" mode are allowed. The "1 plane+zero offset" mode is allowed for the PG stream only when the pop-up menu is on. The type of PG stream when the playback is performed in the B-D presentation mode is called "stereoscopic playback type". The type of PG stream and PG_text subtitle stream when the playback is performed in the "1 plane+offset" mode is called "1 plane+offset type". The type of PG stream and PG_text subtitle stream when the playback is performed in the "1 plane+zero offset" mode is called "1 plane+zero offset type".

In the text subtitle stream 3D display mode, two playback modes, namely the "1 plane+offset" mode, and "1 plane+zero offset" mode are allowed. The "1 plane+zero offset" mode is allowed for the text subtitle stream only when the pop-up menu is on. The type of PG stream when the playback is performed in the B-D presentation mode is called "stereoscopic playback type". The type of PG stream and PG_text subtitle stream when the playback is performed in the "1 plane+offset" mode is called "1 plane+offset type". The type of PG stream and PG_text subtitle stream when the playback is performed in the "1 plane+zero offset" mode is called "1 plane+zero offset type".

In the IG stream 3D display mode, three playback modes, namely the B-D presentation mode, "1 plane+offset" mode, and "1 plane+zero offset" mode are allowed. The "1 plane+zero offset" mode is allowed for the IG stream only when the pop-up menu is on. It is supposed in the following description, except where otherwise mentioned, that the picture-in-picture cannot be used during playback in the 3D playback mode. This is because each of the picture-in-picture and the 3D playback mode requires two video planes for storing non-compressed picture data. It is also supposed in the following description, except where otherwise mentioned, that the sound mixing cannot be used in the 3D playback mode.

Figure 11A:
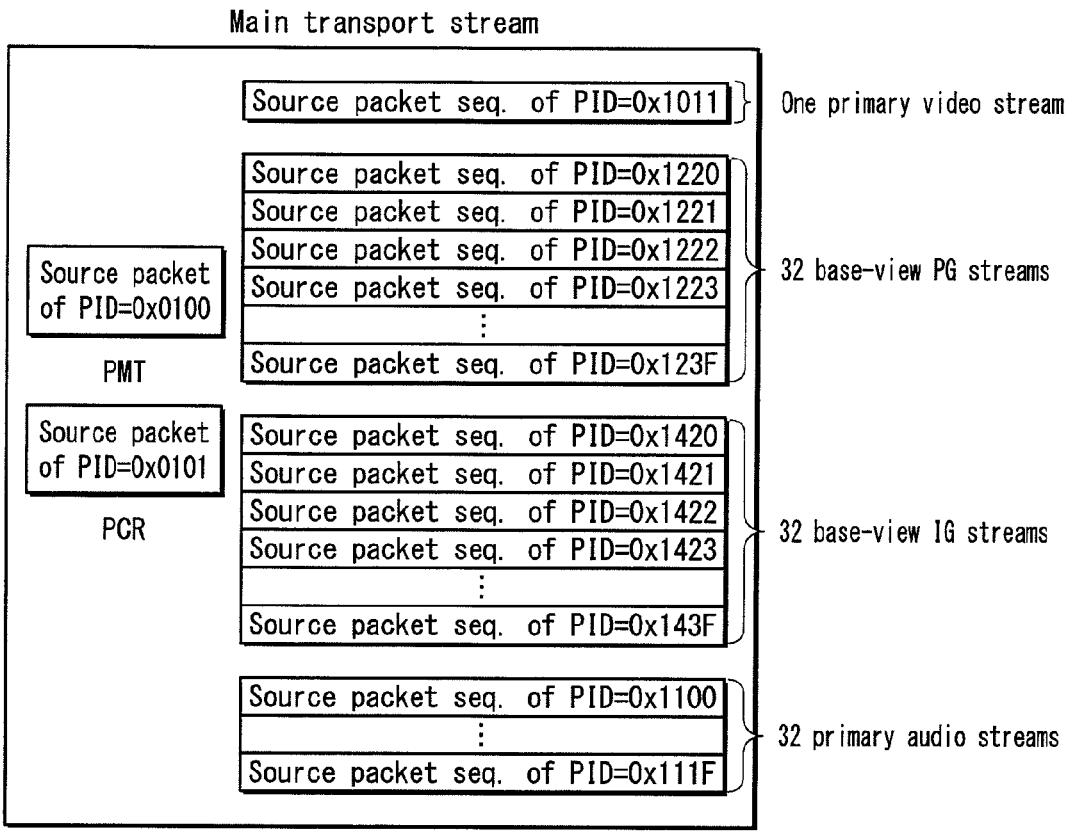
Figure 11B:
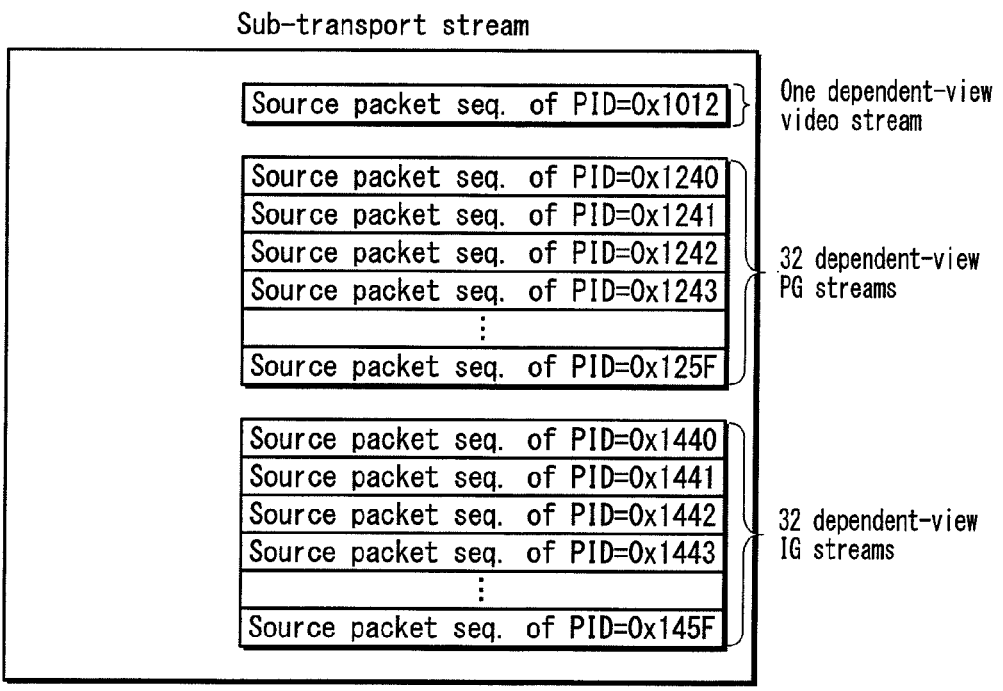

Next, the internal structures of the main TS and sub-TS will be described. FIGS. 11A and 11B show the internal structures of the main TS and sub-TS.

FIG. 11A shows the internal structure of the main TS. The main TS is composed of the following source packets.

A source packet having packet ID "0x0100" constitutes a program_map table (PMT). A source packet having packet ID "0x0101" constitutes a PCR.

A source packet sequence having packet ID "0x1011" constitutes the primary video stream.

Source packet sequences having packet IDs "0x1220" through "0x123F" constitute 32 base-view PG streams.

Source packet sequences having packet IDs "0x1420" through "0x143F" constitute 32 base-view IG streams.

Source packet sequences having packet IDs "0x1100" through "0x111F" constitute primary audio streams.

By specifying a packet identifiers of one of these source packets to the demultiplexing unit, it is possible to cause a desired elementary stream among a plurality of elementary streams multiplexed in the main transport streams to be demultiplexed and subjected to the decoder.

FIG. 11B shows the internal structure of the sub-TS. The sub-TS is composed of the following source packets.

A source packet sequence having packet ID "0x1012" constitutes the dependent-view video stream. Source packet sequences having packet IDs "0x1240" through "0x125F" constitute 32 dependent-view PG streams.

Source packet sequences having packet IDs "0x1440" through "0x145F" constitute 32 dependent-view IG streams.

This completes the description of the stream file. Next is a detailed explanation of the playlist information.

Figure 12A:
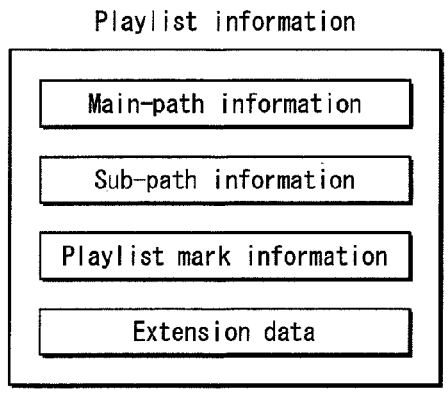
FIGS. 12A through 12D show the internal structure of the playlist information.

To define the above-described multi-path, the internal structures shown in FIGS. 12A through 12D are provided. FIG. 12A shows the internal structure of the playlist information. As shown in FIG. 12A, the playlist information includes main-path information, sub-path information, playlist mark information, and extension data. These constitutional elements will be described in the following.

Figure 12B:
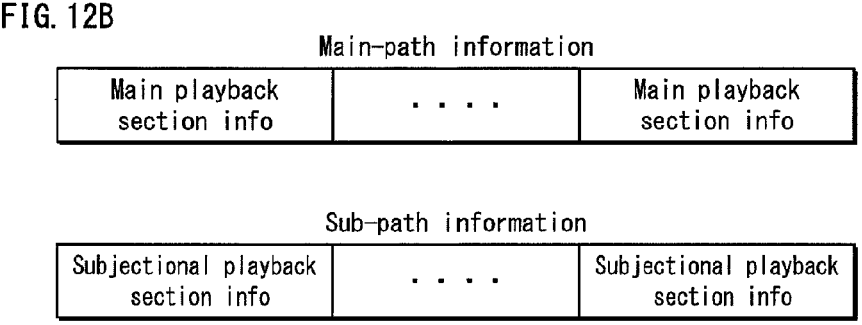

1) The main-path information is composed of one or more pieces of main playback section information. FIG. 12B shows the internal structures of the main-path information and the sub-path information. As shown in FIG. 12B, the main-path information is composed of one or more pieces of main playback section information, and the sub-path information is composed of one or more pieces of subjectional playback section information.

The main playback section information, called playitem information, is information that defines one or more logical playback sections by defining one or more pairs of an "in_time" time point and an "out_time" time point on the TS playback time axis. The playback device is provided with a playitem number register storing the playitem number of the current playitem. The playitem being played back currently is one of the plurality of playitems whose playitem number is currently stored in the playitem number register.

Figure 12C:
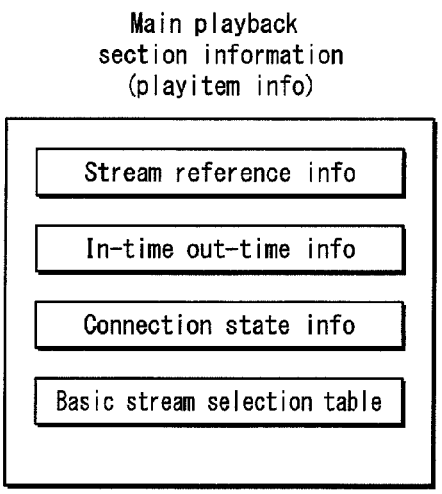

FIG. 12C shows the internal structure of the playitem information. As shown in FIG. 12C, the playitem information includes stream reference information, in-time out-time information, connection state information, and a basic stream selection table.

The stream reference information includes: "clip Information file name information (clip_Information_file_name)" that indicates the file name of the clip information file that manages, as "AV clips", the transport streams constituting the playitem; "clip encoding method identifier (clip_codec_identifier)" that indicates the encoding method of the transport stream; and "STC identifier reference (STC_ID_reference)" that indicates STC sequences in which in-time and out-time are set, among the STC sequences of the transport stream.

This completes the playitem information.

Figure 12D:
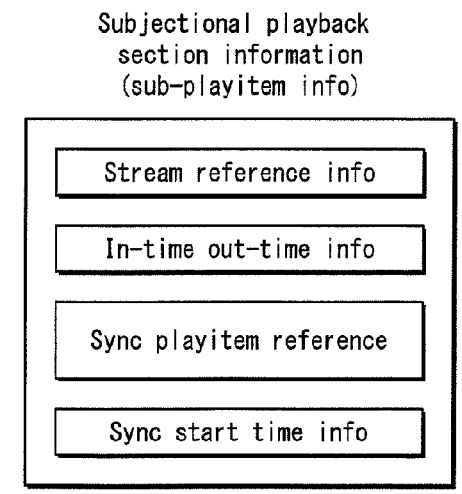

2) The subjectional playback section information, called sub-path information, is composed of a plurality of pieces of sub-playitem information. FIG. 12D shows the internal structure of the sub-playitem information. As shown in FIG. 12D, the sub-playitem information is information that defines playback sections by defining pairs of an "in time" and an "out_time" on the STC sequence time axis, and includes stream reference information, in-time out-time information, sync playitem reference, and sync start time information.

The stream reference information, as in the playitem information, includes: "clip Information file name information", "clip encoding method identifier", and "STC identifier reference".

The "in-time out-time information (SubPlayItem_In_Time, SubPlayItem_Out_Time)" indicates the start point and end poiunt of the sub-playitem on the STC sequence time axis.

The "sync playitem reference (Sync_Playitem_Id)" is information that uniquely indicates a playitem with which the sub-playitem is to be synchronized. The sub-playitem In_Time exists on playback time axis of the playitem specified by this sync playitem identifier.

The "sync start time information (Sync_Start_PTS_of_Playitem)" indicates a time point on the STC sequence time axis of the playitem specified by the sync playitem identifier, that corresponds to the start point of the sub-playitem specified by the sub-playitem In_Time.

3) The playlist mark information is information that defines the mark point unique to the playback section. The playlist mark information includes an indicator indicating a playback section, a time stamp indicating the position of a mark point on the time axis of the digital stream, and attribute information indicating the attribute of the mark point.

The attribute information indicates whether the mark point defined by the playlist mark information is a link point or an entry mark.

The link point is a mark point that can be linked by the link command, but cannot be selected when the chapter skip operation is instructed by the user.

The entry mark is a mark point that can be linked by the link command, and can be selected even if the chapter skip operation is instructed by the user.

The link command embedded in the button information of the IG stream specifies a position for a random-access playback, in the form of an indirect reference via the playlist mark information.

<Basic Stream Selection Table (StreamNumber_Table)>

The basic stream selection table shows a list of elementary streams that are to be played back in a monoscopic playback mode, and the table, when a playitem containing the basic stream selection table itself becomes the current playitem among a plurality of playitems constituting the playlist, specifies, for each of the plurality of stream types, an ES which is permitted to be played back, among ESs multiplexed in AV clips referenced by the main path and the sub-path of the multi-path. Here, the stream types include: the primary video stream in the picture-in-picture; the secondary video stream in the picture-in-picture; the primary audio stream in the soundmixing; the secondary audio stream in the sound mixing; the PG_text subtitle stream; and the interactive graphics stream. It is possible to register an ES which is permitted to be played back, for each of these stream types. More specifically, the basic stream selection table is composed of sequences of stream registrations. Here, the stream registration is information that, when a playitem containing the basic stream selection table itself becomes the current playitem, indicates what kind of stream is the ES permitted to be played back. Each stream registration is associated with the stream number of the stream. Each stream registration has a data structure in which a pair of a stream entry and a stream attribute is associated with a logical stream number.

The stream number in the stream registration is represented by an integer such as "1", "2", or "3". The largest stream number for a stream type is identical with the number of streams for the stream type. The playback device is provided with a stream number register for each stream type, and the current stream, namely the ES being played back currently is indicated by the stream number stored in the stream number register.

A packet identifier of the ES to be played back is written in the stream entry. By making use of this structure in which a packet identifier of the ES to be played back can be written in the stream entry, the stream numbers included in the stream registrations are stored in the stream number registers of the playback device, and the playback device causes the PID filter thereof to perform a packet filtering based on the packet identifiers stored in the stream entries of the stream registrations. With this structure, TS packets of the ESs that are permitted to be played back according to the basic stream selection table are output to the decoder, so that the ESs are played back.

In the basic stream selection table, the stream registrations are arranged in an order of stream numbers. When there are a plurality of streams that satisfy the condition: "playable by playback device", a stream corresponding to the highest stream number in the stream registration sequences is selected.

With this structure, when there is found a stream that cannot be played back by the playback device, among the stream registrations in the basic stream selection table, the stream is excluded from the playback. Also, when there are a plurality of streams that satisfy the condition: "playable by playback device, and the language attribute matches the language setting in the device", the person in charge of authoring can convey the playback device how to select one with priority from among the plurality of streams.

It is judged whether there is a stream that satisfies the condition: "playable by playback device, and the language attribute matches the language setting in the device". Also, a stream is selected from among a plurality of streams that satisfy the condition. The procedure for the judgment and selection is called a "stream selection procedure". The stream selection procedure is executed when the current playitem is switched, or when a request to switch the stream is input by the user.

A sequential procedure for performing the above-described judgment and selection and setting a stream number in the stream number register of the playback device when a state change occurs in the playback device, such as when the current playitem is switched, is called "procedure to be executed at state change". Since the stream number registers are provided respectively in correspondence with the stream types, the above-described procedure is executed for each stream type.

A sequential procedure for performing the above-described judgment and selection and setting a stream number in the stream number register of the playback device when a request to switch the stream is input by the user is called "procedure at state change request".

A procedure for setting the stream number registers to the initial values of the stream registration sequences when a BD-ROM is loaded, is called "initialization".

Priorities are assigned evenly to the streams specified in the sub-playitem information and the streams specified in the playitem information, as indicated by the stream registration sequences in the basic stream selection table. As a result, even a stream not multiplexed with a video stream is targeted for selection as a stream to be played back in sync with the video stream, if the stream is specified by the sub-playitem information.

Furthermore, when playback device can play back a stream specified by the sub-playitem information, and when the priority of the stream specified by the sub-playitem information is higher than the priority of the graphics stream multiplexed with the video stream, the stream specified by the sub-playitem information is played back in place of the stream multiplexed with the video stream.

Figure 13A:
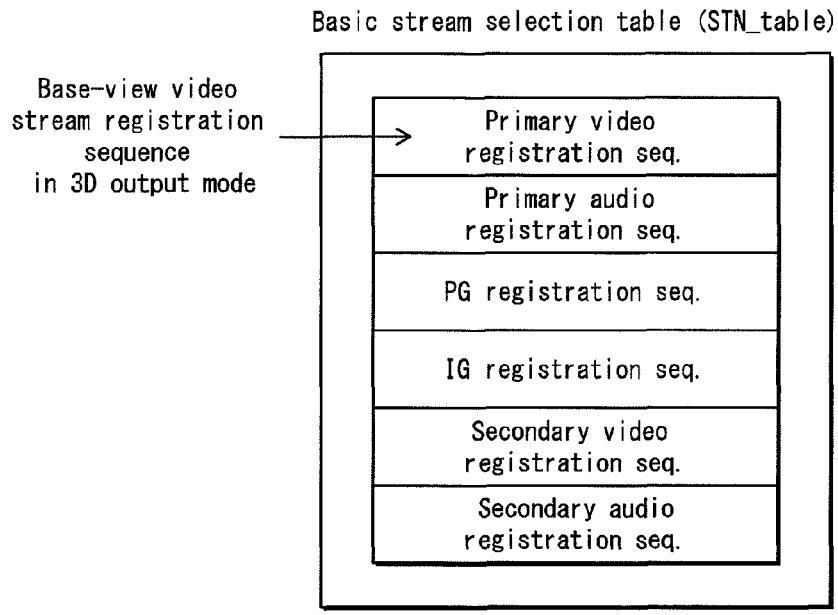
FIGS. 13A and 13B show one example of the basic stream selection table.
Figure 13B:
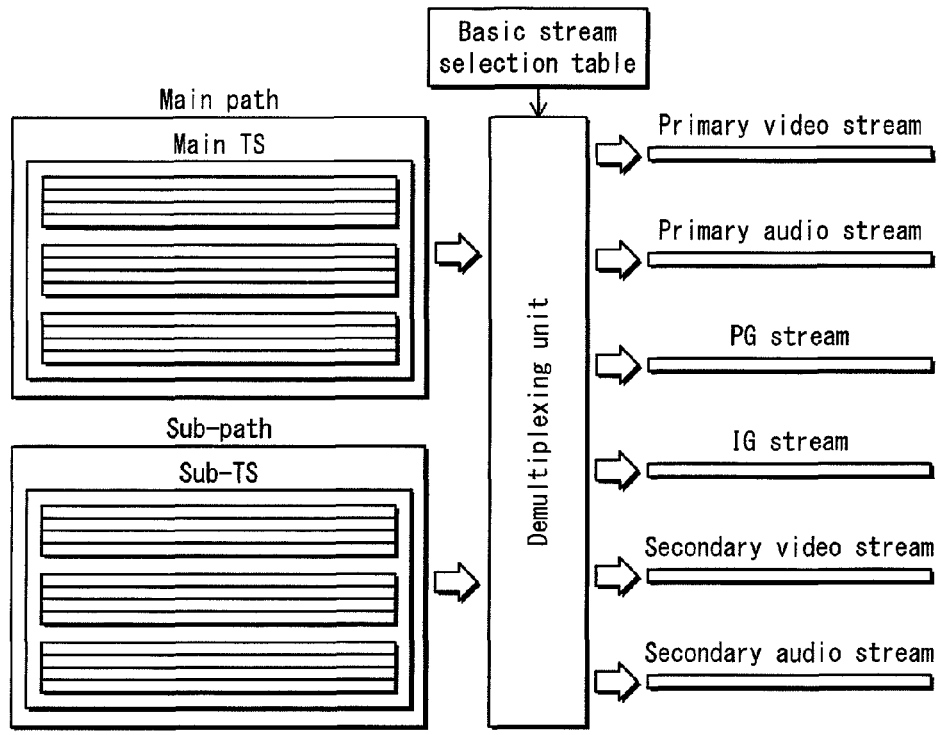

FIGS. 13A and 13B show one example of the basic stream selection table. FIG. 13A shows a plurality of stream registration sequences that are provided in the basic stream selection table when there are following stream types: primary video stream; primary audio stream; PG stream; IG stream; secondary video stream; and secondary audio stream. FIG. 13B shows the elementary streams that are demultiplexed from the main TS and the sub-TSs with use of the basic stream selection table. The left-hand side of FIG. 13B shows the main TS and the sub-TSs, the middle part of FIG. 13B shows the basic stream selection table and the demultiplexing unit, and the right-hand side of FIG. 13B shows the primary video stream, primary audio stream, PG stream, IG stream, secondary video stream, and secondary audio stream that are demultiplexed based on the basic stream selection table.

Next, the extension data will be described in detail.

When the playlist constitutes a picture-in-picture application, picture-in-picture metadata needs to be stored in a data block of extension data in the playlist file. When the playlist information refers to the MVC video stream, an extended stream selection table needs to be stored in a data block of extension data in the playlist information file.

When the playlist information refers to the MVC video stream on the disc, or the MVC video stream in the stereoscopic IG stream playback menu, extension information of the sub-path information (sub-path block extension) needs to be stored in a data block of extension data in the playlist information file.

Other aims of the extension data in the playlist information are reserved.

When a 2D playback device finds unknown extension data in the playlist file, the 2D playback device should disregard the extension data.

<Extension Stream Selection Table (StreamNumber_Table_StereoScopic (SS))>

The extension stream selection table shows a list of elementary streams that are to be played back in a stereoscopic playback mode, and is used together with the basic stream selection table only in the stereoscopic playback mode. The extension stream selection table defines the elementary streams that can be selected when a playitem is played back or when a sub-path related to the playitem is played back.

The extension stream selection table indicates the elementary streams that are permitted to be played back only in the stereoscopic playback mode, and includes stream registration sequences. Each piece of stream registration information in the stream registration sequences includes a stream number, and a stream entry and a stream attribute corresponding to the stream number. The extension stream selection table means an extension that is unique to the stereoscopic playback mode. Therefore, a playlist for which each piece of playitem information is associated with the extension stream selection table (STN_table_SS) is called "3D playlist". Each stream entry in the extension stream selection table indicates a packet identifier that is to be used in the demultiplexing by the playback device, when the playback device is in the stereoscopic playback mode, and the corresponding stream number is set in the stream number register of the playback device. A difference from the basic stream selection table is that the stream registration sequences in the extension stream selection table are not targeted by the stream selection procedure. That is to say, the stream registration information in the stream registration sequences of the basic stream selection table is interpreted as the priorities of the elementary streams, and a stream number in any piece of stream registration information is written into the stream number register. In contrast, the stream registration sequences of the extension stream selection table are not targeted by the stream selection procedure, and the stream registration information of the extension stream selection table is used only for the purpose of extracting a stream entry and a stream attribute that correspond to a certain stream number when the certain stream number is stored in the stream number register.

Suppose that, when the playback mode switches from the 2D playback mode to the 3D playback mode, the target stream selection table also switches from the basic stream selection table to the extension stream selection table. Then, the identity of the stream numbers may not be maintained, and the identity of the language attribute may be lost, as well.

Accordingly, the use of the extension stream selection table is restricted to above-described one to maintain the identity of the stream attribute such as the language attribute.

The extension stream selection table is composed of stream registration sequences of the dependent-view streams, stream registration sequences of the PG streams, and stream registration sequences of the IG streams.

The stream registration sequences in the extension stream selection table are combined with the stream registration sequences of the same stream types in the basic stream selection table. More specifically, the dependent-view video stream registration sequences in the extension stream selection table are combined with the primary video stream registration sequences in the basic stream selection table; the PG stream registration sequences in the extension stream selection table are combined with the PG stream registration sequences in the basic stream selection table; and the IG stream registration sequences in the extension stream selection table are combined with the IG stream registration sequences in the basic stream selection table.

After this combination, the above-described procedure is executed onto the stream registration sequences in the basic stream selection table among the two tables after the combination.

FIG. 14 shows the internal structure of the extension stream selection table. The extension stream selection table is composed of: "length" which indicates the entire length of the extension stream selection table; "fixed offset during pop-up (Fixed_offset_during_Popup)"; and the stream registration sequences of each stream type corresponding to each playitem.

When there are N pieces of playitems identified as playitems #1-#N, stream registration sequences respectively corresponding to the playitems #1-#N are provided in the extension stream selection table. The stream registration sequences corresponding to each playitem are dependent-view stream registration sequence, PG stream registration sequence, and IG stream registration sequence.

The "Fixed_offset_during_Popup" is a fixed offset during pop-up, and controls the playback type of the video or PG_text subtitle stream when the pop-up menu is set to "on" in the IG stream. The "Fixed_offset_during_Popup" field is set to "on" when the "user_interface_model" field in the IG stream is on, namely, when the user interface of the pop-up menu is set to "on". Also, the "Fixedoffset_during_Popup" field is set to "off" when the "user_interface_model" field in the IG stream is off, namely, when the "AlwaysON" user interface is set.

When the fixed offset during pop-up is set to "0", namely, when the pop-up menu is set to "off" in the user interface of the IG stream, the video stream is in the B-D presentation mode, the stereoscopic PG stream becomes the stereoscopic playback type, and during playback in the "1 plane+offset" mode, the PG_text subtitle stream is in the "1 plane+offset" mode.

When the fixed offset during pop-up is set to "1", namely, when the pop-up menu is set to "on" in the IG stream, the video stream is in the B-B presentation mode, the stereoscopic PG stream is in the "1 plane+offset" mode, and the PG stream for "1 plane+offset" is played back as the "1 plane+zero offset" playback type.

In the "1 plane+offset" mode, the PG_text subtitle stream becomes "1 plane+zero offset".

The "offset sequence number information" ("number_of_offset_sequence" in the drawing) indicates the number of offset sequences in the dependent-view stream.

The value of the "offset sequence number information in the extension stream selection table is identical with the number of offset sequences that is included in the dependent-view stream.

FIGS. 15A-15C shows the stream registration sequences in the extension stream selection table.

FIG. 15A shows the internal structure of the dependent-view video stream registration sequence. The dependent-view video stream registration sequence is composed of v(x) pieces of SS_dependent_view_blocks. Here, "v(x)" represents the number of primary video streams that are permitted to be played back in the basic stream selection table of the playitem information #x. The lead lines in the drawing indicates the close-up of the internal structure of the dependent-view video stream registration sequence. As indicated by the lead lines, the "SS_dependent_view_block" is composed of the stream number, stream entry, stream attribute, and "number_of_offset_sequence".

The stream entry includes: a sub-path identifier reference (ref_to_Subpath_id) specifying a sub-path to which the playback path of the dependent-view video stream belongs; a stream file reference (ref_to_subClip_entry_id) specifying a stream file in which the dependent-view video stream is stored; and a packet identifier (ref_to_streamPID_subclip) of the dependent-view video stream in this stream file.

The "stream attribute" includes the language attribute of the dependent-view video stream.

The "number_of_offset sequence" indicates the number of offsets provided in the dependent-view video stream.

The dependent-view video stream registration sequences shown in FIG. 15A indicate that a plurality of pieces of stream registration information are provided in correspondence with a plurality of dependent-view video streams. However, FIG. 15A merely illustrates the data structure thereof. In the actuality, since there is only one base-view video stream normally, the number of pieces of stream registration information for the dependent-view video stream is one.

FIG. 15B shows the internal structure of the PG stream registration sequence. The PG stream registration sequence is composed of P(x) pieces of stream registration information. Here, "P(x)" represents the number of PG streams that are permitted to be played back in the basic stream selection table of the playitem information #x.

The lead lines in the drawing indicates the close-up of the common internal structure of the PG stream registration sequences.

The "PGtextST_offset_sequence_id_ref" is PG_text subtitle stream offset sequence reference information, and indicates an offset sequence with respect to the PG_text subtitle stream in the "1 plane+offset" mode.

The offset metadata is supplied by the access unit of the dependent-view video stream. The playback device should apply the offset, which is supplied by this field, to the presentation graphics (PG) plane of the "1 plane+offset" mode type.

When the field is an undefined value (FF), the playback device does not apply this offset to the PG stream plane memory.

The "is_SS_PG" is a stereoscopic presentation graphics presence/absence flag that indicates the validity and presence of the stream entry of the base-view IG and the stream entry and stream attribute of the dependent-view IG in the PG stream. When the structure is absent in the stereoscopic PG stream, this field should be set to "0"; and when the structure is present in the stereoscopic PG stream, this field should be set to "1".

The "stream_entry_for_base_view" includes: a sub-path identifier reference (ref_to_Subpath_id) specifying a sub-path to which the playback path of the base-view PG stream belongs; a stream file reference (ref_to_subClip_entry_id) specifying a stream file in which the base-view PG stream is stored; and a packet identifier (ref_to_stream_PID_subclip) of the base-view PG stream in this stream file.

The "stream entry_for_dependent_view" includes: a sub-path identifier reference (ref_to_Subpath_id) specifying a sub-path to which the playback path of the dependent-view PG stream belongs; a stream file reference (ref_to_subClip_entry_id) specifying a stream file in which the dependent-view PG stream is stored; and a packet identifier (ref_to_stream_PID_subclip) of the dependent-view PG stream in this stream file.

When the stream file referenced by the "stream entry_for_dependent_view" in the stream registration information in the extension stream selection table is different from the stream file referenced by the stream entry in the basic stream selection table, a stream file storing the dependent-view PG stream needs to be read out.

The "stream attribute" includes language attributes of the base-view PG stream and the dependent-view PG stream.

The "SS_PG_textST_offset_sequence_id_ref" is reference information for referencing an offset sequence for the PG_text subtitle stream, and indicates the offset sequence for the PG_text subtitle stream. The playback device should apply the offset, which is supplied by this field, to the PG plane.

When the field is an undefined value (FF), the playback device does not apply this offset to the PG stream plane memory.

FIG. 15C shows the internal structure of the IG stream registration sequence. The IG stream registration sequence is composed of I(x) pieces of stream registration information. Here, "I(x)" represents the number of IG streams that are permitted to be played back in the basic stream selection table of the playitem information #x. The lead lines in the drawing indicates the close-up of the common internal structure of the IG stream registration sequences.

The "IG_offset_sequence_id_ref" is an interactive graphics offset sequence reference, and is a reference to the sequence ID of the IG stream in the "1 plane+offset" mode. This value indicates an offset sequence ID defined for the offset sequence. As described above, the offset metadata is supplied by the dependent-view video stream. The playback device should apply the offset, which is supplied by this field, to the IG stream of the "1 plane+offset" mode type.

When the field is an undefined value (FF), the playback device does not apply this offset to the interactive graphics (IG) stream plane.

The "IG_Plane_offset_direction_during_BB_video" is the user interface of the pop-up menu in the B-B presentation mode, and indicates the offset direction in the IG plane in the "1 plane+offset" mode while the IG stream is played back.

When this field is set to "0", it is the front setting. That is to say, the plane memory exists between the television and the viewer, and the plane is shifted rightward during the left-view period, and the plane is shifted leftward during the right-view period.

When this field is set to "1", it is the behind setting. That is to say, the plane memory exists behind the television or the screen, and the left plane is shifted rightward, and the right plane is shifted leftward.

The "IG_Plane_offset_value_during_BB_video" indicates, in units of pixels, the offset value of the IG plane in the "1 plane+offset" mode while the IG stream is played back by the user interface of the pop-up menu in the B-B presentation mode.

The "is_SS_PG" is a stereoscopic interactive graphics presence/absence flag that indicates the validity and presence of the stream entry of the base-view IG and the stream entry and stream attribute of the dependent-view IG in the IG stream. When the data structure of the stereoscopic IG stream is absent, this field should be set to "0"; and when the IG stream that is permitted to be played back is a stereoscopic IG stream, this field should be set to "1".

The "stream_entry_for_base_view" includes: a sub-path identifier reference (ref_to_Subpath_id) specifying a sub-path to which the playback path of the base-view IG stream belongs; a stream file reference (ref_to_subClip_entry_id) specifying a stream file in which the base-view IG stream is stored; and a packet identifier (ref_to_stream_PID_subclip) of the base-view IG stream in this stream file.

The "stream_entry_for_dependent_view" includes: a sub-path identifier reference (ref_to_Subpath_id) specifying a sub-path to which the playback path of the dependent-view IG stream belongs; a stream file reference (ref_to_subClip_entry_id) specifying a stream file in which the dependent-view IG stream is stored; and a packet identifier (ref_to_stream_PID_subclip) of the dependent-view IG stream in this stream file. When the stream file referenced by the "stream_entry_for_dependent_view" in the stream registration information in the extension stream selection table is different from the stream file referenced by the stream entry in the basic stream selection table, a stream file storing the dependent-view IG stream needs to be read out.

The "stream_attribute" includes language attributes of the base-view IG stream and the dependent-view IG stream.

The "SS_IG_offset_id_ref" is a reference to the offset sequence ID for the stereoscopic-type IG stream, and indicates the offset sequence for the offset metadata of the dependent-view video stream. The playback device should apply the offset, which is supplied by this field, to the stereoscopic-type IG plane.

When the field is an undefined value (FF), the playback device does not apply this offset to the IG plane.

The following describes restrictions for the extension stream selection table.

The stream entry in the stereoscopic dependent-view block should not change in the playlist.

When the type of the stream entry in the stereoscopic dependent-view block is the ES type (stream type=2) that is used by the sub-path, the sub-path ID reference and the sub-clip entry ID reference (ref_to_subclip_entry_id) do not change in the playlist.

Only two types of elementary streams are permitted to be the types of the stream entry, stream entry for the base view, and stream entry for the dependent view. The two types are: ES (stream type=1) in the AV clip used by the playitem; and ES (stream type=2) in the AV clip used by the sub-path.

In the stereoscopic dependent-view block, the stream encoding method in the stream attribute is set to "0x20".

FIG. 16 shows what elementary streams are demultiplexed from the main TS and the sub-TSs with use of the basic stream selection table and the extension stream selection table.

The middle part of FIG. 16 shows the demultiplexing unit. The upper part of FIG. 16 shows the combination of the basic stream selection table and the extension stream selection table. The left-hand side of FIG. 16 shows the main TS and the sub-TSs, and the right-hand side of FIG. 16 shows the demultiplexed base-view video stream, dependent-view video stream, base-view PG stream, dependent-view PG stream, base-view IG stream, dependent-view IG stream, and primary audio stream.

Figure 17:
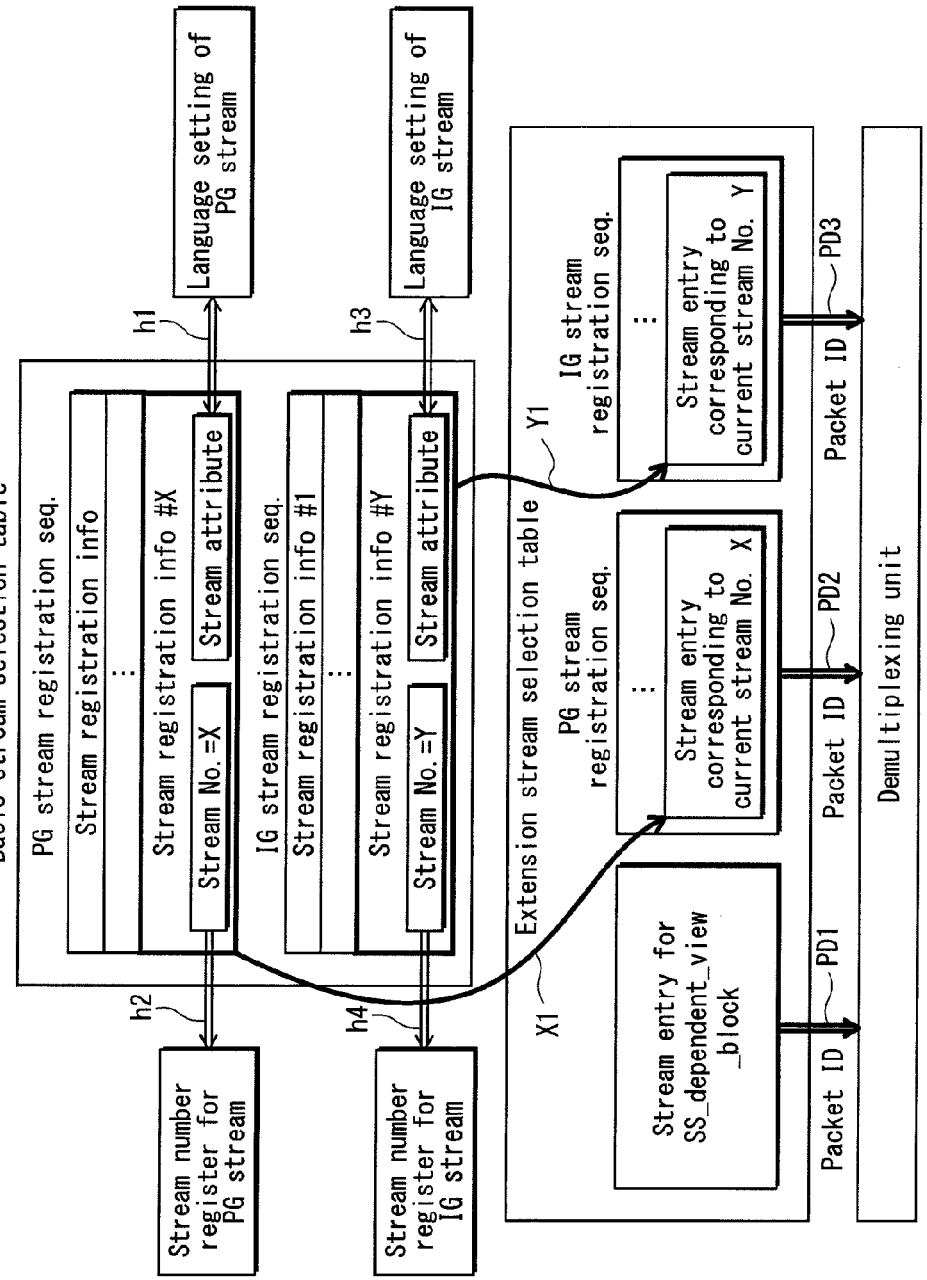
FIG. 17 shows how the stream registration sequences provided in the basic stream selection table and the extension stream selection table are referenced.

FIG. 17 shows how the stream registration sequences provided in the basic stream selection table and the extension stream selection table are referenced, when the demulplexing shown in FIG. 16 is performed. The middle part of FIG. 17 shows the basic stream selection table and the extension stream selection table.

The portion next to the left-hand side of the basic stream selection table shows the stream number registers storing stream numbers of the current streams in the playback device. The portion next to the right-hand side of the basic stream selection table shows the language settings in the playback device. The portion under the basic stream selection table shows the demultiplexing unit. The arrow h1 schematically indicates that the language setting for the PG stream matches the language attribute in the stream registration information #X of the PG stream in the basic stream selection table. The arrow h2 schematically indicates setting of the stream number "X" into the stream number register of the PG stream.

The arrow h3 schematically indicates that the language setting for the IG stream matches the language attribute in the stream registration information #Y of the IG stream in the basic stream selection table. The arrow h4 schematically indicates setting of the stream number "Y" into the stream number register of the IG stream.

The setting of the stream number shown in FIG. 17 symbolically indicates that the PG streams and IG streams to be subjected to the demultiplexing are determined depending on the results of the stream selection procedure performed onto the basic stream selection table.

The arrow PD1 schematically indicates an output of the packet identifier written in the stream entry in the "SS_dependent_view_block" in the extension stream selection table. This output enables the demultiplexing unit to perform the demultiplexing, and the dependent-view stream is output.

The arrow PD2 schematically indicates an output of the packet identifier corresponding to the stream number "X", among the stream entries of the stream registration information of the PG stream in the in the extension stream selection table. The arrow X1 indicates that the output of the packet identifier indicated by the arrow PD1 is linked with the setting of the current stream number X into the stream number register.

The arrow PD3 schematically indicates an output of the packet identifier corresponding to the stream number "Y", among the stream entries of the stream registration information of the IG stream in the in the extension stream selection table. The arrow Y1 indicates that the output of the packet identifier indicated by the arrow PD3 is linked with the setting of the current stream number Y into the stream number register.

It should be noted here that "being linked" in the above description means that the output of the packet identifier written in the extension stream selection table is linked with the fact that the stream number X or Y, among the stream numbers written in the stream registration sequences of the PG or IG stream in the basic stream selection table, is set in the stream number register as the PG or IG stream number of the current stream.

This output enables the demultiplexing unit to perform the demultiplexing, and the PG or IG stream is output.

FIG. 18 shows the assigning of the stream numbers that change depending on the mode.

The vertical column on the left-hand side of FIG. 18 shows the stream numbers: video stream #1, audio stream #1, audio stream #2, PG stream #1, PG stream #2, IG stream #1, and IG stream #2.

The element streams arranged on the left-hand side of FIG. 18, enclosed by a dotted line, are element streams that are targeted for demultiplexing only in the 2D playback mode.

The element streams arranged on the right-hand side of FIG. 18, enclosed by a dotted line, are element streams that are targeted for demultiplexing only in the 3D playback mode.

The element streams enclosed by the combined dotted lines of the left-hand side and the right-hand side are element streams that are targeted for demultiplexing in both the 2D and the 3D playback modes.

In FIG. 18, the video stream #1 is enclosed by the combined dotted lines of the left-hand side and the right-hand side. This indicates that the video stream #1 is targeted for demultiplexing in both the 2D and the 3D playback modes. It should be noted here that the left-view video stream thereof for the 3D mode is also used as the 2D video stream, and the right-view video stream is played back only in the 3D mode, which is suggested by the fact that it is enclosed by only the dotted line on the right-hand side of FIG. 18.

The audio streams #1 and #2 are both enclosed by the combined dotted lines of the left-hand side and the right-hand side. This indicates that the audio streams #1 and #2 are targeted for the playback in both the 2D and the 3D playback modes.

With regard to the PG streams #1 and #2, the 2D PG stream is enclosed only by the dotted line of the left-hand side, and the base-view PG stream and the dependent-view PG stream are enclosed only by the dotted line of the right-hand side. This indicates that the 2D PG stream is targeted for the playback only in the 2D playback mode, and the base-view PG stream and the dependent-view PG stream are targeted for the playback only in the 3D playback mode. This also applies to the IG streams.

As understood from the above description, regarding the stream type "video stream", the dependent-view video stream is added as a target of playback in the 3D playback mode.

It is also understood that, as the mode changes from the 2D playback mode to the 3D playback mode, the playback target changes from the 2D PG stream to the base-view PG stream and the dependent-view PG stream.

The extension stream selection table can be created by writing a description in an object-oriented compiler language as shown in FIG. 19, and subjecting the description to the compiler.

FIG. 19 shows a syntax for writing the extension stream selection table in an object-oriented compiler language.

The "for" statement whose control variable is "PlayItem_id" forms a loop in which description of the dependent-view stream registration sequence, the PG_text subtitle stream registration sequence, and the IG stream registration sequence is repeated as many times as the number of play-items.

The "for" statement whose control variable is "primary_video_stream_id" defines the dependent-view stream registration sequence, and the dependent-view stream registration sequence is defined by writing "SS_dependent_view_block" that is composed of "stream entry" "stream attribute", and "number_of_offset_sequence", as many times as the number indicated by "Number_of_primary_video_stream_entries".

The "for" statement whose control variable is "PG_textST_stream_id" defines the PG_text subtitle stream registration sequence, and forms a loop in which description of "PGtext_offset_sequence_id_ref" and "is_SS_PG" is repeated as many times as the number indicated by "number_of_PG_textST_stream_number_entries". The "if" statement, included in this loop, whose control variable is "is_SS_PG" defines "stream_entry_for_base_biew( )", "stream_entry_for_dependent_biew( )", and "stream_attribute( )" when the "is_SS_PG" is "1b". With this "if" statement, the "stream_entry_for_base_biew( )", "stream_entry_for_dependent_biew( )", and "stream_attribute( )" are added to the stream registration sequences only when the "is_SS_PG" is "1b". The "stream_entry_for_base_biew( )", "stream_entry_for_dependent biew( )", and "stream attribute( )" are not added to the stream registration sequences when the "is_SS_PG" is "0b".

The "for" statement whose control variable is "IG stream_id" defines the IG stream registration sequence, and forms a loop in which description of "IG_offset_sequence_id_ref", "IG_plane_offset_direction_during_BB_video", "IG_plane_offset_value_during_BB_video", and "is_SS_PG" is repeated as many times as the number indicated by "number_of_IG_stream_entries". The "if" statement, included in this loop, whose control variable is "is_SS_IG" defines "stream_entry_for_base_biew( )", "stream_entry_for_dependent_biew( )", and "stream attribute( )" when the "is_SS_IG" is "1b". With this "if" statement, the "stream_entry_for_base_biew( )", "stream_entry_for_dependent_blew( )", and "stream_attribute( )" are added to the stream registration sequences only when the "is_SS_IG" is "1b". The "stream_entry_for_base_biew ( )", "stream_entry_for_dependent_biew( )", and "stream attribute ( )" are not added to the stream registration sequences when the "is_SS_IG" is "0b".

This completes the description of the recording medium. In the following, the playback device will be described in detail.

Figure 20:
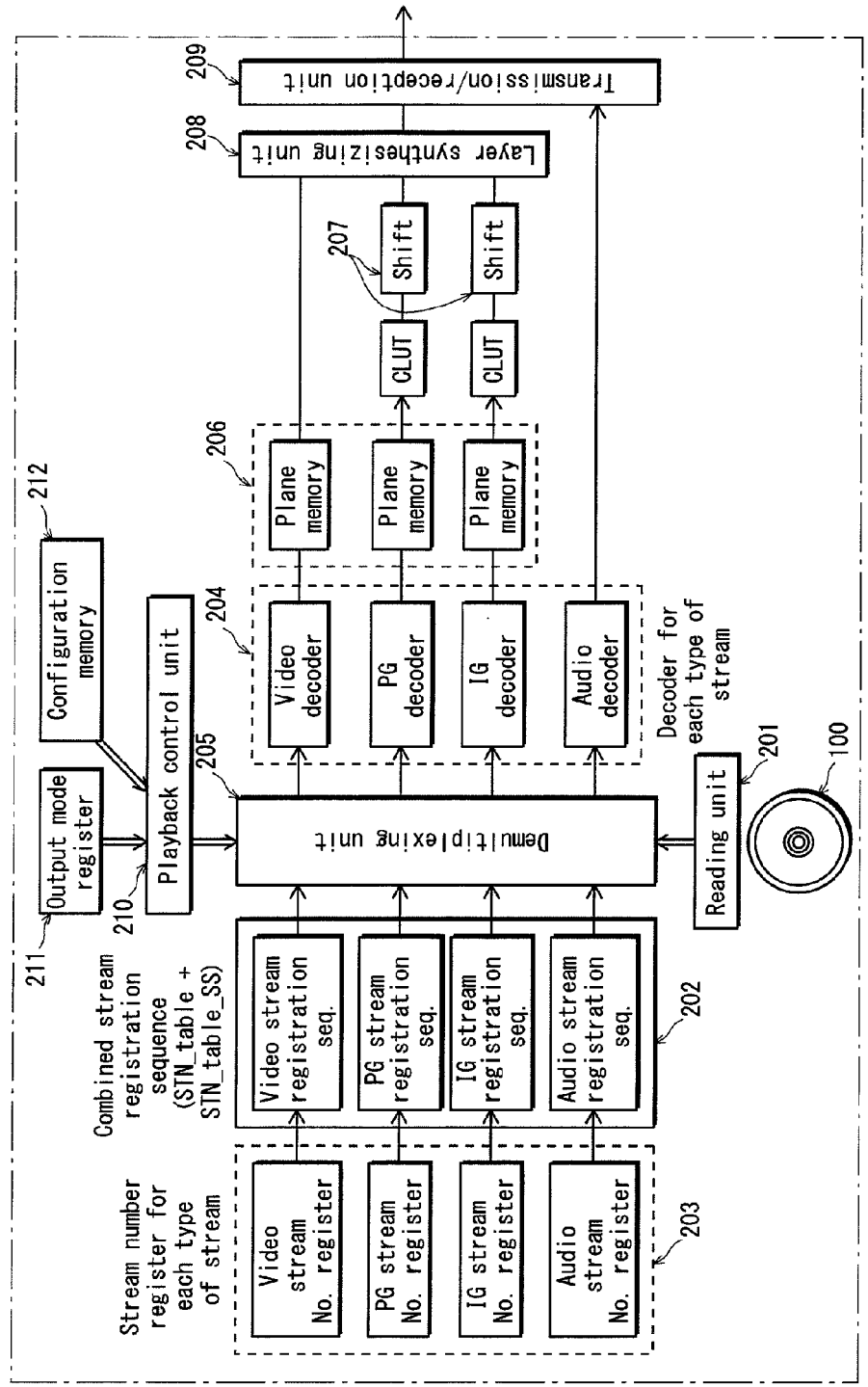
FIG. 20 shows the internal structure of the playback device.

FIG. 20 shows the internal structure of the playback device. As shown in FIG. 20, the playback device includes a reading unit 201, a memory 202, a player number register 203, a decoder 204, a demultiplexing unit 205, a plane memory set 206, a shift unit 207, a layer synthesizing unit 208, a transmission/reception unit 209, a playback control unit 210, an output mode register 211, and a configuration memory 212. The internal structure of FIG. 20 is composed of the minimum structural elements that are required to realize the playback device provided with a problem solving means. A more detailed internal structure will be described in a later embodiment.

The reading unit 201 reads out, from the recording medium, the index table, program file of the operation mode object, playlist information file, stream information file, and stream file.

The memory 202 stores a combined stream registration sequence that is obtained by combining the basic stream selection table and the extension stream selection table.

The player number register 203 includes a video stream number register for storing the stream number of the video stream, a PG stream number register for storing the stream number of the PG stream, an IG stream number register for storing the stream number of the IG stream, and an audio stream number register for storing the stream number of the audio stream.

The decoder 204 for each stream type is composed of a video decoder, a PG decoder, and IG decoder, and an audio decoder.

The demultiplexing unit 205 is provided with a PID filter for performing the packet filtering, and demulplexes, among the TS packets in a plurality of source packets read out from the recording medium, a TS packet that is identified by the packet identifier recited in the combined stream registration sequence.

The plane memory set 206 is composed of a plurality of plane memories. The plane memory stores, in units of lines, one screen of pixel data that is obtained by decoding the elementary streams. The pixel data is output from the plane memory set 206 in accordance with the horizontal and vertical sync signals. Each of the plurality of plane memories stores one screen of pixel data that is obtained as a result of decoding by each of the video decoder, PG decoder, and IG decoder, respectively.

These plane memories constitute a layer model, and the data stored in each plane memory is supplied for synthesizing of the layers. The layer synthesizing is achieved by executing a superimposing process onto all combinations of the two layers in the layer model. In the superimposing process, pixel values of pixel data stored in the plane memories of the two layers are superimposed.

The shift unit 207 shifts the pixel coordinates.

The layer synthesizing unit 208 synthesizes the layers in the plurality of plane memories.

The transmission/reception unit 209 transits to a data transfer phase via a mutual authentication phase and a negotiation phase, when playback device is connected with another device in the home theater system via an interface. The transmission/reception unit 209 performs data transfer in the transfer phase.

In the negotiation phase, the capabilities of the partner device (including the decode capability, playback capability, and display frequency) are grasped, and the capabilities are set in the player setting register, so that the transfer method for the succeeding data transfers is determined. After the mutual authentication phase and the negotiation phase, one line of the pixel data in the non-compression/plaintext format in the picture data after the layer synthesizing is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Further, when the partner device has the decode capability, a pass-through transfer of the video and audio streams is possible. In the pass-through transfer, it is possible to transfer the video stream and audio stream in the compressed/encrypted format, as they are.

The playback control unit 210 controls the reading unit 201 to read out the index table, operation mode object, playlist information, clip information, and stream file from the recording medium, and performs a playback control based on the playlist information and clip information read out from the recording medium. In reading out the stream file, a random access can be performed to read out a source packet corresponding to an arbitrary time point in a time axis, from the stream file.

The output mode register 211 stores a playback mode.

The configuration memory 212 is a nonvolatile memory storing the mode capabilities of the plane memories, and the current mode. The contents to be stored in the configuration memory 212 are set by the producer of the playback device. The mode capability indicates whether or not each of a plurality of plane memories, such as the video plane, PG plane, and IG plane, can perform a corresponding playback mode as described above. Whether a plane memory can perform a playback mode is determined based on the stream type corresponding to the plane memory and based on whether or not the hardware structure for performing the playback mode is provided in the playback device.

The current mode indicates what among the plurality of playback modes the plurality of plane memories are set to, respectively.

This completes the explanation of the playback device. Next, the demultiplexing process performed by the playback device of the present embodiment will be described in detail.

FIGS. 21A and 21B show what packet identifiers are output to the demultiplexing unit by the combined stream registration sequence.

FIG. 21A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and the stream attributes in the three pieces of stream registration information have "English", "Japanese", and "Chinese" as the language attributes, respectively.

The three pieces of stream registration information provided in the extension stream selection table have stream numbers "1", "2", and "3", respectively, and the stream attributes in the three pieces of stream registration information have "English", "Japanese", and "Chinese" as the language attributes, respectively. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 21B shows the setting of a stream number and the outputting of a packet identifier when such a combined stream registration sequence is supplied to playback device in which the language has been set to "Chinese" and the output mode has been set to the 2D playback mode.

The arrows identified by "a1", "a2", and "a3" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "3" in the basic stream selection table is output to the decoder.

FIG. 21C shows the setting of a stream number and the outputting of a packet identifier when such a combined stream registration sequence is supplied to playback device in which the language has been set to "Chinese" and the output mode has been set to the B-D presentation mode.

The arrows identified by "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "3", and it is judged that they match. As a result of this, the stream number "3" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "3" in the extension stream selection table are output to the decoder.

FIGS. 22A through 22C show what packet identifiers are output to the demultiplexing unit by the combined stream registration sequence.

FIG. 22A shows the combined stream registration sequence used in the operation as an example. The combined stream registration sequence is composed of three pieces of stream registration information provided in the basic stream selection table and three pieces of stream registration information provided in the extension stream selection table. The three pieces of stream registration information provided in the basic stream selection table have stream numbers "1", "2", and "3", respectively, and all of the stream attributes in the three pieces of stream registration information have "Chinese" as the language attributes.

The three pieces of stream registration information provided in the extension stream selection table have stream numbers "1", "2", and "3", respectively, and all of the stream attributes in the three pieces of stream registration information have "Chinese" as the language attributes. The stream registration information provided in the basic stream selection table differs in the packet identifier stored in the stream entry, from the stream registration information provided in the extension stream selection table. Also, the stream registration information provided in the extension stream selection table contains (i) a packet identifier for a base-view PG stream for the B-D presentation mode, and (ii) a packet identifier for a dependent-view PG stream.

FIG. 22B shows the setting of a stream number and the outputting of a packet identifier when such a combined stream registration sequence is supplied to playback device in which the language has been set to "Chinese" and the output mode has been set to the 2D playback mode.

The arrows identified by "a1", "a2", and "a3" schematically indicate (i) the judgment on whether language settings match each other, (ii) the setting of a stream number, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a TS packet identified by the packet identifier written in the stream entry of the stream registration information whose stream number is "1" in the basic stream selection table is output to the decoder.

FIG. 22C shows the setting of a stream number and the outputting of a packet identifier when such a combined stream registration sequence is supplied to playback device in which the language has been set to "Chinese" and the output mode has been set to the B-D presentation mode.

The arrows identified by "a4", "a5", and "a6" schematically indicate (i) the judgment on whether language settings match each other, (ii) the setting of a stream number in the stream number register, and (iii) the output of a packet identifier to the demultiplexing unit, respectively.

In the operation procedure of this example, it is judged whether the language setting of the playback device matches the stream attribute contained in the stream registration information whose stream number is "1", and it is judged that they match. As a result of this, the stream number "1" of this stream registration information is written into the stream number register. Also, the packet identifier written in the stream entry of the basic stream selection table is output to the demultiplexing unit. Following this, a pair of TS packets identified by a pair of packet identifiers written in the stream entry of the stream registration information whose stream number is "1" in the extension stream selection table are output to the decoder.

Figure 23:
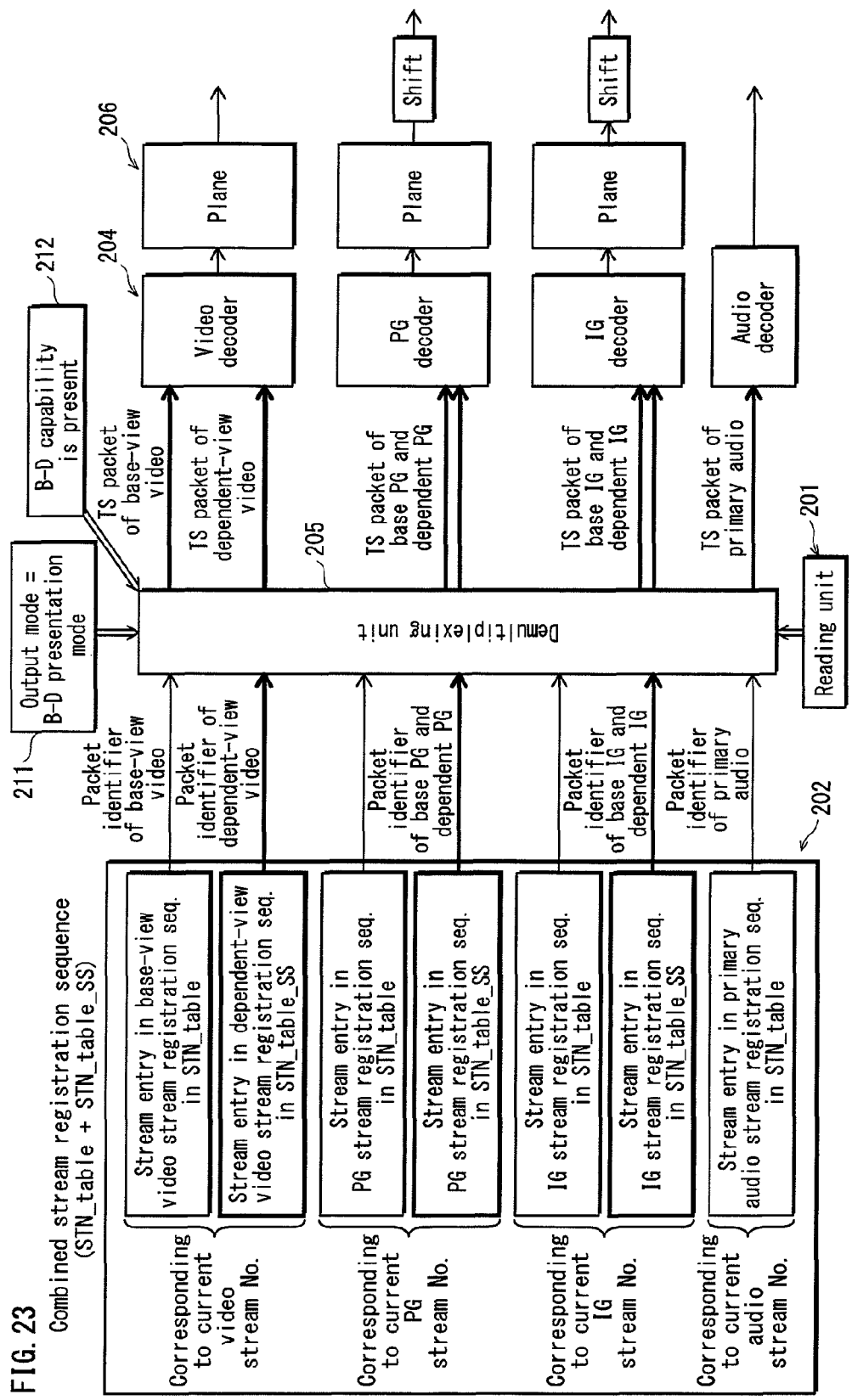
FIG. 23 shows referencing of the packet identifiers and outputting of the packets when the playback device is set to the B-D presentation mode and the playback device has the B-D capability.

FIG. 23 shows referencing of the packet identifiers and outputting of the packets when the playback device is set to the B-D presentation mode and the playback device has the B-D capability.

The arrows connecting the combined stream registration sequence and the demultiplexing unit indicate the stream entries in which the packet identifiers currently referenced are written, among a plurality of stream registration sequences in the combined stream registration sequence. FIG. 23 indicates that the demultiplexing unit is referencing (i) a packet identifier written in a stream entry in the base-view video stream registration sequence in the basic stream selection table, (ii) a packet identifier written in a stream entry in the dependent-view stream registration sequence in the extension stream selection table, (iii) a packet identifier written in a stream entry in the PG_text subtitle stream registration sequence in the extension stream selection table, and (iv) a packet identifier written in a stream entry in the IG stream registration sequence in the extension stream selection table.

The arrows connecting the demultiplexing unit and a plurality of decoders indicate the TS packets that are output to the respective decoders, among a plurality of source packets existing in the interleaved stream file. As shown in FIG. 23, the following TS packets are output from the demultiplexing unit to the decoders: a TS packet constituting the base-view video stream; a TS packet constituting the dependent-view video stream; a TS packet constituting the base-view PG stream; a TS packet constituting the dependent-view PG stream; a TS packet constituting the base-view IG stream; and a TS packet constituting the dependent-view IG stream.

Figure 24:
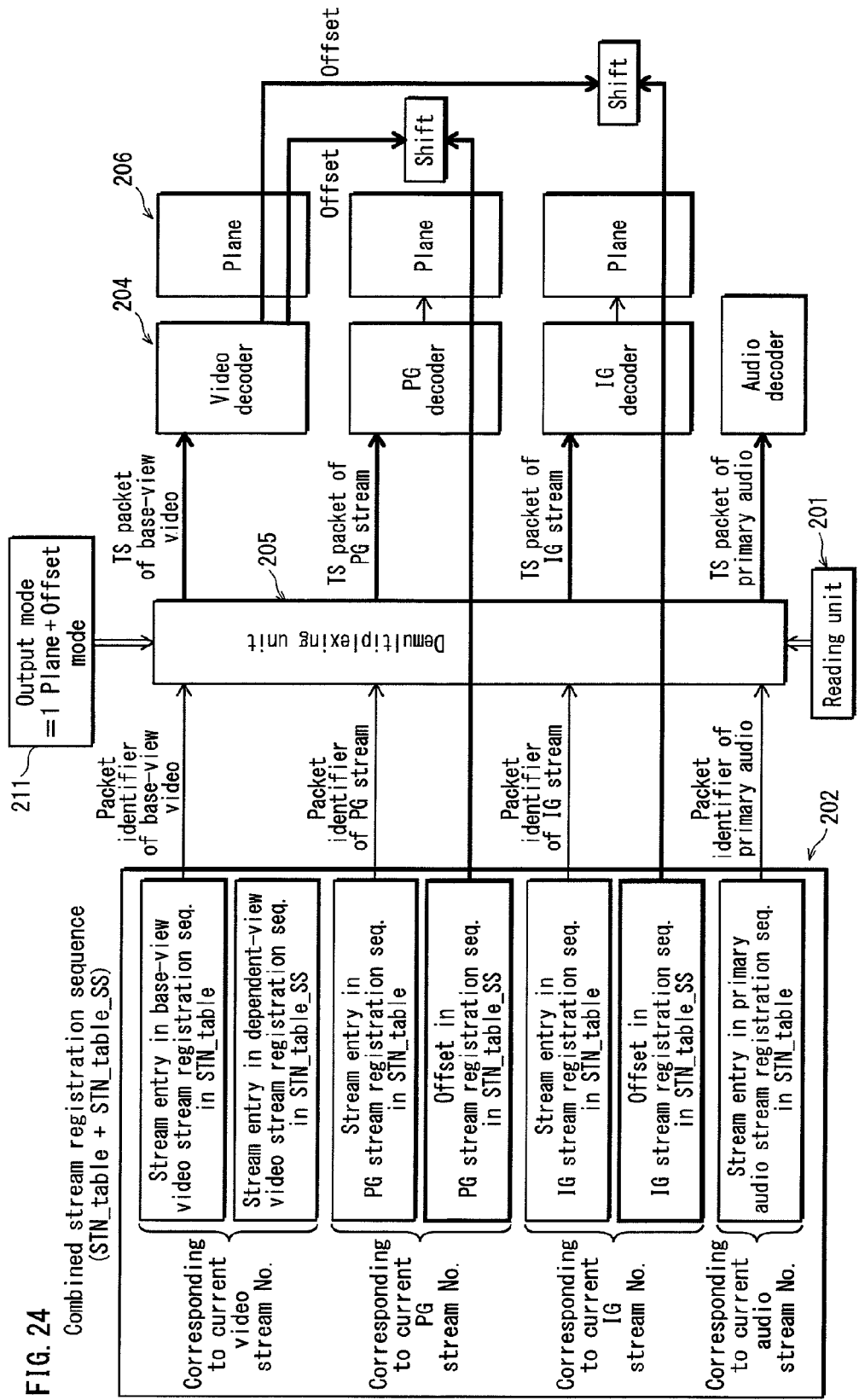
FIG. 24 shows referencing of the packet identifiers and outputting of the packets when the playback device is set to the "1 plane+offset" mode.

FIG. 24 shows referencing of the packet identifiers and outputting of the packets when the playback device is set to the "1 plane+offset" mode.

The arrows connecting the combined stream registration sequence and the shift units indicate the referencing in the "1 plane+offset" mode of (i) an offset of a stream registration sequence corresponding to the PG stream in the extension stream selection table, and (ii) an offset of a stream registration sequence corresponding to the IG stream in the extension stream selection table.

The arrows connecting the demultiplexing unit and a plurality of decoders indicate the TS packets that are output to the respective decoders, among a plurality of source packets existing in the stream file. As shown in FIG. 24, the following TS packets are output from the demultiplexing unit to the decoders: a TS packet constituting the base-view video stream; a TS packet constituting the PG stream; a TS packet constituting the IG stream; and a TS packet constituting the audio stream.

The arrows connecting the video decoder and the shift units indicate that the offset in the dependent-view video stream is supplied to the shift unit for the PG stream and to the shift unit for the IG stream, based on the above-described offset referencing.

Figure 25:
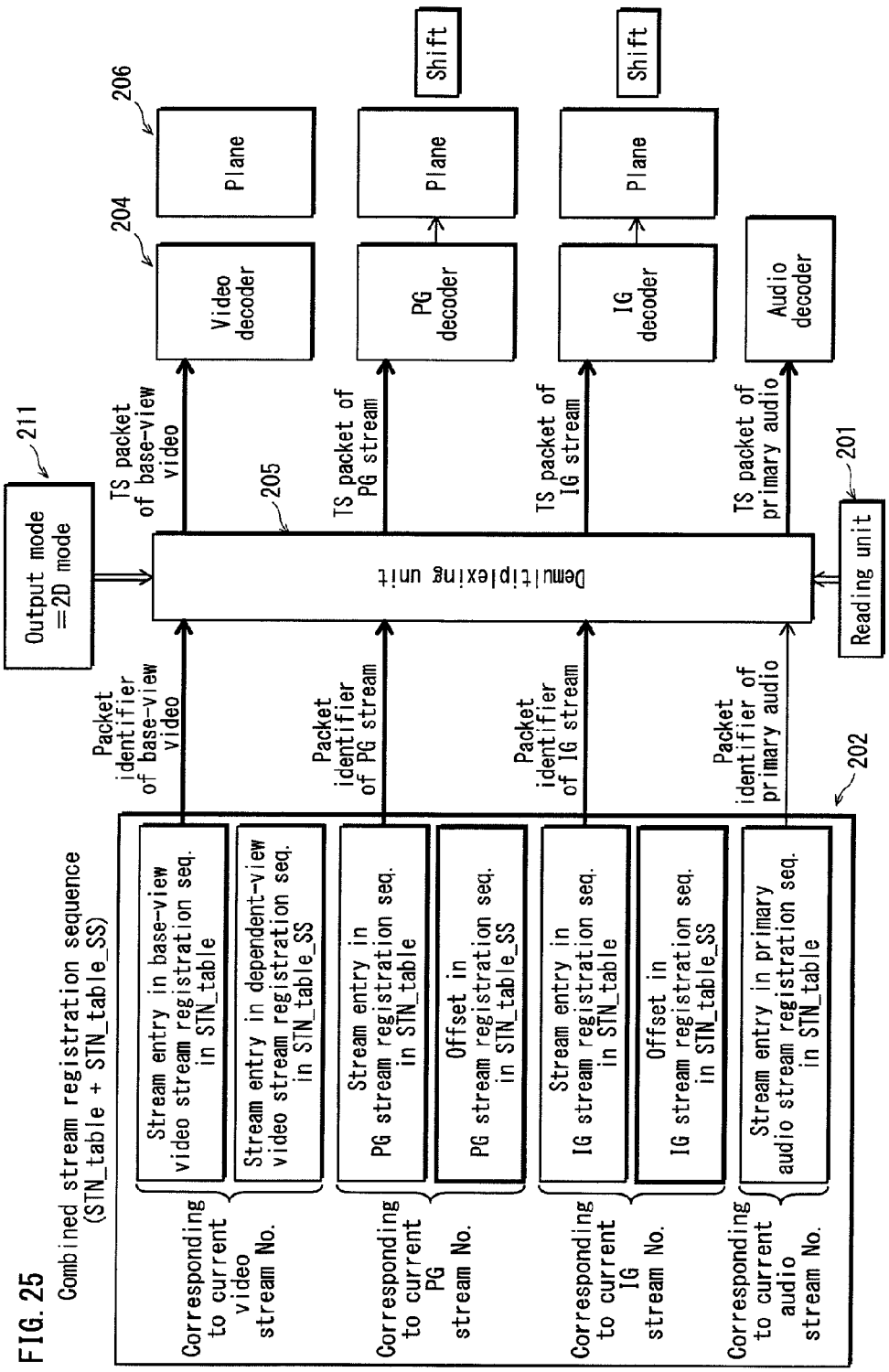
FIG. 25 shows referencing of the packet identifiers and outputting of the packets when the playback device is set to the 2D presentation mode.

FIG. 25 shows referencing of the packet identifiers and outputting of the packets when the playback device is set to the 2D presentation mode.

The arrows connecting the combined stream registration sequence and the demultiplexing unit indicate the stream entries in which the packet identifiers currently referenced are written, among a plurality of stream registration sequences in the combined stream registration sequence. FIG. 25 indicates that the demultiplexing unit is referencing (i) a packet identifier written in a stream entry in the base-view video stream registration sequence in the basic stream selection table, (ii) a packet identifier written in a stream entry in the PG_text subtitle stream registration sequence in the basic stream selection table, and (iii) a packet identifier written in a stream entry in the IG stream registration sequence in the basic stream selection table.

The arrows connecting the demultiplexing unit and a plurality of decoders indicate the TS packets that are output to the respective decoders, among a plurality of source packets existing in the stream file. As shown in FIG. 25, the following TS packets are output from the demultiplexing unit to the decoders: a TS packet constituting the base-view video stream; a TS packet constituting the PG stream; a TS packet constituting the IG stream; and a TS packet constituting the audio stream.

Figure 26:
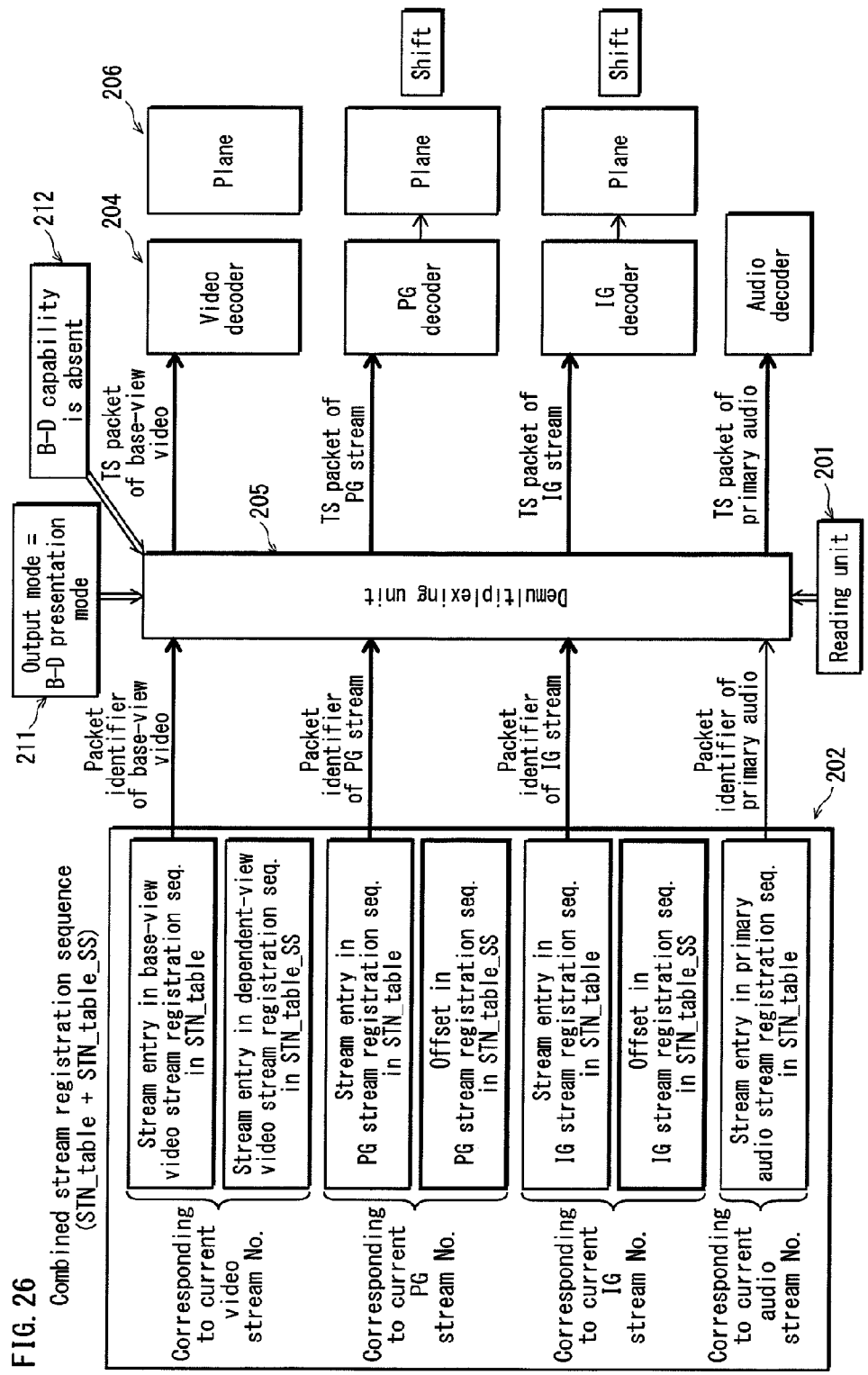
FIG. 26 shows referencing of the packet identifiers and outputting of the packets when the playback device does not have the capability for the B-D presentation mode.

FIG. 26 shows referencing of the packet identifiers and outputting of the packets when the playback device does not have the capability for the B-D presentation mode.

The arrows connecting the combined stream registration sequence and the demultiplexing unit indicate the stream entries in which the packet identifiers currently referenced are written, among a plurality of stream registration sequences in the combined stream registration sequence. FIG. 26 indicates that the demultiplexing unit is referencing (i) a packet identifier written in a stream entry in the base-view video stream registration sequence in the basic stream selection table, (ii) a packet identifier written in a stream entry in the PG_text subtitle stream registration sequence in the basic stream selection table, and (iii) a packet identifier written in a stream entry in the IG stream registration sequence in the basic stream selection table.

The arrows connecting the demultiplexing unit and a plurality of decoders indicate the TS packets that are specified by the stream entries in the stream registration sequences in the basic stream selection table and are output to the respective decoders, among a plurality of source packets existing in the interleaved stream file.

Figure 27:
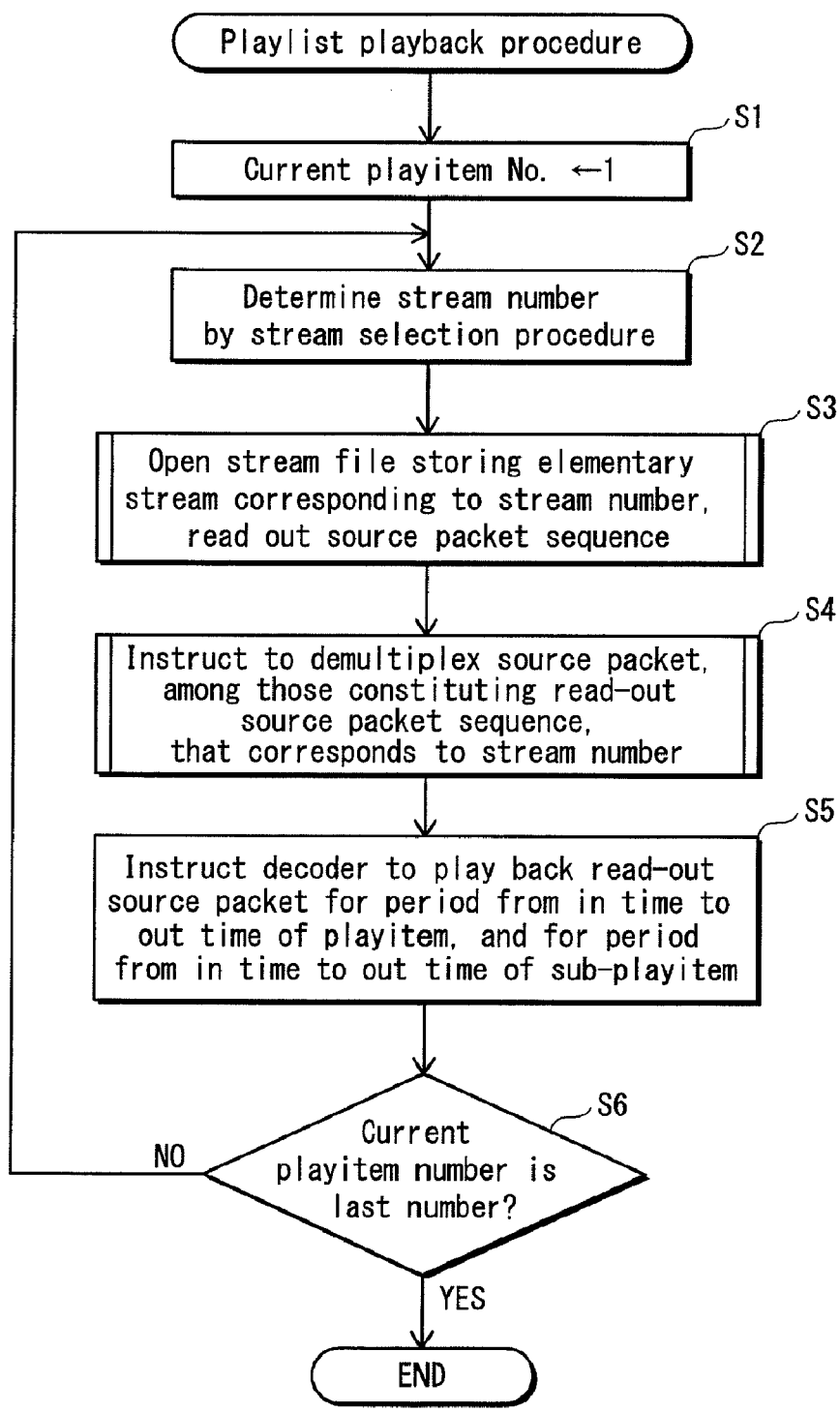
FIG. 27 shows the playlist playback procedure.
Figure 28:
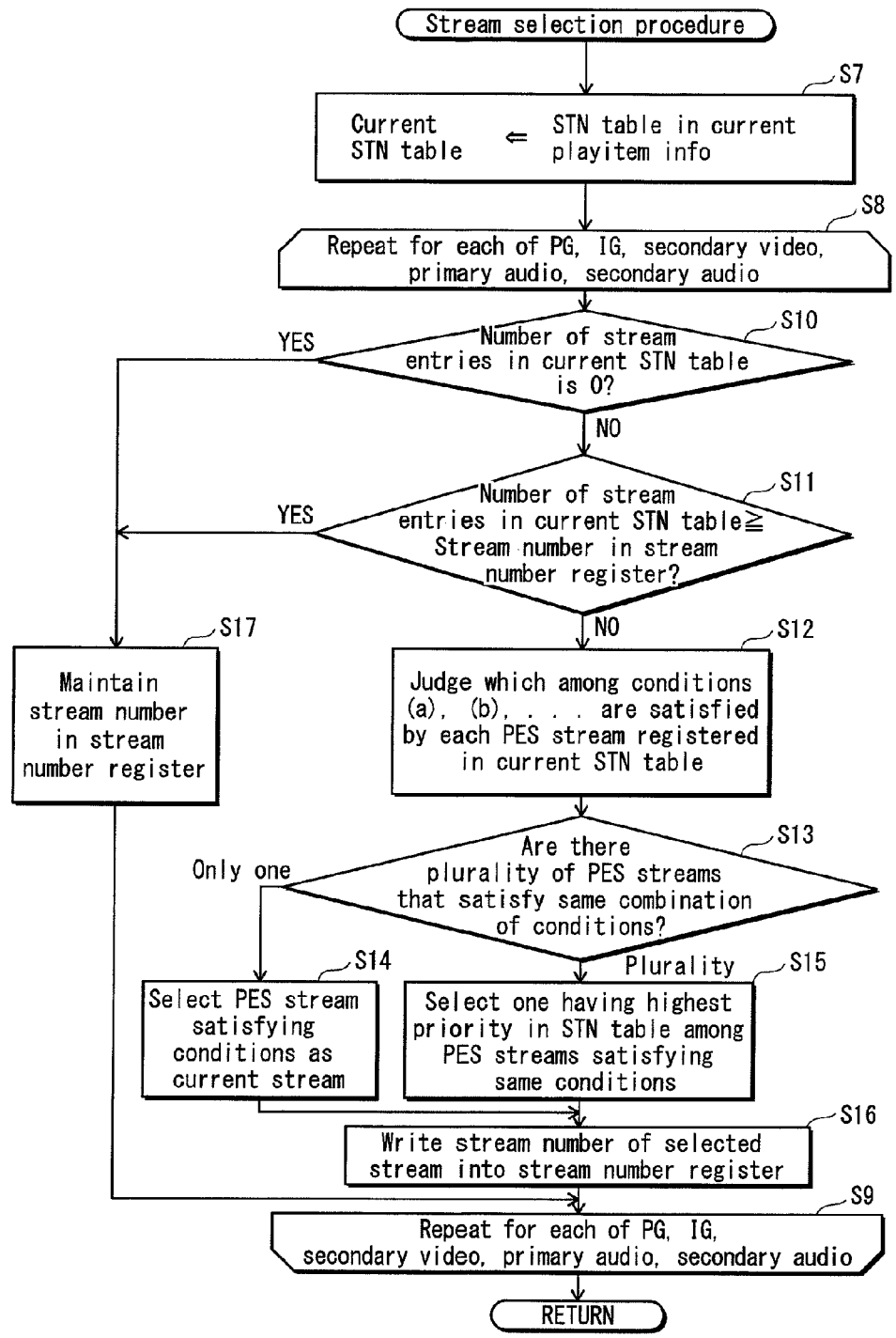
FIG. 28 shows the stream selection procedure.
Figure 29:
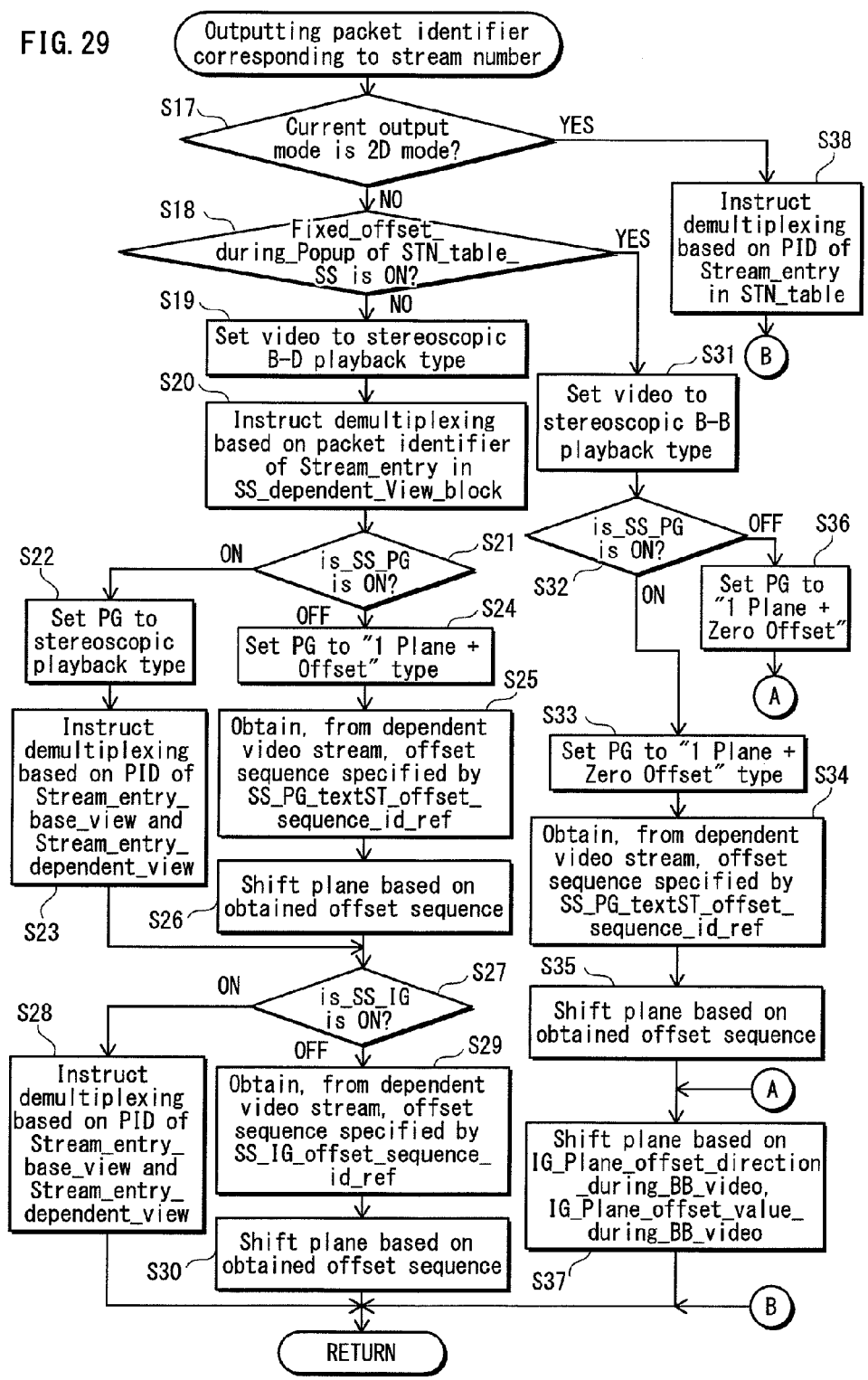
FIG. 29 shows the procedure of outputting the packet identifier corresponding to the stream number.

The playback control having been described up to now can be realized by causing a computer to execute a program which is generated by writing the processing procedure represented by the flowcharts of FIGS. 27 through 29 in an object-oriented compiler language.

FIG. 27 shows the playlist playback procedure. In this flowchart, the current playitem number is set to "1" in step S1, and then the control enters a loop in which the steps S2 to S6 are repeated. In this loop, the steps are performed as follows. The stream number is determined by the stream selection procedure (step S2). A stream file storing an elementary stream corresponding to the stream number is opened, and the source packet sequence is readout therefrom (step S3). It is instructed that a source packet, among those constituting the source packet sequence, that corresponds to the stream number should be demultiplexed (step S4). The decoder is instructed to play back the read-out source packet for the period from the in-time to the out-time of the playitem, and for the period from the in-time to the out-time of the sub-playitem (step S5). These steps constituting the loop are repeated until the current playitem number becomes the last number. When it is judged that the current playitem number is not the last number (NO in step S6), the current playitem number is incremented, and the control moves to step S2. When it is judged that the current playitem number is the last number (YES in step S6), the process ends.

FIG. 28 shows the stream selection procedure.

In this flowchart, the basic stream selection table in the current playitem information is set as the current basic stream selection table (step S7). This step is followed by a loop constituted from steps S8 through S17. In this loop, steps S10 through S17 are repeated for each of the PG stream, IG stream, secondary video stream, primary audio stream, and secondary audio stream. In step S10, it is judged whether or not the number of stream entries in the current basic stream selection table corresponding to stream x is 0. In step S11, it is judged whether or not the number of stream entries in the current basic stream selection table corresponding to stream x is equal to or larger than the stream number stored in the stream number register.

When it is judged YES in step S10 or S11, the control goes to step S17 in which the stream number stored in the stream number register is maintained.

When it is judged NO in both steps S10 and S11, the control goes to step S12 in which it is judged which among a plurality of conditions are satisfied by each PES stream registered in the current basic stream selection table, and then in step S13, it is judged whether there are a plurality of PES streams that satisfy a same combination of conditions.

When it is judged in step S13 that there is only one PES stream that satisfies the conditions, the PES stream satisfying the conditions is selected as the current stream (step S14).

When it is judged in step S13 that there are a plurality of PES streams that satisfy a same combination of conditions, a PES stream having the highest priority in the current basic stream selection table is selected from among the plurality of PES streams that satisfy a same combination of conditions (step S15). After the PES stream is selected in this way, the stream number of the selected PES stream is written into the stream number register (step S16).

After the PES stream to be played back in the current playitem is determined as described above, the playback of the current playitem needs to be started. The procedure for playing back the current playitem is based on the output mode that is determined in the "Procedure when playback condition is changed". FIG. 29 shows the procedure for outputting the packet identifier corresponding to the stream number. In this procedure, the judgment steps S17 and S18 are performed. In step S17, it is judged whether or not the current output mode is the 2D playback mode. When it is judged in step S17 that the current output mode is the 2D playback mode, the control goes to step S38 in which the demultiplexing unit is instructed to perform demultiplexing based on the stream entry of the stream registration information corresponding to the current stream number, among the stream registration sequence in the basic stream selection table.

In step S18, it is judged whether or not the fixed offset_during_Popup of the extension stream selection table is ON. When it is judged NO in step S17, and NO in step S18, the steps S19 through S30 are executed.

In the steps S19 through S30, the video stream is set to the stereoscopic B-D type, and the video plane is set to the B-D presentation mode (step S19), the demultiplexing based on the packet identifier of Stream entry in SS_dependent_View_block is instructed (step S20), and the process of steps S21 through S26 is executed.

In step S21, it is judged whether or not is_SS_PG in the stream registration information of the current PG stream is ON. When is_SS_PG is ON, the PG stream is set to the to stereoscopic playback type (step S22), and the demultiplexing based on the packet identifier of Stream_entry_base_view and Stream_entry_dependent_view of the stream registration information corresponding to the current PG stream is instructed (step S23).

When is_SS_PG is OFF, the PG stream is set to the "1 Plane+Offset" playback type, the PG stream is set to the "1 Plane+Offset" mode (step S24), and the offset sequence specified by SS_PGtextST_offset_sequence_id_ref of the stream registration information corresponding to the current PG stream is obtained from the dependent-view video stream (step S25), and the plane shift is executed based on the obtained offset sequence (step S26).

In step S27, it is judged whether or not is_SS_IG in the stream registration information of the current IG stream is ON. When is_SS_IG is ON, the demultiplexing based on the packet identifier of Stream_entry_base_view and Stream_entry_dependent_view of the stream registration information corresponding to the current IG stream is instructed (step S28).

When is_SS_IG is OFF, the offset sequence specified by SS_IG_textST_offset_sequence_id_ref of the stream registration information corresponding to the current IG stream is obtained from the dependent-view video stream (step S29), and the plane shift is executed based on the obtained offset sequence (step S30).

When Fixed_offset_during_Popup of the extension stream selection table is ON, the judgment in step S17 results in NO, the judgment in step S18 results in YES, and steps S31 through S37 are executed.

In steps S31 through S37, the video stream is set to the stereoscopic B-B playback type, the video plane is set to the B-B presentation mode (step S31), and steps S32 through S37 are executed.

In step S32, it is judged whether is_SS_PG in the stream registration information of the current PG stream is ON. When is_SS_PG is ON, the control proceeds to step S33 in which the PG stream is set to "1 Plane+Offset" mode type, and the PG plane is set to "1 Plane+Offset" mode. Then, the offset sequence specified by SS_PGtextST_offset_sequence_id_ref is obtained from the dependent-view video stream (step S34), and the plane shift is performed based on the obtained offset sequence (step S35). After this, the control proceeds to step S37.

When is_SS_PG is OFF, the control proceeds to step S36 in which the PG stream is set to "1 Plane+Zero Offset" mode type, and the PG plane is set to "1 Plane+Zero Offset" mode. After this, the control proceeds to step S37.

In step S37, the plane shift is performed in the direction indicated by IG_Plane_offset_direction_during_BB_video in the stream registration information of the current IG stream, by the amount indicated by IG_Plane_offset_value_during_BB_video. With the above-described process, when Fixed_offset_during_Popup is ON, a stereoscopic image, which is generated by superimposing a three-dimensional subtitle or menu on a monoscopic video image, can be played back.

As described above, according to the present embodiment, when the playback mode is switched from the 2D playback mode to the 3D playback mode, stream entry makes it possible to select a stream to be demultiplexed, when a stream registration sequence for the stream is present in the extension stream selection table and the stream is identified by the stream number stored in the stream number register.

When the playback mode is switched from the 2D playback mode to the 3D playback mode, it is possible to change the stream to be demultiplexed, while keeping the stream number stored in the stream number register as it is. With this structure, there is no need for the stream selection procedure to be executed even if the mode is switched. Since the stream selection procedure does not need be performed when the mode is switched, the ESs having the same language attribute can be specified as the playback targets before and after the mode switching.

Embodiment 2

In Embodiment 1, sub-TSs constituting the dependent-view data blocks are referenced from the sub-clip entry ID reference. Due to this structure, when the sub-TSs are recorded separately from the main TSs, the sub-TSs are read out when the playback mode is switched from the 2D playback mode to the 3D playback mode. This might impair the seamlessness of the AV playback. As one improvement with respect to this problem, the present embodiment proposes a structure that ensures the main TSs and the sub-TSs to be read together into the playback device. More specifically, a main TS and a sub-TS are interleaved as a pair and recorded as one file.

Here, as a premise of the present embodiment, files in the UDF file system will be explained briefly. The UDF file is composed of a plurality of Extents managed by the file entry. The "file entry" includes a "descriptor tag", an "ICB tag", and an "allocation descriptor".

The "descriptor tag" is a tag identifying, as a "file entry", the file entry which includes the descriptor tag itself. The descriptor tag is classified into a file entry descriptor tag, a space bit map descriptor tag, and so on. In the case of a file entry descriptor tag, "261", which indicates "file entry" is written therein.

The "ICB tag" indicates attribute information concerning the file entry itself.

The "allocation descriptor" includes a Logical Block Number (LEN) indicating a recording position of an Extent constituting a low-order file under a directory. The allocation descriptor also includes data that indicates the length of the Extent. The high-order two bits of the data that indicates the length of the Extent are set as follows: "00" to indicate an allocated and recorded Extent; "01" to indicate an allocated and not-recorded Extent; and: "11" to indicate an Extent that follows the allocation descriptor. When a low-order file under a directory is divided into a plurality of Extents, the file entry should include a plurality of allocation descriptors in correspondence with the Extents.

It is possible to detect an address of an Extent constituting a stream file by referring to the allocation descriptor in the file entry described above.

The following describes the files in various types that are used in the present embodiment.

<Stereoscopic Interleaved Stream File (FileSS)>

The stereoscopic interleaved stream file (FileSS) is a stream file (2TS-interleaved file) in which two TSs are interleaved, and is identified by a five-digit integer value and an extension (ssif) indicating an interleave-format file for stereoscopic playback. The stereoscopic interleaved stream file is composed of Extent SS [n]. The Extent SS [n] (also referred to as EXTSS [n]) is identified by the index number "n". The index number "n" increments in order starting from the top of the stereoscopic interleaved stream file.

Each Extent SS [n] is composed of a pair of a dependent-view data block and a base-view data block. The dependent-view data block and base-view data block constituting the Extent SS[n] are a target of cross reference by the file 2D, file base, and file dependent. Note that the cross reference means that apiece of data recorded on a recording medium is registered as an Extent of a plurality of files in the file entries thereof. In the present embodiment, the starting addresses and continuation lengths of the dependent-view data block and base-view data block are registered in the file entries of the file 2D, file base, and file dependent.

<File Base (FileBase)>

The file base (FileBase) is a virtual stream file that is presumed to "store" a main TS specified by the Extent start point information in the clip information corresponding to the file 2D. The file base (FileBase) is composed of at least one Extent 1[i] (also referred to as EXT1[i]). The Extent 1[i] is the $i^{th}$ Extent in the file base, where "i" is an index number of the Extent and is incremented starting from "0" at the top of the file base. The file base is a virtual stream file used to treat the stereoscopic interleaved stream file, which is a 2TS-file, as a 1TS-file. The file base is generated in a virtual manner by building its file entry in the memory of the playback device.

In the actual reading, the file base is identified by performing a file open using a file name of the stereoscopic interleaved stream file. More specifically, when the file open using a file name of the stereoscopic interleaved stream file is called, the middleware of the playback device generates, in the memory, a file entry identifying an Extent in the file base, and opens the file base in a virtual manner. The stereoscopic interleaved stream file can be interpreted as "including only one TS", and thus it is possible to read out a 2TS stereoscopic interleaved stream file from the recording medium as a 1TS file base.

When only a base-view data block is to be read out in the B-B presentation mode, only the Extents constituting the file base become the target of the reading. Event if the mode is switched from the B-B presentation mode to the B-D presentation mode, both the dependent-view data block and the base-view data block can be read out by extending the reading range from the Extents constituting the file base to the Extents constituting the stereoscopic interleaved stream file. Thus, with this arrangement, the efficiency of the file reading is not decreased.

<File Dependent (FileDependent)>

The file dependent (FileDependent) is a stream file that is presumed to "store" a sub-TS, and is composed of Extent 2[i] (also referred to as EXT2[i]). The Extent 2[i] is the $i^{th}$ Extent in the file dependent, where "i" is an index number of the Extent and is incremented starting from "0" at the top of the file dependent. The file dependent is a virtual stream file used to treat the stereoscopic interleaved stream file, which is a 2TS-file, as a 1TS-file storing the sub-TS. The file dependent is generated in a virtual manner by building its file entry in the memory of the playback device.

The dependent-view video stream is attached with and accessed with use of a file name that is represented by a number generated by adding "1" to the five-digit integer representing the file name of the stereoscopic interleaved stream file. The recording medium stores a dummy file, and the "number generated by adding 1", namely, the identification number of the dependent-view video stream, is attached to the dummy file. Note that the dummy file is a file that stores no Extent, namely, substantial information, but is attached with only a file name. The dependent-view video stream is treated as being stored in the dummy file.

<File 2D (File2D)>

The file 2D (File2D) is a 1TS stream file storing a main TS that is played back in the 2D playback mode, and is composed of the Extent 2D. The file 2D is identified by a five-digit integer value and an extension (ssif)) indicating an interleave-format file for stereoscopic playback.

The following explains the correspondence between the file 2D/file base and the file dependent. FIG. 30 shows the correspondence between the file 2D/file base and the file dependent.

In FIG. 30, the first row shows a file 2D/file base 00001.m2ts and a file dependent 00002.m2ts. The second row shows Extents that store dependent-view data blocks and base-view data blocks. The third row shows a stereoscopic interleaved stream file 00001.ssif.

The dotted arrows h1, h2, h3, and h4 show the files to which Extents EXT1[i] and EXT2[i] belong, the belongingness being indicated by the allocation identifiers. According to the belongingness guided by the arrows h1 and h2, Extents EXT1 [i] and EXT1[i+1] are registered as Extents of the file base 00001.m2ts.

According to the belongingness guided by the arrows h3 and h4, Extents EXT2[i] and EXT2[i+1] are registered as Extents of the file dependent 00002.m2ts.

According to the belongingness guided by the arrows h5, h6, h7, and h8, Extents EXT1[i], EXT2[i], EXT1[i+1], and EXT2[i+1] are registered as Extents of 00001.ssif. As understood from this, Extents EXT1[i] and EXT1[i+1] have the duality of belonging to 00001.ssif and 00001.m2ts. The extension "ssif" is made of capital letters of StereoScopic Interleave File, indicating that the file is in the interleave format for stereoscopic playback.

FIGS. 31A through 31C show the correspondence between the interleaved stream file and file 2D/file base.

The third row in FIG. 31A shows the internal structure of the interleaved stream file. As shown in FIG. 31A, Extents EXT1[1] and EXT1[2] storing base-view data blocks and EXT2[1] and EXT2[2] storing dependent-view data blocks are arranged alternately in the interleave format in the interleaved stream file.

The first row in FIG. 31A shows the internal structure of the file 2D/file base. The file 2D/file base is composed of only Extents EXT1[1] and EXT1[2] storing base-view data blocks, among the Extents constituting the interleaved stream file shown in the third row. The file 2D/file base and the interleaved stream file have the same name, but different extensions.

The second row in FIG. 31A shows the internal structure of the file dependent. The file dependent is composed of only Extents EXT2[1] and EXT2[2] storing dependent-view data blocks, among the Extents constituting the interleaved stream file shown in the third row. The file name of the file dependent is a value higher by "1" than the file name of the interleaved stream file, and they have different extensions.

Not all playback devices necessarily support the 3D playback system. Therefore, it is preferable that even an optical disc including a 3D image supports a 2D playback. It should be noted here that the playback devices supporting only the 2D playback do not identify the data structure extended for the 3D. The 2D playback devices need to access only the 2D playlists and 2D AV clips by using a conventional identification method provided to the 2D playback devices. In view of this, the left-view video streams are stored in a file format that can be recognized by the 2D playback devices.

According to the first method, the main TS is assigned with the same file name as that in the 2D playback system so that the above-described referencing of playlist information can be realized, that is to say, so that the main TS can be used in the 2D playback as well, and stream files in the interleave format have a different extension. FIG. 31B shows that files "00001.m2ts" and "00001.ssif" are coupled with each other by the same file name "00001", although the former is in the 2D format and the latter is in the 3D format.

In a conventional 2D playback device, the playlist refers to only the AV clips the main TS, and therefore the 2D playback device plays back only the file 2D. On the other hand, in a 3D playback device, although the playlist refers to only the file 2D storing the main TS, when it finds a file that has the same identification number and a different extension, it judges that the file is a stream file in the interleave format for the 3D image, and outputs the main TS and sub-TS.

The second method is to use different folders. The main TSs are stored in folders with conventional folder names (for example, "STREAM"), but sub-TSs are stored in folders with folder names unique to 3D (for example, "SSIF"), with the same file name "00001". In the 2D playback device, the playlist refers to only files in the "STREAM" folder, but in the 3D playback device, the playlist refers to files having the same file name in the "STREAM" and "SSIF" folders simultaneously, making it possible to associate the main TS and the sub-TS.

The third method uses the identification numbers. That is to say, this method associates the files based on a predetermined rule regarding the identification numbers. For example, when the identification number of the file 2D/file base is "00001", the file dependent is assigned with identification number "00002" that is made by adding "1" to the identification number of the file 2D/file base. However, the file system of the recording medium treats the file dependent, which is assigned with a file name according to the rule, as a non-substantial dummy file. This is because the file dependent is, in the actuality, the stereoscopic interleaved stream file. The file names having been associated with each other in this way are written into (i) the stream registration information in the basic stream selection table and (ii) the sub-clip entry ID reference (ref_to_STC_id[0]) in the stream registration information in the extension stream selection table. On the other hand, the playback device recognizes a file name, which is a value higher by "1" than the file name written in the sub-clip entry ID reference, as the file name of the dummy file, and performs the process of opening the file dependent in a virtual manner. This ensures that the stream selection procedure read outs, from the recording medium, the file dependent that is associated with other files in the above-described manner.

This completes the description of the file 2D, file base, and file dependent.

The following explains the data blocks in detail.

<Base-View Data Block>

The base-view data block (B[i]) is the $i^{th}$ data in the main TS. Note that the main TS is a TS specified as the main element of the main path by the clip information file name information of the current playitem information. The "i" in B[i] is an index number that is incremented starting from "0" corresponding to the data block at the top of the file base.

The base-view data blocks fall into those shared by the file base and the file 2D, and those not shared by the file base and the file 2D.

The base-view data blocks shared by the file base and the file 2D and the base-view data blocks unique to the file 2D become the Extents of the file 2D, and they are set to have a length that does not cause a buffer underflow in the playback device. The starting sector address of the base-view data blocks is written in the allocation descriptor in the file entry of the file 2D.

The base-view data blocks unique to the file base, which are not shared by the file 2D, do not become the Extents of the file 2D, and thus they are not set to have a length that does not cause an underflow in a single buffer in the playback device. The base-view data blocks are set to have a smaller size, namely, a length that does not cause an underflow in a double buffer in the playback device.

The starting sector addresses of the base-view data block unique to the file base are not written in the allocation descriptor in the file entry. Instead of this, the starting source pocket in the base-view data block is pointed to by the Extent start point information in the clip information of the clip information file corresponding to the main TS. Therefore, the starting sector address of a base-view data block unique to the file base needs to be obtained by using (i) the allocation descriptor in the file entry of the stereoscopic interleaved stream file and (ii) the Extent start point information in the clip information.

When the base view is the left view, the base-view data block is a block of source packets that store portions of a plurality of types of PES streams for 2D playback and left-view playback, including: source packets that store portions of the left-view video stream; source packets that store portions of the left-view graphics stream; source packets that store portions of the audio stream that are played back together with those streams; and packet management information (PCR, PMT, PAT) defined in the European broadcasting standard. The packets constituting the base-view data block have continuous ATCs, STCs, and SPNs to ensure a seamless AV playback for a predetermined period.

<Dependent-View Data Block>

The dependent-view data block (D[i]) is the $i^{th}$ data in the sub-TS. Note that the sub-TS is a TS specified as the main element of the sub-path by the stream entry in the stream registration sequence in the extension stream selection table corresponding to the current playitem information. The "i" in D[i] is an index number that is incremented starting from "0" corresponding to the data block at the top of the file dependent.

The dependent-view data blocks become the Extents of the file dependent, and are set to have a length that does not cause an underflow in a double buffer in the playback device.

Also, in the continuous areas in the recording medium, a dependent-view data block is disposed before a base-view data block that is played back in the same playback time together the dependent-view data block. For this reason, when the stereoscopic interleaved stream file is read out, the dependent-view data block is read out before the corresponding base-view data block, without fail.

The starting sector addresses of the dependent-view data blocks are not written in the allocation descriptor in the file entry of the file 2D since the dependent-view data blocks are not shared by the file 2D. Instead of this, the starting source pocket in the dependent-view data block is pointed to by the Extent start point information in the clip information. Therefore, the starting sector address of a dependent-view data block needs to be obtained by using (i) the allocation descriptor in the file entry of the file 2D and (ii) the Extent start point information in the clip information.

When the dependent view is the right view, the dependent-view data block is a block of source packets that store portions of a plurality of types of PES streams for right-view playback, including: source packets that store portions of the right-view video stream; source packets that store portions of the right-view graphics stream; and source packets that store portions of the audio stream that are played back together with those streams. The packets constituting the dependent-view data block have continuous ATCs, STCs, and SPNs to ensure a seamless AV playback for a predetermined period. In the continuous dependent-view data blocks and corresponding base-view data blocks, the source packet numbers of the source packets constituting these blocs are continuous, but the ATSs of the source packets constituting these blocs are each the same value. Accordingly, a plurality of source packets constituting the dependent-view data blocks and a plurality of source packets constituting the corresponding base-view data blocks reach the PID filters at the same ATC time.

<Classification of Extent>

As described above, the Extents of the file 2D fall into those shared by the file base, and those not shared by the file base.

Suppose here that the Extents of the file 2D are B[0], B[1], B[2], B[3] 2D, and B[4] 2D, and that the Extents of the file base are B[0], B[1], B[2], B[3]ss, and B[4]ss. Of these, B[0], B[1], and B[2] are base-view data blocks shared by the file base. B[3] 2D and B[4] 2D are base-view data blocks unique to the file 2D, not shared by the file base.

Also, B[3]ss and B[4]ss are base-view data blocks unique to the file base, not shared by the file 2D.

The data of B[3] 2D is bit-for-bit same as data of B[3]ss. The data of B[4] 2D is bit-for-bit same as data of B[4]ss.

The data blocks B[2], B[3] 2D, and B[4] 2D in the file 2D constitute Extents (big Extents) having a large continuation length immediately before a position at which a long jump is caused. In this way, big Extents can be formed immediately before a long jump in the file 2D. Accordingly, even when a stereoscopic interleaved stream file is played back in the 2D playback mode, there is no need to worry an occurrence of an underflow in the read buffer.

The file 2D and the file base have sameness, although being partially different in Extents. Therefore, the file 2D and the file base are generically called "file 2D/file base".

<Long Jump>

In general, when an optical disc is adopted as the recording medium, an operation for suspending a reading operation of the optical pickup, and, during the suspension, positioning the optical pickup onto the next reading-target area is called "jump".

The jump is classified into: a jump that increases or decreases the rotation speed of the optical disc; a track jump; and a locus jump. The track jump is an operation of moving the optical pickup in the radius direction of the disc. The focus jump is available when the optical disc is a multi-layer disc, and is an operation of moving the focus of the optical pickup from one recording layer to another recording layer. These jumps are called "long jumps" since they generally require a long seek time, and a large number of sectors are skipped in reading due to the jumps. During a jump, the reading operation by the optical pickup is suspended.

The length of the portion for which the reading operation is skipped during a jump is called "jump distance". The jump distance is typically represented by the number of sectors included in the portion. The above-mentioned long jump is specifically defined as a jump whose jump distance exceeds a predetermined threshold value. The threshold value is, for example, 40000 sectors in the BD-ROM standard, in accordance with the disc type and the performance concerning the process of reading the drive.

Typical positions at which the long jump is caused include a boundary between recording layers, and a position at which one playitem is connected with n playitems, namely, a multi-connection is performed.

Here, when a one-to-n multi-connection of playitems is performed, the first TS among "n" pieces of TSs constituting "n" pieces of playitems can be disposed at a position immediately after a TS that constitutes the playitem that precedes the "n" playitems. However, any of the second TS and onwards cannot be disposed at the position immediately after the TS that constitutes the playitem preceding the "n" playitems.

When, at a one-to-n multi-connection, a jump is made from the one playitem to any of the second playitem and onwards in the "n" playitems, the reading needs to skip one or more recording areas of TSs. Therefore, a long jump occurs at a position where a one-to-n multi-connection exists.

<Playback Path of Each Mode>

The playback path of the 2D playback mode is composed of Extents of the file 2D referenced by the clip information file name information in the current playitem information.

The playback path of the B-D presentation mode is composed of Extents of the stereoscopic interleaved stream file referenced by the clip information file name information in the current playitem information.

The playback path of the B-B presentation mode is composed of Extents of the file base referenced by the clip information file name information in the current playitem information.

Switching among these playback paths of the three modes can be made by performing a file open using the file name written in the clip information file name information in the current playitem information: as the file name of the file 2D; as the file name of the file base; or as the file name of the stereoscopic interleaved stream file. Such switching among playback paths does not change the current playlist or current playitem, and thus can maintain the seamlessness when the playback mode is changed.

With this structure, the playback device can read out data blocks suited for each playback mode from the recording medium by opening any of the stereoscopic interleaved stream file, file base, and file 2D based on the clip information file name information in the current playitem information.

<Specific Values of EXT2D, EXT1[n], EXT2[n]>

The lowermost value of EXT2D is determined so that, when a playback in the 2D playback mode is performed, a buffer under flow does not occur in the read buffer of the playback device during a jump period from each base-view data block to the next base-view data block.

The lowermost value of EXT2D is represented by the following expression, when it takes $Tjump2D(n)$ of time when a jump from the $n^{th}$ base-view data block to the $(n+1)^{th}$ base-view data block is made, each base-view data block is read out into the read buffer at a speed of $Rud2D$, and the base-view data block is transferred from the read buffer to the video decoder at an average speed of $Rbext2D$.

$$[\text{Lowermost value of EXT2D}] \geq (Rud2D + Rbext2D)/(Rud2D - Rbext2D) \times Tjump2D(n)$$

It is presumed here that an Extent corresponding to a base-view data block B[n]ss is represented as EXT1[n]. In this case, the lowermost value of EXT1[n] is determined so that, when a playback in the B-D presentation mode is performed, a buffer under flow does not occur in the double buffer during a jump period from each base-view data block to the next dependent-view data block, and during a jump period from said dependent-view data block to the next base-view data block.

In the present example, the double buffer is composed of a read buffer 1 and a read buffer 2. The read buffer 1 is the same as the read buffer provided in the 2D playback device.

It is presumed here that, when a playback in the B-D presentation mode is performed, it takes Tfjump3D(n) of time when a jump from the $n^{th}$ base-view data block to the dependent-view data block is made, and it takes TBjump3D(n) of time when a jump from the $p^{th}$ dependent-view data block to the $(n+1)^{th}$ base-view data block is made, and It is further presumed that, each base-view data block is read out into the read buffer 1 at a speed of Rud3D, each dependent-view data block is read out into the read buffer 2 at the speed of Rud3D, and the base-view data block is transferred from the read buffer 1 to the video decoder at an average speed of Rbext3D. Then the lowermost value of EXT1[n] is represented by the following expression. The continuation length of the big Extents is set to a value that is equal to or higher than the lowermost value.

[Lowermost value of EXT1$[n]] \geq (Rud3D \times Rbext3D)/$
$(Rud3D-Rbext3D) \times (TFjump3D(n)+EXT2[n]/$
$(Rud3D+TBjump3D(n)))$ The lowermost value of EXT2 is determined so that, when a playback in the B-D presentation mode is performed, a buffer under flow does not occur in the double buffer of the playback device during a jump period from each dependent-view Extent to the next base-view data Extent, and during a jump period from said base-view Extent to the next dependent-view Extent.

The lowermost value of EXT2[n] is represented by the following expression, when it takes Tfjump3D(n+1) of time when a jump from the $(n+1)^{th}$ base-view data block to the $(p+1)^{th}$ dependent-view data block is made, and the dependent-view data block is transferred from the read buffer 2 to the decoder at an average speed of Rdext3D.

[Lowermost value of EXT2$[n]] \geq (Rud3D+Rbext3D)/$
$(Rud3D-Rdext3D) \times (TBjump3D(n)+EXT2[n+1]/$
$(Rud3D+TFjump3D(n+1)))$ EXTSS is composed of Extents of the base-view video stream and Extents of the dependent-view video stream. Thus, the lowermost value of EXTSS is represented by the following expression.

[Lowermost Value of EXTSS $\geq$ EXT1$[n]$+EXT2$[n]$]

FIG. 32 shows correspondence among the stereoscopic interleaved stream file, file 2D, file base, and file dependent. The first row in FIG. 32 shows the file 2D, the second row shows data blocks recorded on the recording medium, the third row shows the stereoscopic interleaved stream file, the fourth row shows the file base, and the shows the file dependent.

The data blocks shown in the second row are D[1], B[1], D[2], B[2], D[3], B[3]ss, D[4], B[4]ss, B[3] 2D, and B[4] 2D. The arrows ex1, ex2, ex3, and ex4 show the belongingness in which, among these data blocks, data blocks B[1], B[2], B[3] 2D, and B[4] 2D constitute the Extents of the file 2D.

The arrows ex5 and ex6 show the belongingness in which D[1], B[1], D[2], B[2], D[3], B[3]ss, D[4], and B[4]ss constitute the Extents of the stereoscopic interleaved stream file.

The fourth row shows that, among these data blocks constituting the stereoscopic interleaved stream file, B[1], B[2], B[3]ss, and B[4]ss constitute the Extents of the file base. The fifth row shows that, among the data blocks constituting the stereoscopic interleaved stream file, D[1], D[2], D[3], and D[4] constitute the Extents of the file dependent.

Figure 33:
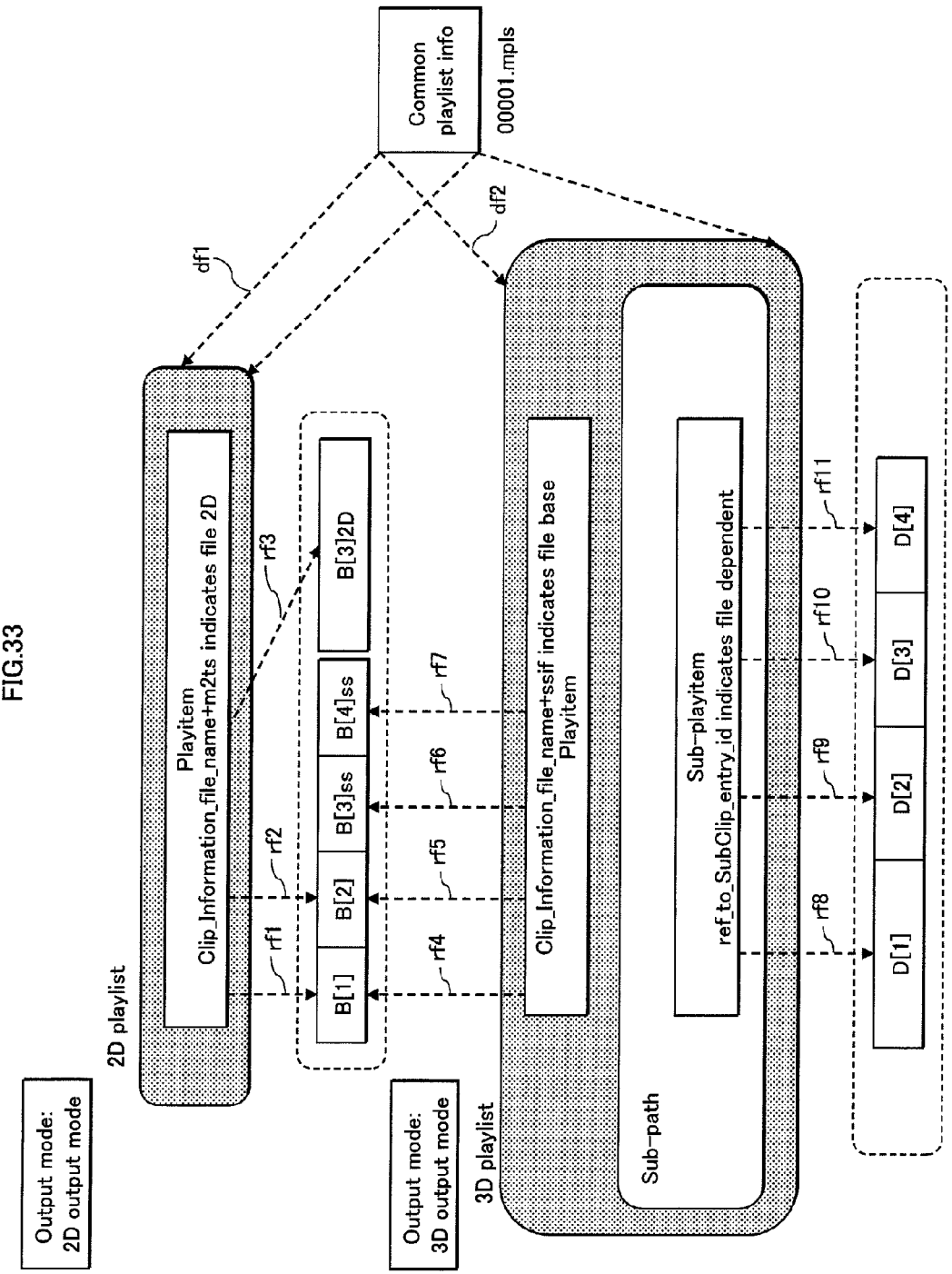
FIG. 33 shows the 2D playlist and 3D playlist.

FIG. 33 shows the 2D playlist and 3D playlist. The first row shows the 2D playlist information. The second row shows the base-view data blocks. The third row shows the 3D playlist. The fourth row shows the dependent-view data blocks.

The arrows rf1, rf2, and rf3 show a playback path generated by combining the extension "m2ts" and a file name "00001" described in "clip_information_file_name" in the playitem information of the 2D playlist information. In this case, the playback path on the base-view side is constituted from data blocks B[1], B[2], and B[3] 2D.

The arrows rf4, rf5, rf6, and rf7 show a playback path specified by the playitem information of the 3D playlist information. In this example, the playback path on the base-view side is constituted from data blocks B[1], B[2], B[3]ss, and B[4]ss.

The arrows rf8, rf9, rf10, and rf11 show a playback path specified by the sub-playitem information of the 3D playlist information. In this example, the playback path on the dependent-view side is constituted from data blocks D[1], D[2], D[3], and D[4]. These data blocks constituting the playback paths specified by the playitem information and the sub-playitem information can be read out by opening files that are generated by combining the extension "ssif" and file names written in "clip_information_file_name" in the playitem information.

As shown in FIG. 33, the clip information file name information in the 3D playlist and the clip information file name information in the 2D playlist have file names in common. Accordingly, the playlist information can be written to include description that is common to the 3D playlist and the 2D playlist (see as signs df1 and df2 indicate) so as to define the 3D playlist and the 2D playlist. Accordingly, once playlist information for realizing the 3D playlist is written: the playlist information functions as the 3D playlist when the output mode of the playback device is the stereoscopic output mode; and the playlist information functions as the 2D playlist when the output mode of the playback device is the 2Doutput mode. The 2D playlist and the 3D playlist shown in FIG. 33 have in common a piece of playlist information, which is interpreted as the 2D playlist or the 3D playlist depending on the output mode of the playback device that interprets the piece of playlist information. This reduces the time and efforts of a person in charge of authoring.

When main TSs and sub-TSs are stored in the stereoscopic interleaved stream file, a file name of the file 2D is written in "clip_information_file_name" in the playitem information of the 2D playlist, and a file name of the file base is written in "clip_information_file_name" in the playitem information of the 3D playlist. Since the file base is a virtual file and its file name is the same as that of the stereoscopic interleaved stream file, the file name of the stereoscopic interleaved stream file can be written in "clip_information filename" in the playitem information. A file name of the file dependent is written in "ref_to_subclip_entry_id" in the stream registration information in the extension stream selection table. The file name of the file dependent is created by adding "1" to the identification number of the stereoscopic interleaved stream file.

Figure 34:
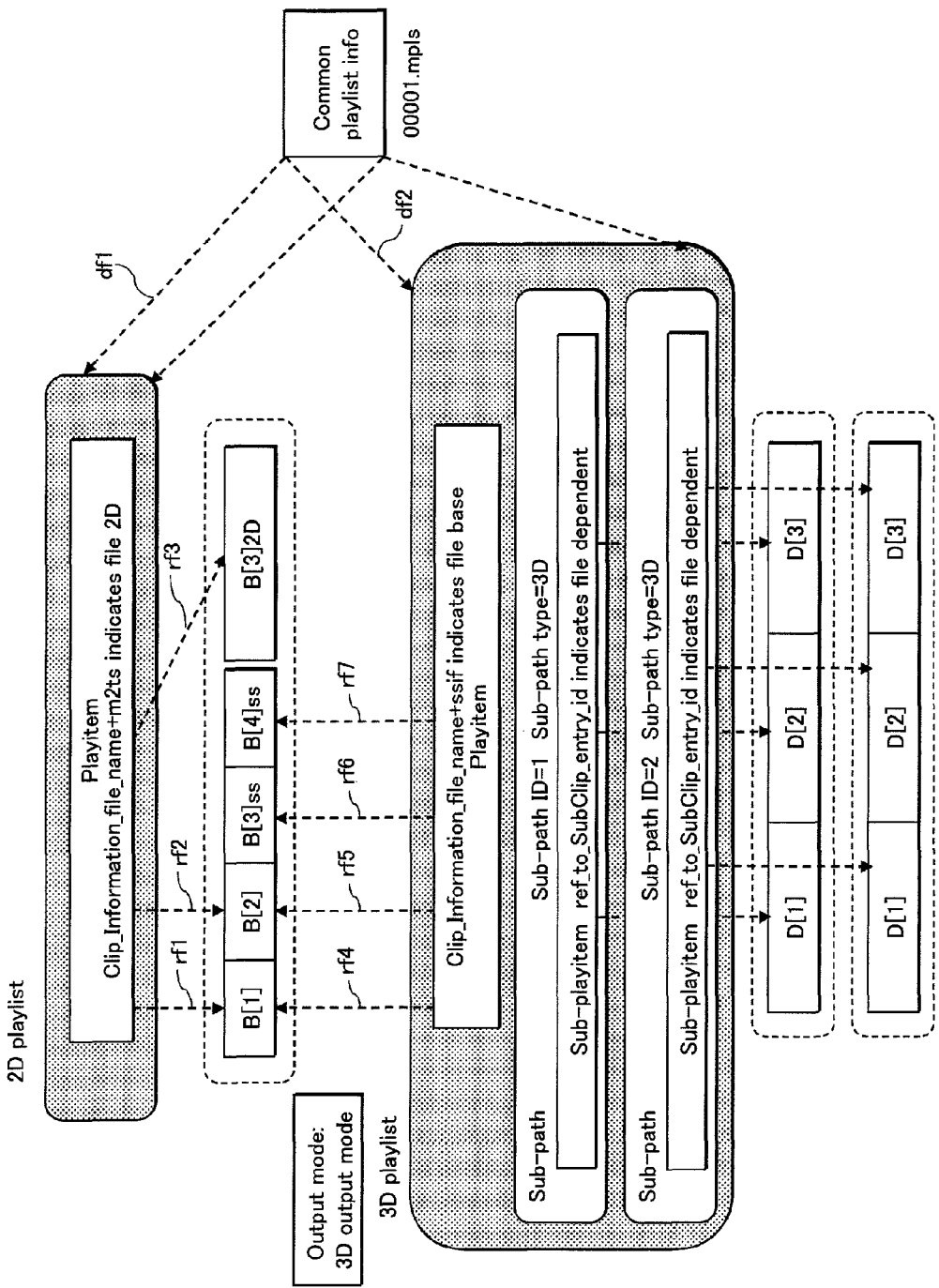
FIG. 34 shows a playlist generated by adding a sub-path to the 3D playlist.

FIG. 34 shows a playlist generated by adding a sub-path to the 3D playlist shown in FIG. 33. The playlist shown in FIG. 33 includes only a sub-path whose sub-path ID is "1", while the second sub-path in the playlist shown in FIG. 34 is identified by sub-path ID "2", and refers to data blocks different from those referred to by the sub-path 1. The two or more pieces of sub-path information define a plurality of right views which are of different angles at which the object is viewed by the right eye. As many data blocks as the angles constitute the right-view. Also, as many sub-paths as the angles are provided.

It is possible to display comfortable stereoscopic images based on parallax to the user by changing sub-paths to be played back in synchronization with main paths defined by the main TS constituted from the base-view data blocks.

With respect to this playlist information realizing the 3D playlist, the playlist information functions as the 3D playlist when the output mode of the playback device is the stereoscopic output mode, and the playlist information functions as the 2D playlist when the output mode of the playback device is the 2Doutput mode. The 2D playlist and the 3D playlist shown in FIG. 34 have in common a piece of playlist information, which is interpreted as the 2D playlist or the 3D playlist appropriately depending on the output mode of the playback device that interprets the piece of playlist information. This reduces the time and efforts of a person in charge of authoring.

The following describes how to specify the base-view video stream.

In general, the left-view video is generated as the 2D video. However, some might think that the right-view video is suitable for the 2D video. To support such a demand, a base-view indicator is set in each piece of playitem information, where the base-view indicator indicates which of the left view and the right view is set as the base view. The base-view indicator set in each piece of playitem information indicates which of the left-view video stream and the right-view video stream is set as the base-view video stream, which of the left-view PG stream and the right-view PG stream is set as the base-view PG stream, and which of the left-view IG stream and the right-view IG stream is set as the base-view IG stream.

As described above, a dependent-view data block precedes a base-view data block without fail. As a result, by referring to the base-view indicator, it is possible to recognize which of the source packet for playing back the right view and the source packet for playing back the left view is first supplied to the playback device. When the right-view video stream is specified as the base-view video stream, this information causes the right-view video stream to be entered to the video decoder first to obtain non-compressed picture data, even if the right view is specified by the sub-path information. And based on the non-compressed picture data obtained by decoding the right-view video stream, motion compensation is performed. This makes the selection of the base view more flexible.

FIG. 35A shows a 3D playlist generated by adding a base-view indicator to the 3D playlist shown in FIG. 33A.

FIG. 35B shows how the base-view indicator is described in the structure defining the playitem, in an object-oriented programming language. FIG. 35B shows one example of such description. As shown in FIGS. 35A and 35B, when an immediate value "0" is set in the base-view indicator, the left-view video stream is specified as the base-view video stream; and when an immediate value "1" is set in the base-view indicator, the right-view video stream is specified as the base-view video stream.

The base-view indicator can be used when the stream are output to the display device. The display device use the base-view indicator to differentiate the two types of streams. In a system in which glasses with shutters are used, displays of the glasses and the display device cannot be synchronized unless it is recognized which of the left view and the right view is the main image referenced by the playitem. A switch signal is sent to the glasses with shutters so that the light is transmitted through the glass for the left eye when the left view is displayed, and the light is transmitted through the glass for the right eye when the right view is displayed.

The information provided by the base-view indicator is also used In stereoscopic methods for the naked eye, such as the lenticular method, in which prism is incorporated in the screen of the display device. This is because the differentiation between the left view and the right view is necessary also in such methods. This completes the description of the base-view indicator. The base-view indicator is based on the premise that either the left view or the right view, among the parallax images, can be played back as the monoscopic video.

Figure 36:
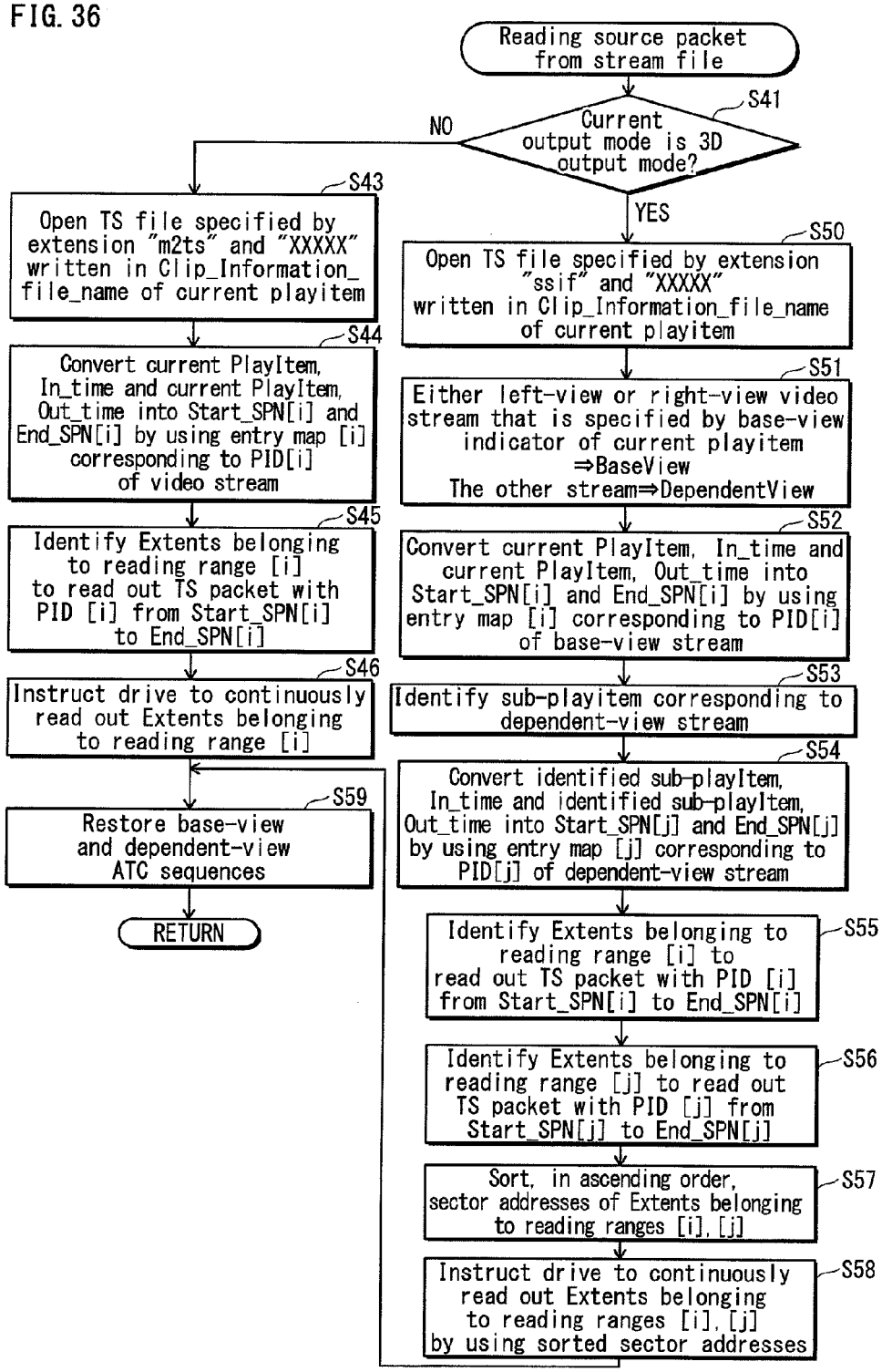
FIG. 36 is a flowchart showing the playitem playback procedure.

FIG. 36 is a flowchart showing the playitem playback procedure.

In step S41, it is judged whether or not the current output mode is the 3D output mode. When the current output mode is the 2D output mode, a loop constituted from steps S43 through S48 is performed.

In step S43, the stream file, which is identified by: "xxxxx" described in Clip_information_file_name of the current playitem; and extension "m2ts", is opened. In step S44, the "In_time" and "Out_time" of the current playitem are converted into "Start_SPN[i]" and "End_SPN[i]" by using the entry map corresponding to the packet ID of the video stream.

In step S45, the Extents belonging to the reading range [i] are identified to read out the TS packet with PID[i] from the Start_SPN [i] to the End_SPN [i]. In step S46, the drive of the recording medium is instructed to continuously read out the Extents belonging to the reading range [i].

When the current output mode is the stereoscopic output mode, a loop constituted from steps S50 through S60 is performed.

In step S50, the stream file, which is identified by: "xxxxx" described in the Clip_information_file_name of the current playitem; and extension "ssif", is opened. In step S51, either the left-view or right-viewvideo stream that is specified by the base-view indicator of the current playitem information is set to the base-view video stream. The left-view or right-view video stream that is not set to the base-view video stream is set to the dependent-view stream.

In step S52, the "In_time" and "Out_time" of the current playitem are converted to "Start_SPN [i]" and "End_SPN [i]" by using the entry map corresponding to the packet ID of the base-view video stream.

In step S53, the sub-playitem corresponding to the dependent-view stream is identified. In step S54, the "In_time" and "Out_time" of the identified sub-playitem are converted into "Start_SPN[j]" and "End_SPN [j]" by using the entry map [j] corresponding to the packet ID[j] of the dependent-view stream.

The Extents belonging to the reading range [i] are identified to read out the TS packet having the packet ID[i] from "Start_SPN [i]" to "End_SPN [i]" (step S55). The Extents belonging to the reading range [j] are identified to read out the TS packet having the packet ID [j] from "Start_SPN[j]" to "End_SPN[j]" (step S56). Following this, in step S57, the Extents belonging to the reading ranges [i] and [j] are sorted in the ascending order. In step S58, the drive is instructed to continuously read out the Extents belonging to the reading ranges [i] and [j] using the sorted addresses. After this, when the source packet sequence is read out, in step S59, the base-view and dependent-view ATC sequences are restored and supplied to the PID filters for the base view and dependent view.

As described above, according to the present embodiment, base-view and dependent-view data blocks are stored in one stereoscopic interleaved stream file, and when they are supplied to the decoder, the base-view and dependent-view ATC sequences are restored. With this structure, the decoder can treat the stereoscopic interleaved stream file in the same manner as a regular stream file. Thus the storage method of the base-view and dependent-view video streams can be positively used for the storage of the stereoscopic interleaved stream file.

Embodiment 3

Embodiment 3 of the present application describes the data structure for supporting the multi-angle playback.

<Stereoscopic Interleaved Stream File>

The following explains the data allocation in the recording area for recording a stereoscopic interleaved stream file for multi-angle.

In the recording area for recording the stereoscopic interleaved stream file for multi-angle, a plurality of interleave units are recorded. The interleave units correspond to pairs of base-view data block and dependent-view data block.

The stereoscopic interleaved stream file is composed of interleave units that respectively correspond to angle numbers 1 through 4 when the multi-angle section includes pairs of base-view data block and dependent-view data block that are to be played back when the angle number is set to 1 through 4, respectively.

Each interleave unit is an Extent SS (EXTSS) in the interleaved stream file, and is composed of: a base-view data block (B[i]Ax) to be read out when the angle number x is set in the angle number register; and a dependent-view data block (D[i]Ax) to be read out when the angle number x is set in the angle number register. Accordingly, in the stereoscopic interleaved stream file for multi-angle, one interleave unit satisfies the above-described requirement for EXTSS[i].

Figure 37A:
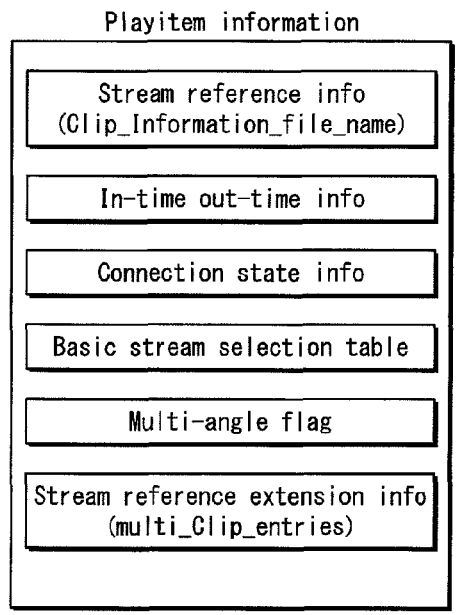
FIGS. 37A through 37C show the playitem information and the sub-playitem in Embodiment 4.
Figure 37B:
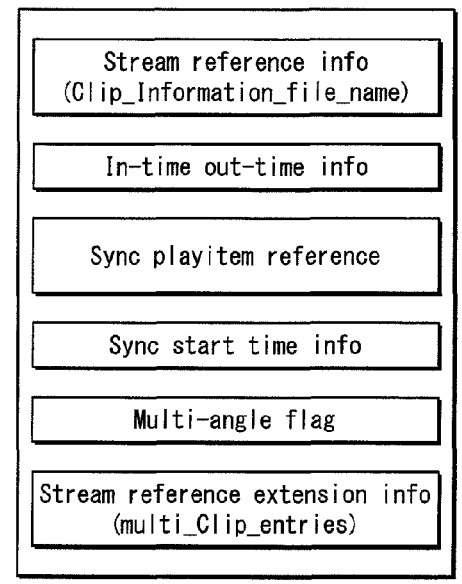
Figure 37C:
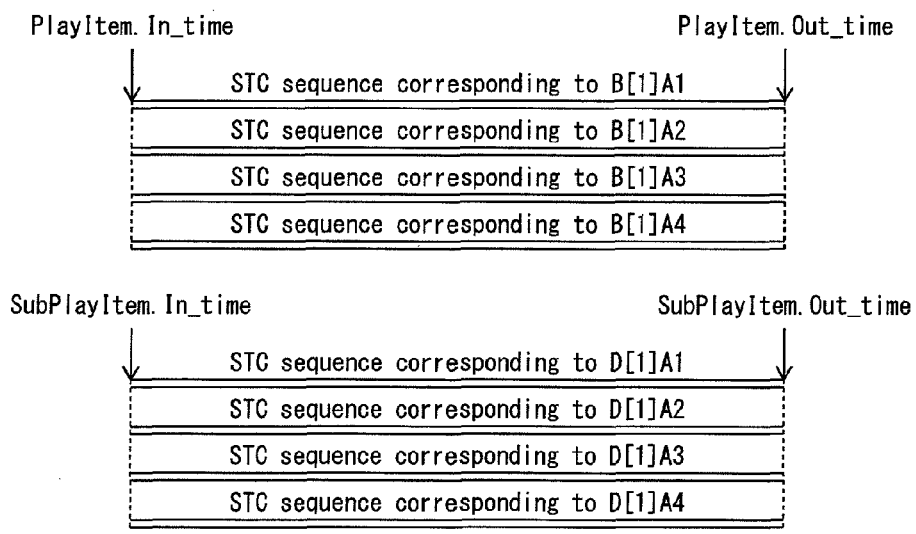

The basic stream selection table of the playlist information indicates a packet identifier of the base-view video stream that is permitted to be played back in a playback section defined in the playitem information, and the extension stream selection table indicates it in correspondence with a packet identifier of the dependent-view video stream that is permitted to be played back. This structure is the same as in Embodiment 1. FIGS. 37A through 37C show the playitem information and the sub-playitem in Embodiment 4. FIG. 37A shows the internal structure of the playitem information. FIG. 37B shows the internal structure of the sub-playitem information.

Both the playitem information and the sub-playitem information include a multi-angle flag (multi_angle flag) that indicates whether or not the playitem constitutes the multi-angle section.

When the multi-angle flag is set ON, both the playitem information and the sub-playitem information include stream reference extension information (Multi_clip_entries). The stream reference extension information includes specification of the second AV clip and onwards in the playitem information. The specification of AV clip is made of a pair of a clip information file name and an STC reference identifier reference.

The stream reference information (clip_information_file_name) in the playitem information and the stream reference information (clip_information_file_name) in the sub-playitem information specify a stream file storing the base-view data block and a stream file storing the dependent-view data block, the stream files being identified by the first angle number stored in the angle number register of the playback device.

The stream reference extension information in the playitem information and the sub-playitem information specify a stream file storing the base-view data block and a stream file storing the dependent-view data block, the stream files being identified by the second angle number and onwards stored in the angle number register of the playback device.

The playitem information includes time information indicating the In-time and Out-time on the playback time axis of the base-view video stream. The sub-playitem information includes time information indicating the In-time and Out-time on the playback time axis of the dependent-view video stream.

The In-time and Out-time in the playitem information is identical to those in the sub-playitem information.

The number of stream files specified by the stream reference extension information in the playitem information is identical to that specified by the stream reference extension information in the sub-playitem information.

FIG. 37C shows correspondence between In_Time and Out_Time in the playitem information and the base-view data blocks in the interleave units.

The upper half of FIG. 37C shows four STC sequences corresponding to four base-view data blocks B[1]A1, B[1]A2, B[1]A3, and B[1]A4. These base-view data blocks B[1]A1, B[1]A2, B[1]A3, and B[1]A4 are base-view data blocks that are to be read out when the angle number is set to 1, 2, 3, and 4, respectively.

The In_Time in the playitem information specifies the playback start time that is common to the four STC sequences corresponding to the four base-view data blocks.

The Out_Time in the playitem information specifies the starting playback end time that is common to the four STC sequences corresponding to the four base-view data blocks B[1]A1, B[1]A2, B[1]A3, and B[1]A4.

The lower half of FIG. 37C shows four STC sequences corresponding to four dependent-view data blocks D[1]A1, D[1]A2, D[1]A3, and D[1]A4. These dependent-view data blocks D[1]A1, D[1]A2, D[1]A3, and D[1]A4 are base-view data blocks that are to be read out when the angle number is set to 1, 2, 3, and 4, respectively. The In_Time in the playitem information specifies the playback start time that is common to the four STC sequences corresponding to the four dependent-view data blocks.

The Out_Time in the playitem information specifies the starting playback end time that is common to the four STC sequences corresponding to the four dependent-view data blocks D[1]A1, D[1]A2, D[1]A3, and D[1]A4.

Figure 38:
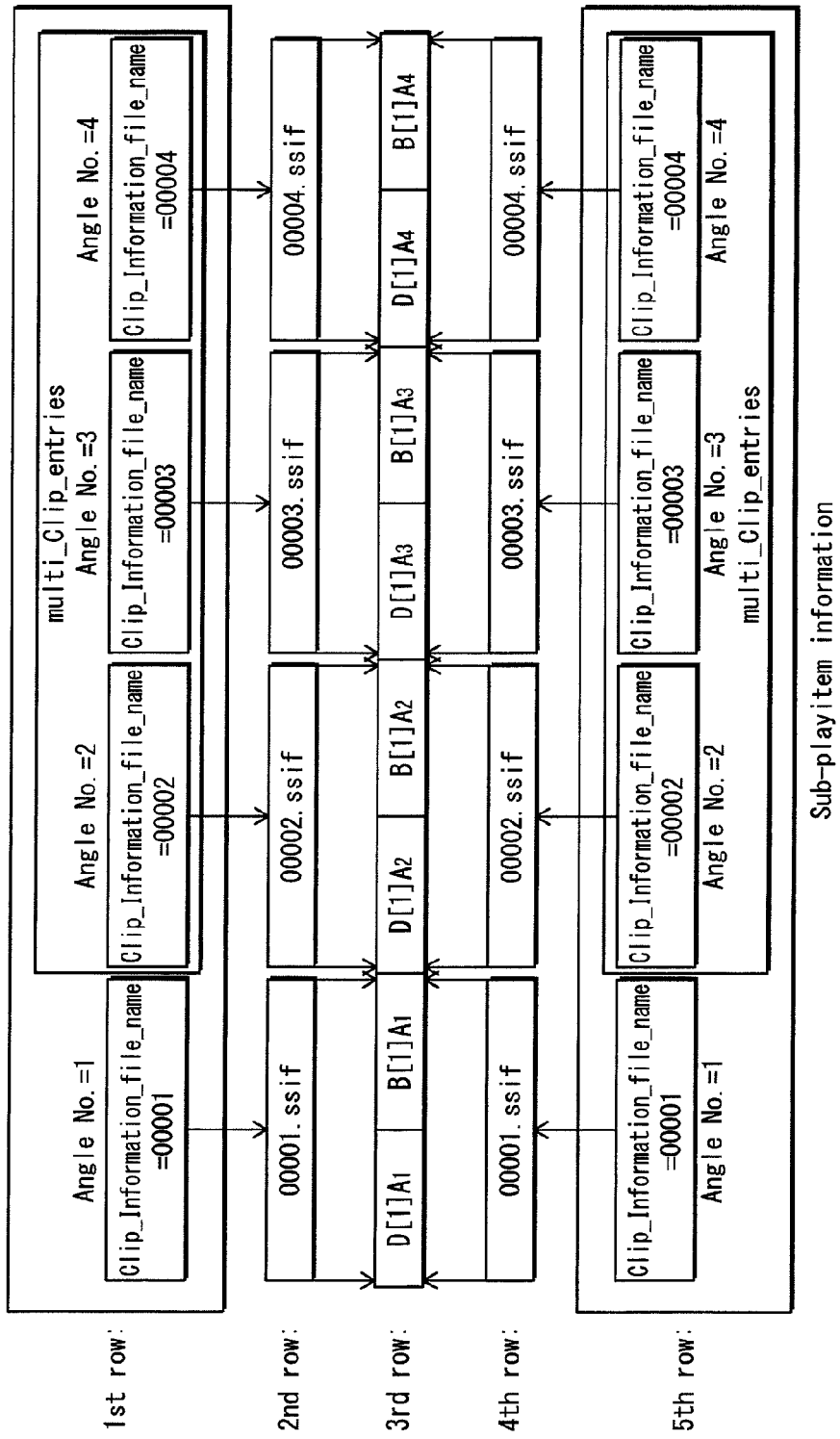
FIG. 38 shows specification of the multi-angle section by the playitem information and the sub-playitem information.

FIG. 38 shows specification of the multi-angle section by the playitem information and the sub-playitem information. The first row of FIG. 38 shows the playitem information including "Multi_clip_entries". The second row shows the stereoscopic interleaved stream file referenced by "clip_information_file_name" in the playitem information. The third row shows pairs of base-view data block and dependent-view data block that constitute interleave units. The fourth row shows the stereoscopic interleaved stream file referenced by "clip_information_file_name" in the sub-playitem information. The fifth row shows the sub-playitem information.

The "clip_information_file_name" in the playitem information is associated with the angle number "1". The "clip_information_file_name" in the "Multi_clip_entries" in the playitem information is associated with angle numbers "2", "3", and "4". The "clip_information_file_name" corresponding to the angle number "1" specifies the stream file 00001.ssif as the supply source of the base-view video stream.

The "clip_information_file_name" corresponding to the angle numbers "2", "3", and "4" specifies 00002.ssif, 00003.ssif, and 00004.ssif as the supply sources of the base-view video stream.

The "clip_information_file_name" in the sub-playitem information is associated with the angle number "1". The "clip_information_file_name" in the "Multi_clip_entries" in the sub-playitem information is associated with angle numbers "2", "3", and "4". The "clip_information_file_name" corresponding to the angle number "1" specifies the stream file 00001.ssif as the supply source of the dependent-view video stream. The "clip_information_file_name" corresponding to the angle numbers "2", "3", and "4" specifies 00002.ssif, 00003.ssif, and 00004.ssif as the supply sources of the dependent-view video stream.

The file 00001.ssif includes an interleave unit that is composed of a pair of data blocks B[1]A1 and D[1]A1. The file 00002.ssif includes an interleave unit that is composed of a pair of data blocks B[1]A2 and D[1]A2. The file 00003.ssif includes an interleave unit that is composed of a pair of data blocks B[1]A3 and D[1]A3. The file 00004.ssif includes an interleave unit that is composed of a pair of data blocks B[1]A4 and D[1]A4. With such correspondence being made, interleave units are read out by the playback device in accordance with the setting of the angle numbers in the playback device.

Suppose here that the stream file 00001.ssif referenced by the stream reference information in the sub-playitem information stores a left-view video stream of the dinosaur shown in FIG. 2.

Suppose also that the file 00002.ssif referenced by the "Multi_clip_entries" in the playitem and sub-playitem information stores a base-view video stream and right-view video stream representing an image from the back angle of the dinosaur shown in FIG. 2.

Suppose further that the file 00003.ssif referenced by the "Multi_clip_entries" in the playitem and sub-playitem information stores a base-view video stream and right-view video stream representing an image from the upper-left angle of the dinosaur shown in FIG. 2.

In this case, the stream files 00001.ssif, 00002.ssif, and 00003.ssif are selectively read out into the playback device as the number stored in the angle number register of the playback device changes.

Figure 39:
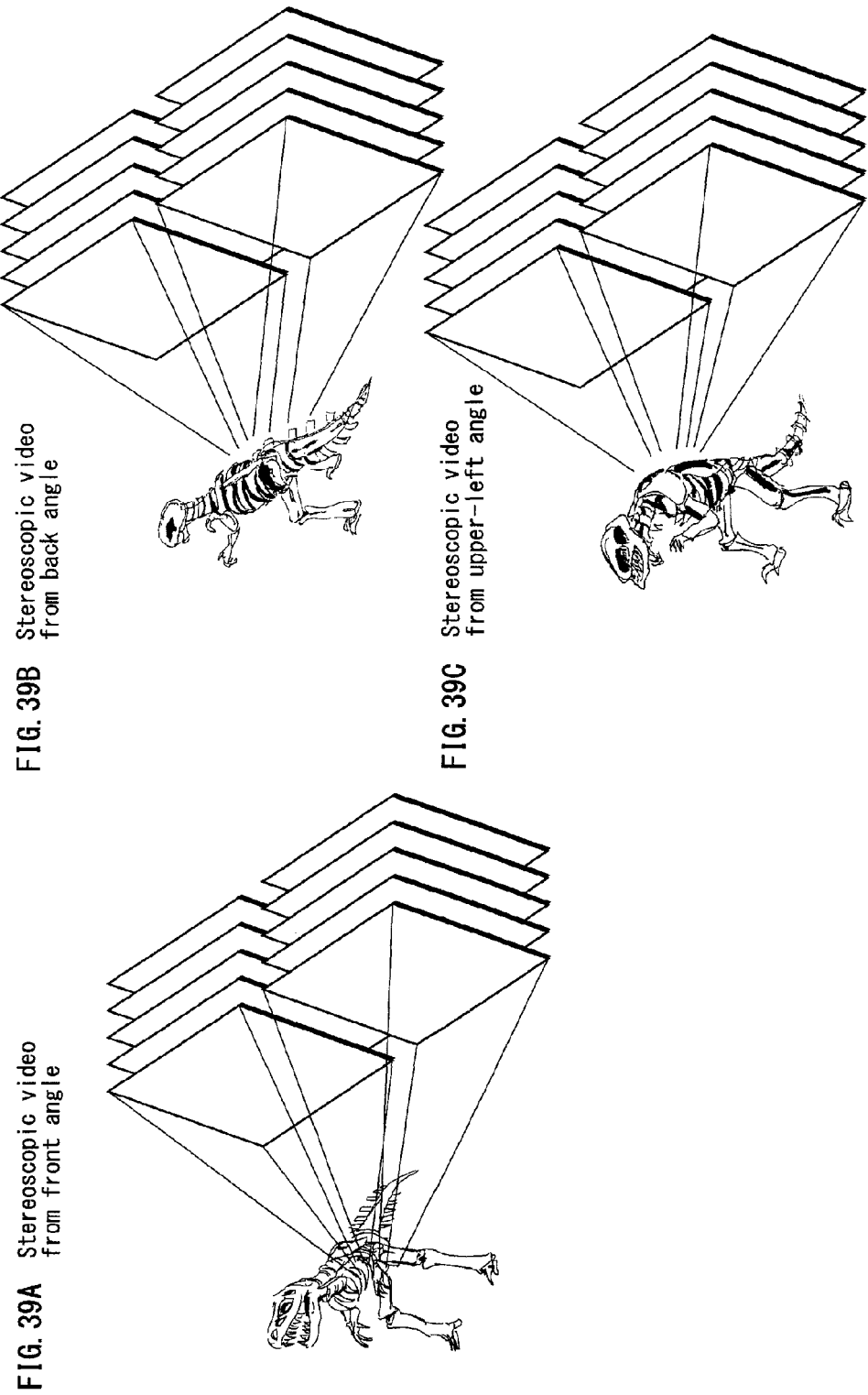
FIGS. 39A through 39C show stereoscopic images to be displayed when corresponding angle numbers are set.

FIGS. 39A through 39C show stereoscopic images to be displayed when corresponding angle numbers are set.

FIG. 39A shows a stereoscopic image to be displayed when the stream file referenced by the stream reference information in the playitem and sub-playitem information is read out, when the angle number is set to "1".

FIG. 39B shows a stereoscopic image to be displayed when the stream file referenced by the "Multi_clip_entries" in the stream reference information in the playitem and sub-playitem information is read out, when the angle number is set to "2".

FIG. 39C shows a stereoscopic image to be displayed when the stream file referenced by the "Multi_clip_entries" in the stream reference information in the playitem and sub-playitem information is read out, when the angle number is set to "3".

In this way, the stream file that is the stream supply source is changed in accordance with the change of the angle number. Therefore, it is possible to change the stereoscopic image to be viewed even if the basic stream selection table and the extension stream selection table have the same registration information.

This completes the description of the recording medium in the present embodiment. The following describes the playback device in detail.

The playback device is provided with the angle number register for storing the angle number, as a structural element unique to the playback device.

In the playback device of the present embodiment, the reading unit reads out a stream file referenced by the stream reference information in the playitem and sub-playitem information when the angle number stored in the angle number register is "1".

The reading unit reads out a stream file referenced by the stream reference extension information in the playitem and sub-playitem information when the angle number stored in the angle number register is "2" or onward.

With respect to the base-view video stream, the portion corresponding to the period from the In-time to the Out-time indicated by the time information of the playitem information on the base-view time axis is played back. With respect to the dependent-view video stream, the portion corresponding to the period from the In-time to the Out-time indicated by the time information of the subjectional playback section on the dependent-view time axis is played back.

Figure 40:
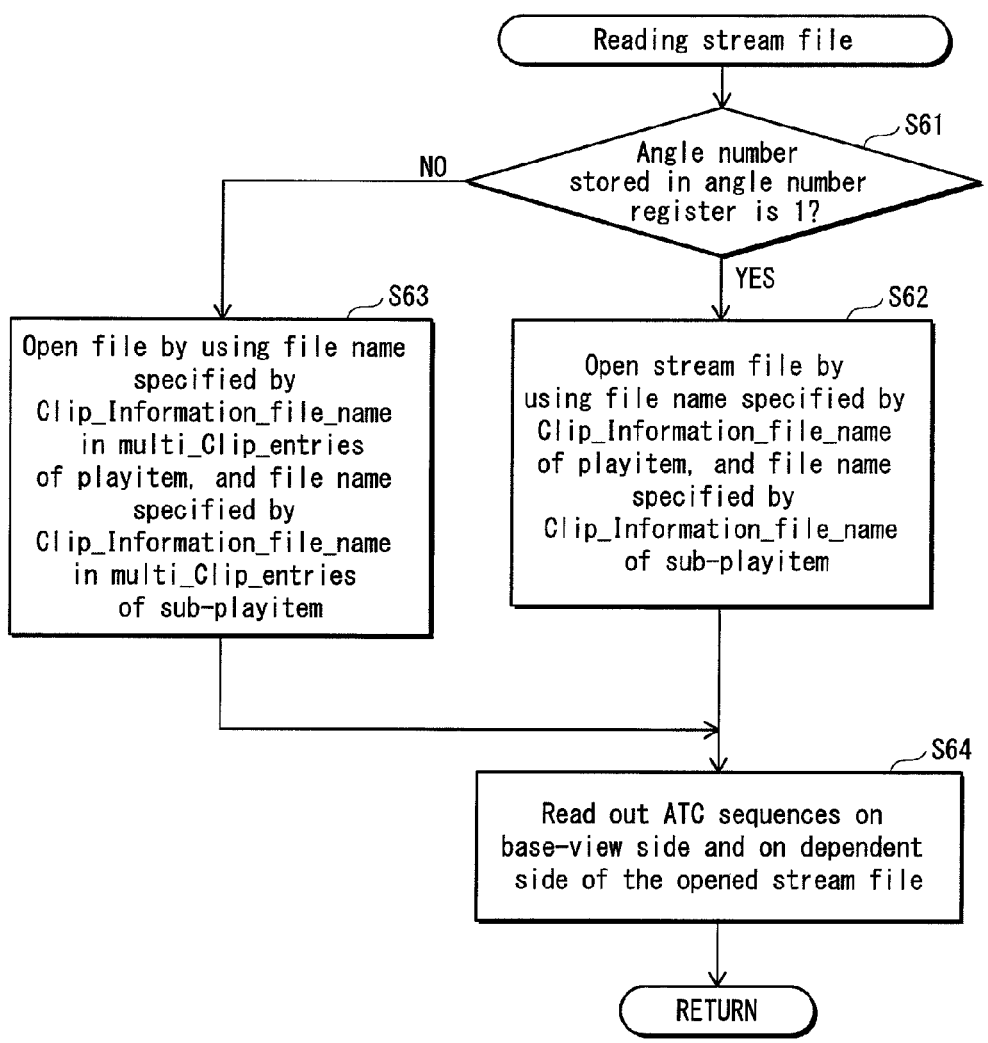
FIG. 40 shows the procedure for reading the stream file in accordance with "Multi_clip_entries"

FIG. 40 shows the procedure for reading the stream file in accordance with "Multi_clip_entries".

In step S61, it is judged whether or not the angle number stored in the angle number register is "1". When the angle number is "1", the control proceeds to step S62, in which a stream file having a file name specified by "clip_information_file_name" in the playitem information and sub-playitem information is opened.

When the angle number is "2" or more, the control proceeds to step S63, in which a stream file having a file name specified by "clip_information_file_name" in "Multi_clip_entries" in the playitem information and sub-playitem information is opened.

In step S64, the base-view video stream and dependent-view video stream of the opened stream file are read out.

As described above, according to the present embodiment, the supply source of base-view video stream and dependent-view video stream_identified by a packet identifier in the stream registration sequence in a stream selection table can be switched in accordance with the angle number stored in the angle number register provided in the playback device. For example, when the angle number stored in the angle number register is "1", it is determined that the supply source of the base-view video stream and dependent-view video stream is the interleaved stream file; and when the angle number stored in the angle number register is "2" or more, it is determined that the supply source of the base-view video stream and dependent-view video stream is another stream file.

Also, it is possible to supply base-view video streams and dependent-view video streams from various stream files to the decoder in accordance with the change of the angle number by user operation. This facilitates the angle switching in the stereoscopic processing.

Embodiment 4

The present embodiment describes the types of sub-paths. More specifically, the present embodiment describes what type of sub-path should be adopted to realize the stereoscopic playback having been described in the embodiments so far.

There two types of playback sections that can be defined for the dependent-view video stream to realize the stereoscopic playback having been described in the embodiments so far: off-disc-type Out-of-MUX dependent-view video stream playback path (sub-path type=5); and on-disc-type Out-of-MUX dependent-view video stream playback path (sub-path type=8).

First, the off-disc-type Out-of-MUX dependent-view video stream playback path (sub-path type=5) will be described. The Out-of-MUX framework is a technology for simultaneously reading out a digital stream recorded on a read-only recording medium, such as BD-ROM, and a digital stream recorded on a local storage of a rewritable type, supplying the read-out digital streams to the decoder, so that the digital streams are played back simultaneously.

As a result, the sub-playitems to be used by the Out-of-MUX dependent-view video stream playback path are separated from the main path. When a playitem in the playlist is associated with a sub-path of the sub-path type "5" that references the dependent-view video stream, the following conditions should be satisfied.

1) The playitem and the sub-playitem associated therewith should be aligned while they are associated with each other. The playback period of the sub-playitem is the same as that of the playitem associated therewith. More specifically:

1-a) The number of sub-playitems should be the same as the number of playitems.

1-b) The playitem information and the sub-playitem information should correspond to each other on a one-piece-by-one-piece basis. The sync playitem reference in the $i^{th}$ sub-playitem should be "i".

1-c) The sync start time playitem reference in the sub-playitem should be equivalent to the sub-playitem In-time.

1-d) The sub-playitem In-time should be equivalent to the In-time in the playitem referenced by the sync playitem reference in the sub-playitem.

1-e) The sub-playitem Out-time should be equivalent to the Out-time in the playitem referenced by the sync playitem reference in the sub-playitem.

2) When continuous sub-playitems are connected, the connection between sub-playitems indicated by the sub-playitem connection form information should be a connection form (connection_condition=5) that evolves a clean break, or a connection form (connection_condition=6) in which an ATC sequence and an STC sequence are continuous with each other.

3) When the associated playlist playback type indicates "sequential playback of playitem", the entries of the sub-playitem should be arranged in the order of playback.

4) The entries of the sub-playitem in the sub-path should be arranged in the order that is associated with the sync playitem reference value. When the playlist playback type of the associated playlist is random shuffle, the sub-playitems should be re-arranged in the order of playback of sub-playitems that have the same sync playitem reference.

These are the conditions to be satisfied by the sub-path of the sub-path type "5".

The sub-path of the sub-path type "5" has two functions: the ES path of the sync-type Out-of-MUX type; and Out-of-MUX dependent-view video playback path. The AV clips used by the sub-path of the sub-path type "5" can be constituted from the multiplexed primary video stream, PG stream, IG stream, secondary audio stream, and dependent-view video stream.

Next, the on-disc-type Out-of-MUX dependent-view video stream playback path (sub-path type=8) will be described. The sub-playitem of this type is used to play back the dependent-view video stream playback path separated from the main path. The sub-playitem associated with the sub-path of the sub-path type "8" should satisfy the following conditions.

1) The playitem and the sub-playitem associated therewith should be aligned while they are associated with each other. The playback period of the sub-playitem is the same as that of the playitem associated therewith. More specifically:

1-a) The number of sub-playitems should be the same as the number of playitems.

1-b) The sync playitem reference in the $i^{th}$ sub-playitem should be "i".

1-c) The sync start time playitem reference in the sub-playitem should be equivalent to the sub-playitem In-time.

1-d) The sub-playitem In-time should be equivalent to the In-time in the playitem referenced by the sync playitem reference in the sub-playitem.

1-e) The sub-playitem Out-time should be equivalent to the Out-time in the playitem referenced by the sync playitem reference in the sub-playitem.

1-f) The number of "Multi_clip_entries" in a sub-playitem should be the same as the number of "Multi_clip_entries" in the playitem referenced by the sync playitem reference.

2) When continuous sub-playitems are connected, the connection between sub-playitems indicated by the sub-playitem connection form information should be a connection form (connection_condition=5) having a clean break, or a connection form (connection_condition=6) in which an ATC sequence and an STC sequence are continuous with each other.

3) When the associated playlist playback type indicates "sequential playback of playitem", the entries of the sub-playitem should be arranged in the order of playback.

4) The entries of the sub-playitem in the sub-path should be arranged in the order that is associated with the sync playitem reference value. When the playlist playback type of the associated playlist is random shuffle, the sub-playitems should be re-arranged in the order of playback of sub-playitems that have the same sync playitem reference.

5) The multi-angle flag in the playitem information is set ON (constitutes a multi-angle), and is associated with sub-playitem information of the sub-path type "8", the playitem information should include the stream reference extension information (Multi_clip_entries).

The sub-clip entry ID reference in the stream entry for the stereoscopic dependent-view block (SS_dependent_view_block) in the extension stream selection table should reference the sub-clip entry ID in the clip information file referenced by the stream reference information, as the one corresponding to the first angle number in the sub-playitem information of the sub-path referenced by the sub-path ID reference in the stream entry.

The following describes the playitem constituting the multi-angle section, and the types of sub-paths. It is possible to define a non-seamless multi-angle-type playitem as the playitem constituting the multi-angle section.

The playitem information in the 3D playlist attached with the extension stream selection table has an "is seamless angle change" flag. The "is seamless angle change" flag indicates whether the angle change is non-seamless or seamless. When the "is seamless angle change" flag is "0" (non-seamless), the 3D playlist can have the sub-path (sub-path type=3) for the interactive graphics playback menu, and the sub-path (sub-path type=9) for the stereoscopic interactive graphics playback menu.

When the "is seamless angle change" flag is "0" (non-seamless), the 3D playlist attached with the extension stream selection table can define only the sub-paths of the above-mentioned sub-path types "3", "8", and "9" as the sub-paths for the dependent-view video stream for the stereoscopic playback mode. Any other sub-paths cannot be associated with it.

As described above, according to the present embodiment, a type of sub-path for realizing the stereoscopic playback on-disc and a type of sub-path for realizing the stereoscopic playback off-disc are provided. This makes it possible to realize the stereoscopic playback by one disc, or by a combination of a disc and another recording medium.

Embodiment 5

The present embodiment describes the clip information file in detail.

Figures 41A, 41B:
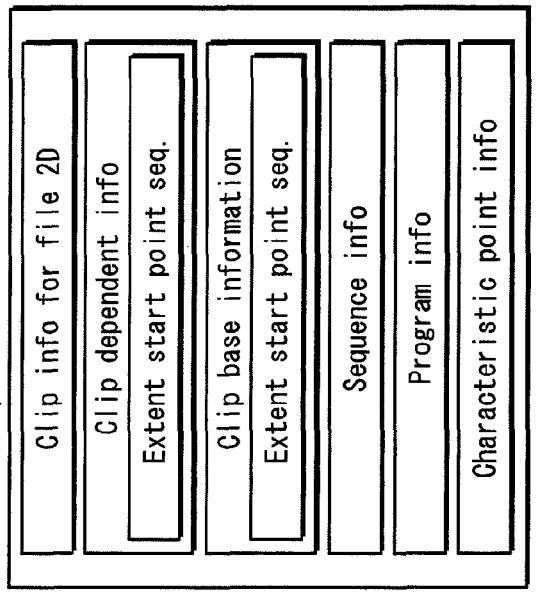
FIGS. 41A through 41C show the internal structure of the clip information file.
Figure 41C:
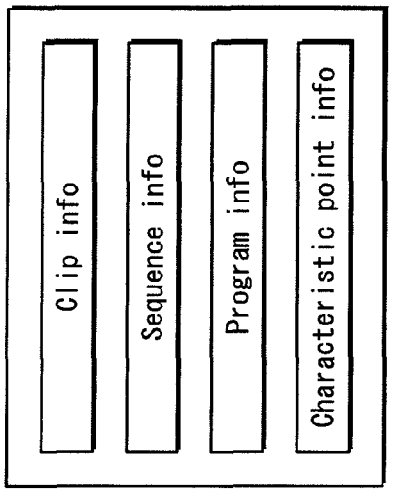

FIGS. 41A through 41C show the internal structure of the clip information file.

FIG. 41A shows the clip information file for 2D. FIG. 41B shows the clip information file for 3D. These clip information files include "clip information", "sequence information", "program information", and "characteristic point information".

The "clip information" is information indicating, for each ATC sequence, what type of AV clip each source packet sequence stored in the stream file is. The clip information includes: application type indicating the type (such as the movie, the slide show) which the application constituted from the AV clip in concern falls under; stream type indicating the type of stream which the AV clip in concern falls under; TS recording rate being a transfer rate of TS packet in the AV clip in concern; ATC delta being a difference in ATC from the ATC sequence constituting the preceding AV clip; and an identifier of the encoding method used in the encoding.

The "sequence information" indicates, for each ATC sequence, information (ATC sequence information) that indicates what type of ATC sequence one or more source packet sequences stored in the stream file are. The ATC sequence information includes: information indicating, by the source packet number, where the source packet being the start point of the ATC exists; offsets between the STC sequence identifiers and the ATC sequence identifiers; and STC sequence information corresponding to each of a plurality of STC sequences. Each piece of STC sequence information includes: a packet number of a source packet storing the PCR of the STC sequence in concern; information indicating where in the STC sequence the source packet being the start point of the STC sequence exists; and the playback start time and the playback end time of the STC sequence.

The "program information" indicates the program structures of the main TS and sub-TSs managed as "AV clips" by the clip information file. The program information indicates what types of ESs are multiplexed in the AV clip. More specifically, the program information indicates what types of packet identifiers the ESs multiplexed in the AV clip have, and indicates the encoding method. Thus the program information indicates the encoding method, such as MPEG2-video or MPEG4-AVC, that is used to compress-encode the video stream.

The "characteristic point information" is information indicating, for each ES, where the characteristic points of a plurality of ESs multiplexed in the AV clip exist. The information indicating the characteristic point for each ES is called "entry map".

What becomes the characteristic point is different for each type of stream. In the case of the base-view and dependent-view video streams, the characteristic point is the access unit delimiter of the I-picture that is located at the start of the open GOP and closed GOP. In the case of the audio stream, the characteristic point is the access unit delimiter indicating the start positions of the audio frames that exist at regular intervals, for example, every one second. In the case of the PG and IG streams, the characteristic point is the access unit delimiter indicating the start positions of the display sets (display set of epoch start, display set of acquisition point) that are provided with all the functional segments necessary for the display, among the display sets of the graphics streams.

The ATC sequence and the STC sequence differ in how they represent the characteristic point. The ATC sequence represents the characteristic point by the source packet number. The STC sequence represents the characteristic point by using the PTS that indicates the time point on the STC time axis.

In view of the above-described differences, the entry map for each ES is composed of a plurality of entry points. More specifically, in each entry point constituting the entry map, a source packet number that indicates the location of the characteristic point in the ATC sequence is associated with a PTS that indicates the location of the characteristic point in the STC sequence. Further, each entry point includes a flag ("is_angle_change" flag) that indicates whether an angle change to the characteristic point is available. Since an angle change is available at the source packet located at the start of the interleave unit constituting the multi-angle section, the "is_angle_change" flag in the entry point indicating the starting source packet of the interleave unit is always set ON. Also, the entry point indicating the starting source packet of the interleave unit is associated with In_Time in the playitem information by the entry point.

The entry map for each ES indicates the source packet numbers of the characteristic points for respective stream types in correspondence with the PTSs. Accordingly, by referencing this entry map, it is possible to obtain, from an arbitrary time point in the ATC sequence, source packet numbers that indicate locations of the characteristic points for the ESs that are closest to the arbitrary time point.

This completes the explanation of the clip information file for 2D. Next is a detailed explanation of the clip information file for 3D. FIG. 41B shows the internal structure of clip information file for 3D. The clip information file for 3D includes: "clip dependent information (dependent-view management information)" which is clip information for the file dependent; and "clip base information (base-view management information)" which is clip information for the file base, as well as the "clip information for file 2D" that is regular clip information (management information). The reason is as follows. As described in Embodiment 2, the stereoscopic interleaved stream file is stored in a directory that is different from the directory in which the regular stream files are stored, to prevent them from mixing each other. Accordingly, the clip information files cannot be associated with the stereoscopic interleaved stream file. Thus the clip dependent information and the clip base information are stored in the clip information file for 2D.

The clip dependent information and the clip base information differ from the clip information file for 2D in that the clip dependent information and the clip base information include metadata that has the Extent start point sequence.

As shown in FIG. 41B, the clip dependent information includes the Extent start point sequence, and the clip base information also includes the Extent start point sequence. The Extent start point sequence included in the clip dependent information is composed of a plurality of pieces of Extent start point information, and each piece of Extent start point information indicates the source packet number of each source packet that is at the start of each of a plurality of Extents constituting the file dependent.

Similarly, the Extent start point sequence included in the clip base information is composed of a plurality of pieces of Extent start point information, and each piece of Extent start point information indicates the source packet number of each source packet that is at the start of each of a plurality of Extents constituting the file base.

The following describes the technical meaning of providing the plurality of pieces of Extent start point information.

The TSs stored in the stream files are originally one TS with only one ATC sequence. Accordingly, the location of the start of a portion that is created by dividing the original one cannot be determined even if the sequence information of the clip information file is referenced. On the other hand, the start of a divisional portion is a start of an Extent, as well. Thus, it is possible to recognize the start of a divisional portion by referencing the information of the file system such as the file entry or the Extent descriptor. However, since the information of the file system is managed by the middleware, it is extremely difficult for the application to reference the information of the Extent. In view of this problem, in the present embodiment, the Extent start point information is used so that the ordinal number of the packet that corresponds to the Extent in concern is indicated in the clip information.

FIG. 41C shows a syntax for writing the Extent start point information in a programming language.

The "for" statement whose control variable is "extention_id" forms a loop in which an Extent start point whose argument is "extention_id" is repeated as many times as the "number_of_extention_start_points". Thus, it is possible to generate the Extent start point information corresponding to the interleaved stream file by creating the "for" statement by writing a number "t", which represents the number of Extents in the interleaved stream file, into the"number_of_extention_start_points".

Figures 42A, 42B:
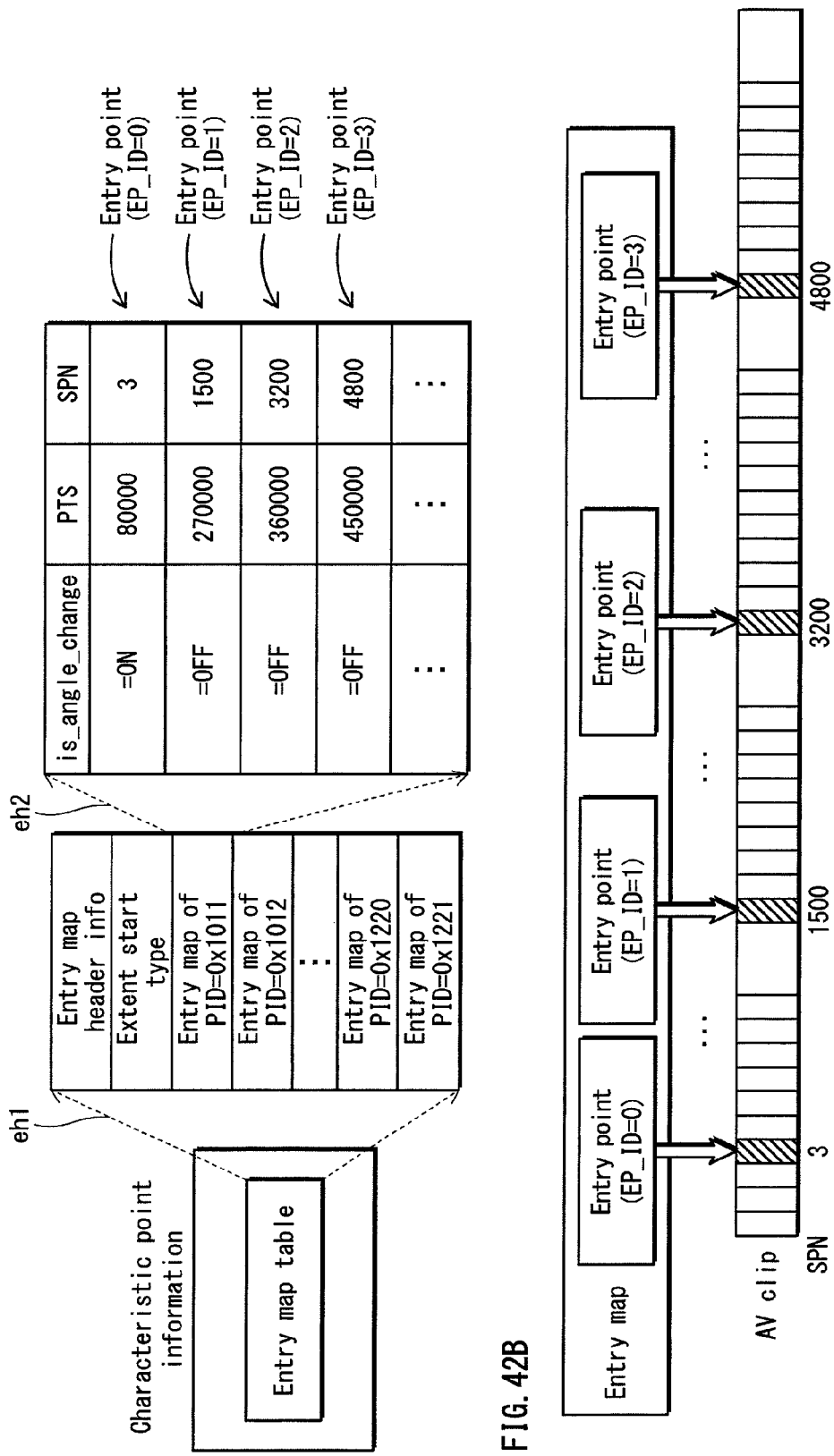
FIGS. 42A and 42B show the Extent start point information and the entry map table included in the clip information file.

FIGS. 42A and 42B show the Extent start point information and the entry map table included in the clip information file. FIG. 42A shows an outline of the structure of the entry map table. The lead line eh1 indicates the close-up of the internal structure of the entry map table. As indicated by the lead line eh1, the entry map table includes "entry map header information", "Extent start type", "entry map for PID=0x1011", "entry map for PID=0x1012", "entry map for PID=0x1220", and "entry map for PID=0x1221".

The "entry map header information" stores information such as the PIDs of video stream indicated by the entry maps, and values of entry points.

The "Extent start type" indicates which of an Extent constituting the left-view video stream and an Extent constituting the right-view video stream is disposed first.

The "entry map for PID=0x1011" "entry map for PID=0x1012", "entry map for PID=0x1220", and "entry map for PID=0x1221" are entry maps for each PES stream constituted from a plurality of types of source packets. Each entry map includes "entry points", each of which is composed of a pair of PTS and SPN values. Also, and identification number of the entry point is called an "entry point ID" (hereinafter referred to as EP_ID), where the EP_ID of the first entry point is "0", and after this, the EP_ID for each entry point in the serial order is incremented by "1". By using the entry maps, the playback device can identify a source packet position corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip. Also, the entry maps are created for each video stream which is multiplexed in the AV clip, and are managed by the PIDs.

The lead line eh2 indicates the close-up of the internal structure of the entry map for PID=0x1011. The entry map for PID=0x1011 includes entry points corresponding to EP_ID=0, EP_ID=1, EP_ID=2, and EP_ID=3. The entry point corresponding to EP_ID=0 indicates a correspondence among the "is_angle_change" flag having been set to "ON", SPN=3, and PTS=80000. The entry point corresponding to EP_ID=1 indicates a correspondence among the "is_angle_change" flag having been set to "OFF", SPN=1500, and PTS=270000.

The entry point corresponding to EP_ID=2 indicates a correspondence among the "is_angle_change" flag having been set to "OFF", SPN=3200, and PTS=360000. The entry point corresponding to EP_ID=3 indicates a correspondence among the "is_angle_change" flag having been set to "OFF", SPN=4800, and PTS=450000. Here, the "is_angle_change" flag indicates whether or not it is possible to decode independent of the entry point itself. When the video stream has been encoded by the MVC or MPEG-4AVC and an IDR picture exists in the entry point, this flag is set to "ON". When a Non-IDR picture exists in the entry point, this flag is set to "OFF".

FIG. 42B shows which source packets are indicated by the entry points included in the entry map corresponding to the TS packet having the PID=0x1011 shown in FIG. 15A. The entry point corresponding to EP_ID=0 indicates SPN=3, and this source packet number is associated with PTS=80000. The entry point corresponding to EP_ID=1 indicates SPN=1500, and this source packet number is associated with PTS=270000.

The entry point corresponding to EP_ID=2 indicates SPN=3200, and this source packet number is associated with PTS=360000. The entry point corresponding to EP_ID=3 indicates SPN=4800, and this source packet number is associated with PTS=450000.

Figure 43:
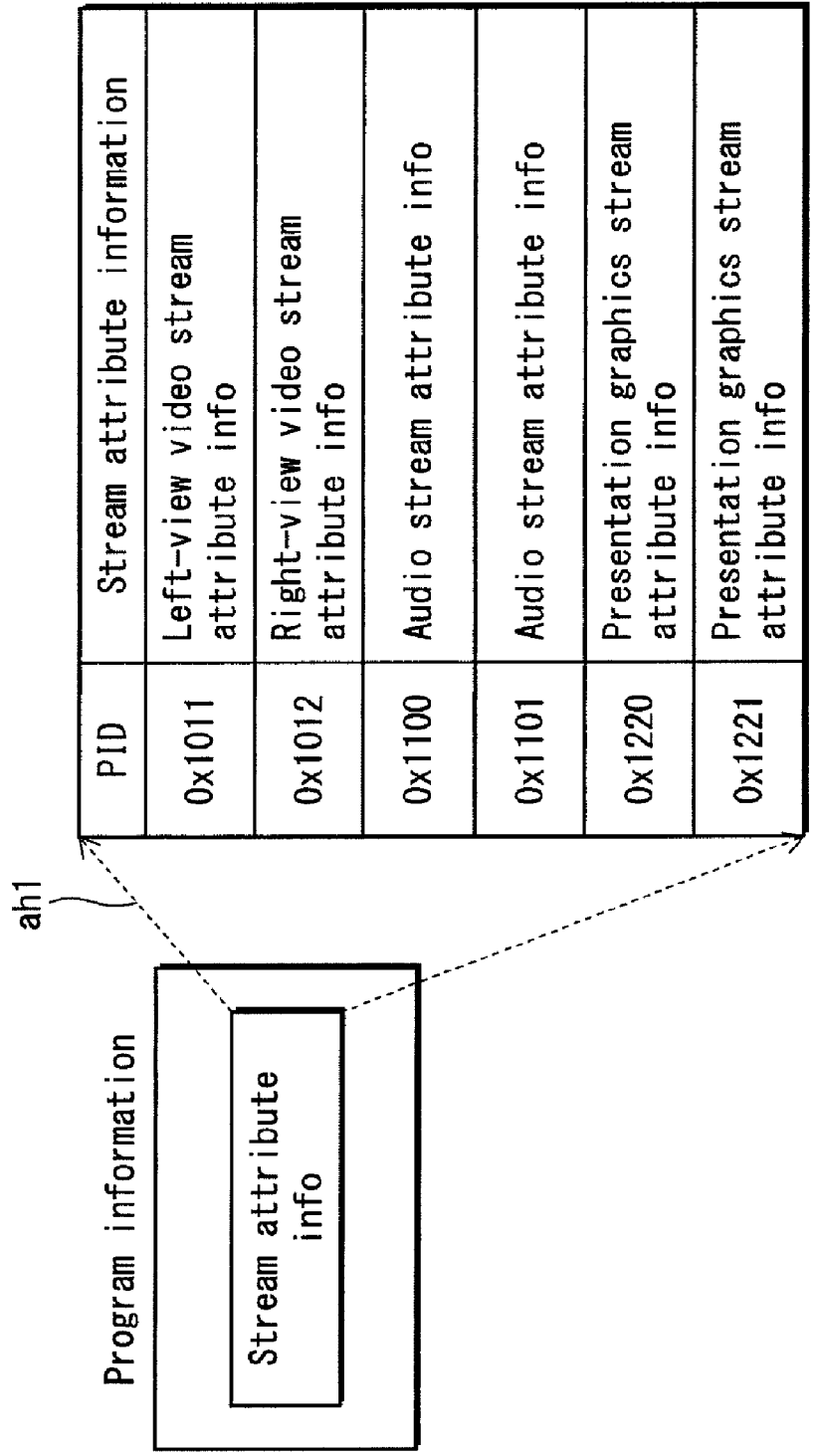
FIG. 43 shows the stream attribute included in the program information.

FIG. 43 shows the stream attribute included in the program information.

The lead line ah1 indicates the close-up of the internal structure of the stream attribute.

As indicated by the lead line ah1, the stream attribute information includes: stream attribute information of the left-view video stream constituted from the TS packet having packet ID "0x1011"; stream attribute information of the right-view video stream constituted from the TS packet having packet ID "0x1012"; stream attribute information of the audio stream constituted from the TS packets having packet IDs "0x1100" and "0x1101"; and stream attribute information of the PG stream constituted from the TS packets having packet IDs "0x1220" and "0x1221". As understood from this, the stream attribute information indicates what attributes the PES streams have, where the PES streams are constituted from a plurality of types of source packets. As indicated by the lead line ah1, attribute information of each stream included in the AV clip is registered for each PID.

Figure 44:
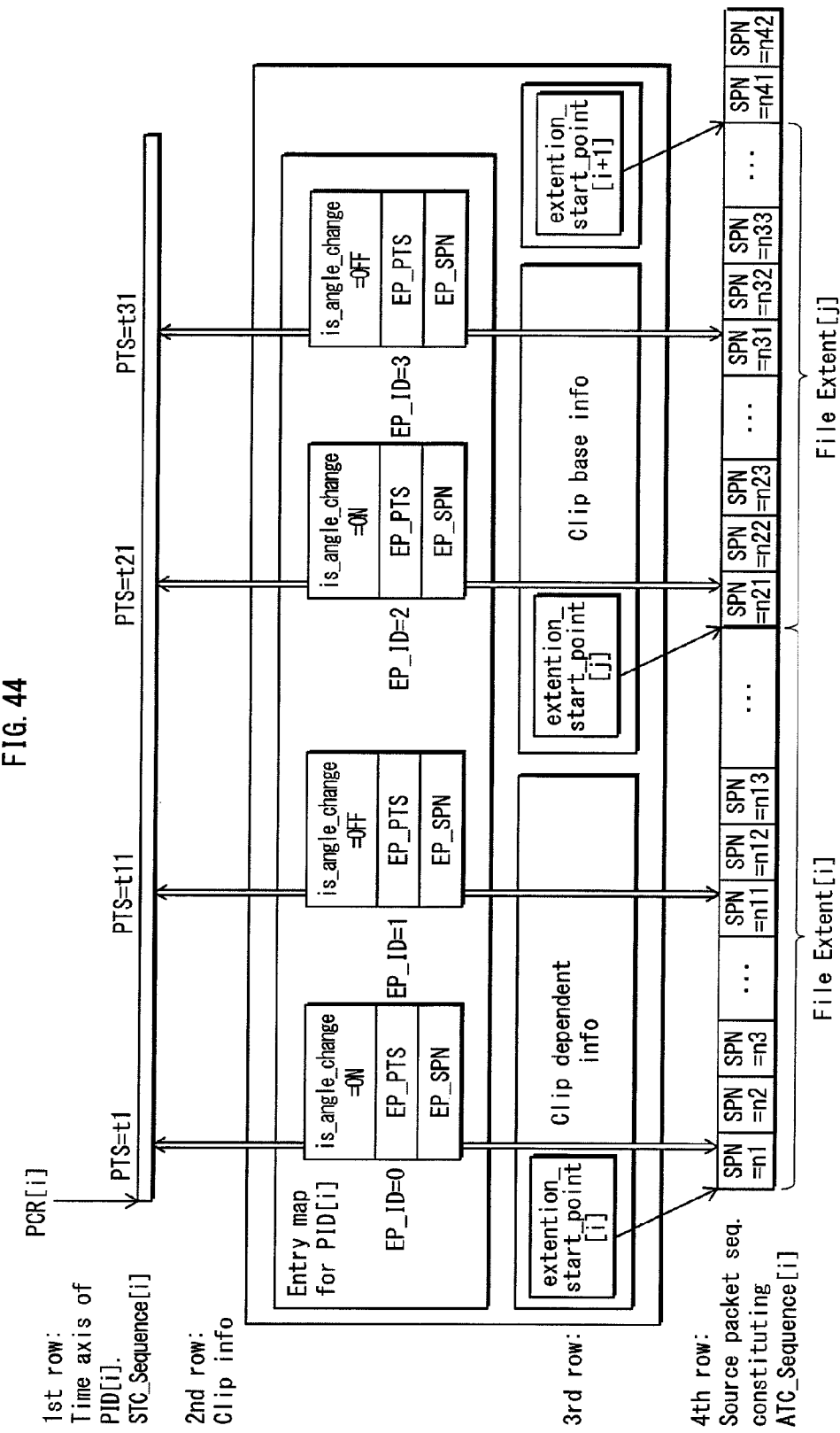
FIG. 44 shows how entry points are registered in an entry map.

FIG. 44 shows how entry points are registered in an entry map. The first row of FIG. 44 shows the time axis defined by the STC sequence. The second row shows the entry map included in the clip information. The third row shows the Extent start point information in the clip dependent information and the Extent start point information in the clip base information. The fourth row shows a source packet sequence constituting the ATC sequence. When the entry map specifies a source packet corresponding to SPN=n1 among the ATC sequence, the PTS of the entry map is set to "PTS=t1" on the time axis of the STC sequence. With this arrangement, it is possible to cause the playback device to perform a random access to the source packet corresponding to SPN=n1 in the ATC sequence at the time "PTS=t1". Also, when the entry map specifies a source packet corresponding to SPN=n21 among the ATC sequence, the PTS of the entry map is set to "PTS=t21" on the time axis of the STC sequence. With this arrangement, it is possible to cause the playback device to perform a random access to the source packet corresponding to SPN=n21 in the ATC sequence at the time "PTS=t21".

By using the entry maps, the playback device can identify the source packet corresponding to an arbitrary position on the time axis of the video stream. For example, when a special playback such as a fast forward or rewinding is to be performed, I-pictures registered in the entry maps can be identified, selected, and played back. This makes it possible to process efficiently without analyzing the AV clip.

Also, in the third row, Extent start point [i] in the clip dependent information and Extent start point [j] in the clip base information indicate the start source packet numbers of Extents constituting the dependent-view video stream and the base-view video stream in the fourth row, respectively.

With this structure, it is possible to extract only the source packet sequence constituting the base-view video stream, by reading out the source packet indicated by the Extent start point [i] in the clip dependent information through a source packet immediately before the source packet indicated by the Extent start point [j] in the clip base information.

It is also possible to extract only the source packet sequence constituting the base-view video stream, by reading out the source packet indicated by the Extent start point [j] in the clip base information through a source packet immediately before the source packet indicated by the Extent start point [i+1] in the clip dependent information.

Further, it is possible to restore the ATC sequence that constitutes the base-view video stream by combining the source packets constituting the base-view video stream; and it is possible to restore the ATC sequence that constitutes the dependent-view video stream by combining the source packets constituting the dependent-view video stream.

Figure 45:
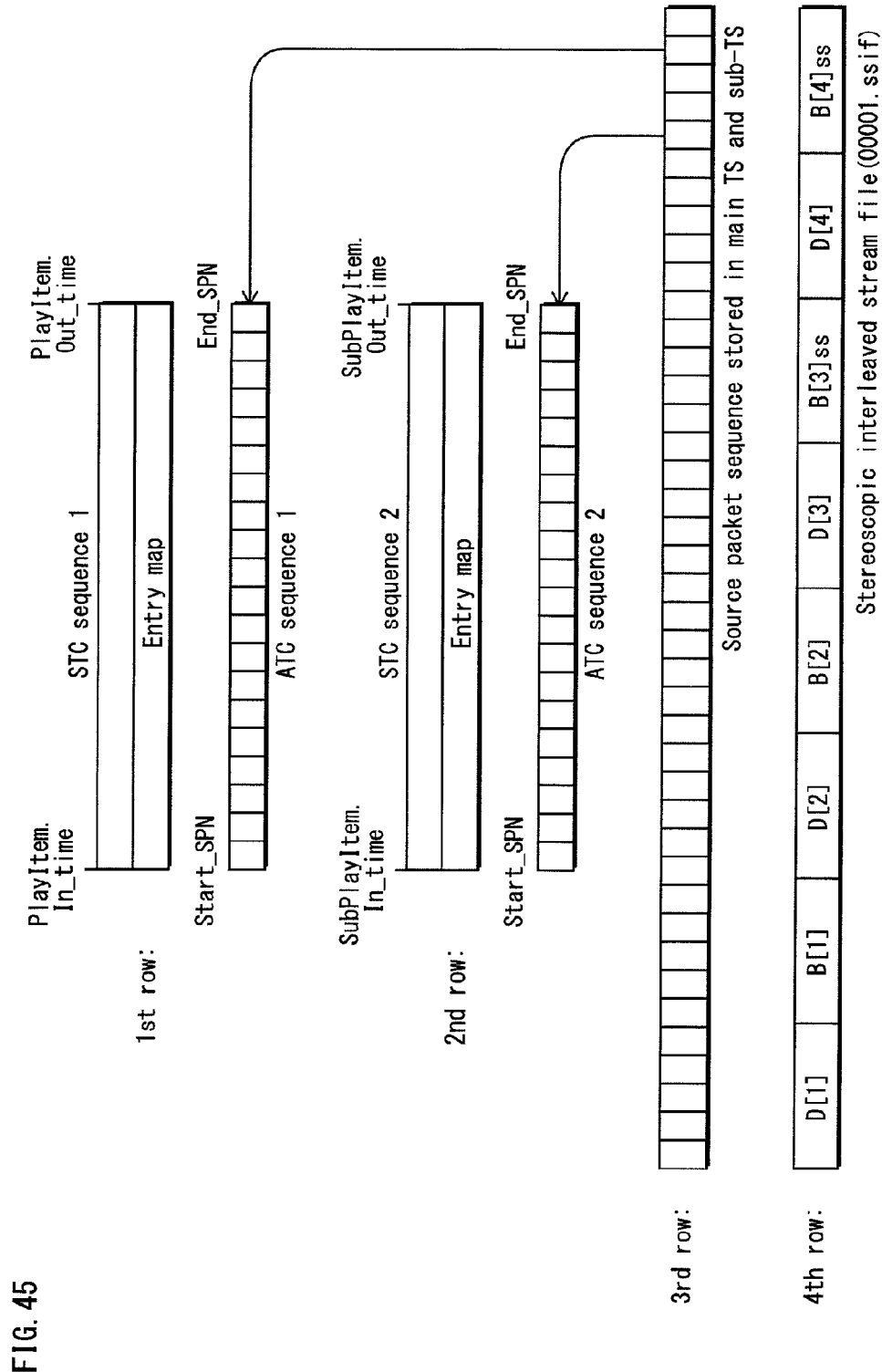
FIG. 45 shows how the ATC sequence is restored from the data blocks constituting the stereoscopic interleaved stream file.

FIG. 45 shows how the ATC sequence is restored from the data blocks constituting the stereoscopic interleaved stream file.

The fourth row of FIG. 45 shows a plurality of data blocks that constitute the stereoscopic interleaved stream file. The third row shows the source packet sequence multiplexed in the main TS and the sub-TS.

The second row shows a set of STC sequence 2 constituting the dependent view, an entry map, and ATC sequence 2 constituting the dependent view. The first row shows a set of STC sequence 1 constituting the dependent view, an entry map, and ATC sequence 1 constituting the dependent view. The arrows extending from the third row to the first and the second rows schematically show that the ATC sequences 1 and 2 are restored from the data blocks of the two TSs (main TS and sub-TS) interleaved in the stereoscopic interleaved stream file. These ATC sequences are associated with the STC sequences by the entry map in the clip information.

This completes the description of the recording medium in the present embodiment. The following describes the playback device in detail.

Figure 46A:
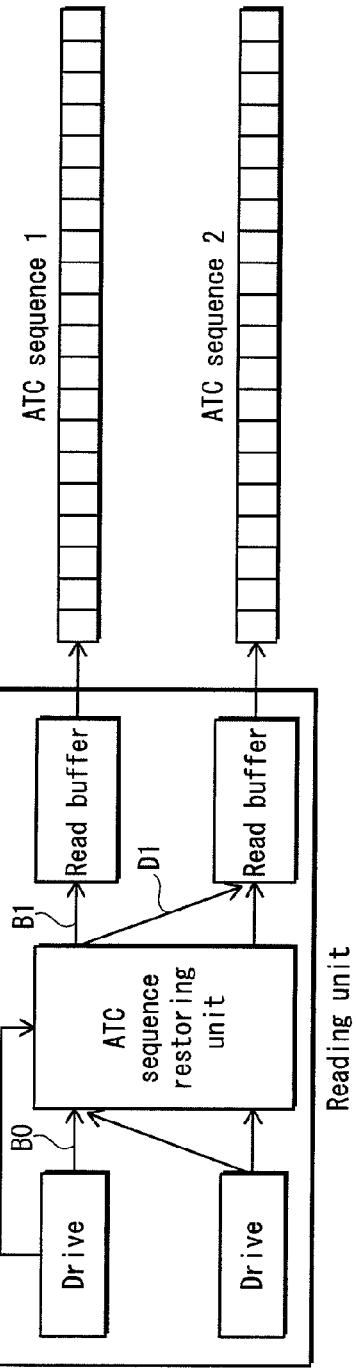
FIGS. 46A and 46B show the internal structure of the reading unit provided with the ATC sequence restoring unit.

The playback device in the present embodiment has a structure in which the reading unit receives inputs of source packets from two recording mediums. For this purpose, the reading unit includes two drives and two read buffers. The two drives are used to access the two recording mediums, respectively. The two read buffers are used to temporarily store the source packets input from the two drives and output them to the decoder. An ATC sequence restoring unit is provided between the two drives and the two read buffers. The ATC sequence restoring unit separates the ATC sequence constituting the base-view stream and the ATC sequence constituting the dependent-view stream, from the source packets in the interleaved stream file read out from one recording medium, and writes the two ATC sequences into the two read buffers, respectively. With this structure, the playback device can process the ATC sequence constituting the base-view video stream and the ATC sequence constituting the dependent-view video stream as if they have been read out from different recording mediums, respectively. FIG. 46A shows the internal structure of the reading unit provided with the ATC sequence restoring unit. As described above, the ATC sequence restoring unit is provided between the two drives and the two read buffers. The arrow B0 symbolically indicates the input of the source packet from one drive. The arrow B1 schematically indicates the writing of the ATC sequence 1 constituting the base-view video stream. The arrow D1 schematically indicates the writing of the ATC sequence 2 constituting the dependent-view video stream.

Figure 46B:
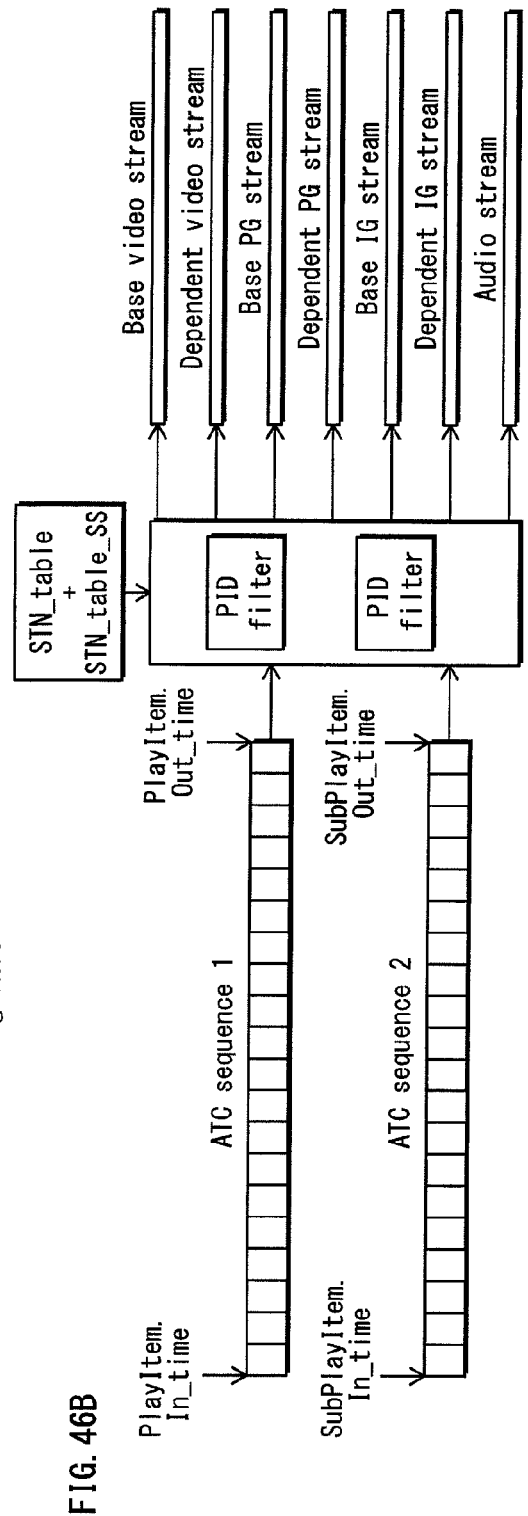

FIG. 46B shows how the two ATC sequences obtained by the ATC sequence restoring unit are treated. The PID filters provided in the demultiplexing unit are shown in the middle part of the FIG. 46B. On the left-hand side of the figure, the two ATC sequences obtained by the ATC sequence restoring unit are shown. The right-hand side of the figure shows the base-view video stream, dependent-view video stream, base-view PG stream, dependent-view PG stream, base-view IG stream, and dependent-view IG stream, which are obtained by demultiplexing the two ATC sequences. The demultiplexing performed by the two ATC sequences is based on the basic stream selection table and the extension stream selection table described in Embodiment 1.

The ATC sequence restoring unit is realized by creating a program that causes the hardware resource to perform the process shown in FIG. 47. FIG. 47 shows the procedure for restoring the ATC sequence.

In step S71, the ATC sequence for base-view is set as the ATC sequence 1, and the ATC sequence for dependent-view is set as the ATC sequence 2. In step S72, the Extent start point information is extracted from the clip dependent information and the clip base information in the clip information file corresponding to the file 2D. The control then proceeds to the loop constituted from steps S73 through S77. In this loop, the following are repeated: the variables "i" and "j" are initialized to "1" (step S73); steps S74 through S76 are performed; and the variables "i" and "j" are incremented (step S77)

In step S74, the source packets from the source packet with the source packet number specified by Extent Start Point [i] in clip dependent information to the source packet immediately before the source packet with the source packet number specified by Extent Start Point [j] in the clip base information are added into the ATC sequence 2.

In step S75, the source packets from the source packet with the source packet number specified by Extent Start Point [j] in the clip base information to the source packet immediately before the source packet with the source packet number specified by Extent Start Point [i+1] in clip dependent information are added into the ATC sequence 1.

In step S76, it is judged whether or not Extent Start Point [i+1] is present. When it is judged that Extent Start Point [i+1] is not present, the control proceeds to step S75 in which the source packets from the source packet with the source packet number specified by Extent Start Point [j] in the clip base information to the last source packet of the stereoscopic interleaved stream file are added into the ATC sequence 1.

By repeating the above-described process, the base-view data blocks are collected in the ATC sequence 1, and the dependent-view data blocks are collected in the ATC sequence 2. After the ATC sequences 1 and 2 are restored in this way, the file entry that indicates the start address of the base-view data blocks and the continuation length by the number of sectors is generated in the memory, and the file base is virtually opened (step S79). Similarly, the file entry that indicates the start address of the dependent-view data blocks and the continuation length by the number of sectors is generated in the memory, and the file dependent is virtually opened (step S80).

The Extent start point information indicates the start address of the data blocks by the source packet number. Thus the start address of the data blocks represented by the source packet number and the continuation length of the data blocks represented by the number of source packets need to be converted into the number of sectors. The procedure of the conversion will be described in the following.

The source packets are segmented into groups each composed of 32 source packets, and are written into three sectors. Each group composed of 32 source packets has 6144 (=32× 192) bytes. This value is equivalent to the size of three sectors: 6144 (=2048×3) bytes. The 32 source packets stored in the three sectors are called "aligned unit". The source packets are written into the recording medium in units of aligned units.

Every 32 source packets are converted into one aligned unit and recorded into three sectors. Therefore, the quotients obtained by dividing the source packet numbers by "32" are interpreted as the addresses of the aligned units. Also, a sector address closest to the starting source packet of a data block can be obtained by multiplying the address of an aligned unit by "3".

Further, a quotient obtained by dividing by "32" the number of source packets indicating the continuation length of a data block is interpreted as the number of continuous aligned units. By multiplying "3" by the number of continuous aligned units, the continuation length of the data block can be represented by the number of sectors. The data block address and the continuation length represented by the number of sectors obtained by the above-described conversions are incorporated, as the allocation descriptors, into the file entries of the file base and the file dependent. In this way, the file entries of the file base and the file dependent can be generated virtually.

<Technical Meaning of Opening File Base>

When a random access from an arbitrary time point is to be performed, a sector search within a stream file needs to be performed. The sector search is a process for identifying a source packet number of a source packet corresponding to the arbitrary time point, and reading a file from a sector that contains a source packet of the source packet number. Since the size of one Extent constituting the stereoscopic interleaved stream file is large, the sector search requires a wide range of searching. In that case, when a random access from an arbitrary time point is performed, it may take a long time to identify the reading-target sector.

This is because, in the interleaved stream file, data blocks constituting the base-view video stream and the dependent-view video stream are disposed in the interleaved manner to constitute one long Extent, and the allocation descriptor of the file entry of the interleaved stream file merely indicates the start address of the long Extent.

In contrast, the file base is composed of a plurality of short Extents, and the start address of each Extent is written in the allocation descriptor. As a result, the sector search requires a narrow range of searching. Thus, when a random access from an arbitrary time point is performed, the reading-target sector can be identified in a short time.

That is to say, since the data blocks constituting the base-view video stream are managed as Extents of the file base, and the start address of the data block is written in the allocation descriptor in the file entry corresponding to the file base, it is possible to quickly reach the sector including the source packet at the target random access position, by starting the sector search from the start address of the Extent that contains the target random access position.

With the above-described structure in which the data blocks constituting the base-view video stream are managed as Extents of the file base, and the start address of each Extent and the continuation length are written in the allocation descriptor in the file entry corresponding to the file base, it is possible to perform a random access from an arbitrary time point in the base-view video stream at a high speed.

More specifically, the sector search is performed as follows. First, the entry map corresponding to the base-view video stream is used to detect a source packet number that is the random access position corresponding to the arbitrary time point.

Next, the Extent start point information in the clip information corresponding to the base-view video stream is used to detect an Extent that contains the source packet number that is the random access position.

Further, the allocation descriptor in the file entry corresponding to the file base is referenced to identify the start sector address of the Extent that contains the source packet number that is the random access position. Then a file read is performed by setting a file pointer to the start sector address, and a packet analysis is executed onto the read-out source packet to identify the source packet with the source packet number that is the random access position. Then the identified source packet is read out. With this procedure, the random access to the main TS is executed efficiently. This also applies to the sub-TS.

As described above, according to the present embodiment, Extents of the base-view video stream and the dependent-view video stream in the interleaved stream file are supplied to the demultiplexing unit and the decoder after they are rearranged based on the Extent start point information. Thus the decoder and program can treat, as the files virtually existing on the recording medium, the file base storing the base-view video stream and the file dependent storing the dependent-view video stream.

In this structure, the base-view video stream and the dependent-view video stream for the stereoscopic viewing are recorded on the recording medium, while the base-view video stream and the dependent-view video stream can be accessed separately. With this structure, the processing efficiency of the playback device is improved.

It should be noted here that, while the Extent start point information can indicate the start of Extent in a unit of byte, it is preferable that the start of Extent is indicated in a unit of a fixed length when Extents are aligned with reading blocks with a fixed length such as the ECC blocks. This restricts the amount of information that is required for identifying the addresses.

Embodiment 6

The present embodiment relates to an improvement for realizing an application for a stereoscopic slide show.

The slide show is composed of still pictures, and thus requires a higher-accuracy random access than the movie. The high-accuracy random access is a random access in which the access is performed in a unit of "one picture" such as an access to a picture preceding by one picture or ten pictures. The entry map of the video stream has a time accuracy of approximately one second such as at an interval of one second. The interval of one second can include 20 to 30 pictures. Accordingly, when the random access is to be realized with the above-described accuracy in units of pictures using the entry map, referencing the entry map is not enough, but the analysis of the stream is required.

The "analysis of stream" is a process of reaching the recording position of a desired picture by repeating a plurality of times a process of extracting the header of a picture from the entry position recited in the entry map, reading out the size of the picture from the extracted header, and identifying a recording position of the next picture based on the read-out size. Such an analysis involves frequent accesses to the stream. Therefore, it takes quite a time to read out merely a picture that precedes by three or five pictures. Since the random access with the accuracy of pictures requires quite a lot of time, when a function to display a preceding or following picture or 10 pictures at once in response to a user operation is to be added to the slide show, it is difficult to realize such a function having as high a level of usability as the producer side expects.

The entry point for the slide show indicates entry addresses of pictures in the video stream in correspondence with the playback times. The playlist mark information specifies each piece of picture data.

With this structure in which each piece of picture data is specified by the entry point and the playlist mark information, when a random access with the accuracy of pictures, such as an access to a picture that precedes by one picture or three pictures, is requested, the random access with the accuracy of pictures is realized without the analysis of the video stream.

Since it is possible to go to a recording position in the video stream from an arbitrary time point on a time axis, and it is possible to realize a random access with the accuracy of pictures, such as an access to a picture that precedes by one picture or three pictures, it is possible to create an application that can display a preceding or following picture or several pictures at once in response to a user operation.

In the embodiments so far, the video stream for the stereoscopic playback is in the interleaved format. However, when the interleaved format is adopted, the plurality of pieces of picture data constituting the slide show are arranged in the order of L-L-L, R-R-R, for example. When the slide show is constituted from the plurality of pieces of picture data arranged in this way, and the plurality of pieces of picture data are specified by the respective entry points, the entry points are arranged in the order of 00:00→00:01→00:02, 00:00→00:01→00:02.

This order does not conform to the restriction to the entry map that the entry points in the entry map should be arranged in the ascending order of playback times. In view of this problem, the picture data constituting the left-view stream and the picture data constituting the right-view stream are incorporated into one TS, as a restriction unique to the case where the application type of the AV clip is slide show. With this structure, it is possible to arrange the picture data constituting the left-view stream and the picture data constituting the right-view stream, in the order of L-R-L-R-L-R, and to arrange the entry points of these picture data so that the playback times in the entry points are arranged in the order of 00:00→00:00→00:01→00:01→00:02→00:02→00:03→00:03.

In this way, a plurality of pieces of picture data constituting one slide are arranged in the order of time, and then the picture data are multiplexed. Then a block of the multiplexed picture data is recorded into continuous areas on the recording medium.

Figure 48A:
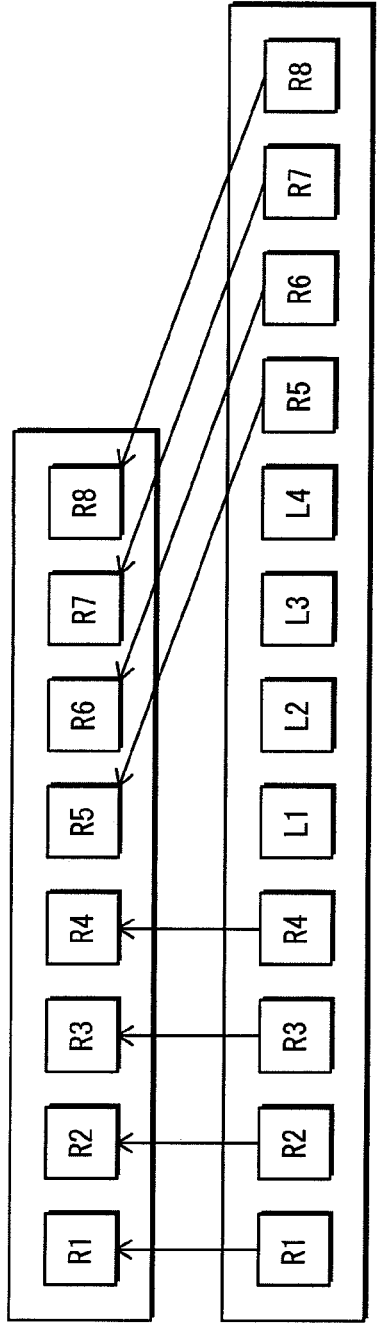
FIGS. 48A and 48B show the internal structure of the video stream.
Figure 48B:
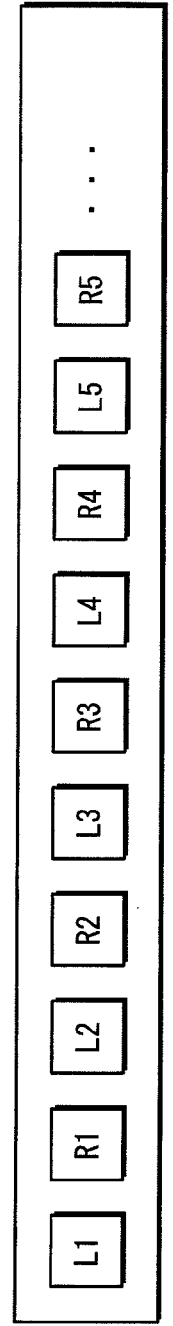

FIGS. 48A and 48B show the internal structure of the video stream. FIG. 48A shows the video stream constituting the movie application. The second row of FIG. 48A shows the stereoscopic interleaved stream file in which the base-view video stream and the dependent-view video stream are stored in the interleaved form. In FIG. 48A, R1, R2, R3, and R4 represent the picture data constituting the dependent-view video stream, L1, L2, L3, and L4 represent the picture data constituting the base-view video stream, and R5, R6, R7, and R8 represent the picture data constituting the dependent-view video stream.

The first row of FIG. 48A shows the stream file of the dependent-view video stream which is in substance the same as the interleaved stream file. It is constituted from the file name and extension "m2ts". The stream file of the dependent-view video stream is composed of R1, R2, R3, R4, R5, R6, R7, and R8. Thus, the dependent-view video stream is used in the movie application.

The second row of FIG. 48B shows I-pictures in the still picture slide show. The sign "L" represent a left-view picture, and the sign "R" represent a right-view picture. As shown in FIG. 48B, the left-view pictures and the right-view pictures are multiplexed and recorded in the order of "L", "R", "L", "R.", "L", "R".

The access unit delimiter provided at the start of picture data being abase-view still picture precedes the start of picture data being a dependent-view still picture, and the end of the picture data being the dependent-view still picture precedes the access unit delimiter representing the start of picture data being abase-view still picture that is to be played back following the first base-view still picture. The source packets storing these access unit delimiters representing the starts of picture data being base-view still pictures and the source packets storing these access unit delimiters representing the starts of picture data being dependent-view still pictures do not store picture data other than the picture data of their own. That is to say, the picture data representing the base-view still picture and the picture data representing the dependent-view still picture are arranged in the recording area in the order of base-view→dependent-view→base-view→dependent-view in the self-contained manner.

However, as shown in the first row of FIG. 48B, the dependent-view video stream is not used. Thus the slide show application cannot access the right-view image as the dependent-view stream.

The reason that the left-view picture data and the right-view picture data are multiplexed is that, if the picture data was recorded on the recording medium as one Extent, the condition for the smallest length of Extent would not be satisfied. To satisfy the condition for the smallest length of Extent, a plurality of pieces of picture data are arranged and multiplexed in the time order as described above, and multiplexed TSs are recorded. With this structure, it is possible to segment and record the TSs so that the condition for the smallest length of Extent is satisfied.

In contrast, due to the smallness of the size, the reading efficiency is increased when a plurality of pieces of data for displaying one still picture are arranged as one block.

The following describes how the entry map is set when the information (application_type) for indicating the type of application in the AV clip indicates the slide show (application_type=2 or 3). Suppose that, for an IDR picture that is present in the slide show, PTSs are set so that the playback is performed at a plurality of time points (t1 through t7) on the time axis. In that case, the entry map is set for the slide show as shown in FIG. 49. FIG. 49 shows the internal structure of the entry map that is set for the slide show.

In the slide show, the entry map is set to specify all the pictures. Thus the entry points #1 through #7 in the entry map specify the playback time points t1 through t7 of each IDR picture in the slide show as the entry times (PTS_EP_start) and are associated with the entry positions (SPN_EP_start).

In this structure, the playback time points of each IDR picture are specified as the entry times by the entry map. With this structure, when one of the playback time points t1 through t7 is to be selected as the random access destination, an overhead due to going through a preceding IDR picture does not occur.

The first row of FIG. 49 shows the setting of the playlist mark information. The second row shows the specification of In-time in the playitem information. The third row shows the L and R pictures. The fourth row shows the entry map. The fifth row shows the source packet sequence.

In the slide show, the entry map is set to specify all the left-view and right-view pictures. Thus the entry points #1 through #7 in the entry map specify the playback time points t1 through t7 of each IDR picture in the slide show as the entry times (PTS_EP_start) and are associated with the entry positions (SPN_EP_start).

When a random access is performed by specifying the time point t6 among the time points t2, t4, and t6 as the access destination, it is possible to access the recording position (SPN=N6) corresponding to the time point t6 without going through a preceding left-view picture because the time point t6 itself is specified by PTS_EP_start.

Since all the left-view pictures are specified by PTS_EP_start, it is possible to execute the random access with use of the time information at high speeds in the slide show.

When "Application type" in the clip information is set to "2" or "3" along with the above-described setting of the entry map, it is possible to indicate that, in the entry map, entries corresponding to all the pictures constituting the slide show are present. This makes it possible to determine the range of data to be read out by referencing the entries in the entry map, and eliminates the need to analyze the preceding or following streams.

This completes the description of the recording medium. Next, the playback device will be described in detail. When the playback device performs a playback of the slide show, the playback control engine performs the playback in accordance with the procedure shown in FIG. 50.

Figure 50:
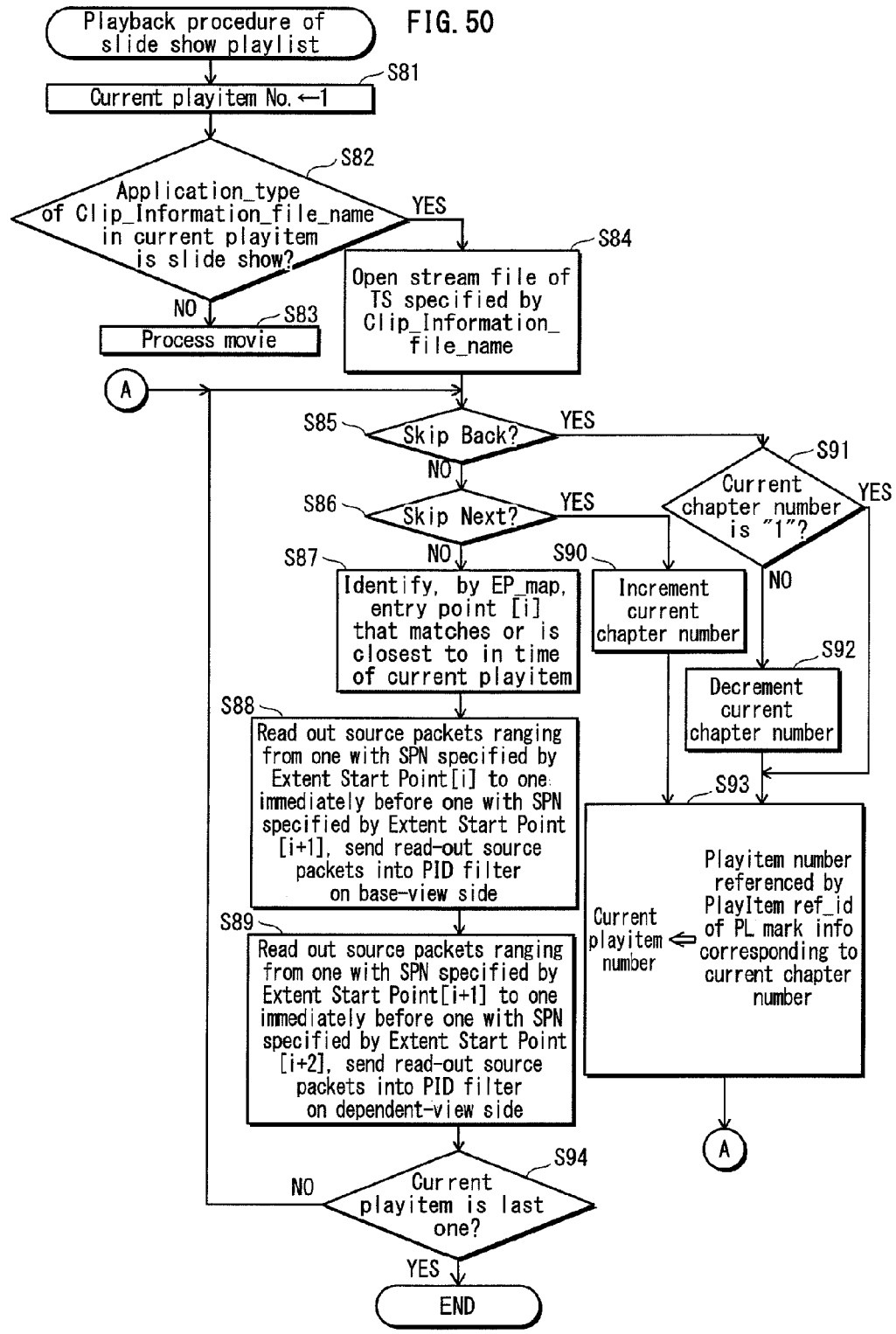
FIG. 50 shows the playback procedure of the slide show playlist.

FIG. 50 shows the playback procedure of the slide show playlist. In step S81, the current playitem number is initialized to "1". In step S82, it is judged whether or not the application type of "clip_Information_file_name" in the current playitem is "slide show". When the application type is "movie", the control proceeds to step S83 in which the process for the movie application is performed.

When the application type is "slide show", the control enters a loop in which the process composed of the steps S84 through S90 is repeated. In this loop, judgments are made in steps S85 and S86. After this, the steps are performed as follows. An entry point [i] that matches or is closest to the In-time of the current playitem is identified from the entry map (step S87), the source packets from the source packet with the SPN specified by Extent Start Point [i] to the source packet immediately before the source packet with the SPN specified by Extent Start Point [i+1.] are read out and supplied to the PID filter on the base-view side (step S88), and the source packets from the source packet with the SPN specified by Extent Start Point [i+1] to the source packet immediately before the source packet with the SPN specified by Extent Start Point [i+2] are read out and supplied to the PID filter on the dependent-view side (step S89). The steps S87 through S89 are repeated until the current playitem number becomes the last playitem number (step S94). Unless it is judged in step S94 that the current playitem number is the last playitem number, the current playitem number is incremented and the control returns to step S85.

In step S85, it is judged whether or not the skip back operation has been made. In step S86, it is judged whether or not the skip next operation has been made. When it is judged that the skip next operation has been made, the current chapter number is incremented (step S90). When it is judged that the skip back operation has been made, it is judged whether or not the current chapter number is "1" (step S91). When it is judged that the current chapter number is not "1", the current chapter number is decremented (step S92).

In step S93, the current playitem number is set to the playitem number that is referenced by "Playitem_ref_id" of the PlayListMark corresponding to the current chapter number, and then the control proceeds to step S55.

As described above, according to the present embodiment, an arbitrary pair of picture data of a left-view picture and picture data of a right-view picture can be read out and played back, without analysis of stream. With this structure, a slide-show application that can access an arbitrary piece of picture data by a random access according to a user operation can be easily realized.

Embodiment 7

The present embodiment explains about the demultiplexing unit, decoder, and hardware scale of the plane memory.

The demultiplexing unit of the present embodiment includes as many pairs of a source depacketizer and a PID filter as the number of stream input lines.

Figure 51A:
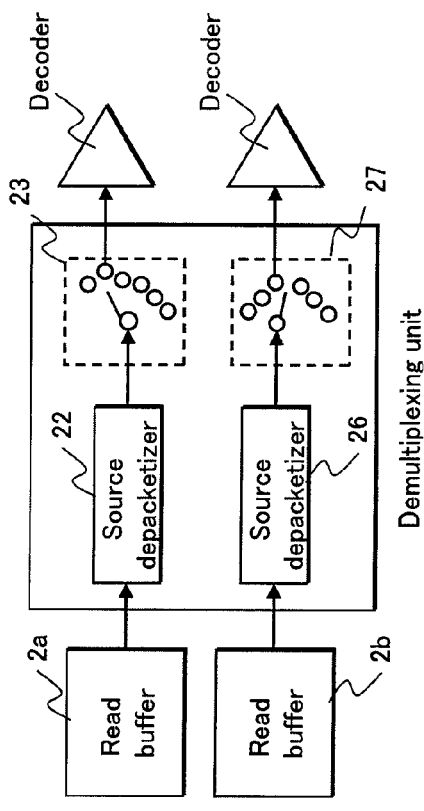
FIGS. 51A and 51B show the internal structures of the demultiplexing unit and the video decoder.
Figure 51B:
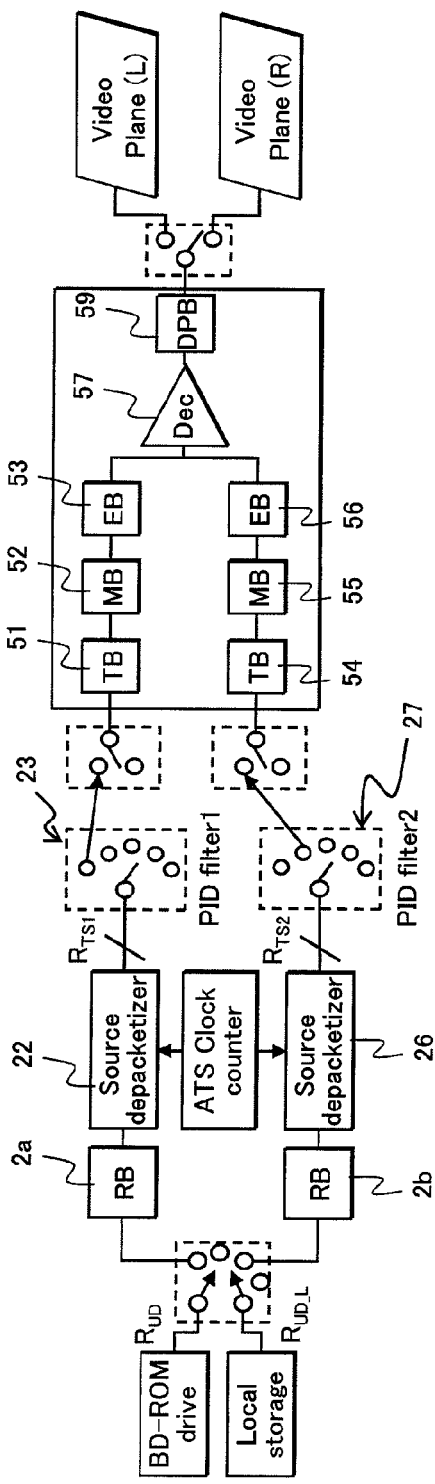

FIGS. 51A and 51B show the internal structures of the demultiplexing unit and the video decoder.

FIG. 51A shows the decoder model of the demultiplexing unit. In this example, the demultiplexing unit includes two pairs of a source depacketizer and a PID filter. This is because originally the demultiplexing unit processes two lines of stream inputs from two recording mediums. In the 2D playback mode, the demultiplexing unit processes stream inputs from two recording mediums, and in the 3D playback mode, the demultiplexing unit processes two lines of stream inputs that are "L" and "R", and "2D" and "depth".

As shown in FIG. 51A, the demultiplexing unit includes a source depacketizer 22, a PID filter 23, a source depacketizer 27, and a PID filter 28.

The source depacketizer 22, in the state where a source packet is stored in a read buffer 2a, in the instant when the value of the ATC generated by the ATC counter and the value of the ATS of the source packet stored in the read buffer 2a become identical, transfers only the source packet (TS packet) to the PID filter 23 in accordance with the recording rate of the AV clip. In the transfer, the input time to the decoder is adjusted in accordance with the ATS of each source packet.

The PID filter 23 outputs, among the TS packets output from the source depacketizer 22, TS packets whose PIDs match the PIDs required for the playback, to the decoders according to the PIDs.

The source depacketizer 26, in the state where a source packet is stored in a read buffer 2b, in the instant when the value of the ATC generated by the ATC counter and the value of the ATS of the source packet stored in the read buffer 2b become identical, transfers only the source packet (TS packet) to the PID filter 27 in accordance with the system rate of the AV clip. In the transfer, the input time to the decoder is adjusted in accordance with the ATS of each source packet.

The PID filter 27 outputs, among the TS packets output from the source depacketizer 26, TS packets whose PIDs match the PIDs required for the playback, to the decoders according to the PIDs.

Next, the internal structure of a primary video decoder 31 will be described.

FIG. 51B shows the internal structure of the primary video decoder 31. As shown in FIG. 51B, the PID filter 23 includes a TB 51, an MB 52, an EB 53, a TB 54, an MB 55, an EB 56, a decoder core 57, a buffer switch 58, a DPB 59, and a picture switch 60.

The Transport Buffer (TB) 51 is a buffer for temporarily storing a TS packet_containing the left-view video stream, as it is after being output from the PID filter 23.

The Multiplexed Buffer (MB) 52 is a buffer for temporarily storing a PES packet when the video stream is output from the TB to the EB. When the data is transferred from the TB to the MB, the TS header is removed from the TS packet.

The Elementary Buffer (EB) 53 is a buffer for storing the video access unit in the encoded state. When the data is transferred from the MB to the EB, the PES header is removed.

The Transport Buffer (TB) 54 is a buffer for temporarily storing a TS packet containing the right-view video stream, as it is after being output from the PID filter.

The Multiplexed Buffer (MB) 55 is a buffer for temporarily storing a PES packet when the video stream is output from the TB to the EB. When the data is transferred from the TB to the MB, the TS header is removed from the TS packet.

The Elementary Buffer (EB) 56 is a buffer for storing the video access unit in the encoded state. When the data is transferred from the MB to the EB, the PES header is removed.

The decoder core 57 generates a frame/field image by decoding each access unit constituting the video stream at predetermined decoding times (DTSs). Since there are a plurality of compress-encoding methods, such as MPEG2, MPEG4 AVC, and VC1, that can be used to compress-encode the video stream that is to be multiplexed into the AV clip, the decoding method of the decoder core 57 is selected in accordance with the stream attribute. When it decodes the picture data constituting the base-view video stream, the decoder core 57 performs a motion compensation using the picture data, which exist in the future and past directions, as reference pictures. When it decodes each picture data constituting the dependent-view video stream, the decoder core 57 performs a motion compensation using the picture data, which constitute the base-view video stream, as reference pictures. After the picture data are decoded in this way, the decoder core 57 transfers the decoded frame/field image to the DPB 59, and transfers the corresponding frame/field image to the picture switch at the timing of the display time (PTS).

The buffer switch 58 determines from which of the EB 53 and the EB 56 the next access unit should be extracted, by using the decode switch information that was obtained when the decoder core 57 decoded the video access units, and transfers a picture from either the EB 53 or the EB 56 to the decoder core 57 at the timing of the decoding time (DTS) assigned to the video access unit. Since the DTSs of the left-view video stream and the right-view video stream are set to arrive alternately in units of pictures on the time axis, it is preferable that the video access units are transferred to the decoder core 57 in units of pictures when decoding is performed ahead of schedule disregarding the DTSs.

The Decoded Picture Buffer (DPB) 59 is a buffer for temporarily storing the decoded frame/field image. The DPB 59 is used by the video decoder 57 to refer to the decoded pictures when the video decoder 57 decodes a video access unit such as the P-picture or the B-picture having been encoded by the inter-picture prediction encoding.

The picture switch 60, when the decoded frame/field image transferred from the video decoder 57 is to be written into a video plane, switches the writing destination between the left-view video plane and the right-view video plane. When the left-view stream is targeted, non-compressed picture data is written into the left-view video plane in a moment, and when the right-view stream is targeted, non-compressed picture data is written into the right-view video plane in a moment.

The operation of the video decoder in the mode switching is described. In the LR method, the 2D image is displayed when the mode is switched to the mode in which only the left-view images are output. In the depth method, the 2D image is displayed when the processing of the depth information is stopped and the depth information is not added. Note that the LR method and the depth method require different data. Thus, when switching between them is performed, the streams to be decoded need to be re-selected.

Next, the size of the decoder and the plane memory in the playback device will be described.

The determination of whether the device is to be provided with one decoder or two decoders, or one plane or two planes, is made based on the combination of the stream type and the stereoscopic method.

When the 3D-LR method is adopted and the playback target is an MVC video stream, the playback device is provided with one decoder and two planes.

When the 3D-Depth method is adopted, the playback device is provided with one decoder and two planes, and a parallax image generator is required. This also applies to the primary video stream and the secondary video stream. FIGS. 52A and 52B show the device structures including one decoder and two planes in the 3D-LR method and the 3D-Depth method. FIG. 52A shows the device structure including one decoder and two planes when the 3D-LR method is adopted. FIG. 52B shows the device structure including one decoder and two planes when the 3D-Depth method is adopted.

The reason that the playback device has one decoder when the MVC video stream is played back is that non-compressed left-view and right-view picture data are used as reference images to realize the motion compensation for the macro blocks of each piece of compressed picture data. The non-compressed left-view and right-view picture data to be used as reference images are stored in a decoded-picture buffer.

This completes the description of the video decoder and the video plane.

For the PG stream: the playback device is provided with one decoder and one plane when the "1 plane+offset" method is adopted; and the playback device is provided with two decoders and two planes when the 3D-LR method or the 3D-Depth method is adopted.

For the IG stream: the playback device is provided with one decoder and one plane when the "1 plane+offset" method is adopted; and the playback device is provided with two decoders and two planes when the 3D-LR method is adopted.

For the text subtitle stream for which the 3D-LR method cannot be adopted: the playback device is provided with one decoder and one plane when the "1 plane+off set" method is adopted; and the playback device is provided with one decoder and two planes when the 3D-Depth method is adopted.

Next, the internal structure of the PG stream, and the internal structure of the PG decoder for decoding the PG stream will be described.

Each of the left-view PG stream and the right-view PG stream includes a plurality of display sets. The display set is a set of functional segments that constitute one screen display. The functional segments are processing units that are supplied to the decoder while they are stored in the payloads of the PES packets which each have the size of approximately 2 KB, and are subjected to the playback control with use of the DTSs and PTSs.

The display set falls into the following types.

A. Epoch-Start Display Set

The epoch-start display set is a set of functional segments that start the memory management by resetting the composition buffer, code data buffer, and graphics plane in the graphics decoder. The epoch-start display set includes all functional segments required for composition of the screen.

B. Normal-Case Display Set

The normal-case display set is a display set that performs the composition of the screen while continuing the memory management of the composition buffer, code data buffer, and graphics plane in the graphics decoder. The normal-case display set includes functional segments that are differentials from the preceding display set.

C. Acquisition-Point Display Set

The acquisition-point display set is a display set that includes all functional segments required for composition of the screen, but does not reset the memory management of the composition buffer, code data buffer, and graphics plane in the graphics decoder. The acquisition-point display set may include functional segments that are different from those in the previous display set.

D. Epoch-Continue Display Set

The epoch-continue display set is a display set that continues the memory management of the composition buffer, code data buffer, and graphics plane in the playback device as it is when the connection between a playitem permitting the playback of the PG stream and a playitem immediately before the playitem is the "seamless connection" (CC=5) that evolves a clean break. In this case, the graphics objects obtained in the object buffer and the graphics plane are kept to be present in the object buffer and the graphics plane, without being discarded.

Certain time points on the playback time axis of the STC sequence are assigned to the start point and end point of these display sets, and the same times are assigned to the left view and to the right view. Also, for the left-view PG stream and the right-view PG stream, the types of the display sets that are present on the same time point on the time axis are the same. That is to say, when the display set on the left view side is the epoch-start display set, the display set on the right view side that is at the same time point on the time axis of the STC sequence is the epoch-start display set.

Further, when the display set on the left view side is the acquisition-point display set, the display set on the right view side that is at the same time point on the time axis of the STC sequence is the acquisition-point display set.

Each display set includes a plurality of functional segments. The plurality of functional segments include the following.

(1) Object Definition Segment

The object definition segment is a functional segment for defining the graphics object. The object definition segment defines the graphics object by using a code value and a run length of the code value.

(2) Pallet Definition Segment

The pallet definition segment includes pallet data that indicates correspondence among each code value, brightness, and red color difference/blue color difference. The same correspondence among the code value, brightness, and color difference is set in both the pallet definition segment of the left-view graphics stream and the pallet definition segment of the right-view graphics stream.

(3) Window Definition Segment

The window definition segment is a functional segment for defining a rectangular frame called "window" in the plane memory that is used to extend the non-compressed graphics object onto the screen. The rendering of the graphics object is restricted to the inside of the plane memory, and the rendering of the graphics object is not performed outside the window.

Since a part of the plane memory is specified as the window for displaying the graphics, the playback device does not need to perform the rendering of the graphics for the entire plane. That is to say, the playback device only needs to perform the graphics rendering onto the window that has a limited size. The rendering of the part of the plane for display other than the window can be omitted. This reduces the load of the software on the playback device side.

(4) Screen Composition Segment

The screen composition segment is a functional segment for defining the screen composition using the graphics object, and includes a plurality of control items for the composition controller in the graphics decoder. The screen composition segment is a functional segment that defines in detail the display set of the graphics stream, and defines the screen composition using the graphics object. The screen composition falls into the types such as Cut-In/-Out, Fade-In/-Out, Color Change, Scroll, and Wipe-In/-Out. With use of the screen composition defined by the screen composition segment, it is possible to realize display effects such as deleting a subtitle gradually, while displaying the next subtitle.

(5) End Segment

The end segment is a functional segment that is located at the end of a plurality of functional segments belonging to one display set. The playback device recognizes a series of segments from the screen composition segment to the end segment as the functional segments that constitute one display set.

In the PG stream, the start time point of the display set is identified by the DTS of the PES packet storing the screen composition segment, and the end time point of the display set is identified by the PTS of the PES packet storing the screen composition segment.

The left-view graphics stream and the right-view graphics stream are packetized elementary streams (PES). The screen composition segment is stored in the PES packet. The PTS of the PES packet storing the screen composition segment indicates the time when the display by the display set to which the screen composition segment belongs should be executed.

The value of the PTS of the PES packet storing the screen composition segment is the same for both the left-view video stream and the right-view video stream.

Decoder Models of PG Decoder

The PG decoder includes: a "coded data buffer" for storing functional segments read out from the PG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

The pipeline in the PG stream makes it possible to simultaneously executes the following processes: the process in which the graphics decoder decodes an object definition segment belonging to a certain display set and writes the graphics object into the graphics buffer; and the process in which a graphics object obtained by decoding an object definition segment belonging to a preceding display set is written from the object buffer to the plane memory.

FIGS. 53A and 53B show the internal structure of the graphics decoder for the PG stream. FIG. 53A shows a decoder model for displaying data in the "1 plane+offset" mode. FIG. 53B shows a decoder model for displaying data in the LR mode.

In FIGS. 53A and 53B, the graphics decoder itself is represented by a frame drawn by the solid line, and a portion that follows the graphics decoder is represented by a frame drawn by the chain line.

FIG. 53A shows the structure composed of one graphics decoder and one graphics plane. However, the output of the graphics plane branches to the left view and the right view. Thus two shift units are provided in correspondence with the outputs to the left view and the right view, respectively.

FIG. 53B shows that two series of "transport buffer"-"graphics decoder"-"graphics plane"-"CLUT unit" are provided so that the left-view stream and the right-view stream can be processed independently.

The offset sequence is contained in the dependent-view video stream. Thus, in the plane offset format, one graphics decoder is provided, and the output from the graphics decoder is supplied to the left view and the right view by switching therebetween.

The PG decoder performs the following to switch between 2D and 3D.

1. The mutual switching between the "1 plane+offset" mode and the 2D mode is performed seamlessly. This is realized by invalidating the "Offset".

2. When switching between the 3D-LR mode and the 2D mode is performed, the display of the subtitle temporarily disappears because the switching between the modes requires switching between PIDs. This is the same as the switching between streams.

3. When switching between the 3D-LR mode and the L mode is performed, switching is made to the display of only L (base-view side). The seamless switching is possible, but there is a possibility that the display position may be shifted.

When switching between the 3D-depth mode and the 2D mode is performed, it is possible to switch between graphics objects seamlessly by, in the background while the 2D is displayed, generating the left-view and right-view graphics objects in advance by decoding the depth information indicated by grayscale.

When the switching is executed by the PG decoder, switching from the depth mode or the "1 plane+offset" to the 2D mode is easy. However, in the case of the 3D-LR method, the graphics objects for the stereoscopic viewing and the 2D are different from each other. Thus, the PG stream that is processed when the switching is to be made needs to be changed, and there is a possibility that the graphics object is not displayed until the next PG stream is supplied.

To prevent the provision of a period in which the graphics object is not displayed, switching to only the base-view graphics object, not to the front-view 2D graphics object, is available. In this case, an images lightly shifted to the left may be displayed. Also, the management data may be set to indicate which method should be used when the stereoscopic PG is switched to the 2D PG.

Decoder Models of Text Subtitle Decoder

The text subtitle decoder is composed of a plurality of pieces of subtitle description data.

The text subtitle decoder includes: a "subtitle processor" for separating the text code and the control information from the subtitle description data; a "management information buffer" for storing the text code separated from the subtitle description data; a "text render" for extending the text code in the management information buffer to the bit map by using the font data; an "object buffer" for storing the bit map obtained by the extension; and a "rendering control unit" for controlling the text subtitle playback along the time axis by using the control information separated from the subtitle description data.

The text subtitle decoder is preceded by: a "font preload buffer" for preloading the font data; a "TS buffer" for adjusting the input speed of the TS packets constituting the text subtitle stream; and a "subtitle preload buffer" for preloading the text subtitle stream before the playback of the playitem.

The graphics decoder is followed by a "graphics plane"; a "CLUT unit" for converting the pixel codes constituting the graphics object stored in the graphics plane into values of brightness and color difference based on the pallet definition segment; and a "shift unit" for the plane shift.

FIGS. 54A and 54B show the internal structure of the text subtitle decoder. FIG. 54A shows a decoder model of the text subtitle decoder in the "1 plane+offset" mode. FIG. 54B shows a decoder model of the text subtitle decoder in the 3D-LR method. In FIGS. 54A and 54B, the text subtitle decoder itself is represented by a frame drawn by the solid line, a portion that follows the text subtitle decoder is represented by a frame drawn by the chain line, and a portion that precedes the text subtitle decoder is represented by a frame drawn by the dotted line.

FIG. 54A shows that the output of the graphics plane branches to the left view and the right view. Thus two shift units are provided in correspondence with the outputs to the left view and the right view, respectively.

FIG. 54B shows that the left-view graphics plane and the right-view graphics plane are provided, and that the bit map extended by the text subtitle decoder is written into the graphics planes. In the text subtitle decoder of the 3D-LR method, the color pallet information has been extended, and three colors have been added for the sake of "depth" in addition to the three colors for the characters, background, and edge of the subtitle. The rendering engine can render the subtitle.

The text subtitle stream differs from the PG stream as follows. That is to say, the font data and the character code are sent, not the graphics data is sent as the bit map, so that the rendering engine generates the subtitle. Thus the stereoscopic viewing of the subtitle is realized in the "1 plane+offset" mode. When the text subtitle is displayed in the "1 plane+offset" mode, switching between modes is made by switching between font sets, or switching between rendering methods. There is also known a method for switching between modes by defining the L/R font set or the OpenGL font set. It is also possible for the rendering engine to perform the 3D display.

In the 3D-LR mode, the stereoscopic playback is realized by defining the font set and the OpenGL font set for the base view independently of the font set and the OpenGL font set for the dependent view. It is also possible for the rendering engine to render the 3D font to realize the stereoscopic playback.

In the 3D-depth mode, the depth images are generated by the rendering engine.

This completes the description of the text subtitle stream and the text subtitle decoder. Next, the internal structure of the IG stream and the structure of the IG decoder will be described.

IG Stream

Each of the left-view IG stream and the right-view IG stream includes a plurality of display sets. Each display set includes a plurality of functional segments. As is the case with the PG stream, the display set falls into the following types. epoch-start display set, normal-case display set, acquisition-point display set, and epoch-continue display set. The plurality of functional segments belonging to these display sets include the following types.

(1) Object Definition Segment

The object definition segment of the IG stream is the same as that of the PG stream. However, the graphics object of the IG stream defines the in-effect and out-effect of pages, the normal, selected, and active states of the button members. The object definition segments are grouped into those that define the same state of the button members, and those that constitute the same effect image. The group of object definition segments defining the same state is called "graphics data set".

(2) Pallet Definition Segment

The pallet definition segment of the IG stream is the same as that of the PG stream.

(3) Interactive Control Segment

The interactive control segment includes a plurality of pieces of page information. The page information is information that defines a screen composition of the multi-page menu. Each piece of page information includes an effect sequence, a plurality of pieces of button information, and a reference value of a pallet identifier.

The button information is information that realizes an interactive screen composition on each page constituting the multi-page menu by displaying the graphics object as one state of a button member.

The effect sequence constitutes the in-effect or the out-effect with use of the graphics object, and includes effect information, where the in-effect is played back before a page corresponding to the page information is displayed, and the out-effect is played back after the page is displayed.

The effect information is information that defines each screen composition for playing back the in-effect or the out-effect. The effect information includes: a screen composition object that defines a screen composition to be executed in the window (partial area) defined by the window definition segment on the graphics plane; and effect period information that indicates a time interval between the current screen and the next screen in the same area.

The screen composition object in the effect sequence defines a control that is similar to the control defined by the screen composition segment of the PG stream. Among the plurality of object definition segments, an object definition segment that defines the graphics object used for the in-effect is disposed at a location that precedes an object definition segment that defines the graphics object used for the button member.

Each piece of button information in the page information is information that an interactive screen composition on each page constituting the multi-page menu by displaying the graphics object as one state of a button member. The button information includes a set button page command that, when a corresponding button member becomes active, causes the playback device to perform the process of setting a page other than the first page as the current page.

To make it possible for the offset in the plane shift to be changed for each page during a playback of the IG stream, a navigation command for changing the offset is incorporated into the button information, and the "auto-activate" of the navigation command is defined in the corresponding piece of button information, in advance. This makes it possible to change automatically the value or direction of the offset defined in the stream registration information of the IG stream.

(4) End Segment

The end segment is a functional segment that is located at the end of a plurality of functional segments belonging to one display set. A series of segments from the interactive control segment to the end segment are recognized as the functional segments that constitute one display set.

The following are the control items of the interactive control segment that are the same for both the left-view graphics stream and the right-view graphics stream: button adjacency information; selection time-out time stamp; user time-out duration; and composition time-out information.

1. Button Adjacency Information

The button adjacency information is information that specifies a button to be changed to the selected state when a key operation specifying any of upward, downward, leftward, and rightward is performed while a certain button adjacent to the specified button is in the selected state.

2. Selection Time-Out Time Stamp

The selection time-out time stamp indicates a time-out time that is required to automatically activate a button member in the current page and cause the playback device to execute the button member.

3. User Time-Out Duration

The user time-out duration indicates a time-out time that is required to return the current page to the first page so that only the first page is displayed.

4. Composition Time-Out Information

The composition time-out information indicates a time period that is required to end an interactive screen display by the interactive control segment. With respect to the IG stream, the start time point of a display set is identified by the DTS of the PES packet storing the interactive control segment, and the end time point of the display set is identified by the composition time-out time of the interactive control segment. The same DTS and the same composition time-out time are set for both the left view and the right view.

Decoder Models of IG Decoder

The IG decoder includes: a "coded data buffer" for storing functional segments read out from the IG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

Figure 55A:
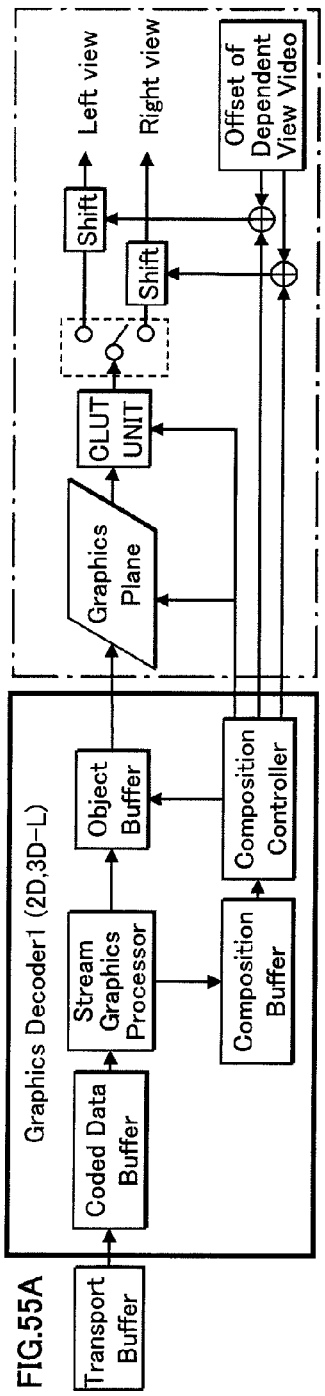
FIGS. 55A and 55B show decoder models of the IG decoder.
Figure 55B:
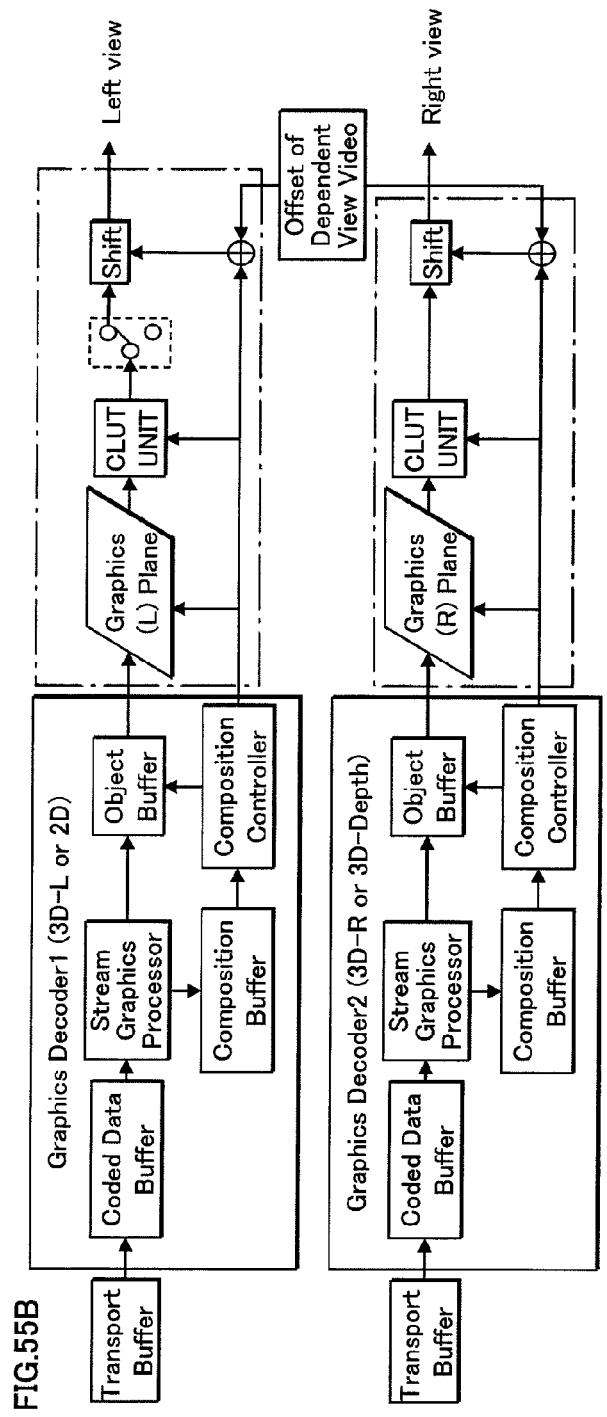

FIGS. 55A and 55B show decoder models of the IG decoder. In FIGS. 55A and 55B, the IG decoder itself is represented by a frame drawn by the solid line, a portion that follows the graphics decoder is represented by a frame drawn by the chain line, and a portion that precedes the IG decoder is represented by a frame drawn by the dotted line.

FIG. 55A shows a decoder model for displaying the 2D-format IG stream in the LR format in the "1 plane+offset" mode. FIG. 55B shows a decoder model of the IG stream for displaying LR-format data.

These decoders include a circuit for reflecting values of system parameters onto the offsets so that the program can control the depth information of the menu graphics.

FIG. 55B shows a two-decoder model that enables the offset values to be changed with use of a command. Accordingly, in this decoder model, the depth information of the menu can be changed by the command. Note that different offset values may be set for the left view and the right view. On the other hand, in the depth method, the offset is invalid.

The composition controller in the graphics decoder realizes the initial display of the interactive screen by displaying the current button, among a plurality of button members in the interactive screen, by using the graphics data of the graphics data set corresponding to the selected state, and displaying the remaining buttons by using the graphics data set corresponding to the normal state.

When a user operation specifying any of upward, downward, leftward, and rightward is performed, it writes, into the button number register, a number of a button member that is present in the direction specified by the user operation among a plurality of button members in the normal state and adjacent to the current button, the writing causing the button member having become newly the current button to change from the normal state to the selected state.

In the interactive screen, when a user operation for changing the button member from the selected state to the active state is performed, the interactive screen is updated by extracting the graphics data constituting the active state from the graphics data set and displaying the extracted graphics data. The update of the interactive screen should be executed in common to the left view and the right view. Thus it is preferable that the left-view graphics decoder and the right-view graphics decoder have in common a composition controller for the two-decoder model.

In the above-described case, the inter-changing is realized by using the same navigation command for both the left view and the right view of the stereoscopic IG stream, and setting the same button structure for both the 3D graphics object and the 2D graphics object.

When switching between the 2D IG stream and the stereoscopic IG stream, it is possible to change only the displayed graphics object when the attribute and number and the like of the navigation command and button information are the same for both. Switching from the 3D-LR mode to the display of only the L image can be made without reloading, but there is a possibility that the display position may be shifted. It is preferable that the playback device performs the switching based on a flag set to indicate which is adopted by the title producer.

The following
1. The mutual switching between the "1 plane+offset" mode and the 2D mode is performed seamlessly. This is realized by invalidating the "Offset".
2. When switching between the 3D-LR mode and the 2D mode is performed, the display of the subtitle temporarily disappears because the switching between the modes requires switching between PIDs. This is the same as the switching between streams.
3. When switching between the 3D-LR mode and the L mode is performed, switching is made to the display of only L (base-view side). The seamless switching is possible, but there is a possibility that the display position may be shifted.

When switching between the 3D-depth mode and the 2D mode is performed, it is possible to switch between graphics objects seamlessly by, in the background while the 2D is displayed, generating the left-view and right-view graphics objects in advance by decoding the depth information indicated by grayscale.

When the switching is executed by the PG decoder, switching from the depth mode or the "1 plane+offset" to the 2D mode is easy. However, in the case of the 3D-LR method, the graphics objects for the stereoscopic viewing and the 2D are different from each other. Thus, the PG stream that is processed when the switching is to be made needs to be changed, and there is a possibility that the graphics object is not displayed until the next PG stream is supplied.

To prevent the provision of a period in which the graphics object is not displayed, switching to only the base-view graphics object, not to the front-view 2D graphics object, is available. In this case, an image slightly shifted to the left may be displayed. Also, the management data may be set to indicate which method should be used when the stereoscopic PG is switched to the 2D PG.

The following are notes on switching between modes.
Reloading does not occur when switching between the "1 plane+offset" mode and the 2D mode is performed. This is because the IG stream does not need to be reloaded, and only invalidation of the offset is required.
Reloading occurs when switching between the 3D-LR mode and the 2D mode is performed. This is because the streams are different.
Reloading does not occur when switching between the 3D-depth mode and the 2D mode is performed if the decoding of the depth information has been completed at the preloading.
The seamless playback may not be guaranteed if the reloading of the IG stream occurs in connection with switching between the 2D mode and the 3D mode, even if the preload model, which reads out the IG stream into the memory before the start of the AV playback, has been adopted.

This completes the description of the IG stream and the IG decoder. Next, the plane memory will be described in detail.

The following describes the plane memory structure in the "1 plane+offset" mode method.

The layer synthesizing in the plane memory is achieved by executing a superimposing process onto all combinations of the layers in the layer model. In the superimposing process, pixel values of pixel data stored in the plane memories of the two layers are superimposed. The layer synthesizing by the layer synthesizing unit 208 is achieved by executing a superimposing process onto all combinations of two layers among the layers in the layer model. In the superimposing process, pixel values of pixel data stored in the plane memories of the two layers are superimposed in the layer model of the plane memory.

The superimposing between layers is performed as follows. A transmittance α as a weight is multiplied by a pixel value in unit of a line in the plane memory of a certain layer, and a weight of (1−transmittance α) is multiplied by a pixel value in unit of a line in the plane memory of a layer below the certain layer. The pixel values with these brightness weights are added together. The resultant pixel value is set as a pixel value in unit of a line in the layer. The layer synthesizing is realized by repeating this superimposing between layers for each pair of corresponding pixels in a unit of a line in adjacent layers in the layer model.

A multiplication unit for multiplying each pixel value by the transmittance to realize the layer synthesizing, an addition unit for adding up the pixels, and a scaling/positioning unit for performing the scaling and positioning of the secondary video are provided at locations after the plane memory, as well as the above-described CLUT unit, shift unit and the like.

Figure 56:
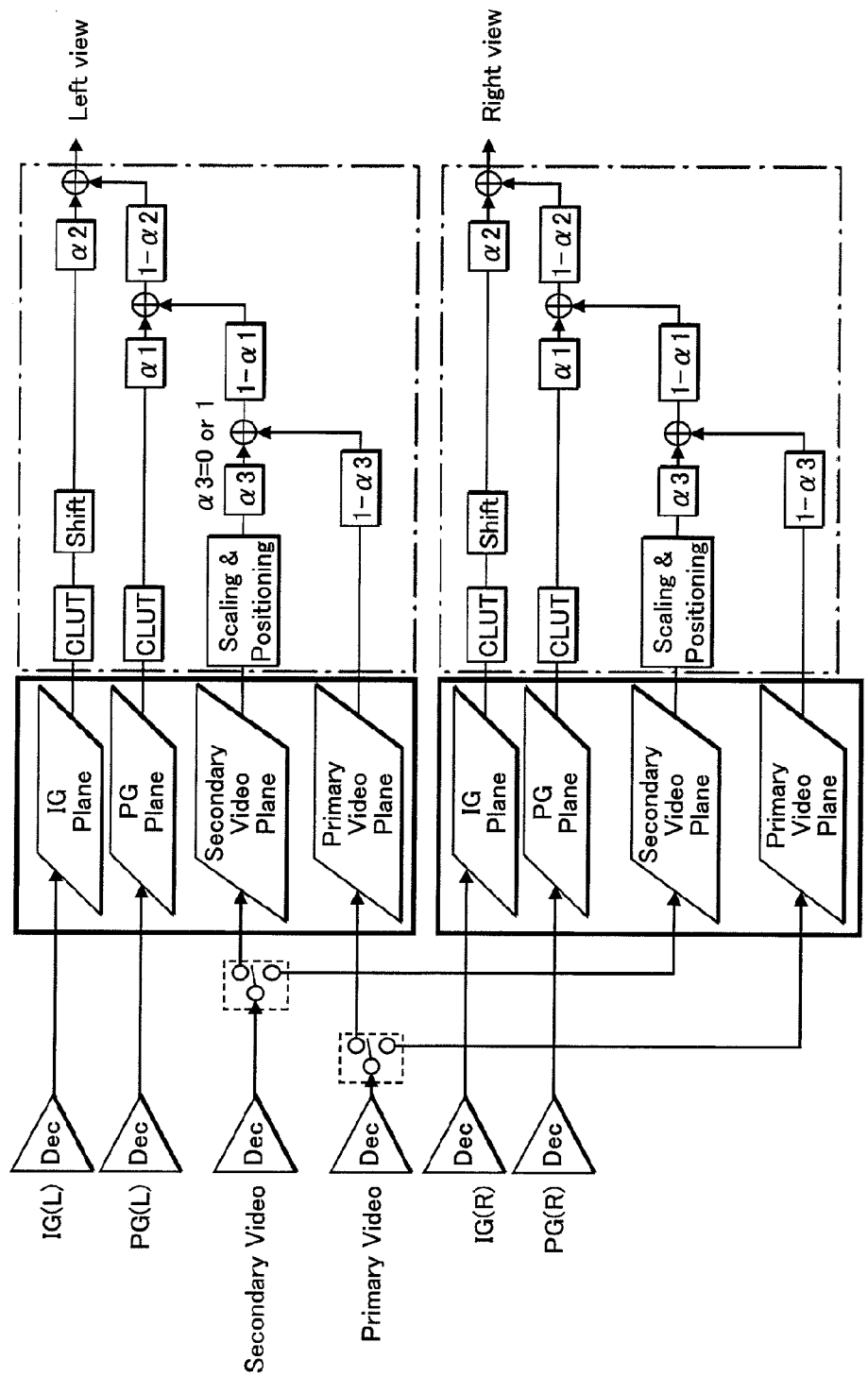
FIG. 56 shows a circuit structure for synthesizing the outputs of these decoder models and outputting the result in the 3D-LR mode.

FIG. 56 shows a circuit structure for synthesizing the outputs of these decoder models and outputting the result in the 3D-LR mode. In FIG. 56, the layer models composed of the primary video plane, secondary video plane, PG plane, and IG plane are represented by the frames drawn by the solid line, and portions that follow the plane memories are represented by the frames drawn by the chain line. As shown in FIG. 56, there are two above-described layer models. Also, there are two portions following the plane memories.

With the plane memory structure for the 3D-LR method which is provided with two pairs of a layer model and a portion following the plane memory, two pairs of the primary video plane, secondary video plane, PG plane, and IG plane are provided for the left view and the right view, and the outputs from each plane memory are synthesized, as the layer synthesizing, separately for the left view and the right view.

The secondary video plane, as is the case with the primary video plane, can be displayed in the 3D-LR mode or in the 3D-depth mode. Also, with the PG stream, it is possible to display a monoscopic image to pop up in front of the background, by assigning an offset to the 2D image.

Figure 57:
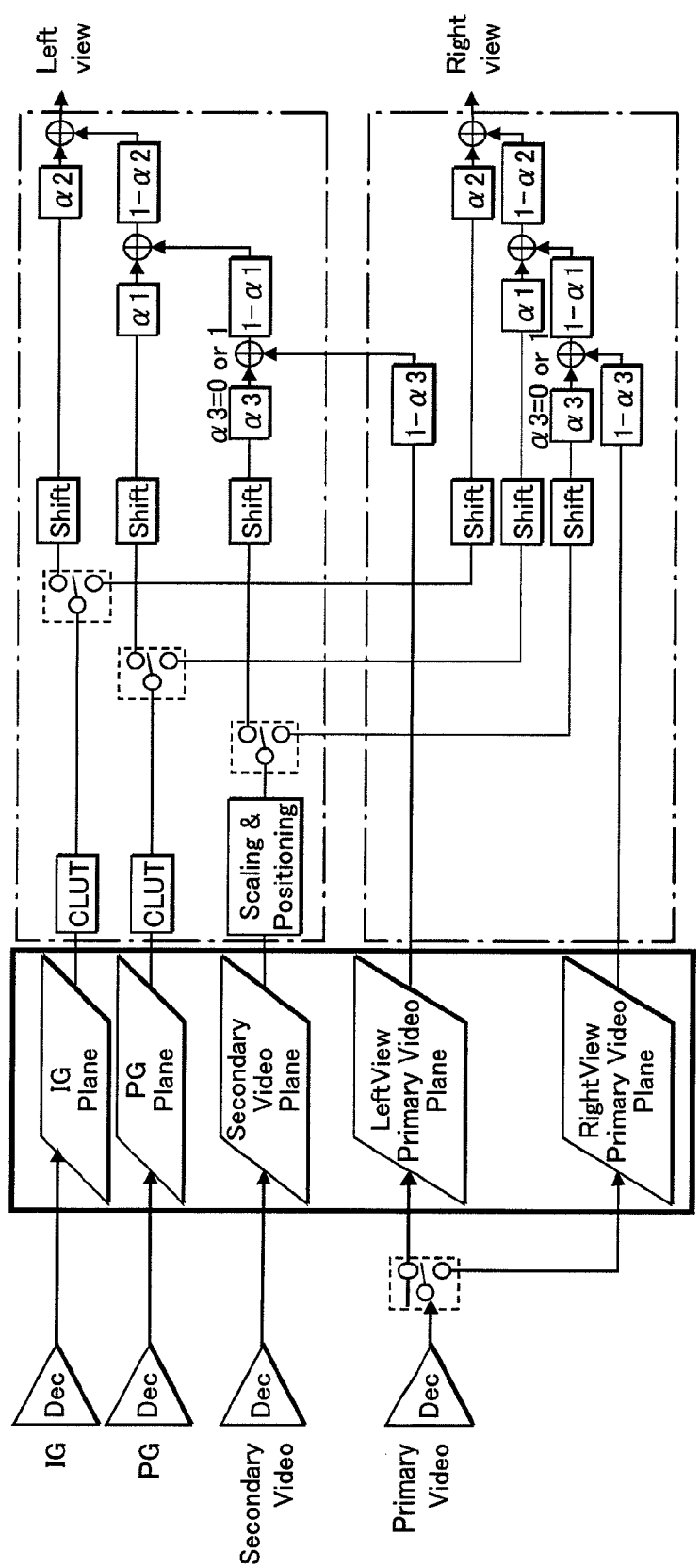
FIG. 57 shows a circuit structure for synthesizing the outputs of the decoder models and outputting the result in the "1 plane+offset" mode.

FIG. 57 shows a circuit structure for synthesizing the outputs of the decoder models and outputting the result in the "1 plane+offset" mode. In FIG. 57, the layer model composed of the primary video plane for the left view, primary video plane for the right view, secondary video plane, PG plane, and IG plane is represented by a frame drawn by the solid line, and a portion that follows the plane memory is represented by a frame drawn by the chain line. As shown in FIG. 57, there is only one above-described layer model. Also, there are two portions following the plane memory.

In the "1 plane+offset" mode method, the primary video planes are provided, one for each of the left view and the right view. The secondary video plane, PG plane, and IG plane are provided, one for both the left view and the right view. There is only one plane memory for both the left view and the right view. With this structure, the above-described layer synthesizing is performed onto the left-view and right-view outputs.

The playback device basically has the hardware structure including two decoders and two planes since it is required to support both the B-D presentation mode and the "1 plane+offset" mode. When the mode switches to the "1 plane+offset" mode or the 2D playback mode, the playback device has the "1 decoder+1 plane" structure, invalidating one of the two pairs of "1 decoder+1 plane".

When the mode switches from the 3D playback mode to the 2D playback mode, and the structure of the playback device changes from the "2 decoders+2 planes" structure to the "1 decoder+1 plane" structure, the target of the demultiplexing becomes only the TS packets constituting the L image. And the user having been viewing both the L and R images via the 3D glasses comes to view only the L image as soon as the mode switches from the 3D playback mode to the 2D playback mode.

This change from the viewing by two eyes to the viewing by one eye increases the burden of the eye, and the user may catch a chill. In view of this, in the present embodiment, when such a change occurs, the target of the PID filter is changed from the TS packets constituting the L and R images to the TS packets constituting the L image, and the memory management in the graphics decoder is reset. In this changing, the subtitle is temporarily deleted to prevent the user from catching a chill.

As described above, according to the present embodiment, the subtitle in the plane memory is temporarily reset when the decoder structure is switched from the 2-decoder structure to the 1-decoder structure. This lessens the burden of the eye that is caused when the viewing of the user changes from the viewing by two eyes to the viewing by one eye.

Embodiment 8

The present embodiment describes the production of the recording mediums described in the embodiments so far, namely, the production act of the recording medium.

Each of the recording mediums described in the embodiments so far can be produced as a BD-ROM disc that is a multi-layered optical disc, a BD-RE disc having compatibility with the BD-ROM disc, a BD-R disc, or an AVC-HD medium.

Figure 58:
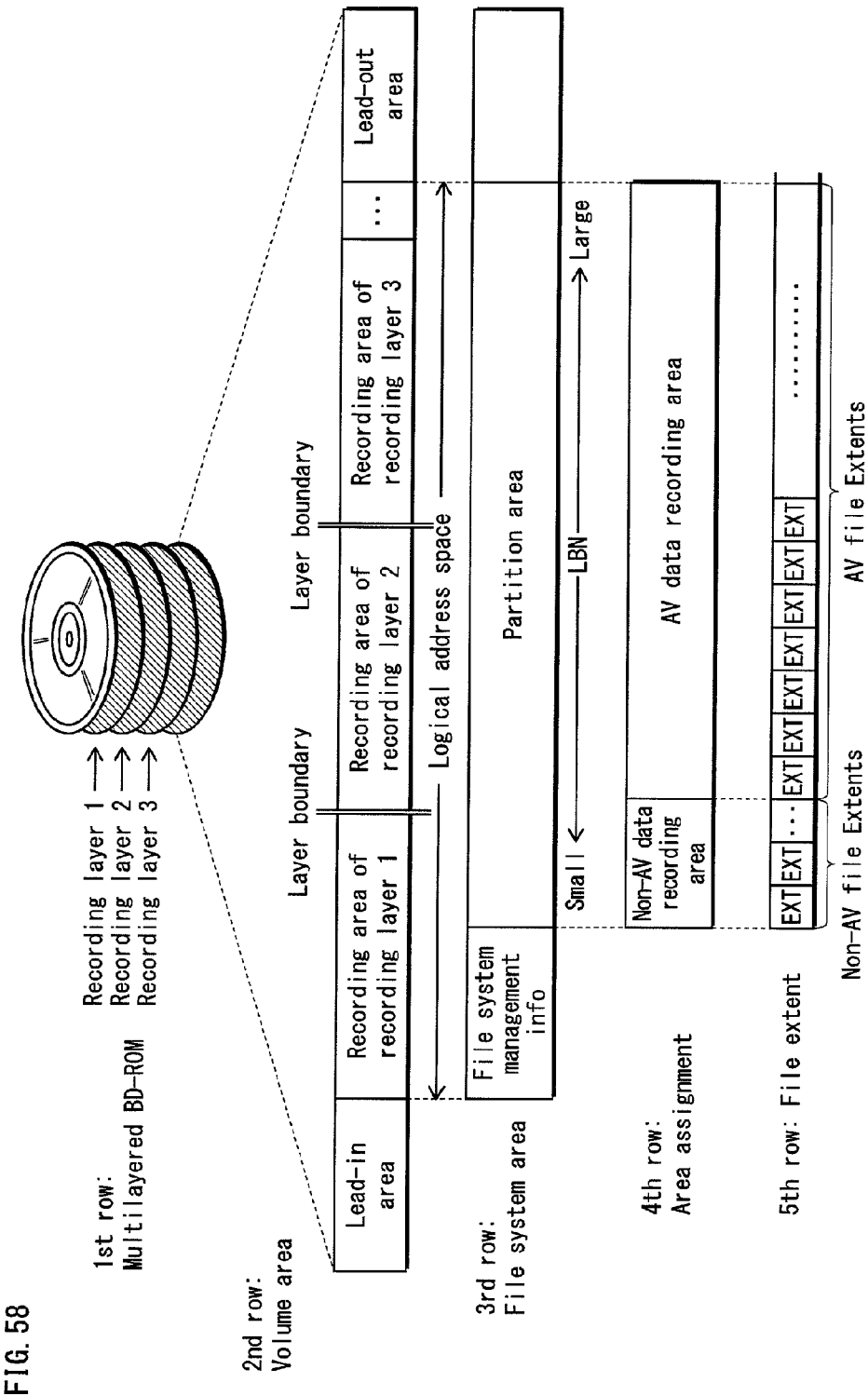
FIG. 58 shows an internal structure of a multi-layered optical disc.

FIG. 58 shows an internal structure of a multi-layered optical disc.

The first row of FIG. 58 shows a BD-ROM being a multi-layered optical disc. The second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording layers of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the BD-ROM, basically, sectors with consecutive logical addresses are also consecutive in the physical disposition on the optical disc. That is to say, data stored in the sectors with consecutive logical addresses can be read out without performing a seek operation. However, at the boundaries between recording layers, consecutive data reading is not possible even if the logical addresses are consecutive. It is thus presumed that the logical addresses of the boundaries between recording layers are registered in the recording device preliminarily.

In the volume area, file system management information is recorded immediately after the lead-in area. Following this, a partition area managed by the file system management information exists. The file system is a system that expresses data on the disc in units called directories and files. In the case of the BD-ROM, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The fourth row shows how the areas in the file system area managed by the file system are assigned. As shown in the fourth row, a non-AV data recording area exists on the innermost circumference side in the file system area; and an AV data recording area exists immediately following the non-AV data recording area. The fifth row shows the contents recorded in the non-AV data recording area and the AV data recording area. As shown in the fifth row, Extents constituting the AV files are recorded in the AV data recording area; and Extents constituting non-AV files, which are files other than the AV files, are recorded in the non-AV data recording area.

Figure 59:
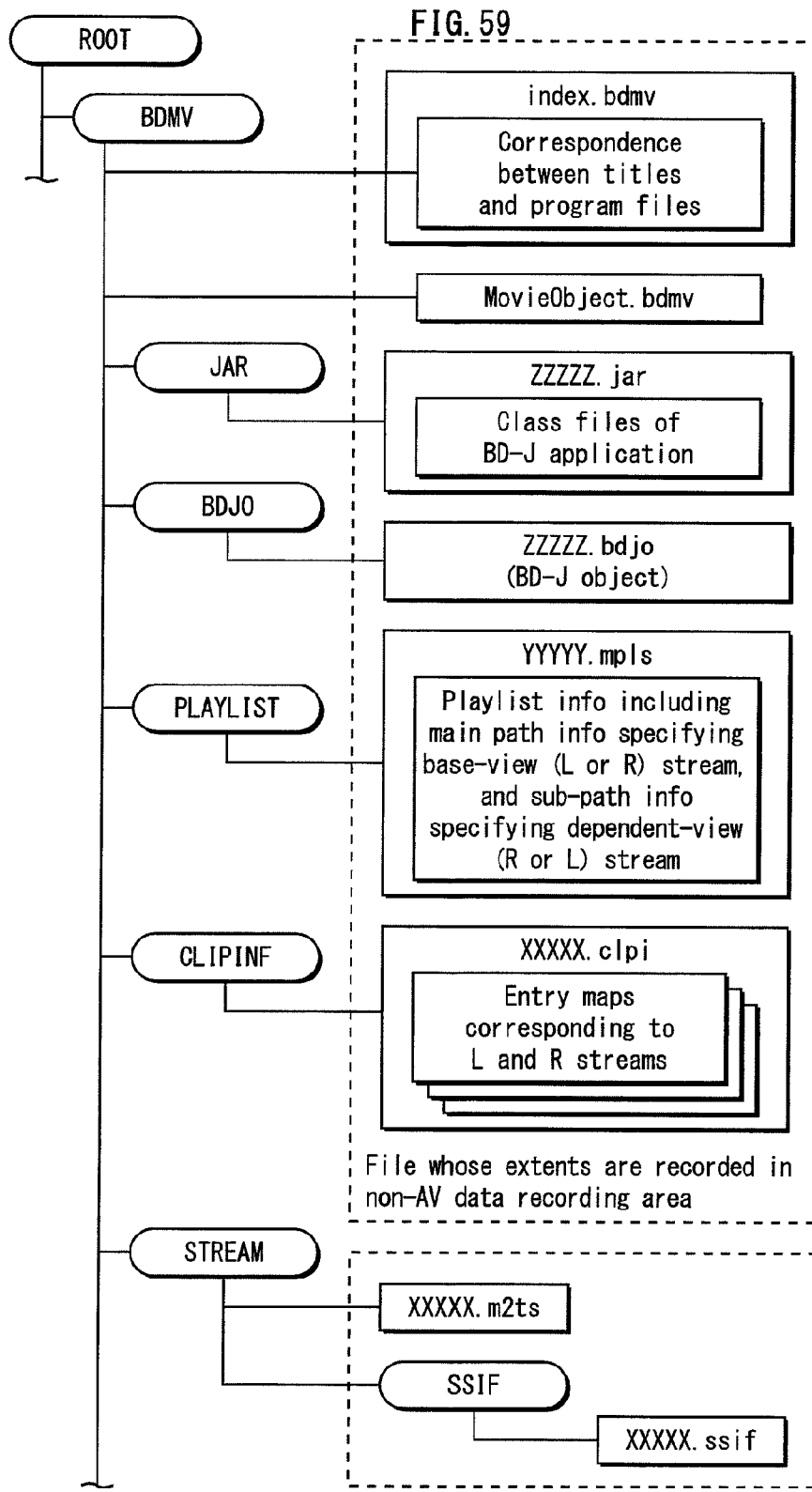
FIG. 59 shows the application format of the optical disc based on the file system.

FIG. 59 shows the application format of the optical disc based on the file system.

The BDMV directory is a directory in which data such as AV content and management information used in the BD-ROM are recorded. Five sub-directories called "PLAYLIST directory," "CLIPINF directory," "STREAM directory," "BDJO directory," "JAR directory," and "META directory" exist below the BDMV directory. Also, two types of files (i.e. index.bdmv and MovieObject.bdmv) are arranged under the BDMV directory.

A file "index.bdmv" (the file name "index.bdmv" is fixed) stores an index table.

A file "MovieObject.bdmv" (the file name "MovieObject.bdmv" is fixed) stores one or more movie objects. The movie object is a program file that defines a control procedure to be performed by the playback device in the operation mode (HDMV mode) in which the control subject is a command interpreter. The movie object includes one or more commands and a mask flag, where the mask flag defines whether or not to mask a menu call or a title call when the call is performed by the user onto the GUI.

A program file (XXXXX.bdjo - - - "XXXXX" is variable, and the extension "bdjo" is fixed) to which an extension "bdjo" is given exists in the BDJO directory. The program file stores a BD-J object that defines a control procedure to be performed by the playback device in the BD-J mode. The BD-J object includes an "application management table". The "application management table" in the BD-J object is a table that is used to cause the playback device to perform an application signaling, with the title being regarded as the life cycle. The application management table includes an "application identifier" and a "control code", where the "application identifier" indicates an application to be executed when a title corresponding to the BD-J object becomes a current title. BD-J applications whose life cycles are defined by the application management table are especially called "BD-J applications". The control code, when it is set to AutoRun, indicates that the application should be loaded onto the heap memory and be activated automatically; and when it is set to Present, indicates that the application should be loaded onto the heap memory and be activated after a call from another application is received. On the other hand, some BD-J applications do not end their operations even if the title is ended. Such BD-J applications are called "title unboundary applications".

A substance of such a Java™ application is a Java™ archive file (YYYYY.jar) stored in the JAR directory under the BDMV directory.

An application may be, for example, a Java™ application that is composed of one or more xlet programs having been loaded into a heap memory (also called work memory) of a virtual machine. The application is constituted from the xlet programs having been loaded into the work memory, and data.

In the "PLAYLIST directory", a playlist information file ("xxxxx.mpls" - - - "XXXXX" is variable, and the extension "mpls" is fixed) to which an extension "mpls" is given exists.

In the "CLIPINF directory", a clip information file ("xxxxx.clpi" - - - "XXXXX" is variable, and the extension "clpi" is fixed) to which an extension "clpi" is given exists.

The Extents constituting the files existing in the directories explained up to now are recorded in the non-AV data area.

The "STREAM directory" is a directory storing a transport stream file. In the "STREAM directory", a transport stream file ("xxxxx.m2ts" - - - "XXXXX" is variable, and the extension "m2ts" is fixed) to which an extension "m2ts" is given exists. The above-described files are formed on a plurality of sectors that are physically continuous in the partition area. The partition area is an area accessed by the file system and includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", and "STREAM directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next is a detailed description of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates the entity having the descriptor tag is a file entry.

The "ICB tag" indicates attribute information concerning the file entry itself.

The "allocation descriptor" includes a logical block number (LBN) that indicates a recording position of the directory file. Up to now, the file entry has been described. Next is a detailed description of the directory file.

The "directory file" includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

The file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory.

The "file recording area of lower file" is an area in which the substance of the lower file that belongs to a directory. A "file entry" of the lower entry and one or more "Extents" are recorded in the "file recording area of lower file".

The stream file that constitutes the main feature of the present application is a file recording area that exists in the directory area of the directory to which the file belongs. It is possible to access the transport stream file by tracing the file identification descriptors of the directory files, and the allocation descriptors of the file entries.

Up to now, the internal structure of the recording medium has been described. The following describes how to generate the recording medium shown in FIGS. 58 and 59, namely a form of a recording method.

The recording method of the present embodiment includes not only the above-described real-time recording in which AV files and non-AV files are generated in real time, and are written into the AV data recording area and the non-AV data recording area, but also a pre-format recording in which bit streams to be recorded into the volume area are generated in advance, a master disc is generated based on the bit streams, and the master disc is pressed, thereby making possible a mass production of the optical disc. The recording method of the present embodiment is applicable to either the real-time recording or the pre-format recording.

Figure 60:
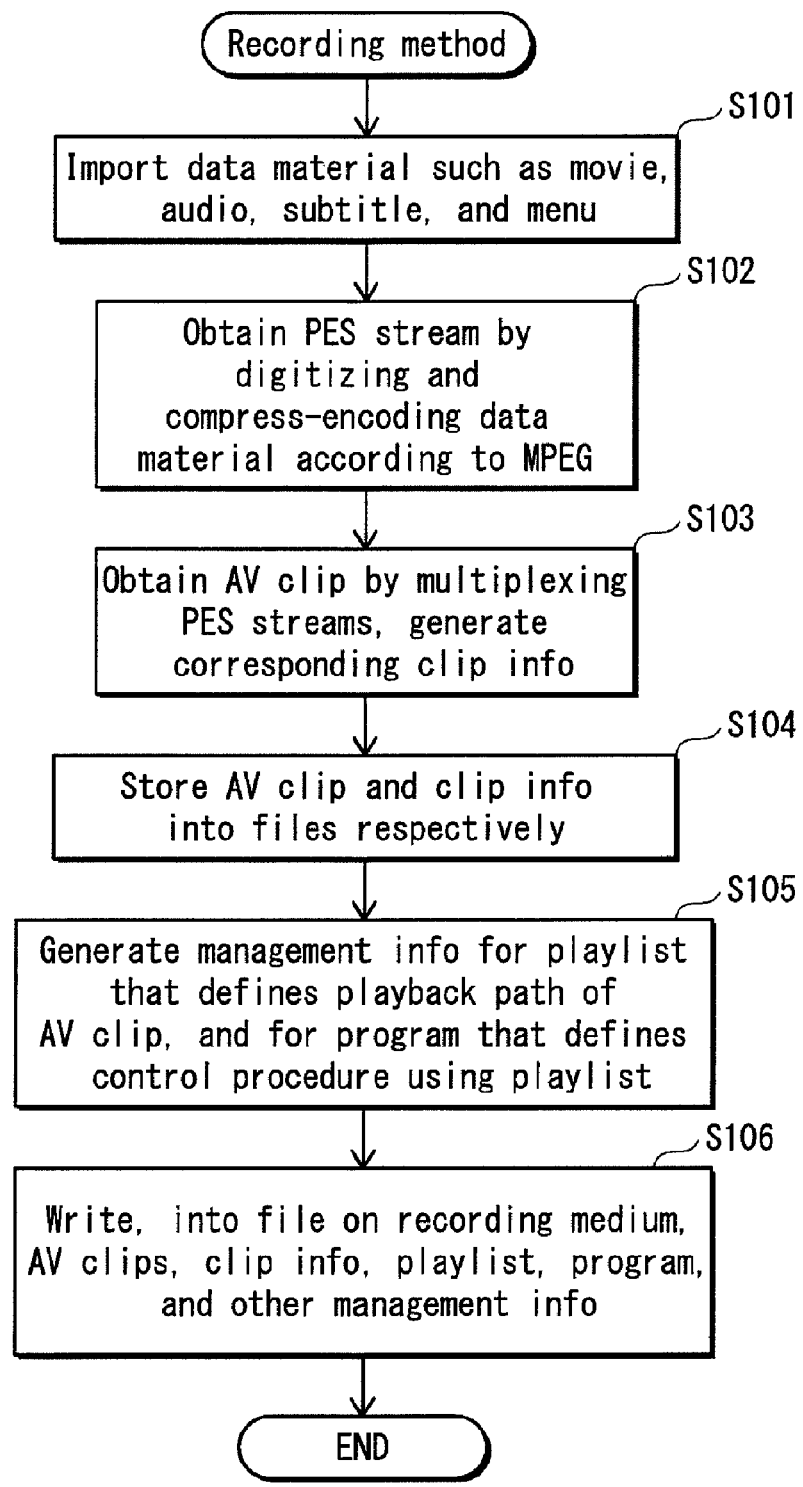
FIG. 60 is a flowchart showing the processing procedure of the recording method.

FIG. 60 is a flowchart showing the processing procedure of the recording method. In step S101, the recording device imports the data material such as movie, audio, subtitle, and menu. In step S102, it obtains the PES streams by digitizing and compress-encoding the data material according to the MPEG standard. In step S103, it obtains the AV clip by multiplexing the PES streams, and generates the corresponding clip information. In step S104, it stores the AV clip and clip information into different files, respectively.

In step S105, the recording device generates the management information for the playlist that defines the playback path of the AV clips, and for the program that defines the control procedure using the playlist. In step S106, it writes, onto the recording medium, the AV clips, clip information, playlist, program, and other management information.

FIG. 61 is a flowchart showing the procedure for writing the AV file.

In step S401, the recording device generates the file entry in the memory of the recording device by creating "xxxxx ssif". In step S402, it is judged whether the continuous free sector areas have been ensured. When the continuous free sector areas have been ensured, the control proceeds to step S403 in which the recording device writes the source packet sequence constituting the dependent-view data block into the continuous free sector areas as much as EXT2[i]. After this, steps s404 through S408 are executed. When it is judged in step S402 that the continuous free sector areas have not been ensured, the control proceeds to step S409 in which the exceptional process is performed, and then the process ends.

The steps S404 through S408 constitute a loop in which the process of steps S404-S406 and S408 is repeated until it is judged "NO" in step S407.

In step S405, the recording device writes the source packet sequence constituting the base-view data block into the continuous free sector areas as much as EXT1[i]. In step S406, it adds, into the file entry, the allocation descriptor that indicates the start address of the source packet sequence and continuation length, and registers it as an Extent. In connection with this, it writes, into the clip information, the Extent start point information that indicates the start source packet number thereof.

The step S407 defines the condition for ending the loop. In step S407, it is judged whether or not there is a non-written source packet in the base-view and dependent-view data blocks. When it is judged that there is a non-written source packet, the control proceeds to step S408 to continue the loop. When it is judged that there is no non-written source packet, the control proceeds to step S410.

In step S408, it is judged whether or not there are continuous sector areas. When it is judged that there are continuous sector areas, the control proceeds to step S403. When it is judged that there are no continuous sector areas, the control returns to step S402.

In step S410, "xxxxx.ssif" is closed and the file entry is written onto the recording medium. In step S411, "xxxxx.m2ts" is created and the file entry of "xxxxx.m2ts" is generated in the memory. In step S412, the allocation descriptor that indicates the continuation length and the start address of Extent of the base-view data block unique to the file 2D is added into the file entry of "xxxxx.m2ts". In step S413, "xxxxx.m2ts" is closed and the file entry is written.

In step S404, it is judged whether or not there is a long jump occurrence point in the range of "EXTss+EXT2D". In the present example, it is presumed that the long jump occurrence point is a boundary between layers. When it is judged that there is a long jump occurrence point in the range of "EXTss+EXT2D", the control proceeds to step S420 in which a copy of the base-view data block is created, and base-view data blocks B[i]ss and B[i]2D are written into the area immediately before the long jump occurrence point, and then the control proceeds to step S406. These become Extents of the file 2D and Extents of the file base.

When the recording method is to be realized by the real-time recording technology, the recording device for performing the recording method creates an AV clip in real time, and stores the AV clip into the BD-RE, BD-R, hard disk, or semiconductor memory card.

In this case, the AV clip may be a transport stream that is obtained as the recording device encodes an analog input signal in real time, or a transport stream that is obtained as the recording device partializes a digital input transport stream. The recording device for performing the real-time recording includes: a video encoder for obtaining a video stream by encoding a video signal; an audio encoder for obtaining an audio stream by encoding an audio signal; a multiplexor for obtaining a digital stream in the MPEG2-TS format by multiplexing the video stream, audio stream and the like; and a source packetizer for converting TS packets constituting the digital stream in the MPEG2-TS format into source packets.

The recording device stores an MPEG2 digital stream having been converted into the source packet format, into an AV clip file, and writes the AV clip file into the BD-RE, BD-R, or the like. When the digital stream is written, the control unit of the recording device performs a process of generating the clip information and the playlist information in the memory. More specifically, when the user requests a recording process, the control unit creates an AV clip file and an AV clip information file in the BD-RE or the BD-R.

After this, when the starting position of GOP in the video stream is detected from the transport stream which is input from outside the device, or when the GOP of the video stream is created by the encoder, the control unit of the recording device obtains (i) the PTS of the intra picture that is positioned at the start of the GOP and (ii) the packet number of the source packet that stores the starting portion of the GOP, and additionally writes the pair of the PTS and the packet number into the entry map of the clip information file, as a pair of EP_PTS entry and EP_SPN entry. After this, each time a GOP is generated, a pair of EP_PTS entry and EP_SPN entry is written additionally into the entry map of the clip information file. In so doing, when the starting portion of a GOP is an IDP picture, an "is_angle_change" flag having been set to "ON" is added to a pair of EP_PTS entry and EP_SPN entry. Also, when the starting portion of a GOP is not an IDR picture, an "is_angle_change" flag having been set to "OFF" is added to a pair of EP_PTS entry and EP_SPN entry.

Further, the attribute information of a stream in the clip information file is set in accordance with the attribute of the stream to be recorded. After the clip and the clip information are generated and written into the BD-RE or the BD-R, the playlist information defining the playback path via the entry map in the clip information is generated and written into the BD-RE or the BD-R. When this process is executed with the real-time recording technology, a hierarchical structure composed of the AV clip, clip information, and playlist information is obtained in the BD-RE or the BD-R.

This completes the description of the recording device for performing the recording method by the real-time recording. Next is a description of the recording device for performing the recording method by the pre-format recording.

The recording method by the pre-format recording is realized as a manufacturing method of an optical disc including an authoring procedure.

Figure 62A:
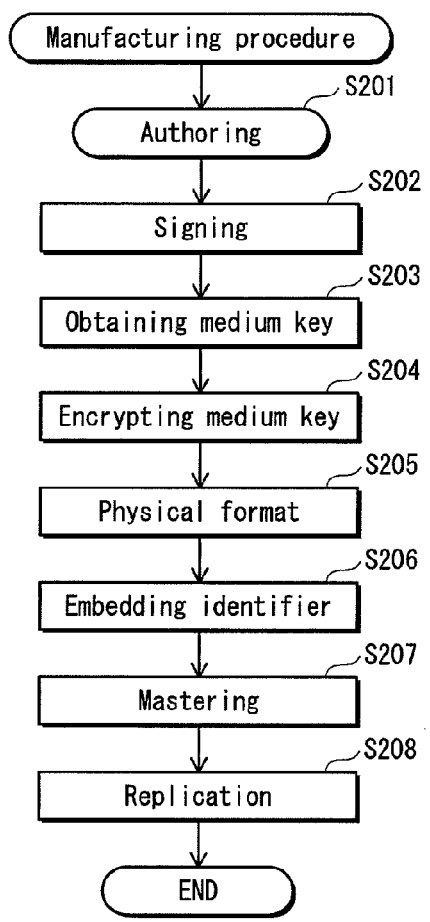
FIGS. 62A and 62B show the manufacturing method of an optical disc.
Figure 62B:
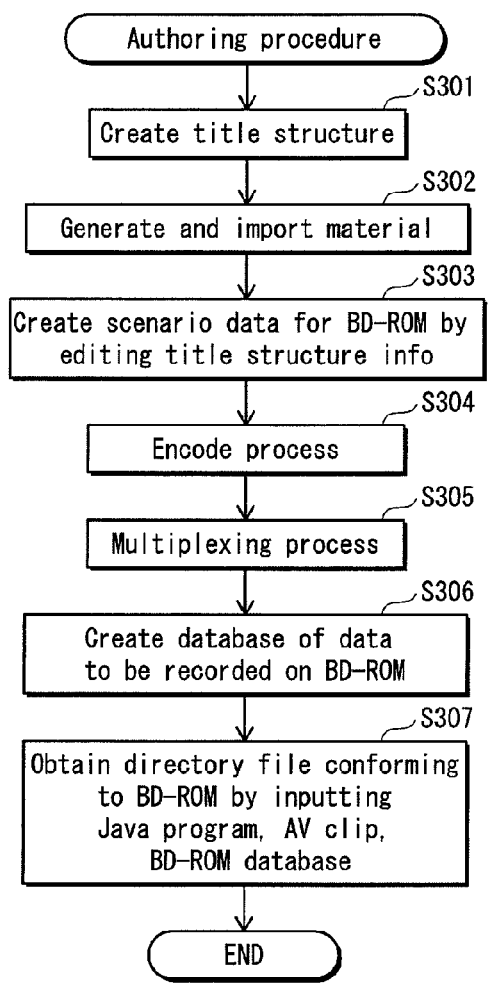

The manufacturing method of an optical disc includes the authoring step, signing step, medium key obtaining step, medium key encrypting step, physical format step, identifier embedding step, a mastering step, and replication step. FIGS. 62A and 62B show the manufacturing method of an optical disc. In the authoring step S201 in FIG. 62A, a bit stream representing the whole volume area of the optical disc is generated.

In the signing step S202, a request for signature is made to the AACS LA to manufacture the optical disc. More specifically, a portion is extracted from the bit stream is sent to the AACS LA. Note that the AACS LA is an organization for managing the license of the copyrighted work protection technologies for the next-generation digital household electric appliances. The authoring sites and mastering sites are licensed by the AACS LA, where the authoring sites perform authoring of optical discs by using authoring devices, and the mastering sites execute mastering by using mastering devices. The AACS LA also manages the medium keys and invalidation information. The AACS LA signs and returns the portion of the bit stream.

In the medium key obtaining step S203, a medium key is obtained from the AACS LA. The medium key provided from the AACS LA is not fixed. The medium key is updated to a new one when the number of manufactured optical discs reaches a certain number. The update of the medium key makes it possible to exclude certain makers or devices, and to invalidate an encryption key by using the invalidation information even if the encryption key is cracked.

In the medium key encrypting step S204, a key used for encrypting a bit stream is encrypted by using the medium key obtained in the medium key obtaining step.

In the physical format step S205, the physical formatting of the bit stream is performed.

In the identifier embedding step S206, an identifier, which is unique and cannot be detected by ordinary devices, is embedded, as electronic watermark, into the bit stream to be recorded on the optical disc. This prevents mass production of pirated copies by unauthorized mastering.

In the mastering step S207, a master disc of the optical disc is generated. First, a photoresist layer is formed on the glass substrate, a laser beam is radiated onto the photoresist layer in correspondence with desired grooves or pits, and then the photoresist layer is subjected to the exposure process and the developing process. The grooves or pits represent values of the bits constituting the bit stream that has been subjected to the eight-to-sixteen modulation. After this, the master disc of the optical disc is generated based on the photoresist whose surface has been made uneven by the laser cutting in correspondence with the grooves or pits.

In the replication step S208, copies of the optical disc are produced by a mass production by using the master disc of the optical disc.

FIG. 62B shows the processing procedure of the authoring step.

In step S301, the title structure of the BD-ROM is created. In this step, the title structure information is generated. The title structure information defines, using a tree structure, the relationships among playback units (such as the title, movie object, BD-J object, and playlist) in the BD-ROM. More specifically, the title structure information is generated by defining nodes that respectively corresponds to: "disc name" of the BD-ROM to be created; "title" that can be played back from index.bdmv; "movie object and BD-J object" constituting the title; and "playlist" that is played back from the movie object and BD-J object, and connecting these nodes with edges.

In step S302, a video, audio, still picture, and subtitle to be used for the title are imported.

In step S303, BD-ROM scenario data is generated by performing an editing process onto the title structure information in accordance with a user operation received via the GUI. Note that the BD-ROM scenario data is information for causing the playback device to play back an AV stream in units of titles. In the BD-ROM, a scenario is information defined as the index table, movie object, or playlist. The BD-ROM scenario data includes information of the materials constituting the streams, playback section, information indicating a playback route, a menu screen arrangement, and information of transition from the menu.

Step S304 is an encoding process in which PES streams are obtained by performing encoding based on the BD-ROM scenario data.

Step S305 is a multiplexing process in which AV clips are obtained by multiplexing the PES streams.

In step S306, a database of the data to be recorded into the BD-ROM is generated. Here, the database is a generic name of the index table, movie object, playlist, BD-object and the like defined in the BD-ROM as described above.

In step S307, an AV file and a non-AV file are generated in a file system format conforming to the BD-ROM, by using inputs of the Java™ program, the AV clip obtained in the multiplexing process, and the BD-ROM database.

Next is a description of the recording device to be used for the work in the authoring step. The recording device described here is used by the authoring staff in a production studio for distributing movie contents. The use form of the recording device of the present invention is as follows: a digital stream and a scenario are generated in accordance with the operation by the authoring staff, where the digital stream represents a movie title and is generated by compress-encoding in compliance with the MPEG standard, and the scenario describes how the movie title should be played, a volume bit stream for BD-ROM including these data is generated, and the volume bit stream is recorded into a recording medium that is to be delivered to the mastering site.

Figure 63:
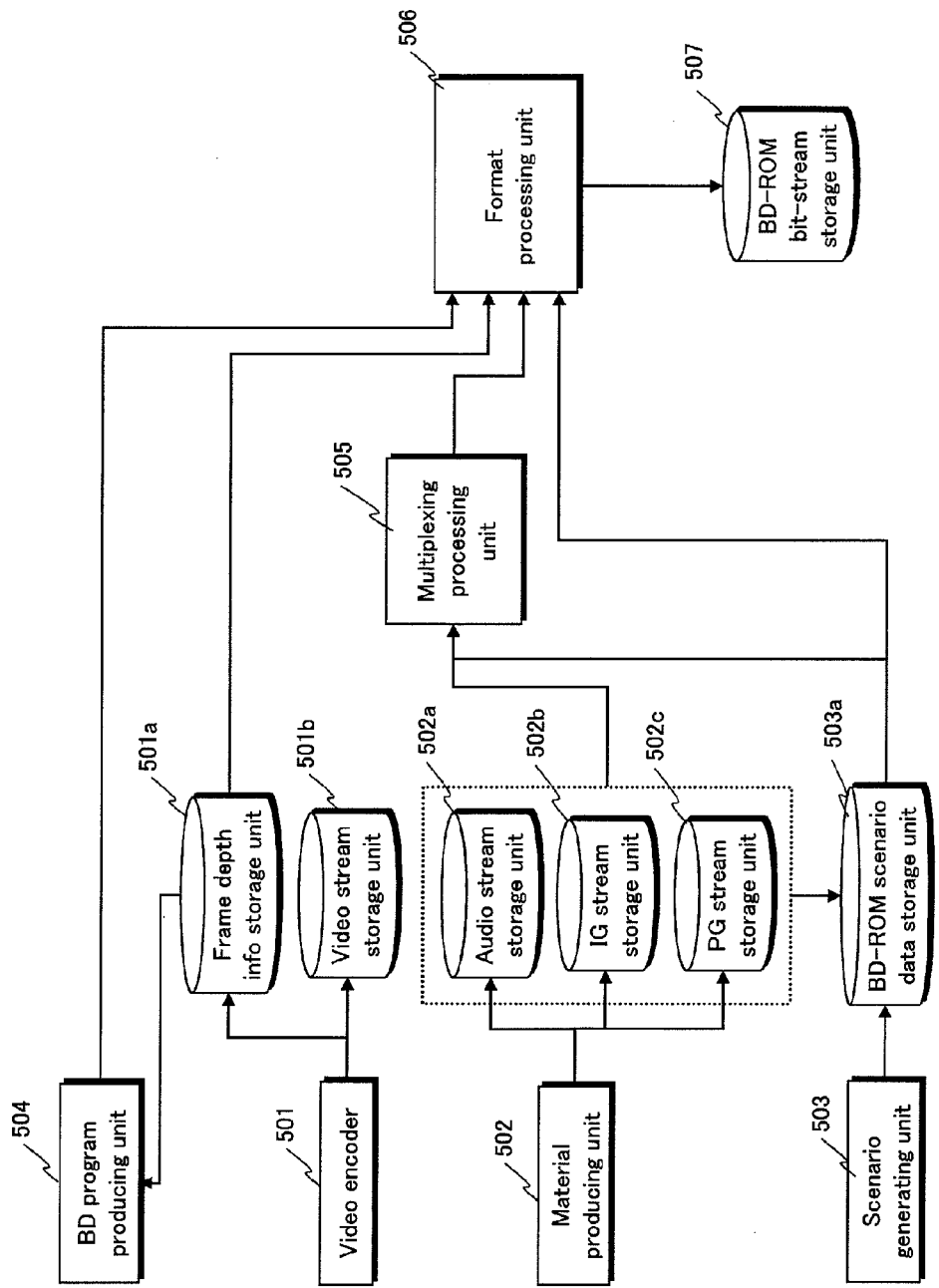
FIG. 63 shows the internal structure of the recording device.

FIG. 63 shows the internal structure of the recording device. As shown in FIG. 63, the recording device includes a video encoder 501, a material producing unit 502, a scenario generating unit 503, a BD program producing unit 504, a multiplexing processing unit 505, and a format processing unit 506.

The video encoder 501 generates left-view and right-view video streams by encoding left-view and right-view non-compressed bit map images in accordance with a compression method such as the MPEG4-AVC or the MPEG2. In so doing, the right-view video stream is generated by encoding frames that correspond to the left-view video stream, by the inter-picture prediction encoding method. In the process of the inter-picture prediction encoding, the depth information for 3D image is extracted from the motion vectors of the left-view and right-view images, and the depth information is stored into a frame depth information storage unit 501a. The video encoder 501 performs an image compression using the relative characteristics between pictures by extracting the motion vectors in units of macro blocks of 8×8 or 16×16.

In the process of extracting the motion vectors in units of macro blocks, a moving image whose foreground is a human being and background is a house is determined as a target of extracting the motion vector. In this case, an inter-picture prediction is performed between a left-eye image and a right-eye image. With this process, no motion vector is detected from the portion of the image corresponding to the "house", but a motion vector is detected from the portion of the image corresponding to the "human being".

The detected motion vector is extracted, and the depth information is generated in units of frames when the 3D image is displayed. The depth information is, for example, an image having the same resolution as the frame having the depth of eight bits.

The material producing unit 502 generates streams such as an audio stream, interactive graphics stream, and a presentation graphics stream, and writes the generated streams into an audio stream storage unit 502a, an interactive graphics stream storage unit 502b, and a presentation graphics stream storage unit 502c.

When generating an audio stream, the material producing unit 502 generates the audio stream by encoding a non-compressed LinearPCM audio by a compression method such as AC3. Other than this, the material producing unit 502 generates a presentation graphics stream in a format conforming to the BD-ROM standard, based on the subtitle information file that includes a subtitle image, a display timing, and subtitle effects such as fade-in and fade-out. Also, the material producing unit 502 generates an interactive graphics stream in a format for the menu screen conforming to the BD-ROM standard, based on the menu file that describes bit-map images, transition of the buttons arranged on the menu, and the display effects.

The scenario generating unit 503 generates a scenario in the BD-ROM format, in accordance with the information of each stream generated by the material producing unit 502 and the operation input by the authoring staff via the GUI. Here, the scenario means a file such as an index file, movie object file, or playlist file. Also, the scenario generating unit 503 generates a parameter file which describes which stream each AV clip for realizing the multiplexing process is constituted from. The file generated here such as an index file, movie object file, or playlist file has the data structure described in Embodiments 1 and 2.

The BD program producing unit 504 generates a source code for a BD program file and generates a BD program in accordance with a request from a user that is received via a user interface such as the GUI. In so doing, the program of the BD program file can use the depth information output from the video encoder 501 to set the depth of the GFX plane.

The multiplexing processing unit 505 generates an AV clip in the MPEG2-TS format by multiplexing a plurality of streams described in the BD-ROM scenario data, such as the left-view video stream, right-view video stream, video, audio, subtitle, and button. When generating this, the multiplexing processing unit 505 also generates the clip information file that makes a pair with the AV clip.

The multiplexing processing unit 505 generates the clip information file by associating, as a pair, (i) the entry map generated by the multiplexing processing unit 505 itself and (ii) attribute information that indicates an audio attribute, image attribute and the like for each stream included in the AV clip. The clip information file has the structure that has been described in each embodiment so far.

The format processing unit 506 generates a disc image in the UDF format by arranging, in a format conforming to the BD-ROM standard, the BD-ROM scenario data generated by the scenario generating unit 503, the BD program file produced by the BD program producing unit 504, the AV clip and clip information file generated by the multiplexing processing unit 505, and directories and files in a format conforming to the BD-ROM standard, where the UDF format is a file system conforming to the BD-ROM standard. The format processing unit 506 writes the bit stream representing the disc image into the BD-ROM bit-stream storage unit.

In so doing, the format processing unit 506 generates the 3D metadata for the PG stream, IG stream, and secondary video stream by using the depth information output from the video encoder 501. Also, the format processing unit 506 sets by automation the arrangement of an image on the screen so as not to overlap with an object in the 3D image, and adjusts the offset value so that depths do not overlap each other. The file layout of the disc image generated in this way is set to have the data structure of the file layout that has already been described. The generated disc image is converted into the data for BD-ROM press, and the press process is performed onto the data. The BD-ROM is produced in this way.

Embodiment 9

The present embodiment describes the internal structure of a 2D/3D playback device that has integrated functions of the playback devices having been described in the embodiments so far.

Figure 64:
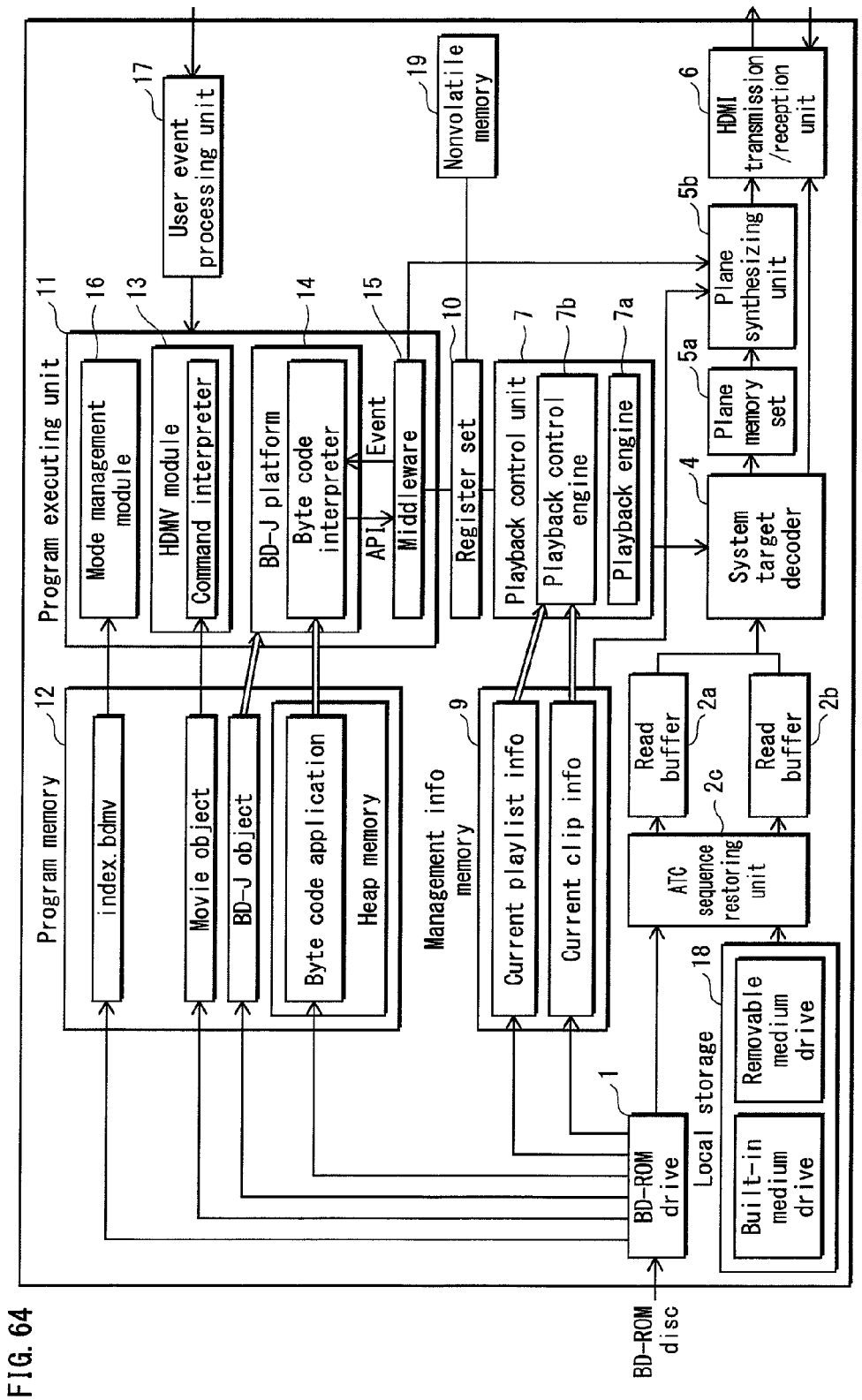
FIG. 64 shows the structure of a 2D/3D playback device.

FIG. 64 shows the structure of a 2D/3D playback device. The 2D/3D playback device includes a BD-ROM drivel, a read buffer 2a, a read buffer 2b, a switch 3, a system target decoder 4, a plane memory set 5a, a plane synthesizing unit 5b, an HDMI transmission/reception unit 6, a playback control unit 7, a management information memory 9, a register set 10, a program executing unit 11, a program memory 12, an HDMV module 13, a BD-J platform 14, a middleware 15, a mode management module 16, a user event processing unit 17, a local storage 18, and a nonvolatile memory 19.

The BD-ROM drive 1, like a 2D playback device, reads out data from a BD-ROM disc based on a request from the playback control unit 7. AV clips read out from the BD-ROM disc are transferred to the read buffer 2a or 2b.

When a 3D image is to be played back, the playback control unit 7 issues a read request that instructs to read out the base-view data block and the dependent-view data block alternately in units of Extents. The BD-ROM drive 1 reads out Extents constituting the base-view data block into the read buffer 2a, and reads out Extents constituting the dependent-view data block into the read buffer 2b. When a 3D image is to be played back, the BD-ROM drive 1 should have a higher reading speed than the BD-ROM drive for a 2D playback device, since it is necessary to read out both the base-view data block and the dependent-view data block simultaneously.

The read buffer 2a is a buffer that may be realized by, for example, a dual-port memory, and stores the data of the base-view data blocks read out by the BD-ROM drive 1.

The read buffer 2b is a buffer that may be realized by, for example, a dual-port memory, and stores the data of the dependent-view data blocks read out by the BD-ROM drive 1.

The switch 3 is used to switch the source of data to be input into the read buffers, between the BD-ROM drive 1 and the local storage 18.

The system target decoder 4 decodes the streams by performing the demultiplexing process onto the source packets read out into the read buffer 2a and the read buffer 2b.

The plane memory set 5a is composed of a plurality of plane memories. The plane memories include those for storing a left-view video plane, a right-view video plane, a secondary video plane, an interactive graphics plane (IG plane), and a presentation graphics plane (PG plane).

The plane synthesizing unit 5b performs the plane synthesizing explained the embodiments so far. When the image is to be output to the television or the like, the output is conformed to the 3D system. When it is necessary to play back the left-view image and the right-view image alternately by using the shutter glasses, the image is output as it is. When the image is to be output to, for example, the lenticular television, a temporary buffer is prepared, the left-view image is first transferred into the temporary buffer, and the left-view image and the right-view image are output simultaneously after the right-view image is transferred.

The HDMI transmission/reception unit 6 executes the authentication phase and the negotiation phase described in Embodiment 1 in conformance with, for example, the HDMI standard, where HDMI stands for High Definition Multimedia Interface. In the negotiation phase, the HDMI transmission/reception unit 6 can receive, from the television, (i) information indicating whether or not it supports a stereoscopic display, (ii) information regarding resolution for a monoscopic display, and (iii) information regarding resolution for a stereoscopic display.

The playback control unit 7 includes a playback engine 7a and a playback control engine 7b. When it is instructed from the program executing unit 11 or the like to play back a 3D playlist, the playback control unit 7 identifies a base-view data block of a playitem that is the playback target among the 3D playlist, and identifies a dependent-view data block of a sub-playitem in the 3D sub-path that should be played back in synchronization with the playitem. After this, the playback control unit 7 interprets the entry map of the corresponding clip information file, and requests the BD-ROM drive 1 to alternately read out the Extent of the base-view data block and the Extent of the dependent-view data block, starting with the playback start point, based on the Extent start type that indicates which of an Extent constituting the base-view video stream and an Extent constituting the dependent-view video stream is disposed first. When the playback is started, the first Extent is read out into the read buffer 2a or the read buffer 2b completely, and then the transfer from the read buffer 2a and the read buffer 2b to the system target decoder 4 is started.

The playback engine 7a executes AV playback functions. The AV playback functions in the playback device are a group of traditional functions succeeded from CD and DVD players. The AV playback functions include: Play, Stop, Pause On, Pause Off, Still Off, Forward Play (with specification of the playback speed by an immediate value), Backward Play (with specification of the playback speed by an immediate value), Audio Change, Picture Data Change for Secondary Video, and Angle Change.

The playback control engine 7b performs playlist playback functions. The playlist playback functions mean that, among the above-described AV playback functions, the Play and Stop functions are performed in accordance with the current playlist information and the current clip information, where the current playlist information constitutes the current playlist.

The management information memory 9 is a memory for storing the current playlist information and the current clip information. The current playlist information is a piece of playlist information that is currently a target of processing, among a plurality of pieces of playlist information that can be accessed from the BD-ROM, built-in medium drive, or removable medium drive. The current clip information is a piece of clip information that is currently a target of processing, among a plurality of pieces of clip information that can be accessed from the BD-ROM, built-in medium drive, or removable medium drive.

The register set 10 is a player status/setting register set that is a set of registers including a general-purpose register for storing arbitrary information that is to be used by contents, as well as the playback status register and the playback setting register having been described in the embodiments so far.

The program executing unit 11 is a processor for executing a program stored in a BD program file. Operating according to the stored program, the program executing unit 11 performs the following controls: (1) instructing the playback control unit 7 to play back a playlist; and (2) transferring, to the system target decoder, PNG/JPEG that represents a menu or graphics for a game so that it is displayed on the screen. These controls can be performed freely in accordance with construction of the program, and how the controls are performed is determined by the process of programming the BD-J application in the authoring process.

The program memory 12 stores a current dynamic scenario which is provided to the command interpreter that is an operator in the HDMV mode, and to the Java™ platform that is an operator in the BD-J mode. The current dynamic scenario is a current execution target that is one of Index.bdmv, BD-J object, and movie object recorded in the BD-ROM. The program memory 12 includes a heap memory.

The heap memory is a stack region for storing byte codes of the system application, byte codes of the BD-J application, system parameters used by the system application, and application parameters used by the BD-J application.

The HDMV module 13 is a DVD virtual player that is an operator in the HDMV mode, and is a performer in the HDMV mode. The HDMV module 13 has a command interpreter, and performs the control in the HDMV mode by interpreting and executing the navigation command constituting the movie object. The navigation command is described in a syntax that resembles a syntax used in the DVD-Video. Accordingly, it is possible to realize a DVD-Video-like playback control by executing the navigation command.

The BD-J platform 14 is a Java™ platform that is an operator in the BD-J mode, and is fully implemented with Java2 Micro_Edition (J2ME) Personal Basis Profile (PBP 1.0), and Globally Executable MHP specification (GEM1.0.2) for package media targets. The BD-J platform 14 is composed of a class loader, a byte code interpreter, and an application manager.

The class loader is one of system applications, and loads a BD-J application by reading out byte codes from the class file existing in the JAR archive file, and storing the byte codes into the heap memory.

The byte code interpreter is what is called a Java virtual machine. The byte code interpreter converts (i) the byte codes constituting the BD-J application stored in the heap memory and (ii) the byte codes constituting the system application, into native codes, and causes the MPU to execute the native codes.

The application manager is one of system applications, and performs application signaling for the BD-J application based on the application management table in the BD-J object, such as starting or ending a BD-J application. This completes the internal structure of the BD-J platform.

The middleware 15 is an operating system for the embedded software, and is composed of a kernel and a device driver. The kernel provides the BD-J application with a function unique to the playback device, in response to a call for the Application Programming Interface (API) from the BD-J application. The middleware 15 also realizes controlling the hardware, such as starting the interruption handler by sending an interruption signal.

The mode management module 16 holds Index.bdmv that was read out from the BD-ROM, built-in medium drive, or removable medium drive, and performs a mode management and a branch control. The management by the mode management is a module assignment to cause either the BD-J platform or the HDMV module to execute the dynamic scenario.

The user event processing unit 17 receive a user operation via a remote control, and causes the program executing unit 11 or the playback control unit 7 to perform a process as instructed by the received user operation. For example, when the user presses a button on the remote control, the user event processing unit 17 instructs the program executing unit 11 to execute a command included in the button. For example, when the user presses a fast forward/rewind button on the remote control, the user event processing unit 17 instructs the playback control unit 7 to execute the fast forward/rewind process onto the AV clip of the currently played-back playlist.

The local storage 18 includes the built-in medium drive for accessing a hard disc, and the removable medium drive for accessing a semiconductor memory card, and stores downloaded additional contents, data to be used by applications, and other data. An area for storing the additional contents is divided into as many small areas as BD-ROMs. Also, an area for storing data used by applications is divided into as many small areas as the applications.

The nonvolatile memory 19 is a recording medium that is, for example, a readable/writable memory, and is a medium such as a flash memory or FeRAM that can preserve the recorded data even if a power is not supplied thereto. The nonvolatile memory 19 is used to store a backup of the register set 10.

Figure 65:
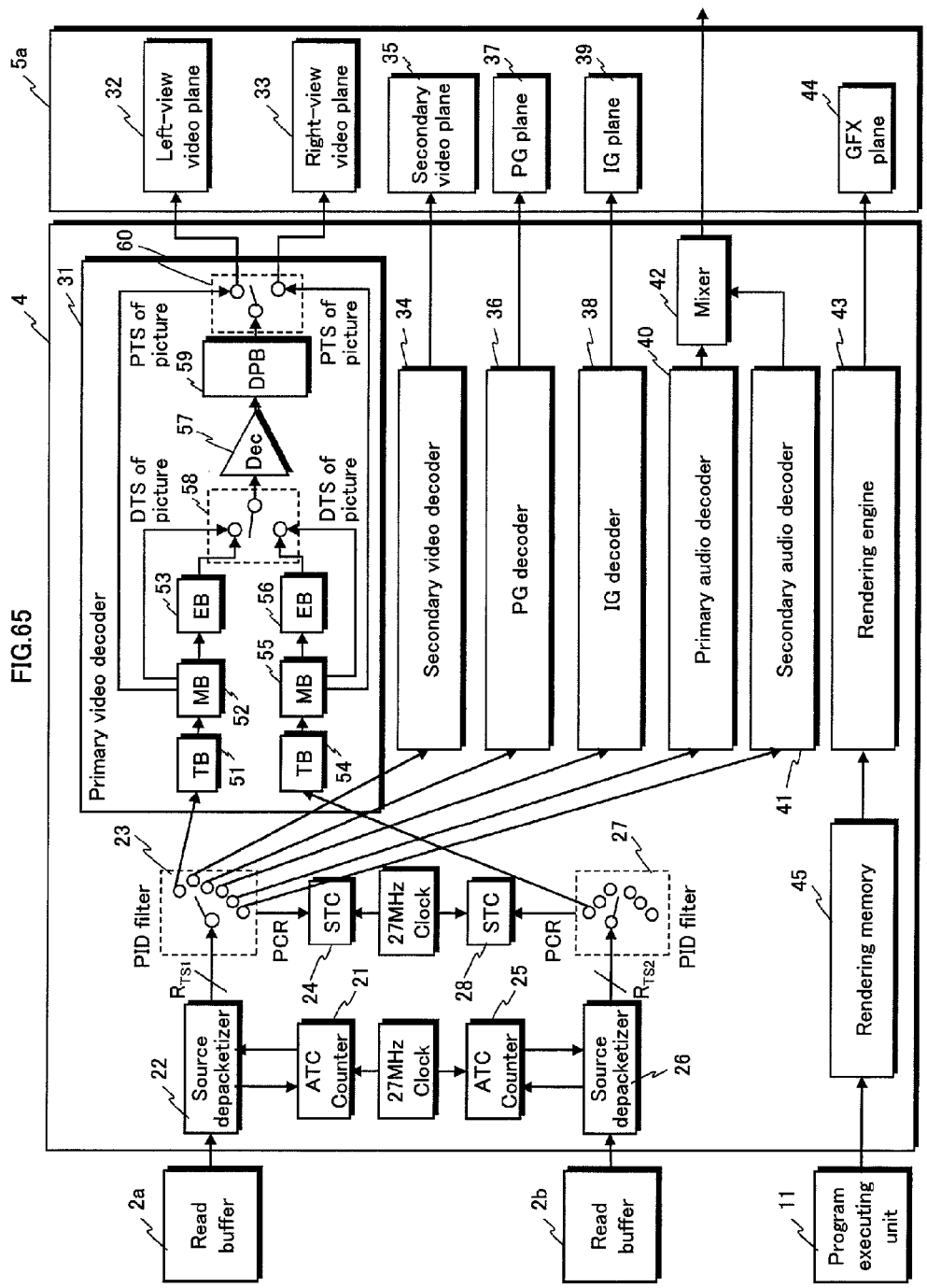

Next, the internal structure of the system target decoder 4 and the plane memory set 5a will be described. FIG. 65 shows the internal structure of the system target decoder 4 and the plane memory set 5a. As shown in FIG. 65, the system target decoder 4 and the plane memory set 5a include an ATC counter 21, a source depacketizer 22, a PID filter 23, an STC counter 24, an ATC counter 25, a source depacketizer 26, a PID filter 27, a primary video decoder 31, a left-view video plane 32, a right-view video plane 33, a secondary video decoder 34, a secondary video plane 35, a PG decoder 36, a PG plane 37, an IG decoder 38, an IG plane 39, a primary audio decoder 40, a secondary audio decoder 41, a mixer 42, a rendering engine 43, a GFX plane 44, and a rendering memory 45.

The primary video decoder 31 decodes the left-view video stream, and writes the decoding result, namely, a non-compressed video frame, into the left-view video plane 32.

The left-view video plane 32 is a plane memory that can store picture data with a resolution of, for example, 1920×2160 (1280×1440).

The right-view video plane 33 is a plane memory that can store picture data with a resolution of, for example, 1920×2160 (1280×1440).

The secondary video decoder 34, having the same structure as the primary video plane, performs decoding of an input secondary video stream, and writes resultant pictures to the secondary video plane in accordance with respective display times (PTS).

The secondary video plane 35 stores picture data for the secondary video that is output from the system target decoder 4 as a result of decoding the secondary video stream.

The PG decoder 36 extracts and decodes a presentation graphics stream from the TS packets input from the source depacketizer, and writes the resultant non-compressed graphics data to the PG plane in accordance with respective display times (PTS).

The PG plane 37 stores non-compressed graphics object that is obtained by decoding the presentation graphics stream.

The IG decoder 38 extracts and decodes an interactive graphics stream from the TS packets input from the source depacketizer, and writes the resultant non-compressed graphics object to the IG plane in accordance with respective display times (PTS).

The IG plane 39 stores non-compressed graphics object that is obtained by decoding the interactive graphics stream.

The primary audio decoder 40 decodes the primary audio stream.

The secondary audio decoder 41 decodes the secondary audio stream.

The mixer 42 mixes the decoding result of the primary audio decoder 40 with the decoding result of the secondary audio decoder 41.

The rendering engine 43, provided with infrastructure software such as Java2D or OPEN-GL, decodes JPEG data/PNG data in accordance with a request from the BD-J application. The rendering engine 43 also obtains an image or a widget, and writes it into the IG plane or the background graphics plane. The image data obtained by decoding the JPEG data is used as the wallpaper of the GUI, and is written into the background graphics plane. The image data obtained by decoding the PNG data is written into the IG plane to be used to realize a button display accompanied with animation. These images and/or widgets obtained by decoding the JPEG/PNG data are used by the BD-J application to display a menu for receiving selection of a title, subtitle, or audio, or to constitute a GUI part for a game that works in conjunction with a stream playback when the game is played. The images and/or widgets are also used to constitute a browser screen on a WWW site when the BD-J application accesses the WWW site.

The GFX plane 44 is a plane memory into which graphics data such as JPEG or PNG is written after it is decoded.

The rendering memory 45 is a memory into which the JPEG data and the PNG data to be decoded by the rendering engine are read out. A cache area is allocated to this image memory when the BD-J application executes a live playback mode. The live playback mode is realized by combining the browser screen on the WWW site with the stream playback by the BD-ROM. The cache area is a cache memory for storing the current and the preceding browser screens in the live playback mode, and stores non-compressed PNG data or non-compressed JPEG data that constitute the browser screen.

As described above, according to the present embodiment, a recording medium that includes the characteristics described in the embodiments so far as a whole can be realized as a BD-ROM, and a playback device that includes the characteristics described in the embodiments so far as a whole can be realized as a BD-ROM playback device.

Embodiment 10

The present embodiment describes the register set in detail.

The register set is composed of a plurality of player status registers and a plurality of player setting registers. Each of the player status registers and player setting registers is a 32-bit register and is assigned with a register number so that a register to be accessed is identified by the register number.

The bit positions of the bits (32 bits) that constitute each register are represented as "b0" through "b31". Among these, bit "b31" represents the highest-order bit, and bit "b0" represents the lowest-order bit. Among the 32 bits, a bit sequence from bit "bx" to bit "by" is represented by [bx:by].

The value of an arbitrary bit range [bx:by] in a 32-bit sequence stored in the player setting register/player status register of a certain register number is treated as an environment variable (also called "system parameter" or "player variable") that is a variable of an operation system in which the program runs. The program that controls the playback can obtain a system parameter via the system property or the application programming interface (API). Also, unless otherwise specified, the program can rewrite the values of the player setting register and the player status register. With respect to the BD-J application, it is required that the authority to obtain or rewrite system parameters is granted by the permission management table in the JAR archive file.

The player status register is a hardware resource for storing values that are to be used as operands when the MPU of the playback device performs an arithmetic operation or a bit operation. The player status register is also reset to initial values when an optical disc is loaded, and the validity of the stored values is checked. The values that can be stored in the player status register are the current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

Figure 66:
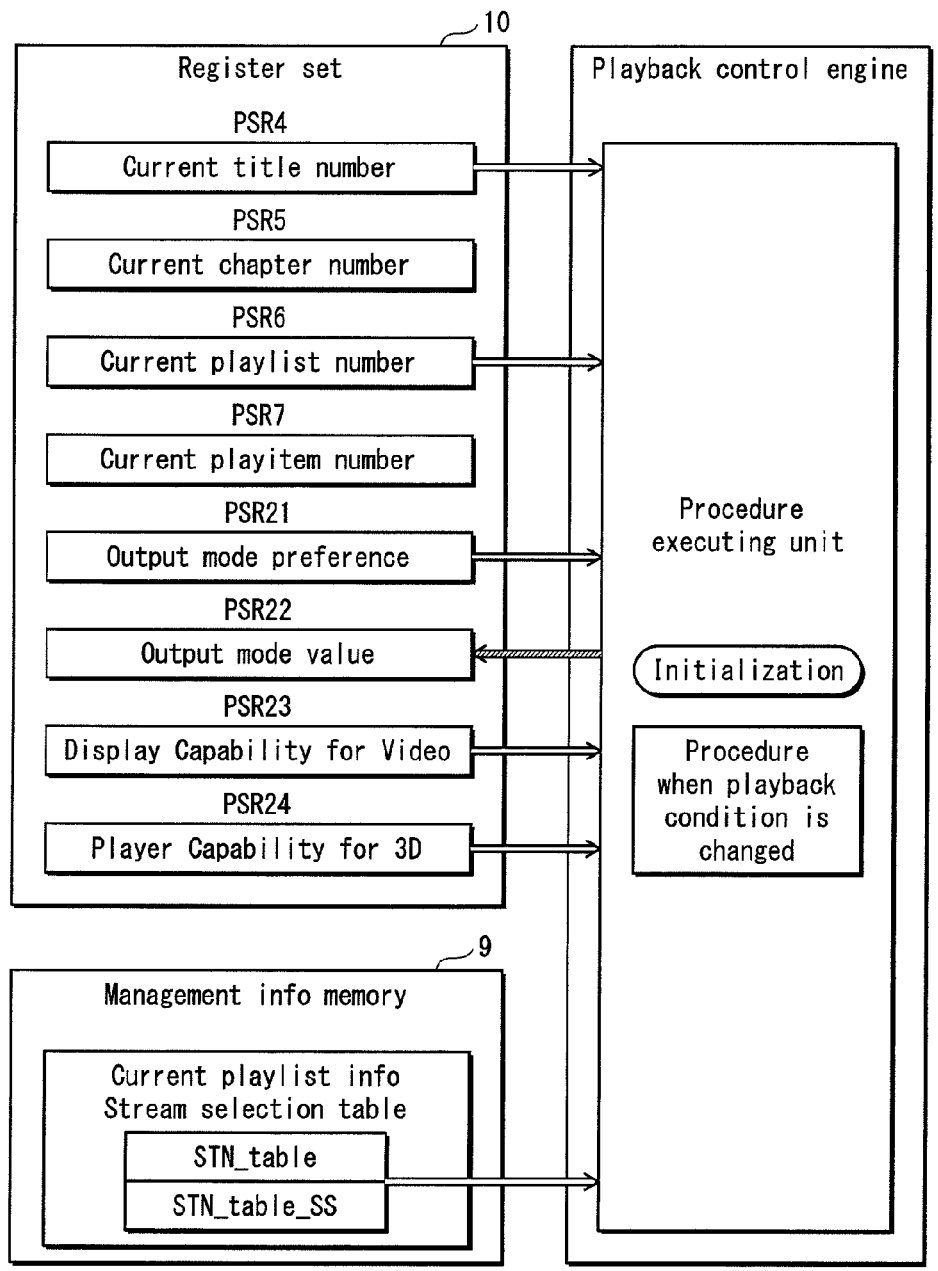
FIG. 66 shows the internal structures of the register set 10 and the playback control engine 7b.

FIG. 66 shows the internal structures of the register set 10 and the playback control engine 7b.

The left-hand side of FIG. 66 shows the internal structures of the register set 10, and the right-hand side shows the internal structures of the playback control engine 7b.

The following describes the player status registers and the player setting registers assigned with respective register numbers.

PSR1 is a stream number register for the audio stream, and stores a current audio stream number.

PSR2 is a stream number register for the PG stream, and stores a current PG stream number.

PSR4 is set to a value in the range from "1" through "100" to indicate a current title number.

PSR5 is set to a value in the range from "1" through "999" to indicate a current chapter number; and is set to a value "0xFFFF" to indicate that the chapter number is invalid in the playback device.

PSR6 is set to a value in the range from "0" through "999" to indicate a current playlist number.

PSR7 is set to a value in the range from "0" through "255" to indicate a current playitem number.

PSR8 is set to a value in the range from "0" through "0xFFFFFFFF" to indicate a current playback time point (current PTM) with the time accuracy of 45 KHz.

PSR10 is a stream number register for the IG stream, and stores a current IG stream number.

PSR21 indicates whether or not the user intends to perform the stereoscopic playback.

PSR22 indicates an output mode value.

PSR23 is used for the setting of "Display Capability for Video". This indicates whether or not a display device connected to the playback device has a capability to perform the stereoscopic playback.

PSR24 is used for the setting of "Player Capability for 3D". This indicates whether or not the playback device has a capability to perform the stereoscopic playback.

On the other hand, the playback control engine 7b includes a procedure executing unit 8 for determining the output mode of the current playlist uniquely by referring to the PSR4, PSR6, PSR21, PSR23, and PSR24, and the stream selection table of the current playlist information in the management information memory 9. The "Player Capability for 3D" stored in PSR24 means the capability of playback device regarding the 3D playback as a whole. Thus it may be simply denoted as "3D-Capability".

Figure 67:
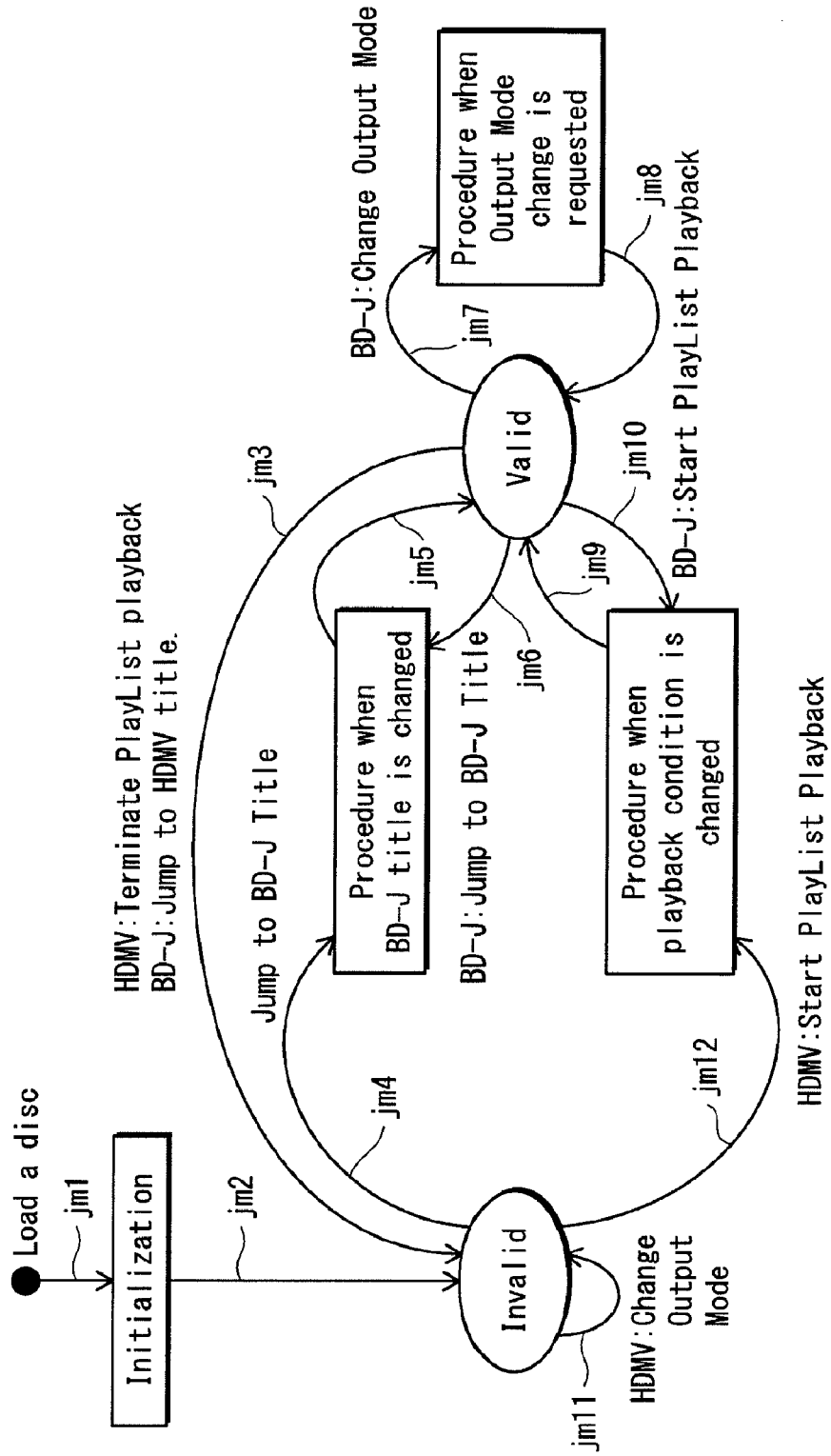
FIG. 67 shows the state transition of the selection model of the output mode.

PSR23 defines the output mode, and the selection model of the state transition is defined as shown in FIG. 67.

FIG. 67 shows the state transition of the selection model of the output mode. There exist two general states in this selection model. The two general states are represented by "invalid" and "valid" in the ovals. The "invalid" indicates that the output mode is invalid, and the "valid" indicates that the output mode is valid.

The general state is maintained unless a state transition occurs. The state transition is caused by a start of playlist playback, a navigation command, an output mode change requested by a BD-J application, or a jump to a BD-J title. When a state transition occurs, a procedure for obtaining a preferable output mode is executed.

The arrows jm1, jm2, jm3, . . . shown in FIG. 31 represent events that trigger state transitions. The state transitions in FIG. 31 include the following.

The "Load a disc" means the state in which the BD-ROM has been loaded.

The "Start presentation" means to "start playlist playback" in the HDMV mode. In the BD-J mode, it means to branch to a BD-J title. This is because, in the BD-J mode, branching to a BD-J title does not necessarily mean that a playlist starts to be played back.

The "Jump to BD-J title" means to branch to a BD-J title. More specifically, it indicates that a title (BD-J title), which is associated with a BD-J application in the index table, becomes a current title.

The "Start Playlist Playback" means that a playlist number identifying a playlist is set to a PSR, and the playlist information is read out onto the memory as the current playlist information.

The "Change Output Mode" means that the output mode is changed when the BD-J application calls the API.

The "Terminate Presentation", in the HDMV mode, means that a playback of a playlist is completed; and in the BD-J mode, means that a BD-J title jumps to a title (HDMV title) that is associated with a movie object in the index table.

When a disc is loaded, the state of the output mode transits to a temporary state "Initialization". After this, the state of the output mode transits to the invalid state.

The output mode selection state is maintained to be "invalid" until the playback start (Start Presentation) is made active. The "Start Presentation", in the HDMV mode, means that a playlist has been started to be played back; and in the BD-J mode, means that a BD-J title has been started to be played back, and some operation of a BD-J application has been started. It does not necessarily mean that a playlist has been started to be played back.

When Start Presentation is made active, the state of the output mode transits to a temporary state "Procedure when playback condition is changed".

The output mode transits to "Valid" depending on the result of "Procedure when playback condition is changed". The output mode transits to "Invalid" when the output mode is effective and Start Presentation is completed.

The navigation command in the movie object should be executed before a playlist starts to be played back because the content provider sets a preferable output mode with the command. When the navigation command in the movie object is executed, the state transits to "invalid" in this model.

Figure 68:
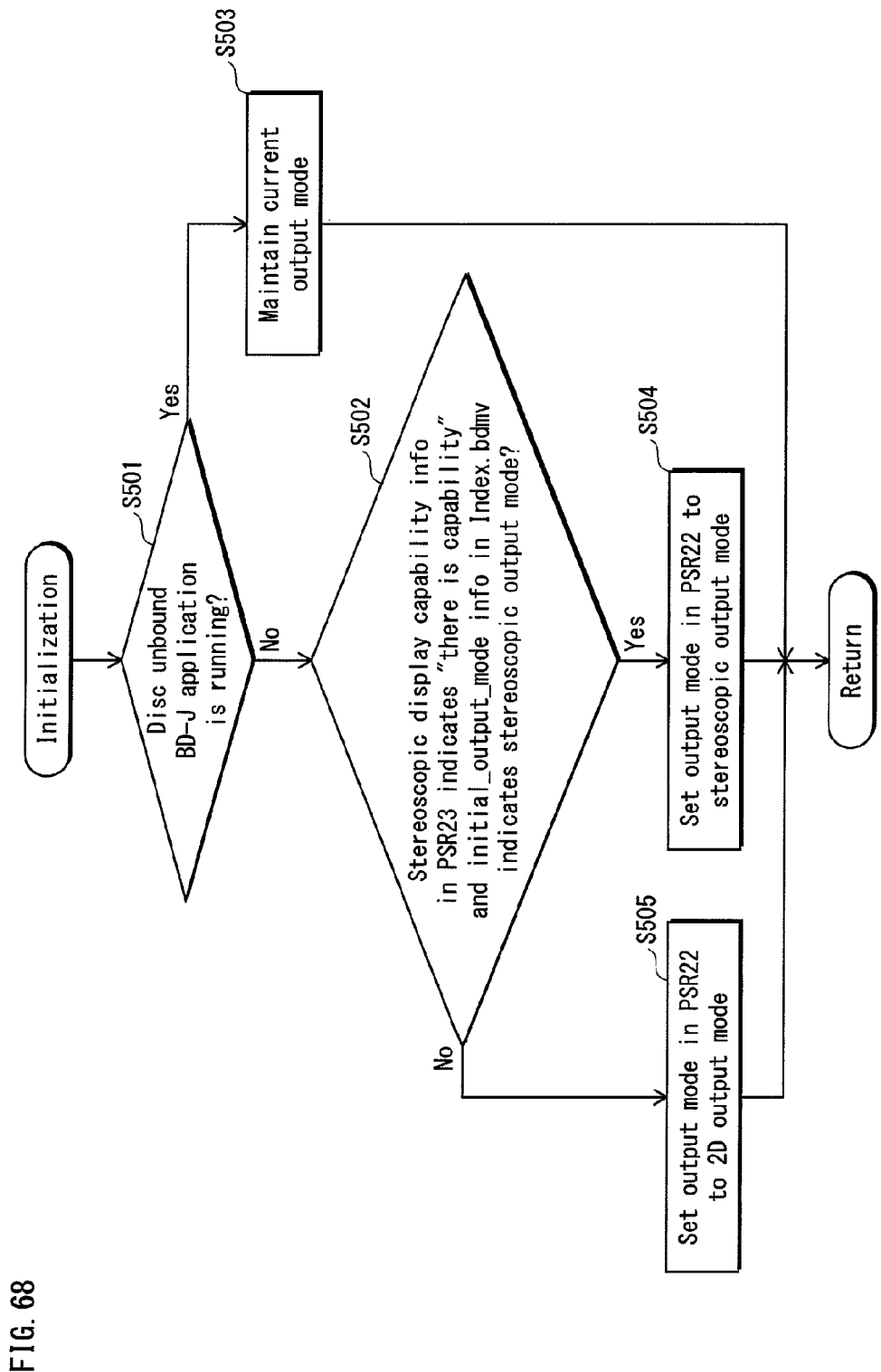
FIG. 68 is a flowchart showing the procedure for the initialization process.

FIG. 68 is a flowchart showing the procedure for the initialization process.

In step S501, it is judged whether or not a disc unbound BD-J application is running. In step S502, it is judged whether or not the stereoscopic display capability information in PSR23 indicates "there is capability" and the initial_output_mode information in Index.bdmv indicates the "stereoscopic output mode".

When it is judged as Yes in step S501, the current output is maintained in step S503. When it is judged as No in step S1 and Yes in step S502, the output mode in PSR22 is set to the stereoscopic output mode in step S504. When it is judged as No in step S501 and No in step S502, the output mode in PSR22 is set to the 2D output mode in step S505.

Figure 69:
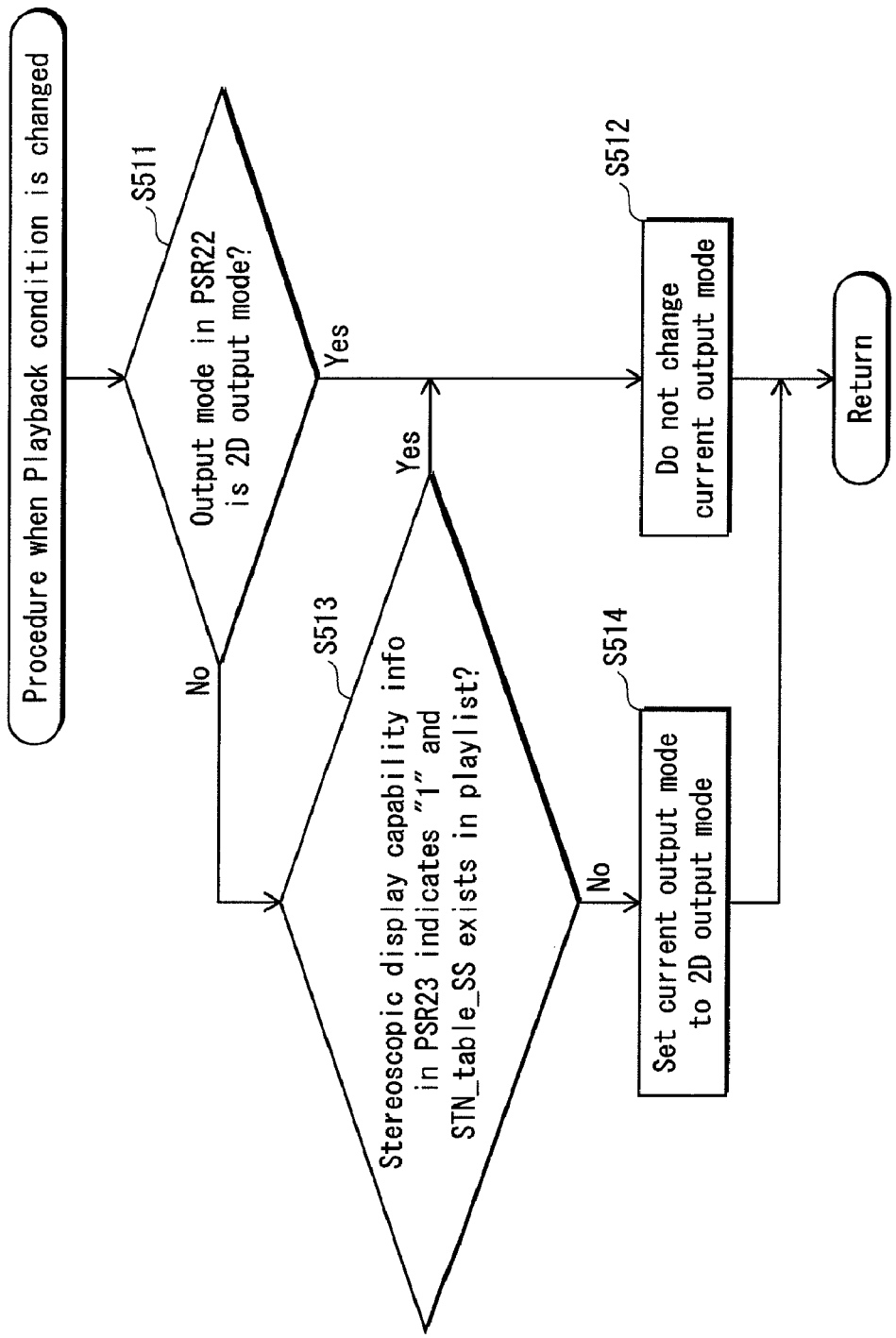
FIG. 69 shows the "Procedure when playback condition is changed"

FIG. 69 shows the "Procedure when playback condition is changed". In step S511, it is judged whether or not the output mode in PSR22 is the 2D output mode. In step S513, it is judged whether or not the stereoscopic display capability information in PSR23 indicates "1" and the extension stream selection table exists in the playlist.

When it is judged as Yes in step S511, the current output mode is not changed in step S512. When it is judged as No in step S511 and Yes in step S513, the current output mode is not changed (step S512). When it is judged as No in step S511 and No in step S513, the current output mode is set to the 2D output mode (step S514).

What should be taken into account when a playlist starts to be played back is that PES streams that can be played back in respective playitems are defined in the stream selection tables of the respective playitems. For this reason, when the current playitem starts to be played back, first, it is necessary to select an optimum one for playback from among PES streams that are permitted to be played back in the stream selection table of the current playitem. The procedure for this selection is called "stream selection procedure".

The following describes the bit assignment in the player setting register for realizing the 3D playback mode. Registers to be used to realizing the 3D playback mode are PSR21, PSR22, PSR23, and PSR24. FIGS. 70A through 70D show the bit assignment in the player setting register for realizing the 3D playback mode.

FIG. 70A shows the bit assignment in PSR21. In the example shown in FIG. 70A, the lowest-order bit "b0" represents the output mode preference. When bit "b0" is set to "0b", it indicates the 2D output mode, and when bit "b0" is set to "1b", it indicates the stereoscopic output mode. The navigation command or the BD-J application cannot rewrite the value set in PSR21.

FIG. 70B shows the bit assignment in PSR22.

The lowest-order bit "b0" in PSR22 represents the current output mode. When the output mode is changed, the video output of the playback device should be changed in correspondence with it. The value of the output mode is controlled by the selection model.

FIG. 70C shows the bit assignment in PSR23. As shown in FIG. 70C, the lowest-order bit "b0" in PSR23 represents the stereoscopic display capability of the connected TV system. More specifically, when bit "b0" is set to "0b", it indicates that the connected TV system is "stereoscopic presentation incapable"; and when bit "b0" is set to "1b", it indicates that the connected TV system is "stereoscopic presentation capable".

These values are automatically set before a playback is started, when the playback device supports an interface that negotiates with the display device. When these values are not set automatically, they are set by the user.

FIG. 70D shows the bit assignment in PSR24. As shown in FIG. 70D, the lowest-order bit "b0" in PSR24 represents the stereoscopic display capability of the playback device. More specifically, when bit "b0" is set to "0b", it indicates that the stereoscopic presentation is incapable; and when bit "b0" is set to "1b", it indicates that the stereoscopic presentation is capable.

As described above, according to the present embodiment, the validity of the output mode can be maintained even if the state of the playback is changed, or a request to switch between streams is received from the user.

Embodiment 11

The present embodiment relates to an improvement in which the plane shift is performed based on the 3D metadata embedded in the memory or middleware.

Figure 71:
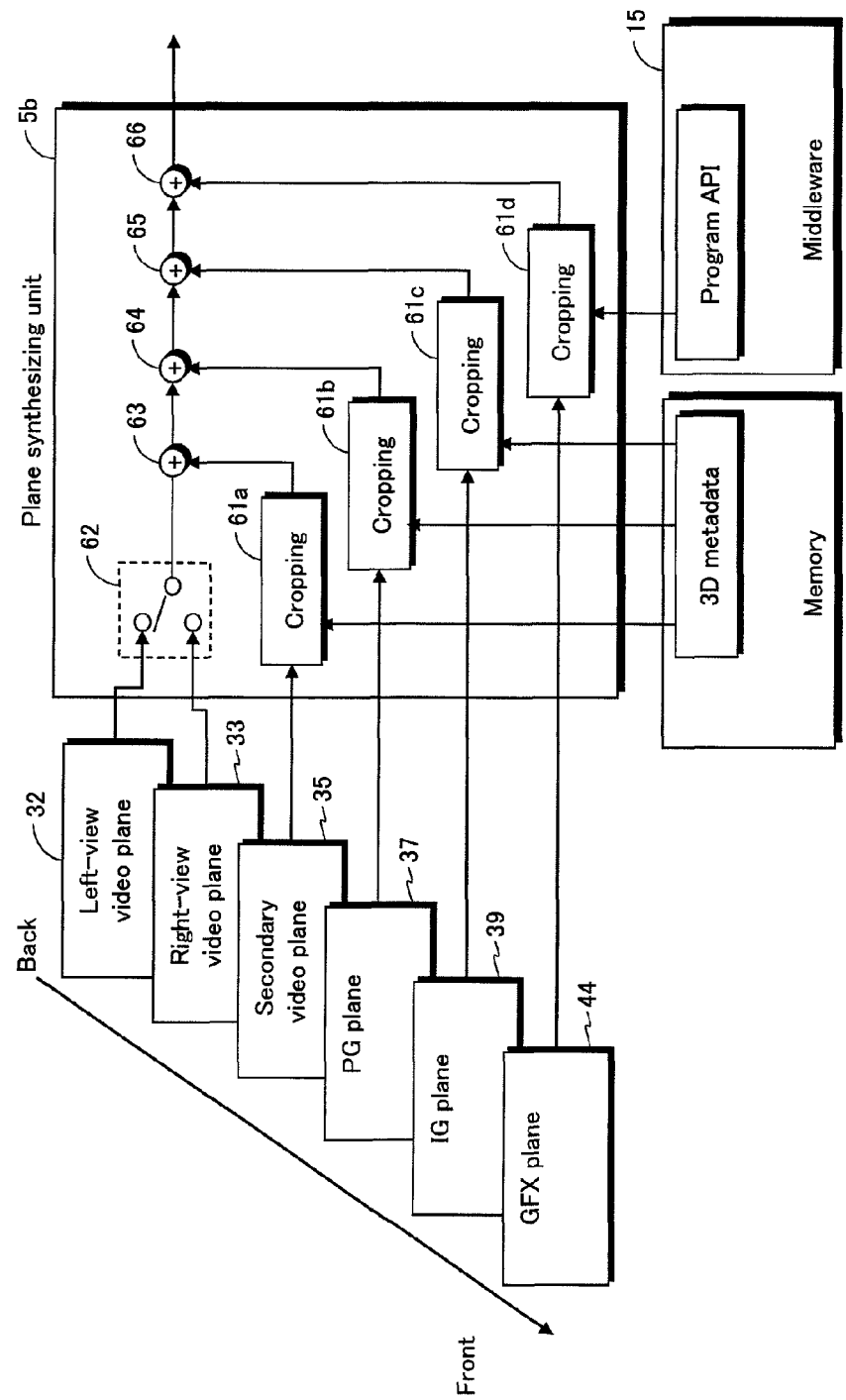
FIG. 71 shows the internal structure of the plane synthesizing unit 5b.

FIG. 71 shows the internal structure of the plane synthesizing unit 5b. As shown in FIG. 27, the plane synthesizing unit 5b includes cropping units 61a, 61b, and 61c for cropping the non-compressed picture data stored in the plane and graphics data based on the 3D metadata embedded in the memory, a cropping unit 61d for cropping the non-compressed graphics data stored in the plane based on the program API, a switch 62 for switching between the left-view video plane 32 and the right-view video plane 33 to receive an output therefrom, and addition units 63, 64, 65, and 66 for performing addition of planes.

The plane memories include a left-view video plane, a right-view video plane, a secondary video plane, a PG plane, an IG plane, and a GFX plane which are arranged in the stated order. Into the left-view video plane and the right-view video plane, the image data is written alternately at the timing of PTS by the system target decoder 4. The plane synthesizing unit 5b selects either the left-view video plane or the right-view video plane into which the image data is written at the timing of PTS, and transfers the data from the selected video plane to the superposing process so that it is superposed with the secondary video plane, PG plane, and IG plane.

As described above, according to the present embodiment, it is possible to perform the plane shift based on the offset embedded in the memory or middleware.

Embodiment 12

The present embodiment describes the data in which the contents for 2D and 3D are mixed and how the playback device should be structured to deal with the data, when the 3D-depth mode is permitted as the B-D presentation mode.

In the following description of the present embodiment, it is presumed that the 3D disc (2D-compatible) can be played back by the 2D playback device.

The 3D disc (2D-compatible) satisfies the requirements for the 2D disc with respect to the navigation data structure/ stream and file arrangement condition in relation to the 2D playback. Thus, the 2D playback device can play back only the 2D-related portion of the contents stored in the 3D disc (2D-compatible).

The 3D playback device can also play back the 2D-related portion of the contents when it is switched to the 2D playback mode.

The 3D disc (3D-only) cannot be played back by the 2D playback device since the file arrangement condition thereof is optimized for the 3D. This is because 3D-LR streams are multiplexed into one TS to increase the TS rate of 3D to be higher than the highest TS rate that the 2D playback device can support. When the 2D playback device attempts to play back the 3D disc (3D-only), the program causes the 2D playback device to transit to a warning screen, and the 2D playback device does not transit to a playback of the 3D-only disc. However, even in such a case, only the first-play title and a predetermined title need to be played back by the 2D playback device.

When the mode is switched to the 2D display mode, only the base-view images are displayed. No stream is prepared for the 2D.

Figures 72A, 72B:
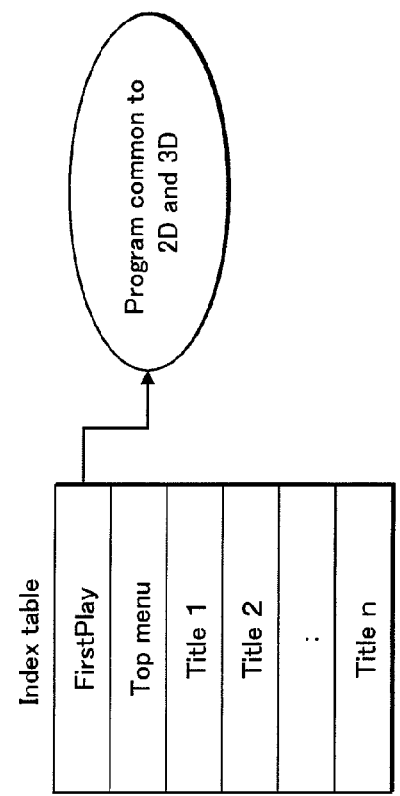
FIGS. 72A and 72B show the data in which the contents for 2D and 3D are mixed and how the data is played back by the playback device.

FIGS. 72A and 72B show the data in which the contents for 2D and 3D are mixed and how the data is played back by the playback device.

FIG. 72A shows, in the form of a table, the correspondence between the contents recorded on various discs and playback methods of various playback devices. The uppermost row of FIG. 72A indicates the 2D disc, 2D-compatible 3D disc, and 3D-only 3D disc. The left-most column of FIG. 72A indicates the 2D playback device and 3D-support playback device. Note that the 3D-support playback device refers to a playback device that can perform both the 2D and 3D playback. When the 3D-support playback device plays back a disc on which only 2D contents are recorded, it can display only the 2D contents.

According to the correspondence shown in the table of FIG. 72A, the 2D playback device not supporting the 3D cannot play back discs that include only contents for 3D. Meanwhile, it is not possible for the users to discern a 3D disc from a 2D disc merely by its shape. Accordingly, the users may erroneously attempt to play back a 3D disc on a 2D playback device, and do not understand why no image or audio is played back, what is happening.

As the means for preventing such a case, a hybrid disc containing both the 2D content and the 3D content is considered so that the 2D playback device can play back a disc even if it contains a 3D content. The hybrid disc might be configured so that the 3D playback device can play back the 3D content contained in the hybrid disc and the 2D playback device can play back the 2D content contained in the hybrid disc.

However, when the AV stream for 2D and the AV stream for 3D are independently recorded on the disc, even the overlapping data is recorded. This requires an extra amount of capacity. Therefore, it is necessary to share the data portion that is common to the AV stream for 2D and the AV stream for 3D, restrict the data size as necessary, and ensure that appropriate data is played back both in the 2D playback device and the 3D playback device.

The following describes the management information that is used to manage the data.

FIG. 72B shows the internal structure of the index table. As shown in FIG. 72B, a program that runs in common to the 2D playback device and the 3D playback device is written in an entry that corresponds to the first-play title. With this structure, the operation when the disc is loaded into the 2D playback device is ensured.

FIG. 73 is a state transition diagram showing the switch between 2D and 3D.

The left-hand side of FIG. 73 shows the state transition of video. The video is composed of three states: State L; State L+R; and State L+Depth.

The state transition (1) occurs when switching is made at the output. The state transition (2) occurs when switching is made at the output.

The state transition (3) occurs when the decode-target streams are switched. The seamless switching is not guaranteed.

The right-hand side of FIG. 73 shows the state transition of graphics. The graphics are subtitle graphics, rendering subtitle graphics, and menu graphics.

The state transition (4) occurs when the offset switching between planes occurs.

The state transition (5) occurs when switching is made at the output.

The state transition (6) occurs when the decode-target streams are switched. The seamless switching is not guaranteed. The playback of AV is interrupted when preloaded streams are switched.

The state transition (7) occurs when the decode-target streams are switched. The seamless switching is not guaranteed.

The state transition (8) occurs when the switch from L to LR or LR to L is made. The decode-target streams are not switched.

Embodiment 13

The present embodiment describes system parameters required for the 3D playback.

FIGS. 74 through 79 show system parameters required for the 3D playback.

FIG. 74 shows the dependent-view capability and the 3D-depth capability.

FIG. 75 shows the system parameters extended to identify the 3D playback capabilities in more detail. More specifically, the bit assignment for this extension is as follows: a bit sequence [b22:b16] is assigned to the "1 plane+offset" method; a bit sequence [b14:b8] is assigned to the 3D-depth method; and a bit sequence [b6:b0] is assigned to the 3D-LR method. The bits constituting these bit sequences indicate whether or not the capability is present, with respect to each of the background image plane, primary video plane, secondary video plane, text subtitle plane, PG plane, IG plane, and Java graphics plane.

FIG. 76 shows the database identification information for identifying whether or not the playback device supports the data structure that has been extended for the 3D. The database identification information includes the number of versions of the application formats that are supported by the playback device, and thus becomes the player profile information. The information can also be used to judge whether or not the device can deal with the management data that has been extended for the 3D, when the program selects a stream to be played back.

Figure 77:
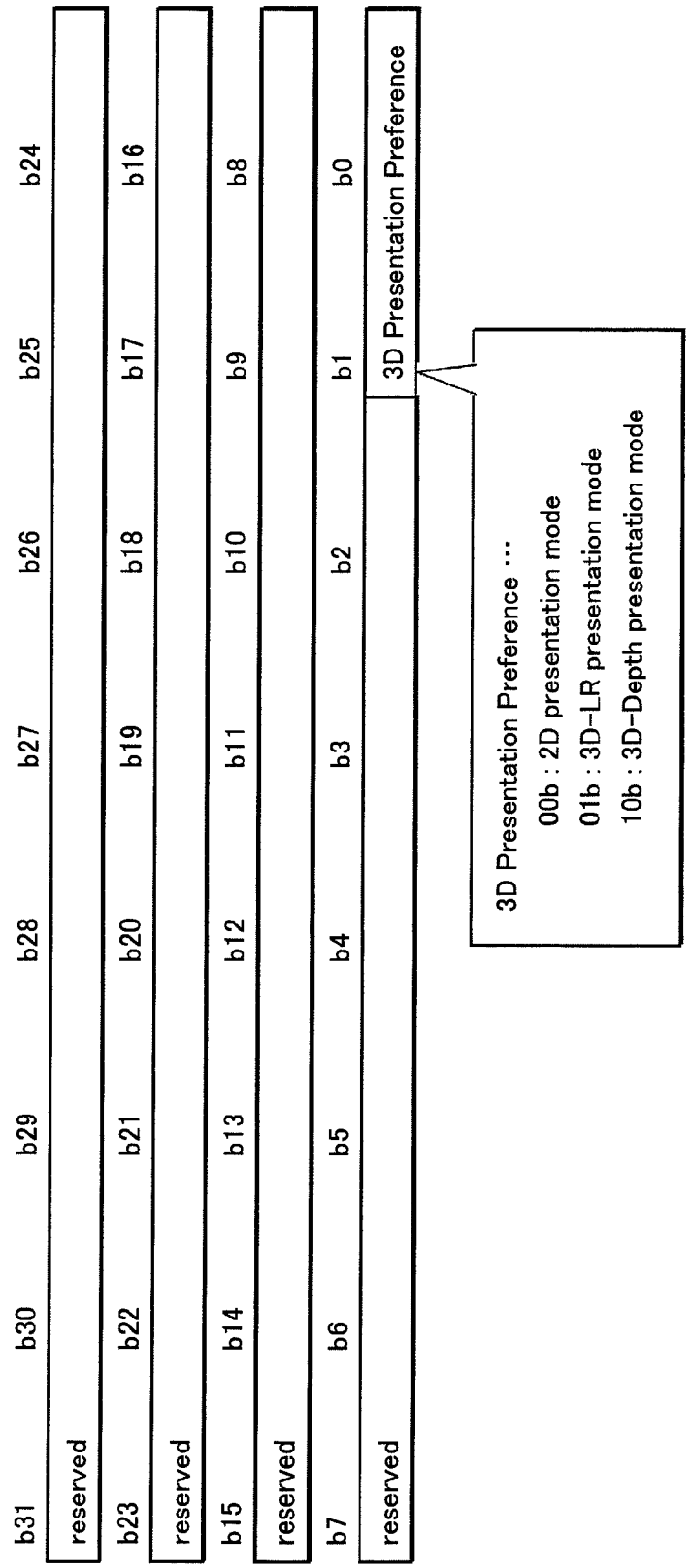
FIG. 77 shows a system parameter in which the user's preference regarding the presentation format is set.

FIG. 77 shows a system parameter in which the user's preference regarding the presentation format is set. For example, when one disc contains the data for the LR method and the data for the depth method, the program recorded on the disc can select a playlist that includes the data conforming to the preference of the user, by referring to the value of the system parameter. In the example shown in FIG. 77, the 3D Presentation Preference set to: "00b" indicates the 2D presentation mode; "01b" indicates the 3D-LR presentation mode; and "10b" indicates the 3D-depth presentation mode.

FIG. 78 shows a system parameter indicating the display format of the current playback. By referencing the system parameter, the program can judge which of the 2D method and the LR method to use when displaying the menu graphics or the like.

In the example shown in FIG. 78, the 3D Presentation Type set to: "00b" indicates the 2D presentation mode; "01b" indicates the 3D-LR presentation mode; and "10b" indicates the 3D-depth presentation mode.

Also, the bits "b31" through "b16" are assigned to the plane memories of the background image, primary video, secondary video, text subtitle, and Java graphics. It is possible to indicate for each method whether the 3D method is available.

Figure 79:
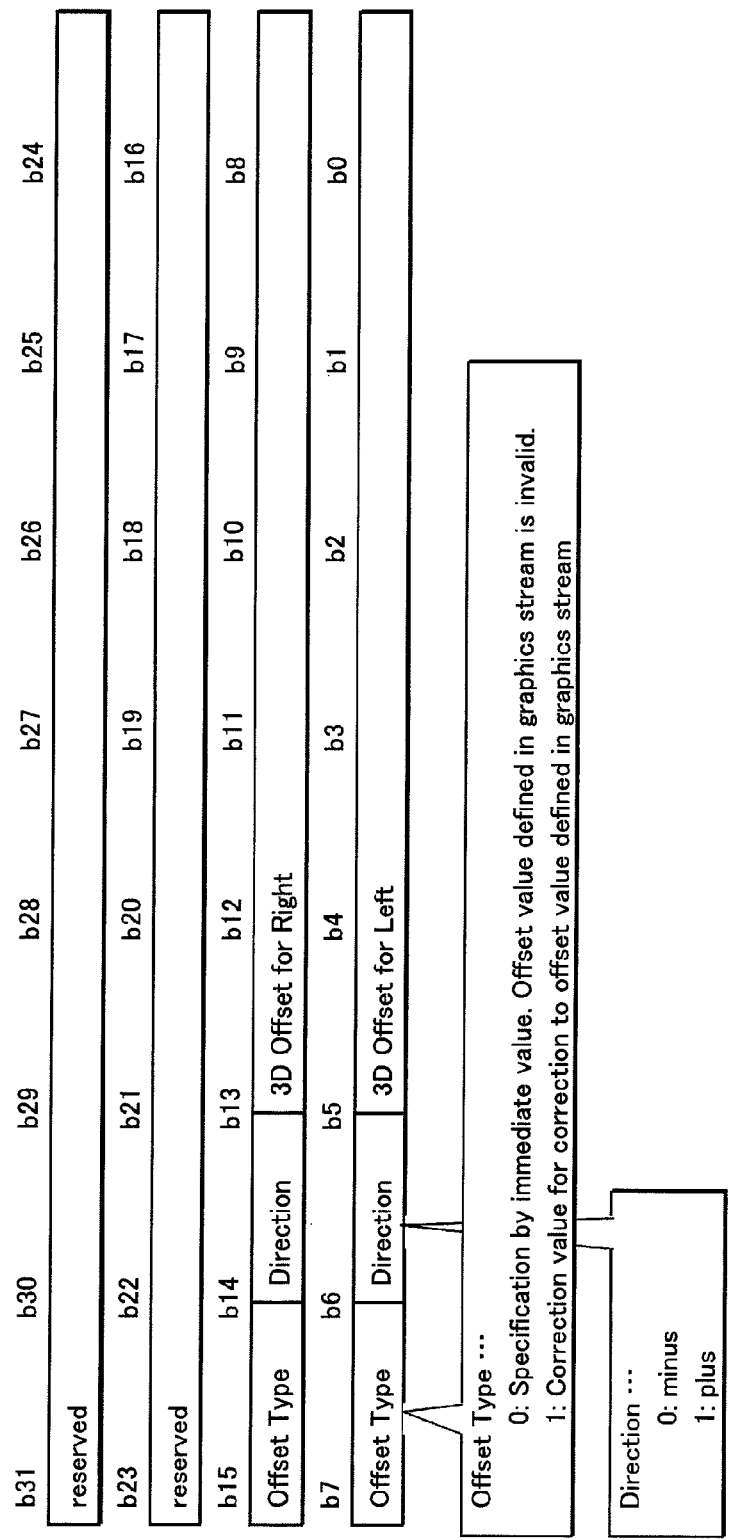
FIG. 79 shows a bit assignment for storing the 3D offset correction value.

Here, correction of the offset value will be described. The appropriate offset value may be different depending on the size of the display. When appropriate offset values for different display sizes are set in the playback device, the playback device can perform more appropriate display by adjusting the values of the system parameters when it displays the subtitle graphics or the menu graphics by the offset method. FIG. 79 shows a bit assignment for storing the 3D offset correction value. The bit [b15] indicates the offset type. The bit [b14] indicates the direction. The bit sequence [b13:b8] indicates 3D Offset for Right. The bit [b7] indicates the offset type. The bit [b6] indicates the direction. The bit sequence [b5:b0] indicates 3D Offset for Left. The Offset Type set to: "0" indicates the specification by the immediate value, and indicates that the offset value defined in the graphics stream is invalid; and "1" indicates that it is the correction value for correction to the offset value defined in the graphics stream. The Direction set to: "0" indicates the minus direction; and "1" indicates the plus direction. The "3D Offset for Right" indicates the offset for the right view, and "3D Offset for Left" indicates the offset for the left view.

The values of this system parameter can be set from the program on the disc. In that case, this system parameter can be used to change the depth of the graphics depending on the scene, for example.

(2D/3D Switch User Operation)

The following describes the 2D/3D switch user operation API. FIGS. 80A and 80B show the user operation. API for switching between the 2D and 3D display methods. The API shown in FIG. 80A has an argument for identifying the display method to which the current one is to be switched. This API is an API between the user event processing unit and the middleware. The description format of this API is "Change3DpresentationType (3DpresentationType)". As the argument "3D Presentation Type", any of "00:2 D", "01:3D-LR", and "10:3D-Depth" can be specified.

Indication of whether to permit the use of "Change3DpresentationType" API can be embedded into the user operation mask table. FIG. 80B shows an example of description into the source code when "Change3DpresentationType" is described in the user operation mask table (UO_mask_table).

(Change of 3D Offset)

The following describes the Change 3D Offset command.

Figure 81:
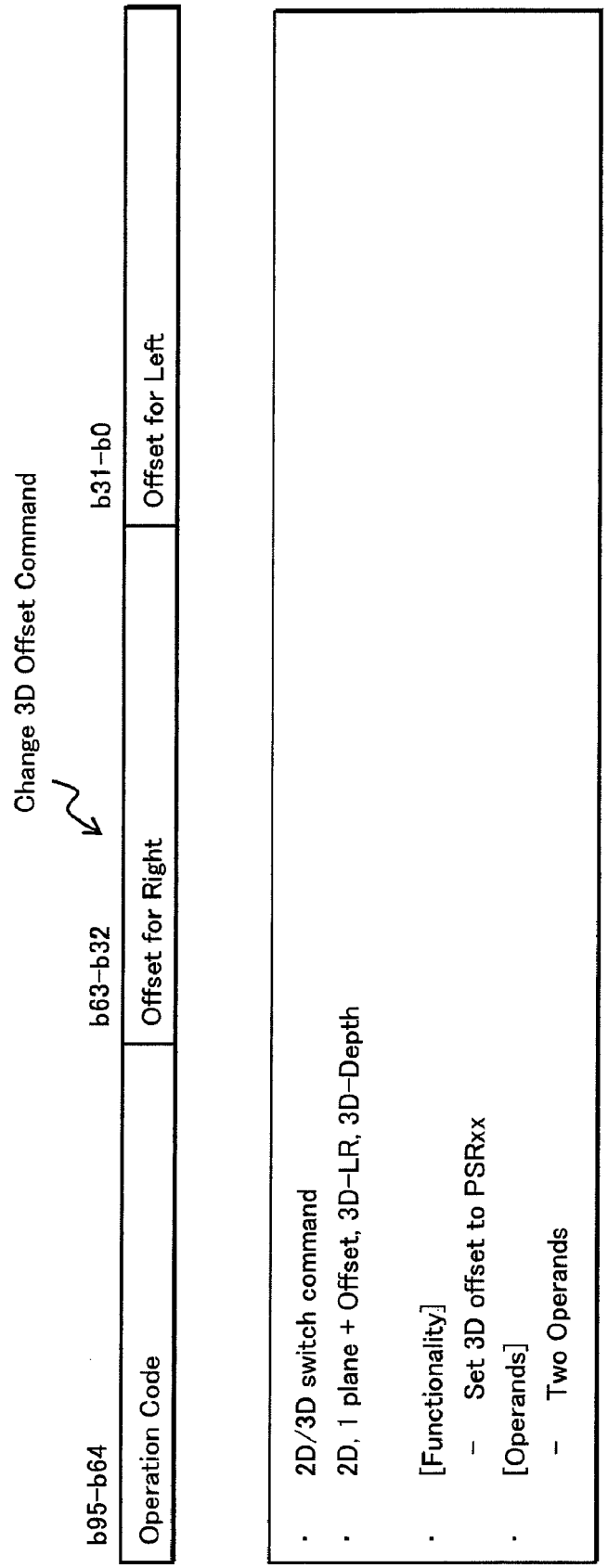
FIG. 81 shows the operation codes and operands of the Change 1plane+Offset mode command.

FIG. 81 shows the operation codes and operands of the Change 1plane+Offset mode command. The upper part of FIG. 81 shows a bit assignment to the operation code and operands. This command has two operands that can specify the offset for the right view and the offset for the left view.

(2D/3D Switch Command)

The lower part of FIG. 81 shows the 2D/3D switch command. The operand of this command can specify any of "2D", "1 plane+Offset", "3D-LR", and "3D-Depth".

(Switching Between Playback Modes in 3D)

The following describes the commands used for switching between playback modes in 3D. The commands can be used to change the values of the above-described system parameters and switch between display methods.

Figure 82:
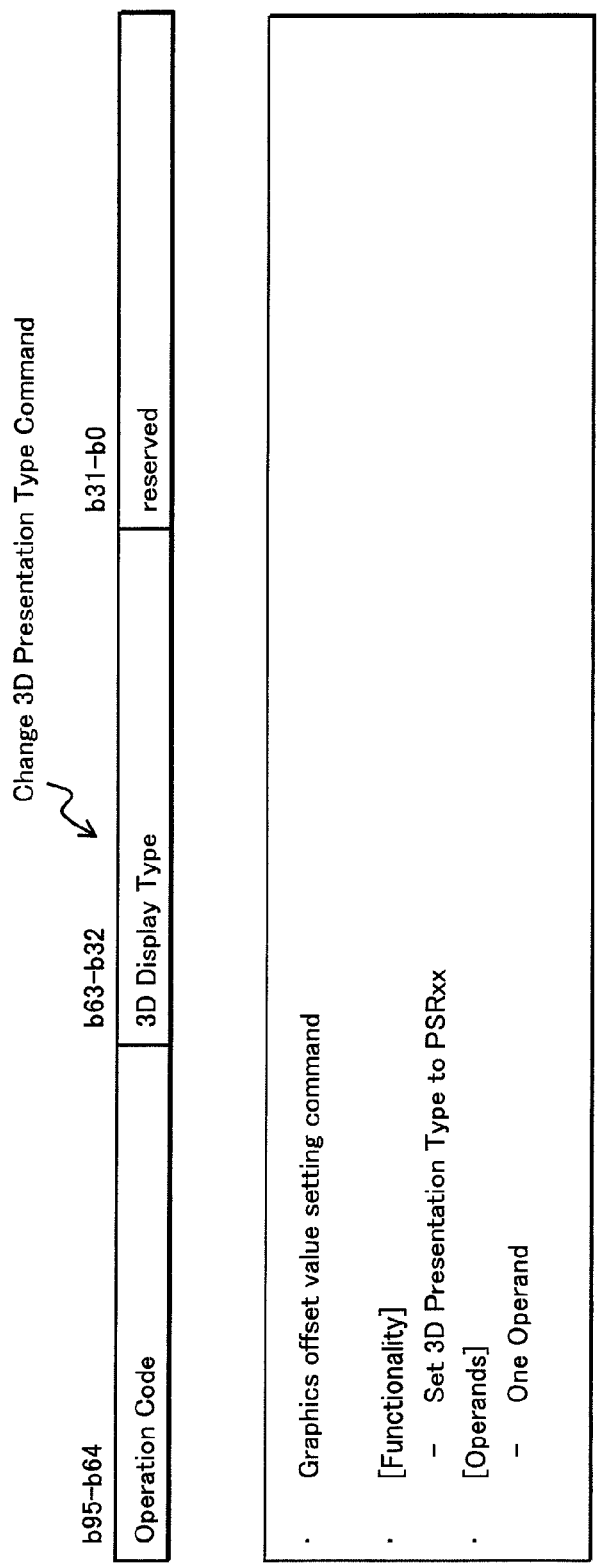
FIG. 82 shows the Change 3D Presentation Type command.

FIG. 82 shows the Change 3D Presentation Type command. The upper part of FIG. 82 shows the bit assignment. A bit sequence [b63:b32] "3D Display Type" in this command indicates that the playback mode is changed.

The lower part of FIG. 82 shows the format of the graphics offset value setting command. This command sets the 3D playback type in any PSR (Set 3D Presentation Type to PSRxx), and the operand can specify any of "2D", "1 plane+Offset", "3D-LR", and "3D-Depth" as the mode after switching.

Embodiment 14

The present embodiment describes the method of sharing a part common to the 2D AV stream and the 3D AV stream so that the data size is restricted to the necessary minimum.

Figure 83:
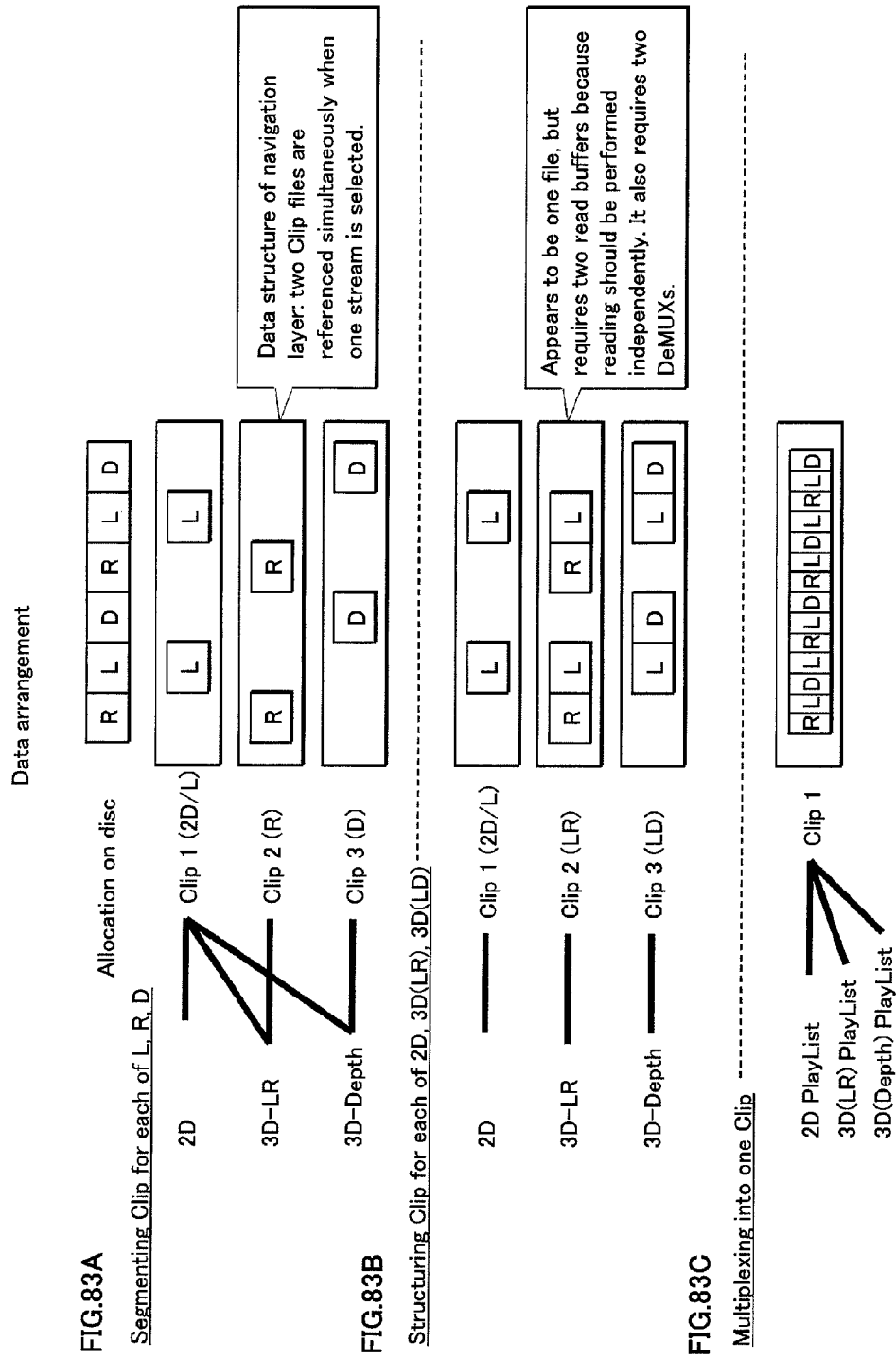
FIGS. 83A through 83C show how transport streams for three modes are stored in the files.

FIGS. 83A through 83C show how transport streams for three modes are stored in the files. As shown in these figures, in order to efficiently read out, from the disc, the data blocks required for the LR method and the data blocks required for the depth method, the data blocks for the left view (L), the data blocks for the right view (R), and the data blocks for the depth (D) are recorded on the disc in an interleaved manner. The data blocks for each mode are referenced by the file system so that the three stream files of the interleaved AV clips are defined on the recording medium.

The playlist for the 2D playback (2D PlayList) references the file containing the data blocks for the left view (L), and the playlist for the LR method (3D (LR) PlayList) references the AV clip containing the data blocks for the left view (L) and the AV clip containing the data blocks for the right view (R).

The following describes the recording method for recording the data blocks for the left view (L), the data blocks for the right view (R), and the data blocks for the depth (D) onto the disc in an interleaved manner.

These data blocks arranged in an interleaved manner constitute the stereoscopic interleaved stream file. The stereoscopic interleaved stream file is cross-referenced by the following three files. The first file is a stream file of Clip 1 (2D/L) that contains only the data blocks for the left view (L). The second file is a stream file of Clip 2 (R) that contains only the data blocks for the right view (R). The third file is a stream file of Clip 3 (D) that contains only the data blocks for the depth (D). When such cross-reference is realized, the playback device has only to read out a stream file corresponding to a playback mode among the three modes when the playback device is set to the playback mode.

The top part of FIG. 83A shows that, in the stereoscopic interleaved stream file, the data blocks for the left view (L), the data blocks for the right view (R), and the data blocks for the depth (D) are arranged in the order of R, L, D, R. L, D in the interleaved manner.

The part under the top part of FIG. 83A shows three stream files that respectively store Clip 1 (2D/L), Clip 2 (R), and Clip 3 (D). The cross-reference indicates that Clip 1 (2D/L) stores only the data blocks for the left view (L), Clip 2 (R) stores only the data blocks for the right view (R), and Clip 3 (D) stores only the data blocks for the depth (D).

The left-hand side of FIG. 83A shows the three modes: 2D; 3D-LR; and 3D-depth. The lines connecting the three modes with the three stream files shows the use relationship indicating which AV clips are used by which modes.

The use relationship indicates that AV clip 1 can be referenced in any of the 2D, 3D-LR, and 3D-depth modes; AV clip 2 can be referenced only in the 3D-LR mode; and AV clip 3 can be referenced only in the 3D-depth mode.

Another method for realizing the cross-reference is to pack the data blocks for the left view (L) and the right view (R), which are required for the 3D-LR mode, to the stream file of one AV clip, and to pack the data blocks for the left view (L) and the depth (D), which are required for the 3D-depth mode, to the stream file of one AV clip.

The right-hand side of FIG. 83B shows three stream files that respectively store Clip 1 (2D/L), Clip 2 (LR), and Clip 3 (LD). The cross-reference indicates that Clip 1 (2D/L) stores only the data blocks for the left view (L), Clip 2 (LR) stores the data blocks for the left view (L) and the right view (R), and Clip 3 (LD) stores the data blocks for the left view (L) and the depth (D).

The left-hand side of FIG. 83B shows the three modes: 2D; 3D-LR; and 3D-depth. The lines connecting the three modes with the three stream files shows the use relationship indicating which AV clips are used by which modes.

The use relationship indicates that AV clip 1 can be referenced only in the 2D mode; AV clip 2 can be referenced only in the 3D-LR mode; and AV clip 3 can be referenced only in the 3D-depth mode.

A still another method for realizing the cross-reference is to multiplex the data blocks for the left view (L), the right view (R), and the depth (D) into one transport stream so that they can be reference by the playlists that correspond to the three playback modes.

The right-hand side of FIG. 83C shows a transport stream in which the data blocks for the left view (L), the right view (R), and the depth (D) are multiplexed. The left-hand side of FIG. 83C shows three playlists: 2D playlist; 3D (LR) playlist; and 3D (depth) playlist. The lines connecting the three playlists with the stream file shows the use relationship indicating which AV clips are used by which modes.

Any of the above-described methods can be used to record the data, and any of the above-described methods stream identifiers are preliminarily assigned to the streams. This makes it easy and efficient to extract each type of data.

Figure 84:
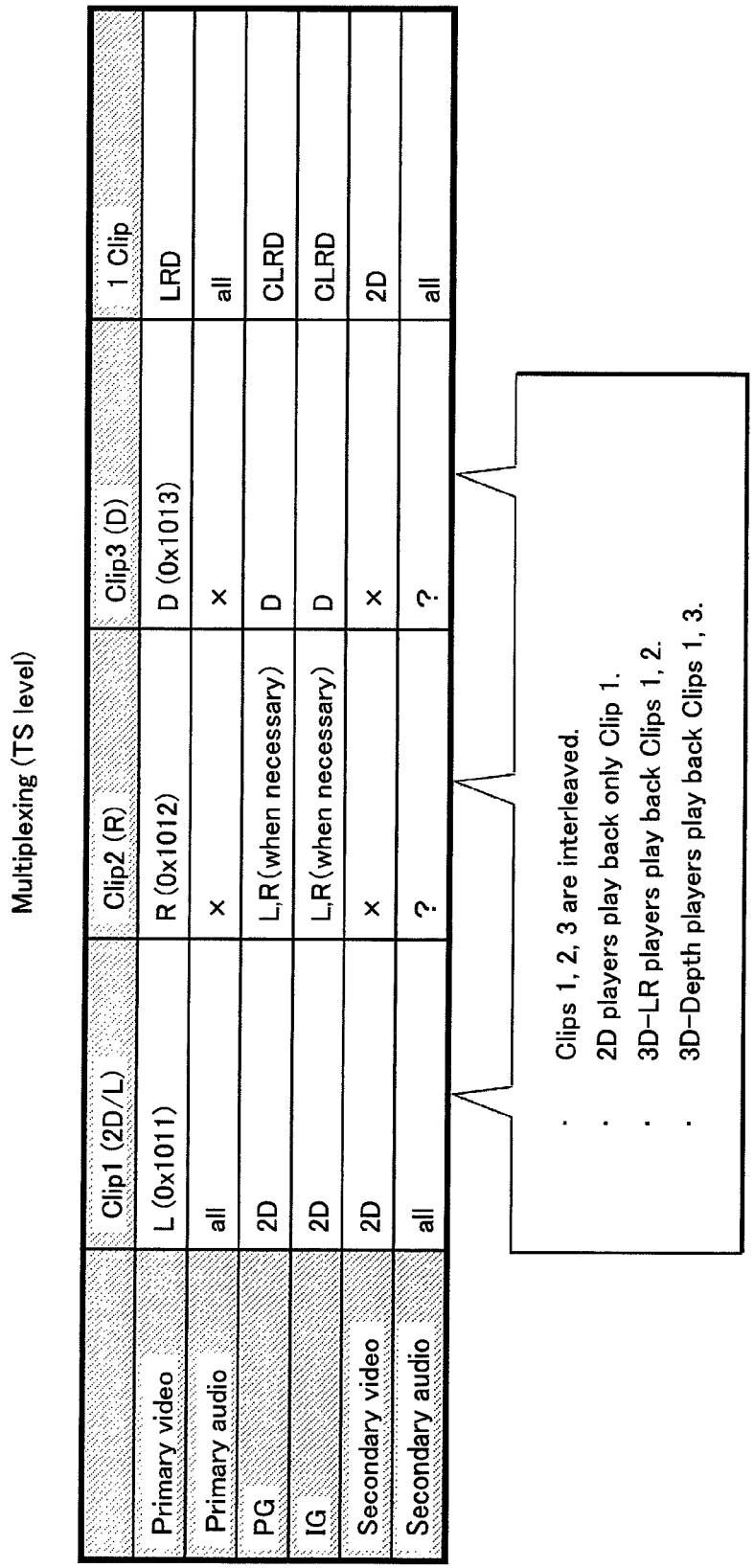
FIG. 84 shows, in the form of a table, the multiplexing at the transport stream level.

FIG. 84 shows, in the form of a table, the multiplexing at the transport stream The uppermost row of FIG. 84 indicates the AV clips for: 2D/L (Clip1 (2D/L); R (Clip2 (R); and Depth (Clip3 (D), and 1 Clip. The left-most column of FIG. 84 indicates the primary video stream, primary audio stream, PG stream, IG stream, secondary video stream, and secondary audio stream. In the example shown in FIG. 84, Clips 1, 2, and 3 are disposed in the interleaved manner. The 2D playback device plays back only AV clip 1, the 3D-LR playback device plays back AV clips 1 and 2, and 3D-depth playback device plays back AV clips 1 and 3.

Embodiment 15

The present embodiment describes which elementary streams of which packet identifiers are subjected to the playback in correspondence with the stream number set in the playback device when the playback device is set to any of the 3D-LR, 3D-depth, and "1 plane+offset" modes.

In the following description of the present embodiment, it is presumed that the packet identifiers (PIDs) of the graphics streams for 2D, LR, and Depth are segmented in the rages of +20/40/60. Note that any PID value can be specified directly from the stream selection table.

In the case of the PG stream, the following rule is made, for example: in order to associate the 2D PG stream with the stereoscopic PG stream, the PIDs of the multiplexed streams are associated such that the PIDs of the stereoscopic PG stream are obtained by adding 0x20/0x40/0x60 to the PIDs of the 2D PG stream.

FIG. 85 shows the assignment of PIDs to the transport stream (TS) packets. The AV clips contain TS packets to which these PIDs are assigned.

FIGS. 86A through 86C show the primary video stream and the primary audio stream.

The frames represented by the dotted lines in FIG. 86A show which TS packets of which PIDs are the target of demultiplexing in each output mode. The example shown in FIG. 86A indicates that: the TS packets constituting the base view are the target of demultiplexing in the 2D mode; the TS packets constituting "the base view+the dependent view" are the target of demultiplexing in the 3D-LR mode; and the TS packets constituting "the base view+the depth information" are the target of demultiplexing in the 3D-depth mode.

More specifically, when the playback device is in the 2D mode, the TS packet of PID=0x1101 is the target of demultiplexing.

When the playback device is in the 3D-LR mode, the TS packet of PID=0x1101 and the TS packet of PID=0x1012 are the target of demultiplexing.

When the playback device is in the 3D-depth mode, the TS packet of PID=0x1101 and the TS packet of PID=0x1013 are the target of demultiplexing.

The table shown in FIG. 86B shows combinations with which the secondary video stream cannot coexist. According to FIG. 86B, the secondary video stream cannot coexist with the combination of MPEG-4 AVC Base View as the base-view stream and MPEG-4 AVC Dependent View as the dependent-view stream. Also, the secondary video stream cannot coexist with: the combination of the base-view stream and the dependent-view stream that are both MPEG-2 Video; the combination of the base-view stream and the dependent-view stream that are both MPEG-4 AVC; and the combination of the base-view stream and the dependent-view stream that are both VC-1.

FIG. 86C shows the internal structures of the primary audio streams to which stream numbers 1, 2, and 3 have been assigned, respectively. Basically, the audio stream is used in common to the 2D mode and the 3D mode. The frames represented by the dotted line indicate the TS packets that are the targets of dmultiplexing in the three modes. In FIG. 86C, it is presumed that the audio stream with PID=0x1101 is a channel-extended stream.

When the stream number of the audio stream is set to "1" in the 2D/3D playback mode, the TS packet with PID=0x1100 becomes the target of dmultiplexing.

When the stream number of the audio stream is set to "2" in the 2D/3D playback mode, the TS packet with PID=0x1101 becomes the target of dmultiplexing.

When the stream number of the audio stream is set to "3" in the 2D playback mode, the TS packet with PID=0x1102 becomes the target of dmultiplexing.

FIGS. 87A through 87C show PG streams to which stream numbers 1 and 2 are assigned. The 2D subtitle and the 3D subtitle correspond to each other one to one.

The frames represented by the dotted line in the figures indicate the TS packets that are the targets of dmultiplexing in the three modes: 2D playback mode; 3D-LR mode; and 3D-depth mode.

When the stream number of the PG stream is set to "1" in the 3D-depth mode, the PG stream composed of TS packet with PID=0x1260 is played back.

When the stream number of the PG stream is set to "1" in the 2D mode, the "1 plane+offset" mode, or the 3D-LR mode, the TS packet with PID=0x1200 becomes the target of demultiplexing.

When the stream number of the PG stream is set to "2" in the 3D-depth mode, the PG stream composed of TS packet with PID=0x1261 becomes the target of demultiplexing.

When the stream number of the PG stream is set to "2" in the 2D mode or the "1 plane+offset" mode, the PG stream composed of TS packet with PID=0x1201 becomes the target of demultiplexing.

When the stream number of the PG stream is set to "2" in the 3D-LR mode, the PG stream composed of TS packets with PID=0x1221 and PID=0x1241 becomes the target of demultiplexing.

FIG. 87B shows the text subtitle streams.

When the stream number of the text subtitle stream is set to "1" in the 2D mode, the TS packet with PID=0x1800 becomes the target of demultiplexing. When the stream number of the text subtitle stream is set to "2" in the 2D mode, the TS packet with PID=0x1800 becomes the target of demultiplexing, as well.

When the stream number of the text subtitle stream is set to "1" or "2" in the "1 plane+offset (3D-LR)" mode or the 3D-depth mode, the TS packet with PID=0x1801 becomes the target of demultiplexing.

FIG. 87C shows the IG streams.

When the stream number of the IG stream is set to "1" in the 3D-depth mode, the TS packet with PID=0x1460 becomes the target of demultiplexing. When the streamnumber of the IG stream is set to "2" in the 3D-depth mode, the TS packet with PID=0x1461 becomes the target of demultiplexing.

When the stream number of the IG stream is set to "1" in the 2D mode or the "1 plane+offset" mode, the TS packet with PID=0x1400 becomes the target of demultiplexing. When the stream number of the IG stream is set to "2" in the 2D mode or the "1 plane+offset" mode, the TS packet with PID=0x1401 becomes the target of demultiplexing.

When the stream number of the IG stream is set to "1" in the 3D-LR (2Dec) mode, the TS packet with PID=0x1400 becomes the target of demultiplexing. When the stream number of the IG stream is set to "2" in the 3D-LR (2Dec) mode, the TS packet with PID=0x1421 and the TS packet with PID=0x1441 become the target of demultiplexing.

FIGS. 88A and 88B show the TS packets constituting the secondary video stream and the secondary audio stream.

FIG. 88A shows the secondary audio stream.

When the stream number is set to "1" in the 3D-LR mode, the TS packet for the right view with PID=0x1B20 and the TS packet for the left view with PID=0x1B00 become the target of demultiplexing.

When the stream number is set to "1" in the 2D mode, the TS packet for the left view with PID=0x1B00 becomes the target of demultiplexing.

When the stream number is set to "1" in the "1 plane+offset" mode, the TS packet for the left view with PID=0x1B00 and the offset information become the target of demultiplexing.

When the stream number is set to "1" in the 3D-depth mode, the TS packet for the left view with PID=0x1B00 and the TS packet for the depth information with PID=0x1B40 become the target of demultiplexing.

When the stream number is set to "2" in any of the modes, the TS packet for the left view with PID=0x1B00 becomes the target of demultiplexing.

When the primary video stream is the 3D display format, it is possible for the secondary video stream to select any of the 2D playback mode, "1 plane+offset" mode, 3D-LR mode, and 3D-depth mode depending on the decode capability of the playback device and the display format of the primary video stream.

The following explains the case where the primary audio stream is mixed to be output.

The secondary audio stream, like the primary audio stream, may be the same in both the 2D and the 3D, or may be separately prepared for the 2D and the 3D, respectively. When it is separately prepared for the 2D and the 3D, the extended stream may be set, or it may be segmented.

FIG. 88B shows the secondary audio streams.

When the stream number is set to "1" in the 2D playback mode, the TS packet with PID=0x1100 becomes the target of demultiplexing. When the stream number is set to "1" in the 3D playback mode, the TS packet with PID=0x1100 becomes the target of demultiplexing, as well.

When the stream number is set to "2" in the 2D or 3D playback mode, the TS packet with PID=0x1101 becomes the target of demultiplexing.

When the stream number is set to "3" in the 2D playback mode, the TS packet with PID=0x1102 becomes the target of demultiplexing. When the stream number is set to "3" in the 3D playback mode, the TS packet with PID=0x1103 becomes the target of demultiplexing.

This completes the description of the management of the streams for the 2D/3D display format.

Embodiment 16

The present embodiment relates to an improvement regarding the connection state indicated by the connection state information.

The connection state information indicates the connection type of the connection between the current playitem and the preceding playitem when the corresponding playitem becomes the current playitem indicated by the current playitem information. It should be noted here that the playitem is composed of an STC sequence for which In_Time and Out_Time are set, and an ATC sequence composed of the "mother" of the STC sequence. The connection between a playitem and the preceding playitem falls into any of the following three types depending on whether the ATC sequences are continuously connected, or whether the STC sequences are continuously connected.

The first one is a connection type called "connection_condition=1" in which the ATC sequences and the STC sequences are not connected continuously, and the seamless playback is not guaranteed.

The second one is a connection type called "connection_condition=5" in which the ATC sequences are not continuous, and a clean break is present in the STC sequences. In the connection type involving the clean break, in two video streams that are played back continuously, (1) the start time of the first video presentation unit in the video stream that is positioned immediately after the connection point and (ii) the end time of the last video presentation unit in the video stream that is positioned immediately before the connection point, are continuous in the system time clock time axis. This makes the seamless connection possible.

On the other hand, in two audio streams that are played back continuously via a connection point of the ATC sequence, there is an overlap between (i) the start time of the first audio presentation unit in the audio stream that is positioned immediately after the connection point and (ii) the end time of the last audio presentation unit in the audio stream that is positioned immediately before the connection point. With respect to this overlap, the audio output is muted.

The third one is a connection type called "connection condition=6" in which the ATC sequences and the STC sequences are connected continuously. In this connection type, the connection point of the two video streams via the connection matches the boundary between GOPs.

The seamless connection in "connection_condition=5" is realized by the following procedure.

A differential value of ATC (ATC_delta) between the current ATC sequence and the preceding ATC sequence is stored in the clip information. Thus, a value (ATC2) measured by the clock counter for processing ATC_Sequence constituting the current playitem is obtained by adding ATC_delta to a value (ATC1) measured by the clock counter for processing ATC_Sequence constituting the preceding playitem.

Also, an offset value called "STC_delta" is obtained when playitems are switched.

The "STC_delta" value is added to a value (STC1) measured by the clock counter for processing the STC sequence constituting the preceding playitem. This results in a value (STC2) measured by the clock counter for processing the STC sequence constituting a new current playitem.

The offset value "STC_delta" is obtained by the following equation, where "PTS1 (1stEND)" represents the display start time of the last picture played back in the first STC sequence, "Tpp" represents the display period of the picture, "PTS2 (2ndSTART)" represents the display start time of the first picture played back in the second STC sequence, and it is taken into account that, when CC=5, the time "PTS1 (1stEND)+Tpp" should match the time "PTS2(2ndSTART)", $$STC\_delta=PTS1(1stEND)+Tpp-PTS2(2ndSTART)$$

Here, the basic stream selection table and the extension stream selection table are considered. When the above-described seamless connection is to be realized, it is required that the tables are the same for continuous two pieces of playitem information. However, the basic stream selection table and the extension stream selection table may be different in the file specification method.

The ESs in two stream files and ESs multiplexed in one clip can be connected seamlessly when the same ESs are permitted in both the basic stream selection table and the extension stream selection table, under the conditions that the streams have the same stream attributes, and so on.

That is to say, the playitem information for 2TS interleave and the playitem information for 1TS multiplexing can be connected together when the same ESs are permitted in both the basic stream selection table and the extension stream selection table.

The above-described connections occur in the following cases:

a) connection of playitem information in the multi-angle section;

b) connection of playitem information for the disc content and the downloaded content; and c) connection of playitem information for a moving picture and a still picture.

FIGS. 89A and 89B show the forms for seamlessly connecting two playitems. FIG. 89A shows the structure for seamlessly connecting streams in two clip files and streams multiplexed in one clip.

FIG. 89B shows the setting of In_Time and Out_Time in the sub-playitem.

The sub-playitems included in the sub-paths of the types 8, 9, 10 have the same start time and end time as the corresponding playitem information.

Embodiment 17

The present embodiment proposes that, when 3D/2D-shared data block B[i]ss and 2D-only data block B[i]2D are provided in each recording layer of the multi-layered optical disc, a playback path that is played back via these data blocs is provided.

According to the writing of stream files disclosed in an earlier embodiment, a 3D-only data block B[i]ss and a 2D-only data block B[i]2D are written immediately before a layer boundary. Thus a new sub-path is defined as a 3D bypass path for switching between files that are referenced at the layer boundary by the 2D playback device and the 3D playback device.

FIGS. 90A through 90C show the sub-path types for switching between files at the layer boundary. FIG. 90A shows that: when the sub-path type is "8", the sub-path is the dependent view for LR; when the sub-path type is "9", the sub-path is the dependent view for Depth; and when the sub-path type is "10", the sub-path is the 3D bypass path for switching between files that are referenced at the layer boundary by the 2D playback device and the 3D playback device.

When there is no need to switch between 2D and 3D in one playlist, the playlist may be divided.

In the 3D-only disc (without allocation for 2D playback device), the bypass by the sub-path of type "10" is not used, but the clip referenced by the playitem information is played back.

FIG. 90B shows the AV clips constituting the sub-paths of sub-path types "8" and "9". FIG. 90C shows the AV clips constituting the sub-path of sub-path type "10". As described earlier in other embodiments, the AV clip for 2D playback and the AV clip for 3D playback need to be separated from each other at a position, such as a layer boundary, where a long jump occurs.

This is why the sub-playitem of sub-path type "10" is composed of AV clip 2 and AV clip 3.

Embodiment 18

In the embodiments so far, the extension stream selection table supports the 3D-LR method and the "1 plane+offset" mode. The present embodiment provides description of the extension stream selection table that supports the 3D-depth method, as well.

The following describes how to describe the stream registration sequences for permitting the playback of the primary video stream and the primary audio stream.

FIG. 91 shows one example of how to describe, using the source code, the stream registration sequences for permitting the playback of the primary video stream and the primary audio stream.

The first "for" statement defines the stream registration sequence of the primary video stream, and is a loop statement that defines "dependent_view_is_available", "depth_is_available", and two "if" statements as many as the number of primary video streams.

The "dependent_view_is_available" indicates whether or not a data block for the right view exists. The "depth_is_available" indicates whether or not a data block for the depth exists. When such a data block exists, the "Stream_entry" in this loop includes a PID for identifying the clip file that corresponds to the data block, and for identifying the target data in the clip file.

The "if" statement whose conditional expression is "dependent_view_is_available" in the "for" statement indicates that the stream entry and the stream attribute are added if "dependent_view_is_available" is valid.

The "if" statement whose conditional expression is "depth_is_available" in the "for" statement indicates that the stream entry and the stream attribute are added if "depth_is_available" is valid.

The second "for" statement defines the stream registration sequence of the primary audio stream, and is a loop statement that defines "replace_3D_audio_stream", the stream entry, and the stream attribute as many as the number of primary audio streams.

The "replace_3D_audio_stream" indicates whether or not the audio stream should be replaced during the execution of the 3D playback mode.

(PG Text Subtitle Stream)

The following describes how to describe the stream registration sequences for permitting the playback of the PG text subtitle stream. It is described so that it is detected whether or not LR-method data and depth information exist in correspondence with one stream number, and necessary files are specified.

FIG. 92 shows one example of how to describe, using the source code, the stream registration sequences for the PG text subtitle stream.

The "for" statement in the drawing defines a loop in which "offset_is_available" indicating whether or not the offset is valid, "LR_streams_are_available" indicating whether or not the LR method is valid, "Depth_stream_is_available" indicating whether or not the 3D-depth method is valid, and three "if" statements are repeated as many as the number of text subtitle streams.

The "if" statement whose conditional expression is "offset_is_available" indicates that the stream entry and the stream attribute are added if "offset_is_available" is valid.

The "if" statement whose conditional expression is "LR_streams_are_available" indicates that the stream entry for left, the stream entry for right, and the stream attribute are added if "LR_streams are_available" is valid.

The "if" statement whose conditional expression is "Depth_stream_is_available" indicates that the stream entry and the stream attribute are added if "Depth_stream_is_available" is valid.

(IG Stream)

The following describes how to describe the stream registration sequences for permitting the playback of the IG stream.

FIG. 93 shows one example of how to describe the stream registration sequences for the IG stream.

The "for" statement in the drawing includes "offset_is_available", "LR_streams_are_available", "Depth_stream_is_available", and three "if" statements as many as the number of text subtitle streams.

The "if" statement whose conditional expression is "offset_is_available" indicates that the stream entry and the stream attribute are added if "offset_is_available" is valid.

The "if" statement whose conditional expression is "LR_streams_are_available" indicates that the stream entry for left, the stream entry for right, and the stream attribute are added if "LR_streams_are_available" is valid.

The "if" statement whose conditional expression is "Depth_stream_is_available" indicates that the stream entry and the stream attribute are added if "Depth_stream_is_available" is valid.

FIG. 94 shows one example of how to describe the stream registration sequences for the secondary audio stream and the secondary video stream.

(Secondary Audio Stream)

The following describes how to describe the stream registration sequences for permitting the playback of the secondary audio stream.

The first "for" statement forms a loop in which a set of "replace_3D_audio_stream", the stream entry, and the stream attribute is defined as many times as the number of secondary audio streams. The "replace_3D_audio_stream" indicates whether or not the secondary audio stream should be replaced during the execution of the 3D playback mode.

The second "for" statement includes the pair of "dependent_view_is_available" and "Depth_is_available", and two "if" statements.

The "if" statement whose conditional expression is "dependent_view_is_available" indicates that the stream entry and the stream attribute are added if "dependent_view_is_available" is valid.

The "if" statement whose conditional expression is "Depth_is_available" indicates that the stream entry and the stream attribute are added if "Depth_is_available" is valid.

(Secondary Video Stream)

The following describes how to describe the stream registration sequences for permitting the playback of the secondary video stream.

The second "for" statement is a loop statement in which "dependent_view_is_available", "Depth_is_available", and two "if" statements are defined as many times as the number of secondary video streams.

The "if" statement whose conditional expression is "dependent_view_is_available" in the "for" statement indicates that the stream entry and the stream attribute are added if "dependent_view_is_available" is valid.

The "if" statement whose conditional expression is "Depth_is_available" in the "for" statement indicates that the stream entry and the stream attribute are added if "Depth_is_available" is valid.

As described above, according to the present embodiment, it is possible to create the extension stream selection table that can support the 3D-depth method, as well as the 3D-LR method and the "1 plane+offset" mode.

Embodiment 19

The present embodiment explains the plane offset of the text subtitle stream.

The text subtitle (textST) stream is not multiplexed in the AV stream. Accordingly, when the text subtitle stream is to be played back, the substantive data of the text subtitle stream and the fonts that are used to extend the text need to be preloaded into the memory. Also, which languages of text subtitle streams can be normally displayed is set in the capability flags provided in correspondence with the language codes in the BD-ROM playback device. On the other hand, the capability flags need not be referenced when the subtitle by the PG stream is played back. This is because the subtitle by the PG stream can be played back only by extending the run-length-compressed subtitle.

Up to now, the general structure of the text subtitle stream has been described. The following describes an improvement of the text subtitle stream unique to the 3D playback mode. For the text subtitle stream (composed of TS packets 0x1801) that is the target of playback in the "1 plane+offset (3D-LR)" mode and the 3D-depth mode, the plane offset can be updated in a unit of a frame, and the pallet structure for plane can be added. These are realized to meet the demand that, to change the depth smoothly, only the offset information should be sent for each frame to the text subtitle decoder.

With use of the differential between two pieces of offset information, it is possible to change the depth linearly over time. It is also possible to change the offset by adjusting the speed smoothly by supplementing the interval between two points linearly.

Figure 95:
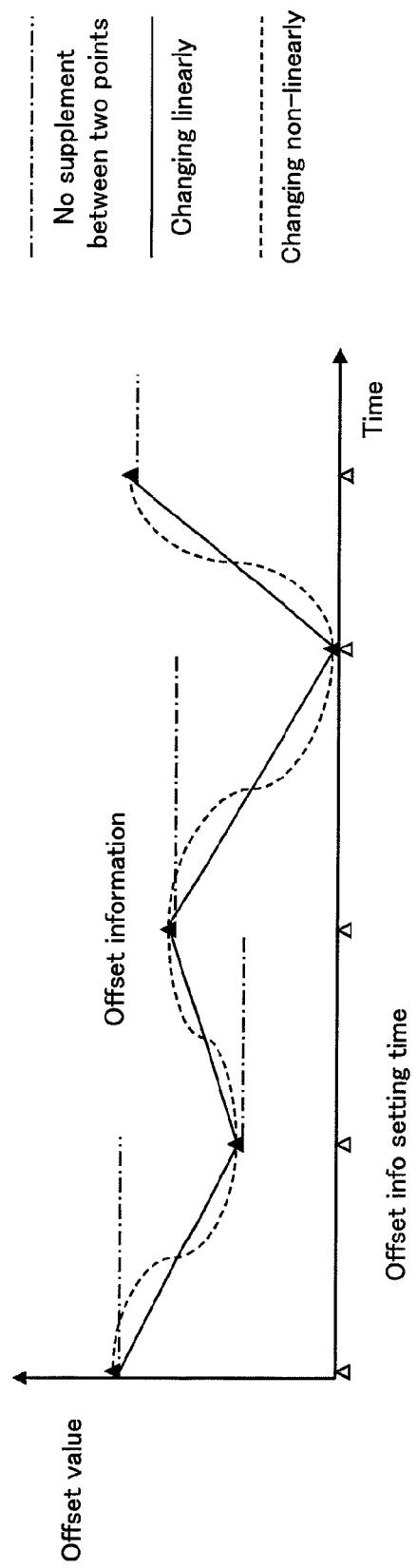
FIG. 95 is a graph indicating the temporal change in the plane offset of the text subtitle stream.

FIG. 95 is a graph indicating the temporal change in the plane offset of the text subtitle stream. In FIG. 95, the dotted line indicates a non-linear supplement, and the solid line indicates a linear supplement.

As described above, according to the present embodiment, the linear supplement and non-linear supplement can be used to set the plane offset. This makes it possible to change the pop-out level of the subtitle smoothly.

Embodiment 20

Figure 96:
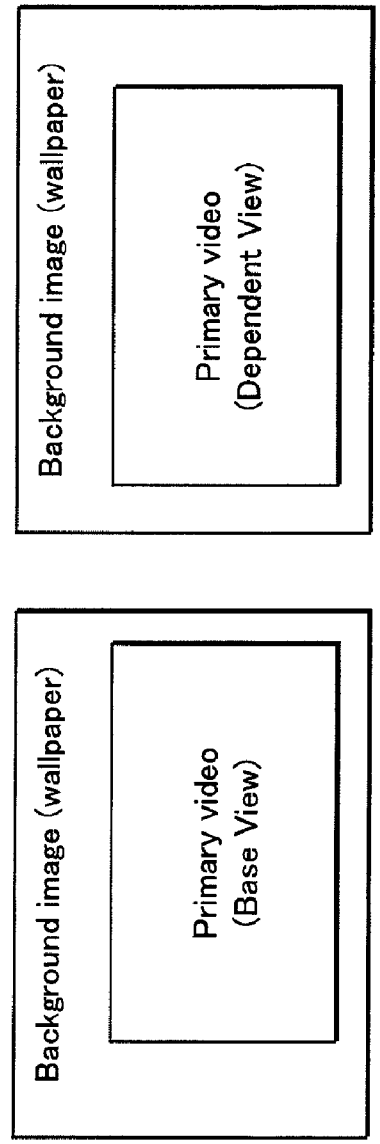
FIG. 96 shows the I-picture constituting the background image.

The present embodiment relates to an improvement of the plane memory existing in the lowest layer in the layer model of the plane. The plane memory is called a background plane memory, and stores the background image (wallpaper). The data stored in the background plane memory is used as the background image (wallpaper) when the pop-up menu of the interactive graphics is played back or when the BD-J application displays the pop-up menu. In the present embodiment, the data stored in the background plane is changed so that the display format changes as the primary video stream switches between 2D and 3D. FIG. 96 shows the I-picture constituting the background image. To set the background image (wallpaper), JPEG or I-frame is specified for each of L and R. When switching between 2D and 3D is performed, either the left or right image that is specified by the MainView attribute (=L or R) is displayed.

Embodiment 21

The playback device 200 recited in Embodiment 8 is provided with a local storage including the built-in medium drive and removable medium drive, and is structured presuming that data is written into these storages. This indicates that the playback device of the present application has a function of a recording device, as well. When the playback device 200 functions as the recording device, the playlist information including the extension stream selection table is written as follows.

i) When the playback device 200 has a function to receive the on-demand manufacture service or the electronic sell-through service (MODEST), the writing of the BD-J object is performed as follows.

That is to say, when the playback device 200 receives the supply of the BD-J object by the on-demand manufacture service or the electronic sell-through service (MODEST), a default directory and the MODEST directory are created under the root directory of the removable medium, and the BDMV directory is created under the MODEST directory. This MODEST directory is the first MODEST directory which is created when the service is received for the first time. When the user receives the service for the second time or later, the control unit in the playback device 200 creates the MODEST directory that corresponds to the service of the second time or later.

As described above, upon obtaining the playlist information, the control unit writes the start-up program into the default directory, and writes the BD-J object into the BDMV directory under the default directory. The start-up program is a program that is to be executed first when the recording medium is loaded into the playback device 200. The start-up program causes the playback device 200 to display the menu for receiving from the user the operation for selecting the BDMV directory, and causes the playback device 200 to execute the route change function. The root change function is a function that, when the user performs a selection operation on the menu, causes it to recognize the MODEST directory to which the selected BDMV directory belongs, as the root directory. With the root change function, it is possible to execute the playback control based on the playlist information obtained by the same control procedure as for playing back the BD-ROM.

ii) Implementation as recording device realizing managed copy

The recording device may write the digital stream by the managed copy.

The managed copy is a technology that, when a digital stream, playlist information, clip information, or application program is to be copied from a read-only recording medium such as the BD-ROM to another optical disc (BD-R, BD-RE, DVD-R, DVD-RW, DVD-RAM or the like), hard disk, removable medium (SD memory card, memory stick, Compact Flash™, smart medium, multi-media card or the like), has a communication with a server to perform an authentication, and permits the copy only if the authentication results in success. This technology makes it possible to perform controls, such as limiting the number of backups, and permitting the backup only with billing.

When a copy from the BD-ROM to the BD-R or BD-RE is to be performed, and the copy source and the copy destination have the same recording capacity, the managed copy only requires a sequential copy of the bit stream in the BD-ROM from the innermost circumference to the outermost circumference.

When the managed copy is the one that assumes a copy between different types of mediums, a transcode is necessary. Here, the "transcode" means a process for adapting the digital stream recorded in the BD-ROM to the application format of the copy-destination medium by converting the format of the digital stream from the MPEG2 transport stream format to the MPEG2 program stream format or the like, or re-encoding after decreasing the bit rates assigned to the video stream and the audio stream. In the transcode, it is necessary to obtain the AV clip, clip information, and playlist information by performing the above-described real-time recording process.

As described above, according to the present embodiment, it is possible to implement the playback devices having been described in the earlier embodiments as recording/playback devices of dual type.

Embodiment 22

The present embodiment relates to an improvement of the audio stream.

The encoding methods of the audio stream include DD/DD+, DTS-HD, and DD/MLP, as well as LPCM. The audio frame of the audio streams encoded by the encoding methods such as DD/DD+, DTS-HD, and DD/MLP is composed of basic data and extension data. The basic data and extension data of DD/DD+ are respectively the independent substream and the dependent substream; the basic data and extension data of DTS-HD are respectively the core substream and the extension substream; and the basic data and extension data of DD/MLP are respectively the DD data and the MLP audio.

To support these encoding methods, the playback device is provided with: a configuration register that indicates, for each encoding method, whether the stereo playback capability or the surround playback capability is present; a language setting register that indicates the language setting of the playback device; and a stream number register that stores the audio stream number of the audio stream that is the target of playback. And, in order to select a playback target from among a plurality of audio streams, the playback device executes a procedure that judges which among a plurality of conditions are satisfied by each of a plurality of audio stream recorded on the recording medium, and selects an audio stream based on the combination of conditions satisfied by each audio stream.

The plurality of conditions include the first, second, and third conditions. The first condition is whether the audio stream can be played back, which is judged by comparing the encoding method of the audio stream with the value set in the configuration register. The second condition is whether the language attributes match, which is judged by comparing the language code of the audio stream with the value set in the language setting register. The third condition is whether the surround output can be performed, which is judged by comparing the number channels of the audio stream with the value set in the configuration register.

When there is no audio stream that satisfies all of the first, second, and third conditions, an audio stream which, among audio streams satisfying the first and second conditions, is the first one registered in the STN_table is selected, and the stream number of the selected audio stream is set in the stream number register (PSR1) in the playback device. With such a procedure, an optimum audio stream is selected. The setting register in the playback device includes a first group of flags corresponding to the basic data of a plurality of encoding methods and a second group of flags corresponding to the extension data of the plurality of encoding methods. The first group of flags is composed of a plurality of flags that indicate, for each encoding method, whether the surround output of the basic data can be processed. The second group of flags is composed of a plurality of flags that indicate, for each encoding method, whether the surround output of the extension data can be processed.

The audio streams are not influenced by the playback method of television. Thus the audio streams can be shared by the 2D mode and the 3D mode if the audio streams having sound effect and localization in 5.1 channel or the like are recorded.

The 2D mode and the 3D mode in display format differ in visual display. The above-described encoding methods adopted in the audio streams can localize the sound in front of the display by using the multi-channel such as the 5.1 channel.

In above-mentioned case, an extended multi-channel playback is available only in the playback devices that support the multi-channel extension method. The above-described encoding methods already support the multi-channel extension method, and there is no need to change audio between the 2D mode and the 3D mode.

However, if it is desired that the 2D mode and the 3D mode have different sound localizations, extension portions, which can be played back only by the 3D playback devices, may be set in the audio streams, or the audio to be played back may be switched between the 2D mode and the 3D mode.

In order that the 2D playback mode and the 3D playback mode have different sound localizations or the like, extension data for the 3D playback mode is set in the audio access unit constituting the audio stream, and the stream registration sequence of the audio stream is set in the extension stream selection table so that different TS packets are demultiplexed in the 2D playback mode and the 3D playback mode. And then, in the 3D playback mode, the audio stream for the 3D playback mode is played back. In this way, the sound localization unique to the 3D playback mode can be realized.

However, even when different audio streams are played back in the 2D playback mode and the 3D playback mode, the streams having the same stream number should have the same language attribute. With respect to a stream number, there should be no audio that can only be played back in the 2D mode, or no audio that can only be played back in the 3D mode. This rule is necessary to prevent the user from being confused when switching between the 2D playback mode and the 3D playback mode is made.

Even when different audio streams are prepared for the 2D playback mode and the 3D playback mode, respectively, the language attribute of the audio stream for the 2D mode should be made consistent with the language attribute of the audio stream for the 3D mode.

Embodiment 23

The present embodiment describes an example structure of a playback device for playing back the data of the structure described in an earlier embodiment, which is realized by using an integrated circuit 603.

Figure 97:
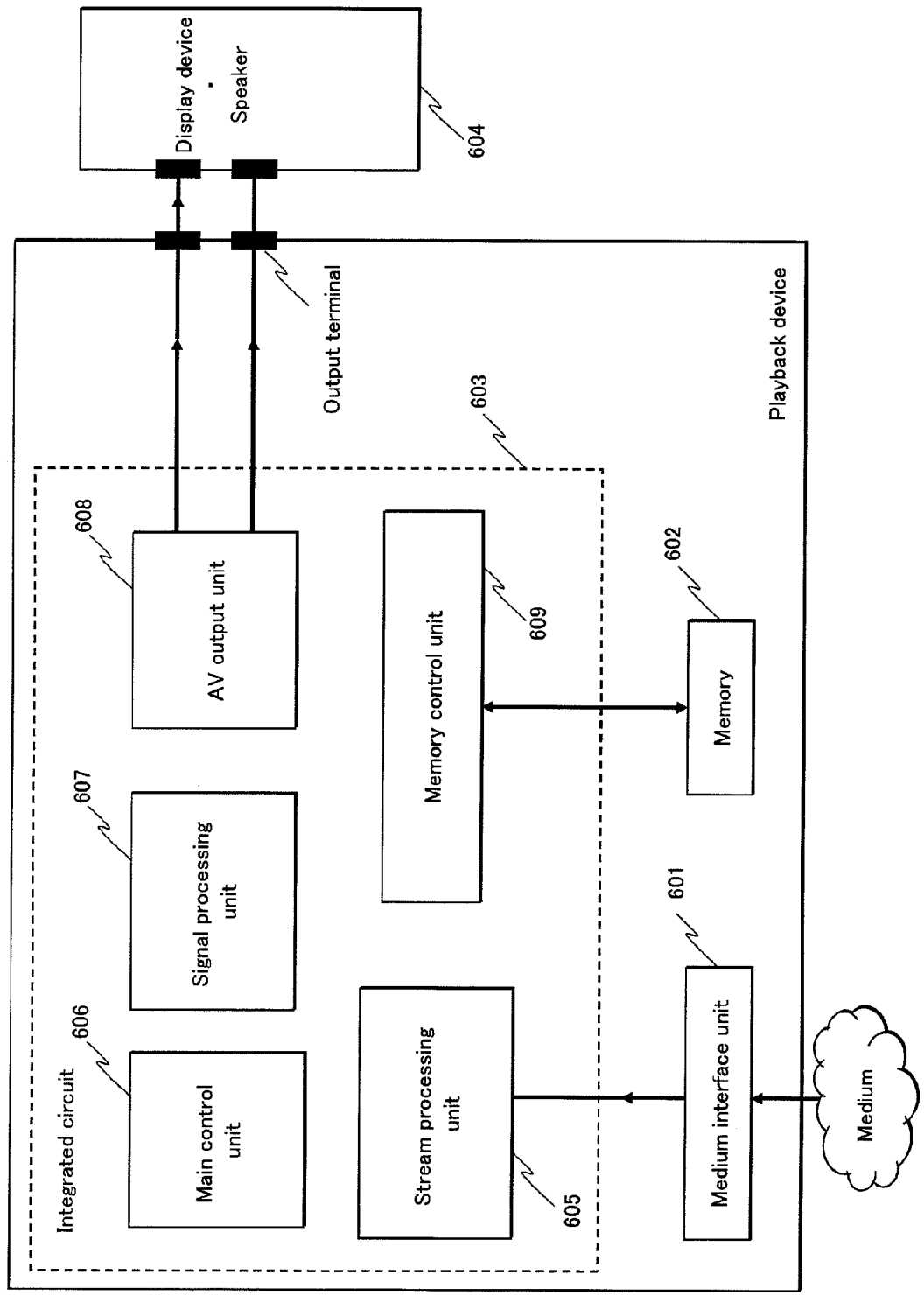
FIG. 97 shows an example structure of a 2D/3D playback device which is realized by using an integrated circuit.

FIG. 97 shows an example structure of a 2D/3D playback device which is realized by using an integrated circuit.

The medium interface unit 601 receives (reads out) data from the medium, and transfers the data to the integrated circuit 603. Note that the medium interface unit 601 receives the data of the structure described in the earlier embodiment. The medium interface unit 601 is, for example: a disc drive when the medium is the optical disc or hard disk; a card interface when the medium is the semiconductor memory such as the SD card or the USB memory; a CAN tuner or Si tuner when the medium is broadcast waves of broadcast including the CATV; or a network interface when the medium is the Ethernet, wireless LAN, or wireless public line.

The memory 602 is a memory for temporarily storing the data received (read out) from the medium, and the data that is being processed by the integrated circuit 603. For example, the SDRAM (Synchronous Dynamic Random Access Memory), DDRx SDRAM (Double-Date-Ratex Synchronous Dynamic Random Access Memory; x=1, 2, 3 . . . ) or the like is used as the memory 602. Note that the number of the memories 602 is not fixed, but may be one or two or more, depending on the necessity.

The integrated circuit 603 is a system LSI for performing the video/audio processing onto the data transferred from the interface unit 601, and includes a main control unit 606, a stream processing unit 605, a signal processing unit 607, a memory control unit 609, and an AV output unit 608.

The main control unit 606 includes a processor core having the timer function and the interrupt function. The processor core controls the integrated circuit 603 as a whole according to the program stored in the program memory or the like. Note that the basic software such as the OS (operating software) is stored in the program memory or the like preliminarily.

The stream processing unit 605, under the control of the main control unit 606, receives the data transferred from the medium via the interface unit 601 and stores it into the memory 602 via the data bus in the integrated circuit 603. The stream processing unit 605, under the control of the main control unit 606, also separates the received data into the video-base data and the audio-base data. As described earlier, on the medium, AV clips for 2D/L including left-view video stream and AV clips for R including right-view video stream are arranged in an interleaved manner, in the state where each clip is divided into some Extents. Accordingly, the main control unit 606 performs the control so that, when the integrated circuit 603 receives the left-eye data including left-view video stream, the received data is stored in the first area in the memory 602; and when the integrated circuit 603 receives the right-eye data including right-view video stream, the received data is stored in the second area in the memory 602. Note that the left-eye data belongs to the left-eye Extent, and the right-eye data belongs to the right-eye Extent. Also note that the first and second areas in the memory 602 may be areas generated by dividing a memory logically, or may be physically different memories.

The signal processing unit 607, under the control of the main control unit 606, decodes, by an appropriate method, the video-base data and the audio-base data separated by the stream processing unit 605. The video-base data has been recorded after being encoded by a method such as MPEG-2, MPEG-4 AVC, MPEG-4 MVC, or SMPTE VC-1. Also, the audio-base data has been recorded after being compress-encoded by a method such as Dolby AC-3, Dolby Digital Plus, MLP, DTS, DTS-HD, or Linear PCM. Thus, the signal processing unit 607 decodes the video-base data and the audio-base data by the methods corresponding thereto. Models of the signal processing unit 607 are various decoders of Embodiment 9 shown in FIG. 65.

The AV output unit 608, under the control of the main control unit 606, performs the superimposing of the video-base data having been decoded by the signal processing unit 607, or format conversion of the video-base data and the like, and outputs the data subjected to such processes to the outside of the integrated circuit 603.

Figure 98:
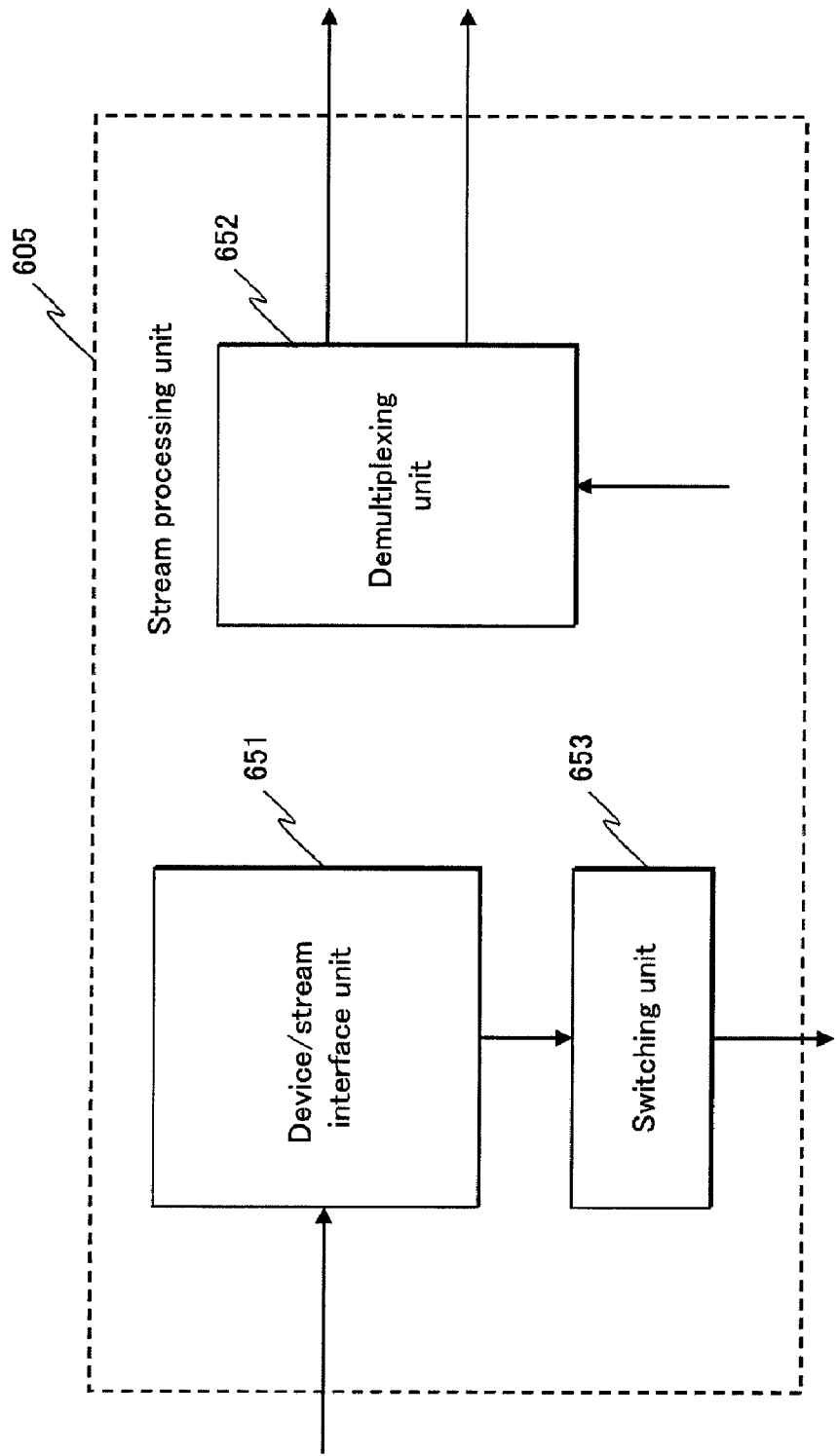
FIG. 98 is a functional block diagram showing a typical structure of the stream processing unit.

FIG. 98 is a functional block diagram showing a typical structure of the stream processing unit 605. The stream processing unit 605 includes a device/stream interface unit 651, a demultiplexing unit 652, and switching unit 653.

The device/stream interface unit 651 is an interface for transferring data between the interface unit 601 and the integrated circuit 603. The device/stream interface unit 651 may be: SATA (Serial Advanced Technology Attachment), ATAPI (Advanced Technology Attachment Packet Interface), or PATA (Parallel Advanced Technology Attachment) when the medium is the optical disc or the hard disk; a card interface when the medium is the semiconductor memory such as the SD card or the USB memory; a tuner interface when the medium is broadcast waves of broadcast including the CATV; or a network interface when the medium is the Ethernet, wireless LAN, or wireless public line. The device/stream interface unit 651 may have a part of the function of the interface unit 601, or the interface unit 601 may be embedded in the integrated circuit 603, depending on the type of the medium.

The demultiplexing unit 652 separates the playback data, transferred from the medium, including video and audio, into the video-base data and the audio-base data. Each Extent, having been described earlier, is composed of source packets of video, audio, PG (subtitle), IG (menu) and the like (dependent source packets may not include audio). The demultiplexing unit 652 separates the playback data into video-base TS packets and audio-base TS packets based on the PID (identifier) included in each source packet. The demultiplexing unit 652 transfers the data after the separation to the signal processing unit 607. A model of the demultiplexing unit 652 is, for example, the source depacketizer and the PID filter of Embodiment 9 shown in FIG. 65.

Figure 99:
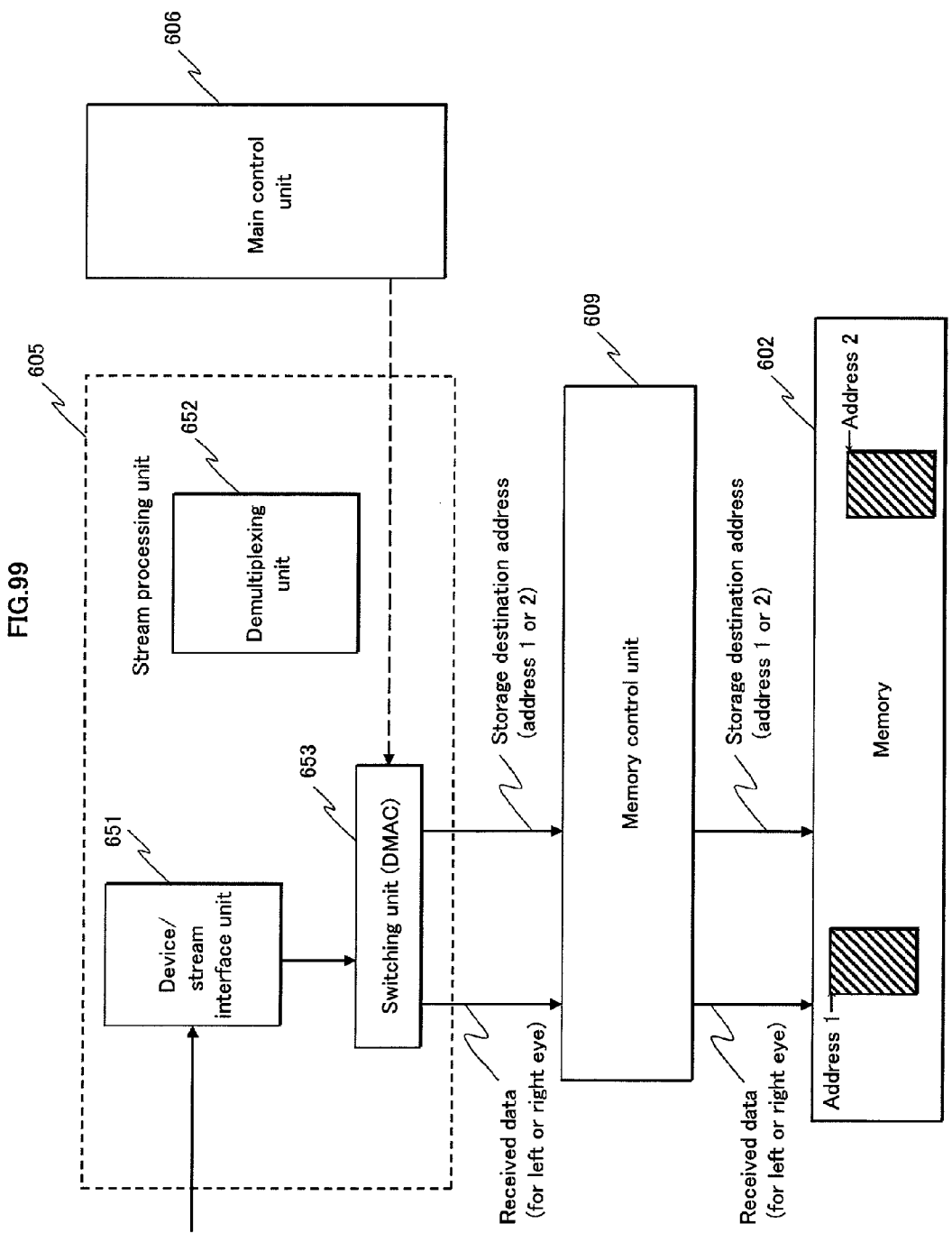
FIG. 99 is a conceptual diagram showing the switching unit 653 and the peripheral when the switching unit 653 is DMAC.

The switching unit 653 switches the output destination (storage destination) so that, when the device/stream interface unit 651 receives the left-eye data, the received data is stored in the first area in the memory 602; and when the integrated circuit 603 receives the right-eye data, the received data is stored in the second area in the memory 602. Here, the switching unit 653 is, for example, DMAC (Direct Memory Access Controller). FIG. 99 is a conceptual diagram showing the switching unit 653 and the peripheral when the switching unit 653 is DMAC. The DMAC, under the control of the main control unit 606, transmits the data received by the device stream interface and the data storage destination address to the memory control unit 609. More specifically, the DMAC switches the output destination (storage destination) depending on the received data, by transmitting Address 1 (the first storage area) to the memory control unit 609 when the device stream interface receives the left-eye data, and transmitting Address 2 (the second storage area) to the memory control unit 609 when the device stream interface receives the right-eye data. The memory control unit 609 stores data into the memory 602 in accordance with the storage destination address sent from the DMAC. Note that a dedicated circuit for controlling the 653 may be provided, instead of the main control unit 606.

In the above description, the device/stream interface unit 651, demultiplexing unit 652, and switching unit 653 are explained as a typical structure of the stream processing unit 605. However, the stream processing unit 605 may further include an encryption engine unit for decrypting received encrypted data, key data or the like, a secure management unit for controlling the execution of a device authentication protocol between the medium and the playback device and for holding a secret key, and a controller for the direct memory access. In the above, it has been explained that, when the data received from the medium is stored into the memory 602, the switching unit 653 switches the storage destination depending on whether the received data is left-eye data or right-eye data. However, not limited to this, the data received from the medium may be temporarily stored into the memory 602, and then, when the data is to be transferred to the demultiplexing unit 652, the data may be separated into the left-eye data and the right-eye data.

Figure 100:
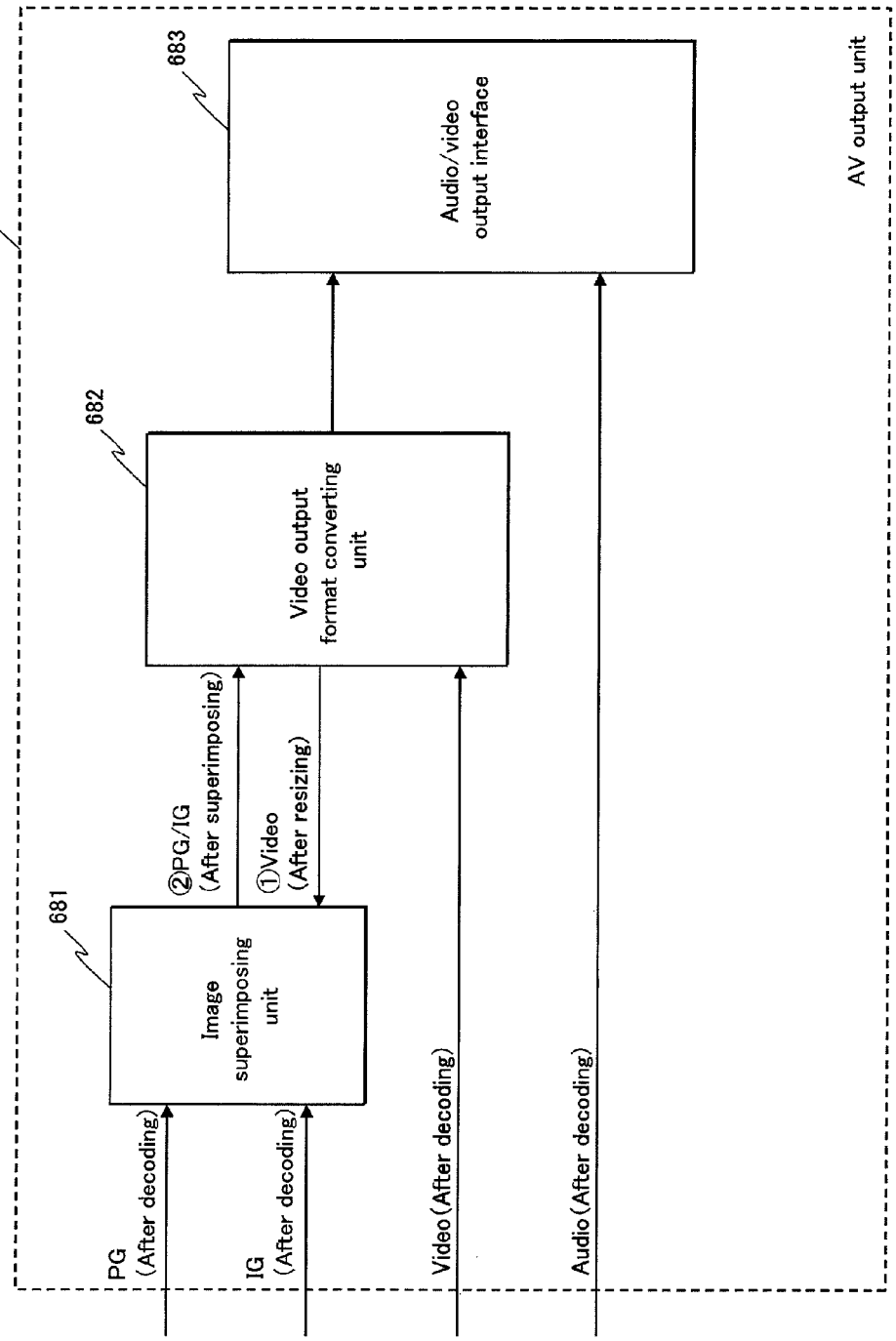
FIG. 100 is a functional block diagram showing a typical structure of the AV output unit 608.

FIG. 100 is a functional block diagram showing a typical structure of the AV output unit 608. The AV output unit 608 includes an image superimposing unit 681, a video output format converting unit 682, and an audio/video output interface unit 683.

The image superimposing unit 681 superimposes the decoded video-base data. More specifically, the image superimposing unit 681 superimposes the PG (subtitle) and the IG (menu) onto the left-view video data or the right-view video data in units of pictures. A model of the image superimposing unit 681 is, for example, Embodiment 11 and FIG. 71.

The video output format converting unit 682 performs the following processes and the like as necessary: the resize process for enlarging or reducing the decoded video-base data; the IP conversion process for converting the scanning method from the progressive method to the interlace method and vice versa; the noise reduction process for removing the noise; and the frame rate conversion process for converting the frame rate.

The audio/video output interface unit 683 encodes, in accordance with the data transmission format, the video-base data, which has been subjected to the image superimposing and the format conversion, and the decoded audio-base data. Note that, as will be described later, the audio/video output interface unit 683 may be provided outside the integrated circuit 603.

Figure 101:
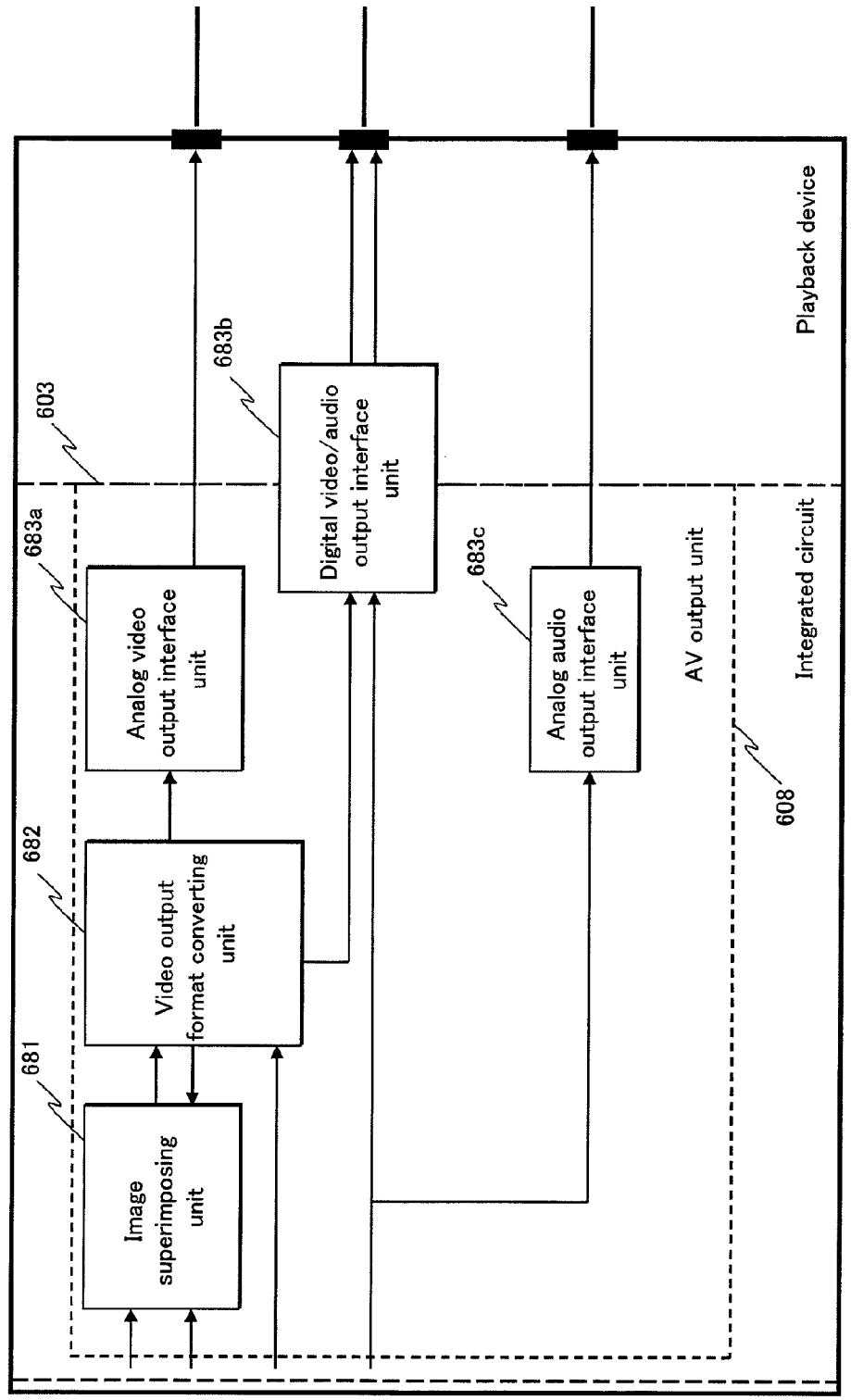
FIG. 101 is an example structure showing the AV output unit 608, or the data output part of the playback device in more detail.

FIG. 101 is an example structure showing the AV output unit 608, or the data output part of the playback device in more detail. The integrated circuit 603 of the present embodiment and the playback device support a plurality of data transmission formats for the video-base data and the audio-base data. The audio/video output interface unit 683 shown in FIG. 100 corresponds to an analog video output interface unit 683a, a digital video/audio output interface unit 683b, and an analog audio output interface unit 683c.

The analog video output interface unit 683a converts and encodes the video-base data, which has been subjected to the image superimposing process and the output format conversion process, into the analog video signal format, and outputs the conversion result. The analog video output interface unit 683a is, for example: a composit video encoder that supports any of the NTSC method, PAL method, and SECAM method; an encoder for the S image signal (Y/C separation); an encoder for the component image signal; or a DAC (D/A converter).

The digital video/audio output interface unit 683b synthesizes the decoded audio-base data with the video-base data having been subjected to the image superimposing and the output format conversion, encrypts the synthesized data, encodes in accordance with the data transmission standard, and outputs the encoded data. The digital video/audio output interface unit 683b is, for example, HDMI (High-Definition Multimedia Interface).

The analog audio output interface unit 683c, being an audio DAC or the like, performs the D/A conversion onto the decoded audio-base data, and outputs analog audio data.

The transmission format of the video-base data and audio-base data may be switched depending on the data receiving device (data input terminal) supported by the display device/speaker, or may be switched in accordance with the selection by the user. Furthermore, it is possible to transmit a plurality of pieces of data corresponding to the same content in parallel by a plurality of transmission formats, not limited to the transmission by a single transmission format.

In the above description, the image superimposing unit 681, video output format converting unit 682, and audio/video output interface unit 683 are explained as a typical structure of the AV output unit 608. However, the AV output unit 608 may further include, for example, a graphics engine unit for performing the graphics processing such as the filter process, image synthesizing, curvature drawing, and 3D display.

This completes the description of the structure of the playback device in the present embodiment. Note that all of the functional blocks included in the integrated circuit 603 may not be embedded, and that, conversely, the memory 602 shown in FIG. 97 may be embedded in the integrated circuit 603. Also, in the present embodiment, the main control unit 606 and the signal processing unit 607 have been described as different functional blocks. However, not limited to this, the main control unit 606 may perform a part of the process performed by the signal processing unit 607.

Figure 102:
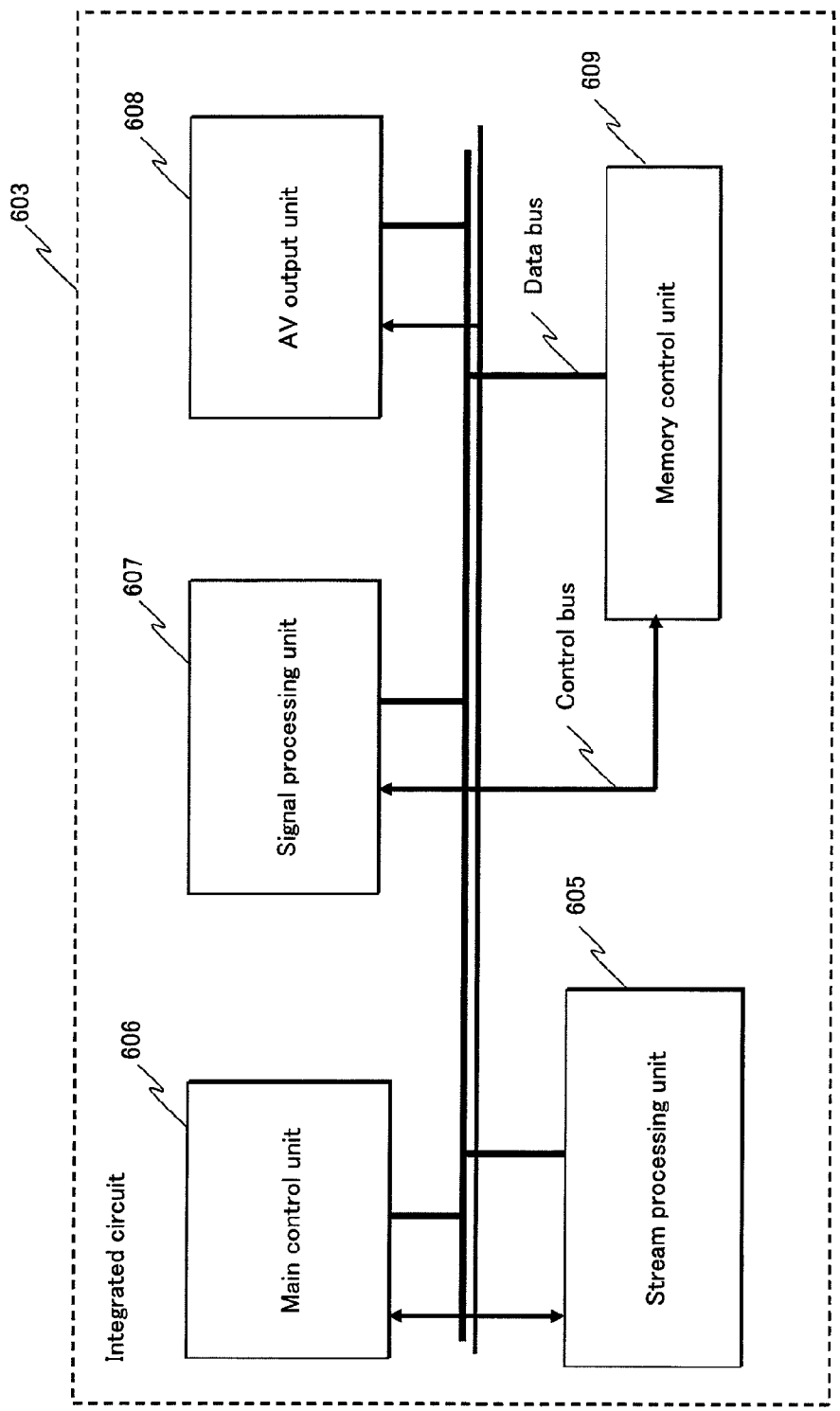
FIG. 102 shows an arrangement of the control buses and data buses in the integrated circuit.
Figure 103:
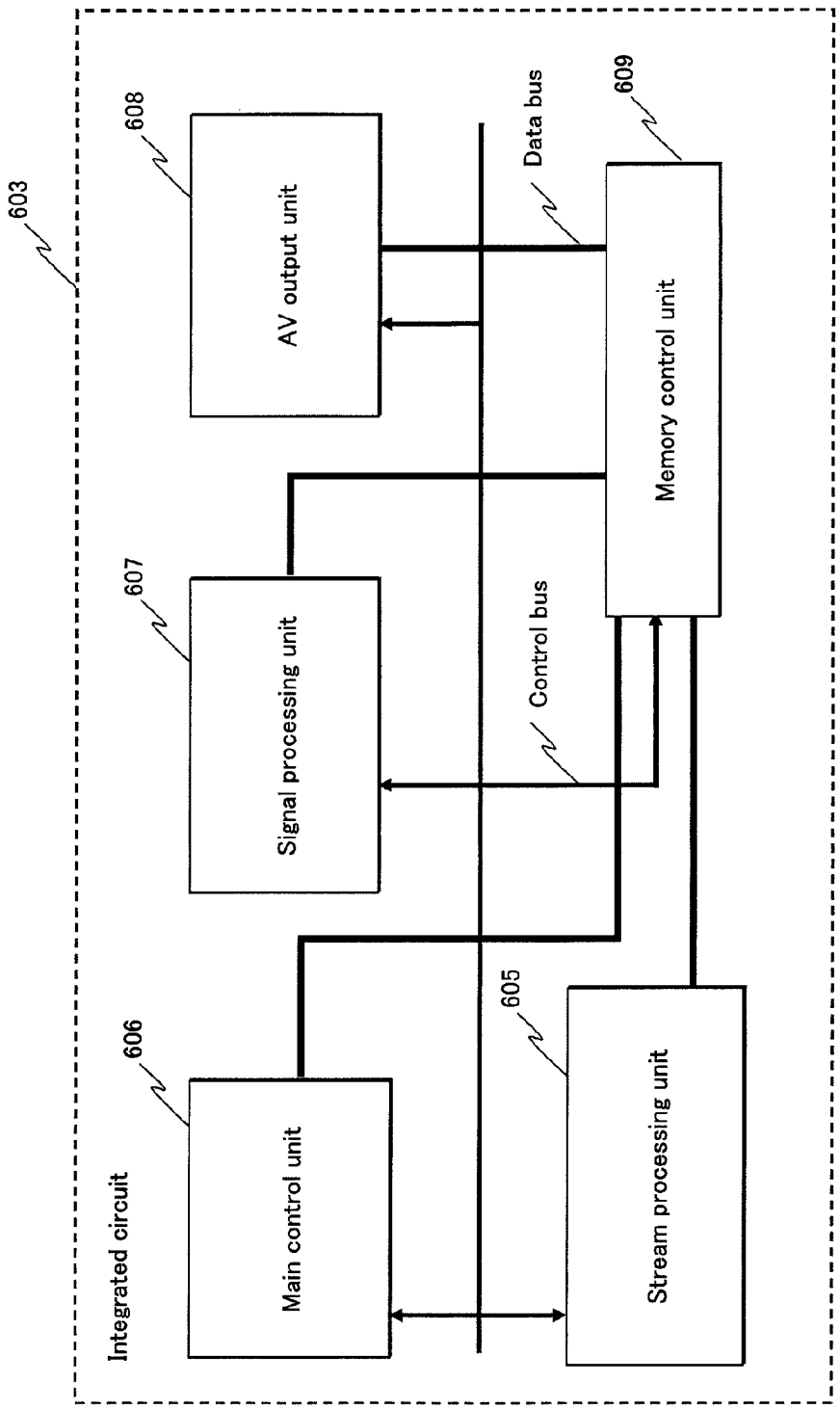
FIG. 103 shows an arrangement of the control buses and data buses in the integrated circuit.

The route of the control buses and the data buses in the integrated circuit 603 is designed in an arbitrary manner depending on the processing procedure of each processing block or the contents of the processing. However, the data buses may be arranged so that the processing blocks are connected directly as shown in FIG. 102, or may be arranged so that the processing blocks are connected via the memory 602 (the memory control unit 609) as shown in FIG. 103.

The integrated circuit 603 may be a multi-chip module that is generated by enclosing a plurality of chips into one package, and its outer appearance is one LSI.

It is also possible to realize the system LSI by using the FPGA (Field Programmable Gate Array) that can be re-programmed after the manufacturing of the LSI, or the reconfigurable processor in which the connection and setting of the circuit cells inside the LSI can be reconfigured.

Next, the operation of the playback device having the above-described structure will be explained.

Figure 104:
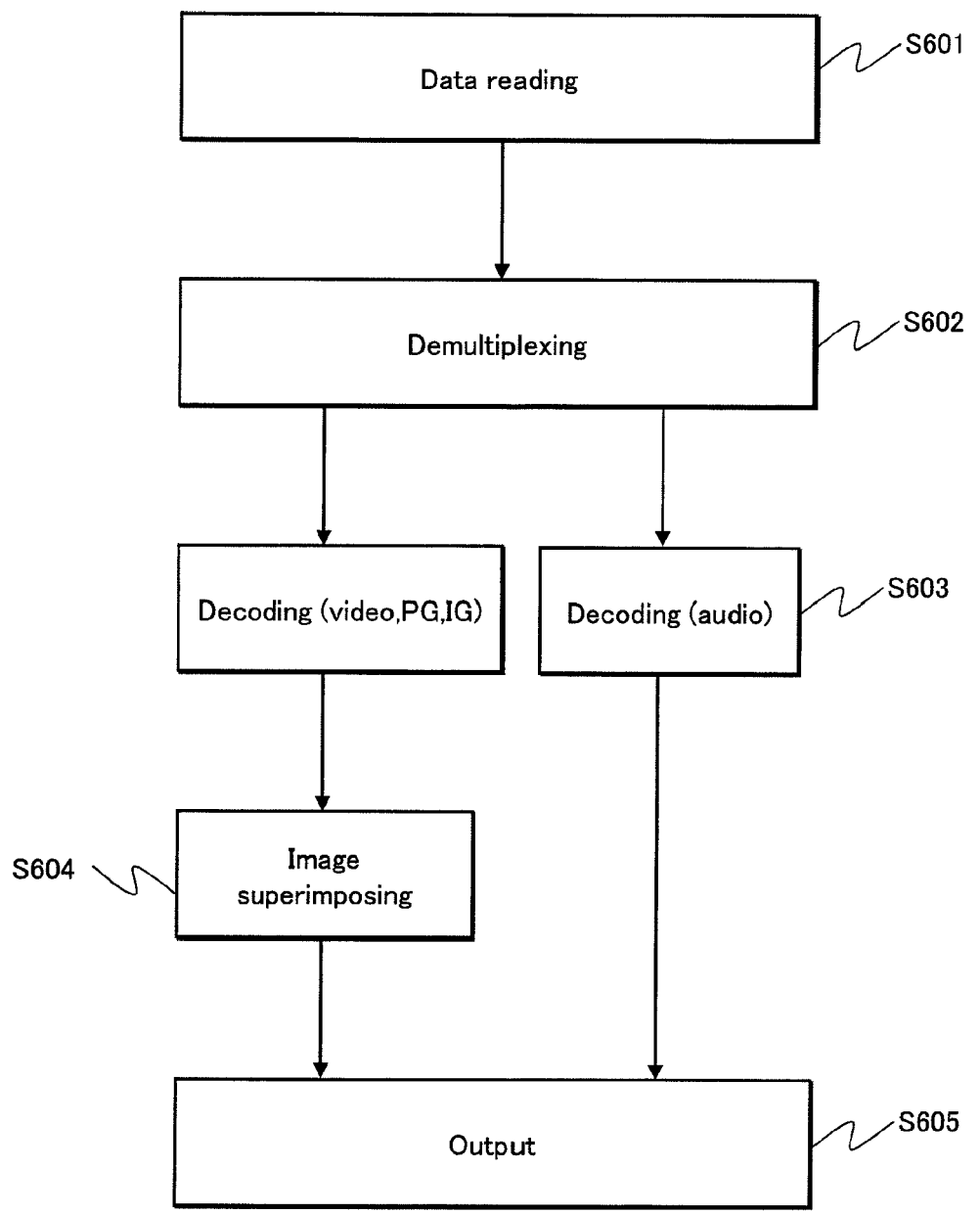
FIG. 104 is a simple flowchart showing an operation procedure in the playback device.

FIG. 104 is a flowchart showing a playback procedure in which data is received (read out) from the medium, is decoded, and is output as a video signal and an audio signal.

S601: data is received (read out) from the medium (the interface unit 601→the stream processing unit 605).

S602: the data received (read out) in S601 is separated into various data (the video-base data and the audio-base data) (the stream processing unit 605).

S603: the various data generated by the separation in S602 are decoded by the appropriate format (the signal processing unit 607).

S604: among the various data decoded in S603, the video-base data is subjected to the superimposing process (the AV output unit 608).

S605: the video-base data and the audio-base data having been subjected to the processes in S602 through S604 are output (the AV output unit 608).

FIG. 105 is a flowchart showing a detailed playback procedure. Each of the operations and processes is performed under the control of the main control unit 606.

S701: the device/stream interface unit 651 of the stream processing unit 605 receives (reads out) data (playlist, clip information, etc.) which is other than the data stored in the medium to be played back and is necessary for playback of the data, via the interface unit 601, and stores the received data into the memory 602 (the interface unit 601, the device/stream interface unit 651, the memory control unit 609, the memory 602).

S702: the main control unit 606 recognizes the compression method of the video and audio data stored in the medium by ref erring to the stream attribute included in the received clip information, and initializes the signal processing unit 607 so that the corresponding decode processing can be performed (the main control unit 606).

S703: the device/stream interface unit 651 of the stream processing unit 605 receives (reads out) the data of video/audio that is to be played back, from the medium via the interface unit 601, and stores the received data into the memory 602 via the stream processing unit 605 and the memory control unit 609. Note that the data is received (read out) in units of Extents, and the main control unit 606 controls the switching unit 653 so that, when the left-eye data is received (read out), the received data is stored in the first area; and when the right-eye data is received (read out), the received data is stored in the second area, and the switching unit 653 switches the data output destination (storage destination) (the interface unit 601, the device/stream interface unit 651, the main control unit 606, the switching unit 653, the memory control unit 609, the memory 602).

S704: the data stored in the memory 602 is transferred to the demultiplexing unit 652 of the stream processing unit 605, and the demultiplexing unit 652 identifies the video-base data (main video, sub-video), PG (subtitle), IG (menu), and audio-base data (audio, sub-audio) based on the PIDs included in the source packets constituting the stream data, and transfers the data to each corresponding decoder in the signal processing unit 607 in units of TS packets (the demultiplexing unit 652).

S705: each in the signal processing unit 607 performs the decode process onto the transferred TS packets by the appropriate method (the signal processing unit 607).

S706: among the video-base data decoded by the signal processing unit 607, the data corresponding to the left-view video stream and the right-view video stream is resized based on the display device (the video output format converting unit 682).

S707: the PG (subtitle) and IG (menu) are superimposed onto the video stream resized in S706 (the image superimposing unit 681).

S708: the IP conversion, which is a conversion of the scanning method, is performed onto the video data after the superimposing in S707 (the video output format converting unit 682).

S709: the encoding, D/A conversion and the like are performed onto video-base data and the audio-base data having been subjected to the above-described processes, based on the data output format of the display device/speaker or the data transmission format for transmission to the display device/speaker. The composit video signal, the S image signal, the component image signal and the like are supported for the analog output of the video-base data. Also, HDMI is supported for the digital output of the video-base data and the audio-base data. (the audio/video output interface unit 683)

S710: the video-base data and the audio-base data having been subjected to the process in S709 is output and transmitted to the display device/speaker (the audio/video output interface unit 683, the display device/speaker).

This completes the description of the operation procedure of the playback device in the present embodiment. Note that the result of process may be temporarily stored into the memory 602 each time a process is completed. Also, in the above operation procedure, the video output format converting unit 682 performs the resize process and the IP conversion process. However, not limited to this, the processes may be omitted as necessary, or other processes (noise reduction process, frame rate conversion process, etc.) may be performed. Furthermore, the processing procedures may be changed if possible.

(Supplementary Notes)

Up to now, the present invention has been described through the best embodiments that the Applicant recognize as of now. However, further improvements or changes can be added regarding the following technical topics. Whether to select any of the embodiments or the improvements and changes to implement the invention is optional and may be determined by the subjectivity of the implementer.

(Correspondence Between Files)

In Embodiment 3, as a specific example of association using the identification information, the identification number of the right view is generated by adding "1" to the identification number of the left view. However, not limited to this, the identification number of the right view may be generated by adding "10000" to the identification number of the left view.

When a coupling method is to be realized to associate the files by the file names, the playback device side requires a mechanism for detecting the coupled files, and a mechanism for detecting the file based on a predetermined rule, and playing back files that are not referenced by the playlist. The 3D supporting playback devices require the above-described mechanisms when they use any of such coupling methods. However, with this structure, there is no need to use different types of playlists to play back both the 2D and 3D images, and it is possible to make the playlist operate safely in the conventional 2D playback devices that are already prevalent.

As in the Depth method in which the grayscale is used, when the stereoscopic image cannot be played back only with one stream, it is necessary to distinguish the stream by assigning a different extension thereto to prevent it from being played back singly by the device by mistake. In connection with the identification of the file that cannot be played back singly, it is necessary to prevent the user from being confused when the 3D file is referenced from an existing device via DLNA (Digital Living Network Alliance). It is possible to realize the pairing information only by the file names by assigning the same file number and different extensions.

(Stereoscopic Viewing Methods)

According to the parallax image method used in Embodiment 1, the left-eye and right-eye images are displayed alternately in the time axis direction. As a result, for example, when 24 images are displayed per second in a normal two dimensional movie, 48 images, for the combination of the left-eye and right-eye images, should be displayed per second in a three dimensional movie. Accordingly, this method is suitable for display devices that rewrite each screen at relatively high speeds. The stereoscopic viewing using the parallax images is used in the play equipment of the amusement parks, and has been established technologically. Therefore, it may be said that this method is closest to the practical use in the homes. There have been proposed various other technologies such as the two-color separation method, as the methods for realizing stereoscopic viewing using the parallax images. In the embodiments, the sequential segregation method and the polarization glasses method have been used as examples. However, the present invention is not limited to these methods as far as the parallax images are used.

Also, not limited to the lenticular lens, the television 300 may use other devices, such as the liquid crystal element, that have the same function as the lenticular lens. It is further possible to realize the stereoscopic viewing by providing a vertical polarization filter for the left-eye pixels, and providing a horizontal polarization filter for the right-eye pixels, and causing the viewer to view the screen through a pair of polarization glasses that is provided with a vertical polarization filter for the left eye and a horizontal polarization filter for the right eye.

(Target of Application of Left View and Right View)

The left view and right view may be prepared not only to be applied to the video stream representing the main story, but also to be applied to the thumbnail images. As is the case with the video stream, the 2D playback device displays conventional 2D thumbnail images, but the 3D playback device outputs a left-eye thumbnail image and a right-eye thumbnail image prepared for the 3D, in compliance with a 3D display system.

Similarly, the left view and right view may be applied to menu images, thumbnail images of each scene for chapter search, and reduced images of each scene.

(Embodiments of Program)

The application program described in each embodiment of the present invention can be produced as follows. First, the software developer writes, using a programming language, a source program that achieves each flowchart and functional component. In this writing, the software developer uses the class structure, variables, array variables, calls to external functions, and soon, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded on a computer-readable recording medium, and may be provided to the user in this form.

(Playback of Optical Disc)

The BD-ROM drive is equipped with an optical head that includes a semiconductor laser, collimated lens, beam splitter, objective lens, collecting lens, and light detector. The light beams emitted from the semiconductor laser pass through the collimated lens, beam splitter, and objective lens, and are collected on the information surface of the optical disc.

The collected light beams are reflected/diffracted on the optical disc, pass through the objective lens, beam splitter, and collimated lens, and are collected in the light detector. A playback signal is generated depending on the amount of light collected in the light detector.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

(Embodiments of Semiconductor Memory Card Recording Device and Playback Device)

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to playback a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read out data via an optical disc drive, for example. On the other hand, in the case in which the playback device plays back a semiconductor memory card, it is structured to read out data via an interface for reading out the data from the semiconductor memory card.

More specifically, the playback device may be structured such that, when a semiconductor memory card is inserted into a slot (not illustrated) provided in the playback device, the playback device and the semiconductor memory card are electrically connected with each other via the semiconductor memory card interface, and the playback device reads out data from the semiconductor memory card via the semiconductor memory card interface.

(Embodiments of Receiving Device)

The playback device explained in each Embodiment may be realized as a terminal device that receives data (distribution data) that corresponds to the data explained in each Embodiment from a distribution server for an electronic distribution service, and records the received data into a semiconductor memory card.

Such a terminal device may be realized by structuring the playback device explained in each Embodiment so as to perform such operations, or may be realized as a dedicated terminal device that is different from the playback device explained in each Embodiment and stores the distribution data into a semiconductor memory card. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server (not illustrated) that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read-out identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted.
(1) A check on whether the identification information of the semiconductor memory card contained in the public key information matches the identification number of the semiconductor memory card preliminarily stored in the semiconductor memory card.
(2) A check on whether the hash value of the public key information calculated in the playback device matches the hash value included in the signature information.
(3) A check, based on the information included in the device list, on whether the playback device to perform the playback is authentic (for example, the device key shown in the device list included in the public key information matches the device key preliminarily stored in the playback device).

These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

It is preferable that the identifier of the semiconductor memory card that is preliminarily recorded in the semiconductor memory card is stored in a highly secure recording area. This is because, when the identification number (for example, the serial number of the SD memory card) that is preliminarily recorded in the semiconductor memory card is tampered with, unauthorized copying becomes easy. More specifically, unique, although different identification numbers are respectively assigned to semiconductor memory cards, if the identification numbers are tampered with to be the same, the above-described judgment in (1) does not make sense, and as many semiconductor memory cards as tamperings may be copied in an unauthorized manner.

For this reason, it is preferable that information such as the identification number of the semiconductor memory card is stored in a highly secure recording area.

To realize this, the semiconductor memory card, for example, may have a structure in which a recording area for recording highly confidential data such as the identifier of the semiconductor memory card (hereinafter, the recording area is referred to as a second recording area) is provided separately from a recording area for recording regular data (hereinafter, the recording area is referred to as a first recording area), a control circuit for controlling accesses to the second recording area is provided, and the second recording area is accessible only through the control circuit.

For example, data may encrypted so that encrypted data is recorded in the second recording area, and the control circuit may be embedded with a circuit for decrypting the encrypted data. In this structure, when an access is made to the second recording area, the control circuit decrypts the encrypted data and returns decrypted data. As another example, the control circuit may hold information indicating the location where the data is stored in the second recording area, and when an access is made to the second recording area, the control circuit identifies the corresponding storage location of the data, and returns data that is read out from the identified storage location.

An application, which is running on the playback device and is to record data onto the semiconductor memory card with use of the electronic distribution, issues, to the control circuit via a memory card interface, an access request requesting to access the data (for example, the identification number of the semiconductor memory card) recorded in the second recording area. Upon receiving the request, the control circuit reads out the data from the second recording area and returns the data to the application running on the playback device. It sends the identification number of the semiconductor memory card and requests the distribution server to distribute the data such as the public key information, and corresponding distribution data. The public key information and corresponding distribution data that are sent from the distribution server are recorded into the first recording area.

Also, it is preferable that the application, which is running on the playback device and is to record data onto the semiconductor memory card with use of the electronic distribution, preliminarily checks whether or not the application is tampered with before it issues, to the control circuit via a memory card interface, an access request requesting to access the data (for example, the identification number of the semiconductor memory card) recorded in the second recording area. For checking this, an existing digital certificate conforming to the X.509 standard, for example, may be used.

Also, the distribution data recorded in the first recording area of the semiconductor memory card may not necessarily be accessed via the control circuit provided in the semiconductor memory card.

INDUSTRIAL APPLICABILITY

The information recording medium of the present invention stores a 3D image, but can be played back in both 2D-image playback devices and 3D-image playback devices. This makes it possible to distribute movie contents such as movie titles storing 3D images, without causing the consumers to be conscious about the compatibility. This activates the movie market and commercial device market. Accordingly, the recording medium and the playback device of the present invention have high usability in the movie industry and commercial device industry.

DESCRIPTION OF CHARACTERS 100 recording medium
200 playback device
300 display device
400 3D glasses
500 remote control Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device for playing back a non-transitory recording medium on which playlist information and a plurality of elementary streams are recorded, the playlist information including a basic stream selection table and an extension stream selection table, wherein
the basic stream selection table showing a list of elementary streams that are to be played back in a monoscopic playback mode, and including stream numbers of the elementary streams,
the extension stream selection table showing a list of elementary streams that are to be played back in a stereoscopic playback mode, and including stream numbers of the elementary streams that are to be played back in the stereoscopic playback mode,
a dependent view video stream shown in the extension stream selection table being used in combination with a corresponding base view video stream shown in the basic stream selection table in the stereoscopic playback mode, and
a stream number of the dependent view video stream being identical to a stream number of the corresponding base view video stream, the playback device comprising:
a reading unit operable to read out sequentially a plurality of packets stored in the stream file;
a demultiplexing unit operable to demultiplex packets with predetermined packet identifiers, from among the plurality of packets read out by the reading unit; and
a decoder operable to decode the packets demultiplexed by the demultiplexing unit, wherein
in the stereoscopic playback mode, the demultiplexing unit uses, in the demultiplexing of the packets, packet identifiers indicated by stream entries associated with the stream numbers, among the list of elementary streams shown in the extension stream selection table.

2. The playback device of claim 1, wherein
the elementary streams to be played back in the stereoscopic playback mode are graphics streams,
the extension stream selection table includes an identification flag that indicates whether or not graphics streams played back in the stereoscopic playback mode include a pair of a left-view graphics stream and a right-view graphics stream, and
when the identification flag indicates that the graphics streams include a pair of a left-view graphics stream and a right-view graphics stream, the demultiplexing unit supplies the pair of the left-view graphics stream and the right-view graphics stream to the decoder.

3. The playback device of claim 2, wherein
the graphics streams are classified into presentation graphics streams and interactive graphics streams.

4. A recording method for recording playlist information and a plurality of elementary streams onto a non-transitory recording medium, the recording method comprising:
generating a base-view video stream and a dependent-view video stream, each of the base-view video stream and the dependent-view video stream including a plurality of extents;
recording the plurality of extents belonging to the base-view video stream and the plurality of extents belonging to the dependent-view video stream, the plurality of extents belonging to the base view video stream and the plurality of extents belonging to the dependent view video stream being disposed in an interleaved manner; and
recording the playlist information, wherein
the playlist information includes a basic stream selection table and an extension stream selection table,
the basic stream selection table shows a list of elementary streams that are to be played back in a monoscopic playback mode, and includes stream numbers of the elementary streams that are to be played back in the monoscopic playback mode,
the extension stream selection table shows a list of elementary streams that are to be played back in a stereoscopic playback mode, and includes stream numbers of the elementary streams that are to be played back in the stereoscopic playback mode,
a dependent view video stream shown in the extension stream selection table is used in combination with a corresponding base view video stream shown in the basic stream selection table in the stereoscopic playback mode, and
a stream number of the dependent view video stream is identical to a stream number of the corresponding base view video stream.

5. A recording medium playback system comprising a non-transitory recording medium and a playback device for playing back the non-transitory recording medium, playlist information and stream files being recorded on the non-transitory recording medium, wherein the playlist information includes a basic stream selection table and an extension stream selection table, the basic stream selection table shows a list of elementary streams that are to be played back in a monoscopic playback mode, and includes stream numbers of the elementary streams to be played back in the monoscopic playback mode, the extension stream selection table shows a list of elementary streams that are to be played back in a stereos copic playback mode, and includes stream numbers of the elementary streams that are to be played back in the stereoscopic playback mode, a dependent view video stream shown in the extension stream selection table is used in combination with a corresponding base view video stream shown in the basic stream selection table in the stereoscopic playback mode, a stream number of the dependent view video stream is identical to a stream number of the corresponding base view video stream, and the playback device includes:

a reading unit operable to read out sequentially a plurality of packets stored in the stream file;

a demultiplexing unit operable to demultiplex packets with predetermined packet identifiers, from among the plurality of packets read out by the reading unit; and a decoder operable to decode the packets demultiplexed by the demultiplexing unit, wherein in the stereoscopic playback mode, the demultiplexing unit uses, in the demultiplexing of the packets, packet identifiers indicated by stream entries associated with the stream numbers, among the list of elementary streams shown in the extension stream selection table.

6. A non-transitory recording medium produced in accordance with the recording method of claim 4.

7. A playback method for playing back the non-transitory recording medium according to claim 6, comprising:

reading the playlist information including the basic stream selection table and the extension stream selection table.

* * * * *